United States Patent

Mullery et al.

[15] 3,648,253

[45] Mar. 7, 1972

[54] PROGRAM SCHEDULER FOR PROCESSING SYSTEMS

[72] Inventors: Alvin P. Mullery, Chappaqua; Frank W. Zurcher, Jr., Yorktown Heights, both of N.Y.

[73] Assignees: International Business Machines Corporation, Armonk, N.Y.; Burroughs Corporation, Detroit, Mich.

[22] Filed: Dec. 10, 1969

[21] Appl. No.: 883,983

[52] U.S. Cl. .......... 340/172.5

[51] Int. Cl. .......... G06f 9/18

[58] Field of Search .......... 340/172.5; 235/157

[56] References Cited

UNITED STATES PATENTS

| | | | |
|---|---|---|---|
| 3,286,239 | 11/1966 | Thompson et al. | 340/172.5 |
| 3,312,951 | 4/1967 | Hertz | 340/172.5 |
| 3,333,252 | 7/1967 | Shimabukuro | 340/172.5 |
| 3,359,544 | 12/1967 | Macon et al. | 340/172.5 |
| 3,363,234 | 1/1968 | Erickson et al. | 340/172.5 |
| 3,399,384 | 8/1968 | Crockett et al. | 340/172.5 |
| 3,421,150 | 1/1969 | Quosig et al. | 340/172.5 |
| 3,449,722 | 6/1969 | Tucker | 340/172.5 |
| 3,491,339 | 1/1970 | Schramel | 340/172.5 |
| 3,496,551 | 2/1970 | Driscoll et al. | 340/172.5 |
| 3,530,438 | 9/1970 | Mellen et al. | 340/172.5 |

*Primary Examiner*—Gareth D. Shaw
*Assistant Examiner*—Sydney R. Chirlin
*Attorney*—Thomas and Thomas, Edwin M. Thomas and Ralph L. Thomas

[57] ABSTRACT

A program scheduler is provided for use with a multiprocessor system or its equivalent, such as a multiprogrammed processor unit, and the program scheduler receives tasks to be executed, schedules them for assignment, allots a task to each processor and interrupts the processors to assign new tasks. The program scheduler includes a plurality of buckets or tables where task words are stored, and associated with each task word is a $T_e$ field which specifies the estimated processor time required to complete the task and a $T_d$ field which indicates the time remaining before the task must be completed. The ratio $T_e/T_d$ provides an indication of the need of each task word for processor service since the need for such service becomes more urgent as the ratio approaches 1. A scheduling algorithm periodically recalculates the service ratio and shifts tasks, if need be, from one table to another whereby tasks with a similar service ratio are stored in a common table. Task words within a given table are divided into classes according to the length of time a task has not received service. An allocation algorithm allots tasks to processors from the older classes first and proceeds in sequence through the various classes to the latest classes. Both the scheduling algorithm and the allocation algorithm service all tables in the program scheduler, but the tables with higher service ratios are serviced more often by each algorithm than tables with lower service ratios. When many task words are awaiting processor service, a given task word receives processor service at a rather low frequency when it has a small service ratio, but it receives processor service at a relatively high frequency as its service ratio approaches 1.

40 Claims, 65 Drawing Figures

INVENTORS
ALVIN P. MULLERY
FRANK W. ZURCHER, JR.
BY Thomas & Thomas
ATTORNEYS

Patented March 7, 1972 3,648,253

61 Sheets-Sheet 10

Patented March 7, 1972 | 3,648,253

61 Sheets-Sheet 23

Patented March 7, 1972 3,648,253

61 Sheets-Sheet 33

Patented March 7, 1972 3,648,253

61 Sheets-Sheet 41

Patented March 7, 1972

3,648,253

61 Sheets-Sheet 4

PRIORITY CLOCK

Patented March 7, 1972 3,648,253

61 Sheets-Sheet 52

BT CLOCK FIG. 54

Patented March 7, 1972 3,648,253

61 Sheets-Sheet 53

Patented March 7, 1972 3,648,253

61 Sheets-Sheet 55

NEW TASK CLOCK

PROGRAM SCHEDULER FOR PROCESSING SYSTEMS

BACKGROUND OF THE INVENTION

1. This invention relates to processor systems and more particularly to a program scheduler for operating such systems in an efficient manner to cause the timely completion of a plurality of tasks.

2. In earlier types of program control devices used with multiprocessors or the equivalent system, such as a multiprogrammed processor unit, various program control techniques such as branch and interrupt, with or without condition, permitted some degree of flexibility in varying the order in which tasks were executed. However, the degree of flexibility was controlled in large part by internal conditions of the processor system over which the programmer had either no control at all or, at best, indirect control. The efficiencies provided were principally that of keeping the processors busy, a worthwhile objective to be sure. By utilizing various types of special instruction periodically to supervise program performance, some degree of control could be exercised in changing from one program to another. The degree of flexibility was minimal in scope, and the basic ordered arrangement of tasks remained relatively unchanged. There exists a need for a program control device which keeps each processor busy, and hence efficiently used, yet at the same time permits programs once scheduled to be interrupted and reassigned on the basis of an updated need for allocation to a processor. Neglected tasks should be favored at the expense of those unnecessarily advanced. It is to the objective of providing a program scheduling arrangement which modifies the order of task execution to provide for the timely completion of numerous tasks, whose priorities are constantly changing, while efficiently utilizing a multiplicity of program execution devices that the present invention is directed.

SUMMARY OF THE INVENTION

It is a feature of this invention to provide an improved program scheduler for operating a data processing system.

It is a feature of this invention to provide an improved program scheduler for operating a plurality of program execution devices.

It is a feature of this invention to provide a program control device which reevaluates the priority of multiple tasks awaiting execution and favors neglected tasks at the expense of tasks unnecessary advanced.

It is a feature of this invention to provide a program scheduler for a data processing system that provides a service ratio with each task which signifies the priority of need for processor service.

It is another feature of this invention to provide a program scheduler which includes a service ratio with each task, and tasks once scheduled are rescheduled and allocated to processors at a rate which changes with the service ratio.

It is a further feature of this invention to provide a program scheduler wherein each task has a service ratio which is continually updated, and the program scheduler includes provision to allocate tasks as a function of the service ratio.

It is a feature of this invention to provide a program scheduler which receives a plurality of tasks each of which has a service ratio that is continually updated, and the program scheduler allocates tasks as a function of the service ratio and the length of time a task has been waiting for service.

It is another feature of this invention to provide a program scheduler which includes a service ratio with each task wherein tasks are scheduled, and continually rescheduled, on the basis of the service ratio and wherein tasks are allocated on the basis of the service ratio the length of time the task has been awaiting service.

It is a further feature of this invention to provide a program scheduler which sooner or later allocates all tasks to a processor for some execution time, but the rate of allocation is weighted in favor of tasks with a higher priority.

It is a still further feature of this invention to provide a program scheduler for scheduling tasks each of which has a service ratio, and the program scheduler includes: (A) a first arrangement for scheduling tasks by (1) disposing task words in buckets or tables according to their service ratio, (2) updating the service ratio of each task with task words having higher service ratios being updated more often than those with lower service ratios, and (3) moving task words from one table to another, if need be, upon reevaluation, and (B) a second arrangement for allocating task words to a processor (1) as a function of the service ratio with task words having higher service ratios being allocated more often than task words with lower service ratios, and (2) allocating first those task words in a given table which have been waiting for service longer than other task words in the same table.

In one arrangement according to this invention a program scheduler is provided which includes a plurality of buckets or tables in which task words are stored according to their service ratio. Each task entering the system includes a $T_r$ field which signifies the amount of processor time needed to complete the task and a $T_d$ field which indicates the time remaining before the task must be completed. As each task enters the system the ratio $T_r/T_d$ is determined, and the task word is assigned to a table with other task words of a similar service ratio. More specifically, task words with a similar service ratio may include, for example, service ratios within the range one-eighth through seven thirty-seconds, this range being arbitrarily varied depending upon the number of tables used in a given installation. This range is decreased in magnitude per table as the number of tables increases. The service ratio of each task word in each table is recalculated at same frequency. One method, for example is to have tables having higher service ratios recalculated more often than tables with lower service ratios. Since the lapse of time causes the service ratios to change, the recalculation of the service ratio of all task words is necessary to update each of the tables, since, upon recalculation, task words may be moved from one table to another because of the change in their service ratios. As the scheduling algorithm moves task words from tables with lower service ratios to tables with higher service ratios it increases the likelihood that such task words may be allocated to a processor under the allocation algorithm. The allocation of task words to a processor is performed under the control of an allocation algorithm which allocates task words to the processor from all tables, but task words in the tables with higher service ratios are allocated more often than task words in tables with lower service ratios. Task words within each table are subdivided into classes according to the time the task words have been waiting for allocation. The boundaries between classes are defined by pointers which may be counters termed boundary counters. As words are allocated to processors from the various tables, words from the oldest classes are allocated from each table ahead of task words in the most recent classes. Thus, allocation of task words in the tables with a higher service ratio take place more often than in tables with lower service ratios, and task words in older classes of each table are allocated ahead of task words in more recent classes of the same table. Therefore it is seen that the scheduling algorithm and the allocation algorithm are weighted to favor task words with higher service ratios thereby to assure their timely completion ahead of task words with lower service ratios although task words with lower service ratios are given some processor time, small though it might be in some cases.

The foregoing and other objects, features and advantages of the invention will be apparent from the following move particular description of a preferred embodiment of the invention, as illustrated in the accompanying drawings.

DESCRIPTION OF THE PREFERRED EMBODIMENT

Figure 1:
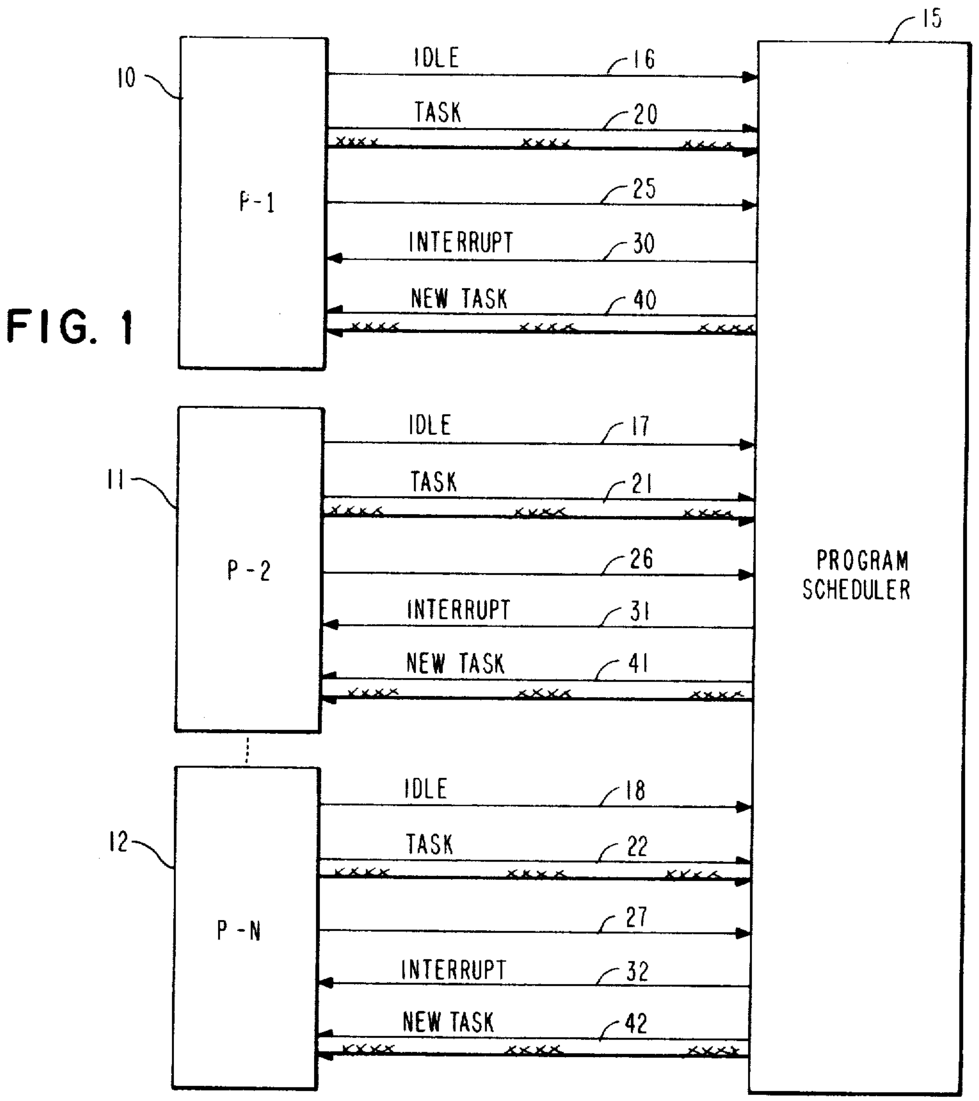
FIG. 1 illustrates a system according to this invention.

Referring first to FIG. 1, a multiprocessor system is shown which includes processors 10 through 12 which have their tasks automatically scheduled by a program scheduler 15. Whenever anyone of the processors completes the execution of its task, it sends a signal on a corresponding one of the lines 16 through 18 to signify this fact to the program scheduler 15. Whenever anyone of the processors is assigned a new task, it is interrupted, and the old task is forwarded to the program scheduler 15 via cable 20 through 22 so that such task may be rescheduled for execution. New tasks submitted for scheduling and old tasks awaiting reallocation to processors are monitored by the program scheduler 15, and depending upon the deadline for its completion, the priority of each task is adjusted to assure that it is completed on time. This type of scheduling favors neglected tasks at the expense of those that may have been advanced unnecessarily. The frequency of priority reevaluation is directly related to the task priority itself, but reevaluation by the program scheduler 15 does not imply that the task concerned is necessarily activated by interrupting another task. The program scheduler 15 assigns or allocates each task by forwarding signals in the form of task words over cables 40 through 42 to respective processors 10 through 12, and control signals on one of the corresponding lines 30 through 32 interrupts the associated one of the processors 10 through 12 to substitute the new task for the old task. The old task is returned to the program scheduler 15 via an associated one of the cables 20 through 22.

Figure 2:
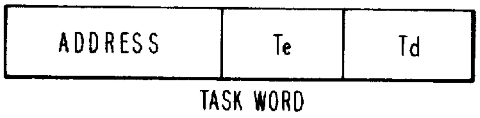
FIG. 2 depicts a task word used in this invention.

Processor time is quantized into time slices, and if there are P processors, then there are P time slices per time slot. A ratio, denoted as the requested service ratio, is associated with each task entering the system, and this service ratio is the ratio of the estimated amount of processor time required to complete the task to the amount of time yet remaining before some subsequent point in time when it is desired to have the computational results of the completed task. More specifically, the ratio is the number of time slices required to complete the processing of a task to the number of time slices remaining until the task must be completed. FIG. 2 illustrates the format of a task word which is supplied on the cables 20 through 22 to the program scheduler or on the cables 40 through 42 to the respective processors 10 through 12. The task word in FIG. 2 includes an address field which denotes the address in memory where the task status word, including the first instruction of a task program, is stored. The $T_e$ field represents the estimated processor time required for executing a task, and the $T_d$ field represents the time till the task must be completed. This latter time is referred to as "deadline" time. When a task is given to a processor, the processor decrements the $T_e$ field and the $T_d$ field according to the length of time that the task runs on the processor before it is interrupted or completes the assigned task. Every time that a task is interrupted in a processor and returned to the program scheduler, the current task then becomes a new task with the updated $T_e$ field and $T_d$. The $T_e$ and the $T_d$ fields of a task word are decremented by means not shown in the interest of simplicity. As mentioned above, the $T_e$ field is decremented by the processor according to the time that the processor works on the task. The $T_d$ field must be continuously, or at frequent intervals, decremented because the "time till deadline" continuously becomes smaller and smaller until at the actual "deadline" this value becomes zero. The $T_d$ field is never reduced to zero in order to prevent the service ratio from becoming infinity. The $T_d$ field is never reduced below 1. The $T_d$ field of each task word must be decremented at all times both while it is in the program scheduler 15 as well as while it is in the processors 10 through 12. In order to take care of the condition when the $T_d$ field is changing from any count to the next lower count, it is preferably that the $T_d$ field be coded in the well known "reflected binary" code. In the reflected binary code only one bit of the number changes when it goes from one count to the next lower count. Thus, when the $T_d$ field is gated from one location to another, the most that it could be in error would be one count. The calculation of the service ratio is done by dividing the $T_e$ field by the $T_d$ field, and the divider must be provided with a suitable decoder to convert the $T_d$ field from the reflected binary code to the conventional binary code before a division operation is performed. The service ratio is calculated in the program scheduler. In each processor the situation is somewhat simpler because the processor can keep track of the execution time on the task. When the task is interrupted, if such is the case, the $T_e$ and the $T_d$ fields may be decremented appropriately before the task word is sent back to the program scheduler. The decrementing of the $T_d$ field stops when the $T_d$ field reaches the value of 1, as explained above. This is done for the additional reason that the divider in the program scheduler need not have to recognize a zero or a negative divisor.

Figure 3:
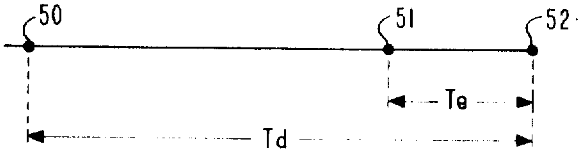
FIG. 3 shows the component parts of a service ratio used in this invention.

FIG. 3 illustrates the relationship of the $T_e$ and $T_d$ fields. The point 50 in FIG. 3 represents the time at which a task enters the system. The point 51 represents the time when the execution of the task must begin in order to be completed on time. The point 52 represents the time when the task must be completed. Tasks are assigned or allocated to processors for execution according to their service ratio and the length of time they are not serviced.

Figure 4:
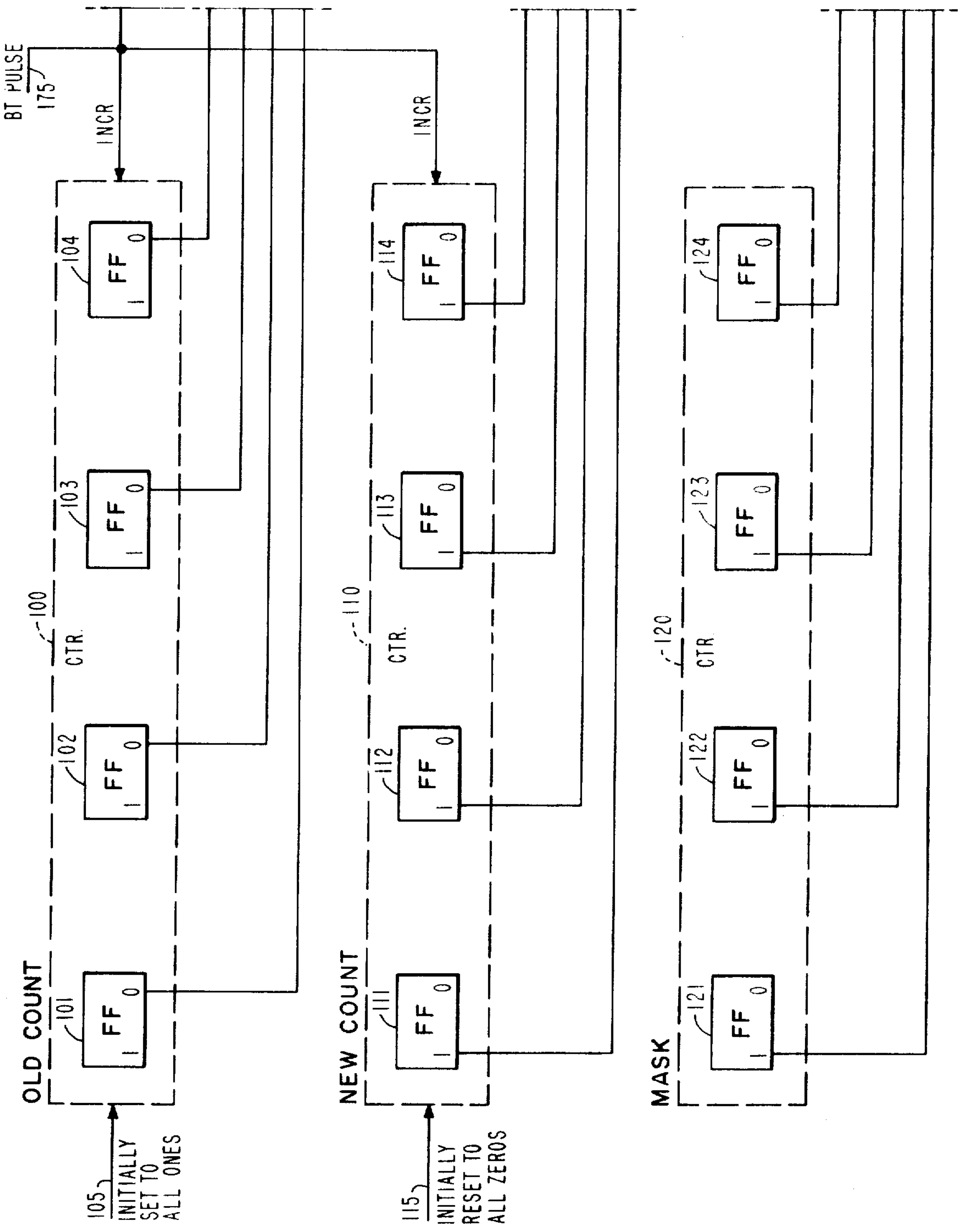
FIGS. 4 through 51 illustrate a program scheduler according to this invention.

A preferred arrangement of a program scheduler according to this invention is illustrated in detail in FIGS. 4 through 51. FIGS. 4 through 51 should be arranged as illustrated in FIG. 52. Positive logic is assumed unless otherwise indicated. Therefore, positive pulses or levels are effective to operate the various circuits, and such circuits provide positive output pulses or levels when they are operated. Referring first to FIG. 4, a counter 100 includes flip-flops 101 trough 104, and this counter is labeled old count. The old count counter 100 is initially set to all ones by a positive signal on a line 105. A new count counter 110 includes flip-flops 111 through 114, and this counter is initially reset to all zeros by a positive signal on a line 115. A mask register 120 includes flip-flops 121 through 124.

Figure 5:
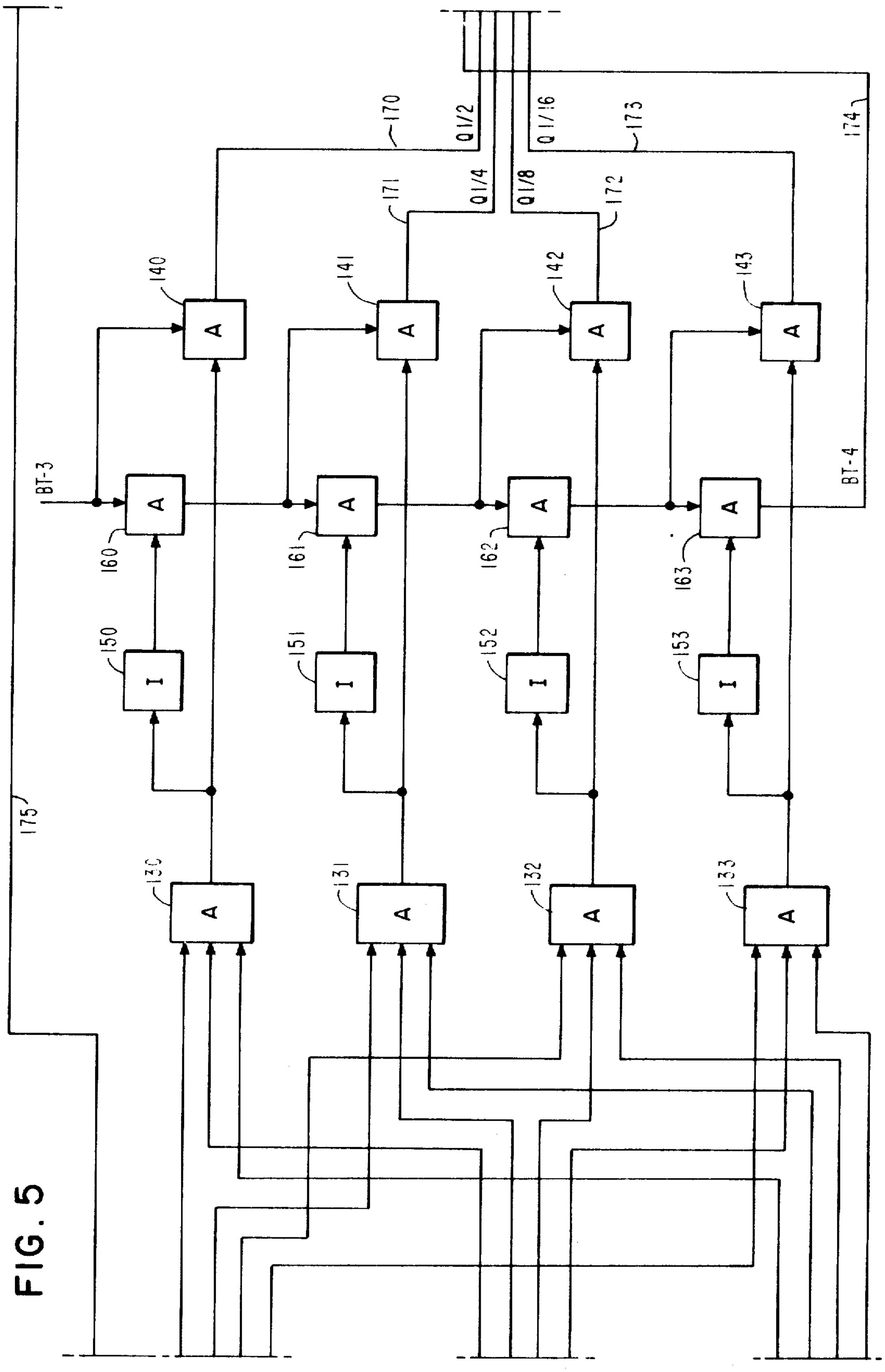

Output signals from the old count counter 100, the new count counter 110, and the mask register 120 are supplied to And circuits 130 through 133 in FIG. 5. The output of the AND-circuits 130 through 133 are connected to respective AND-circuits 140 through 143, and the output of the AND-circuits 130 through 133 are connected through respective inverters 150 through 153 to corresponding AND-circuits 160 through 163. The AND-circuits 140 through 143 provide signals on output lines 170 through 173 to a BT clock described more fully hereinafter. The AND-circuit 163 supplies signals on a line 174 to the BT clock. A BT pulse is applied to the line 175 in FIG. 4 to increment the old count counter 100 and the new count counter 110, and the BT pulse is supplied to the BT clock to initiate its operation.

Figure 6:
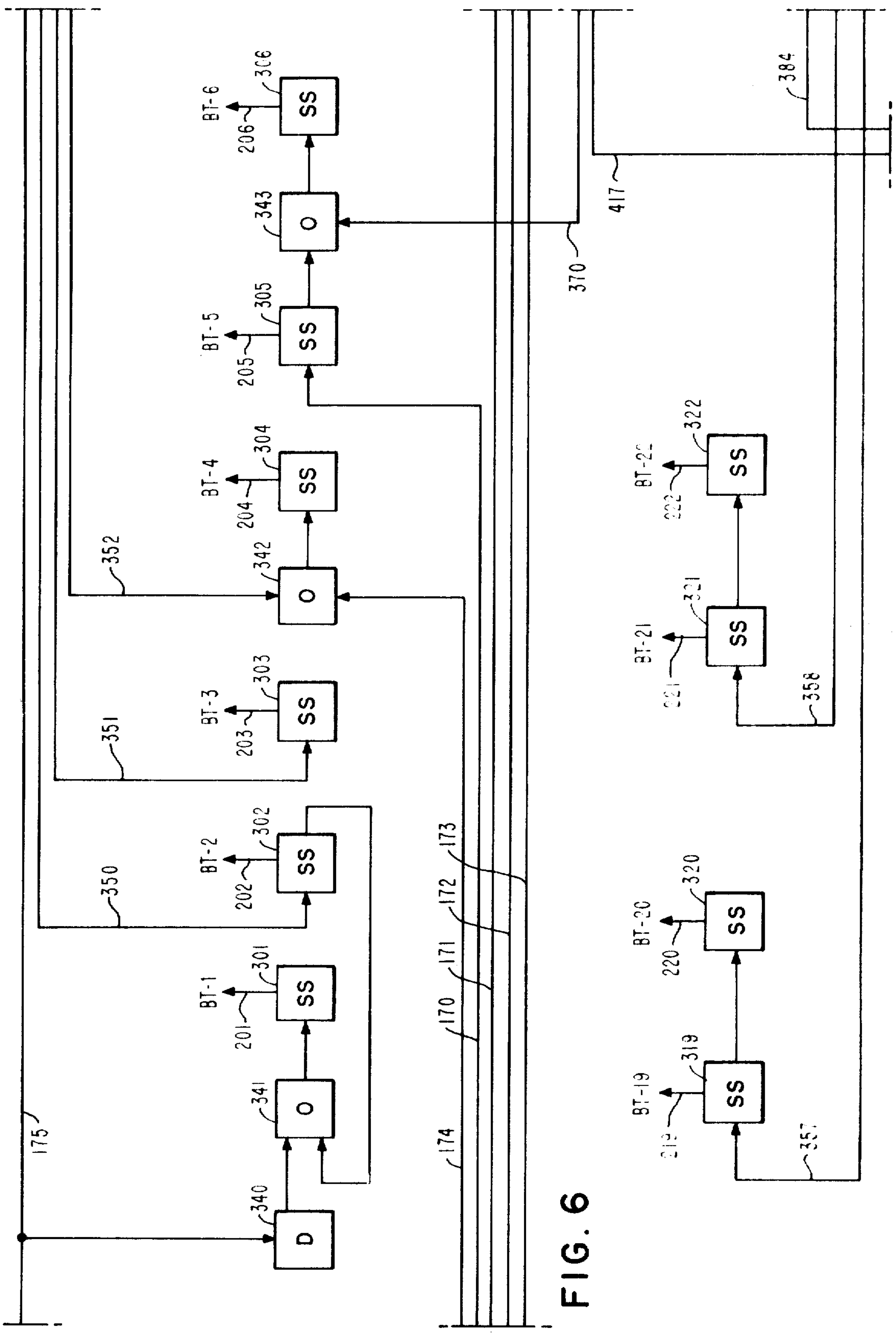
Figure 8:
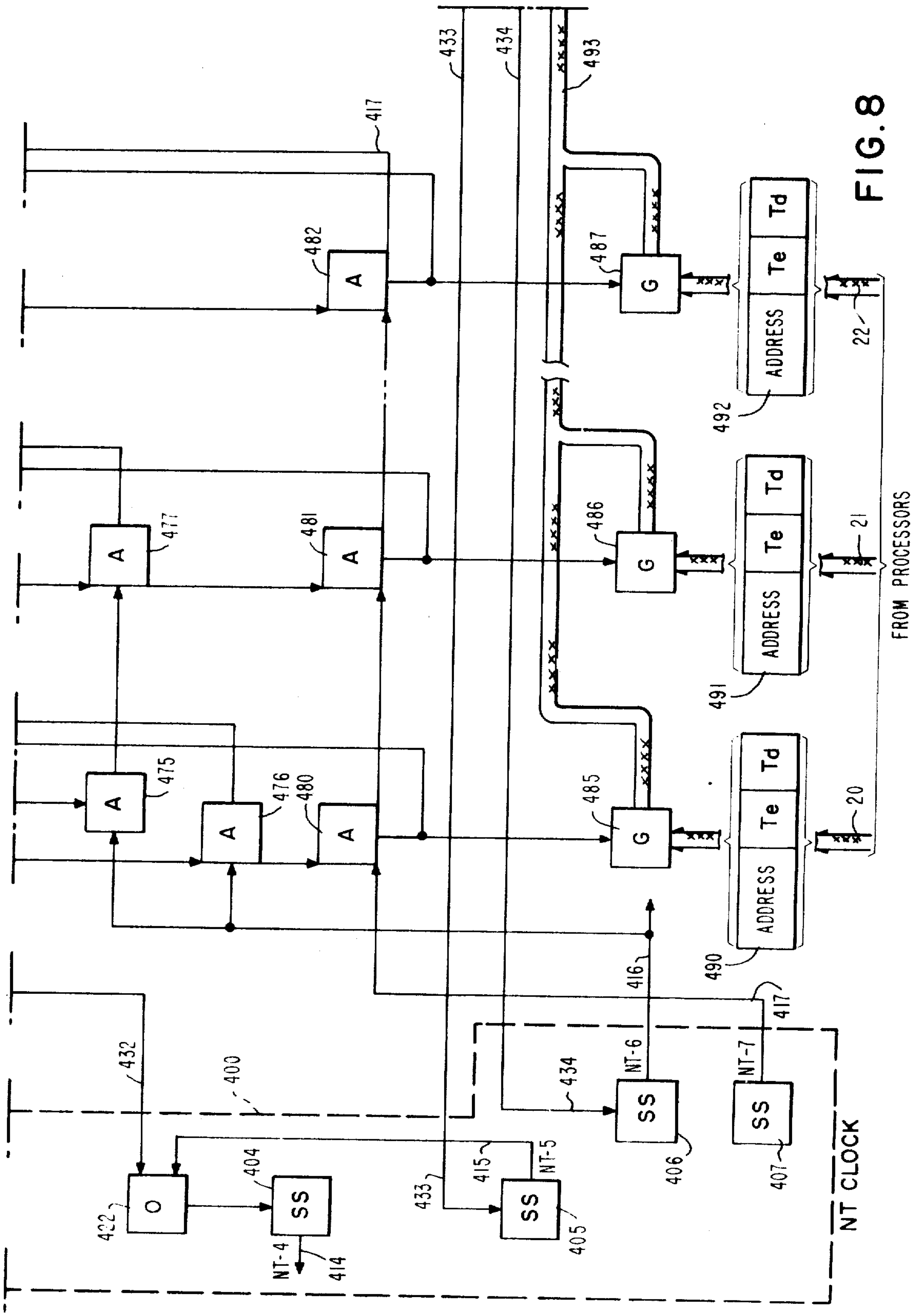
Figure 9:
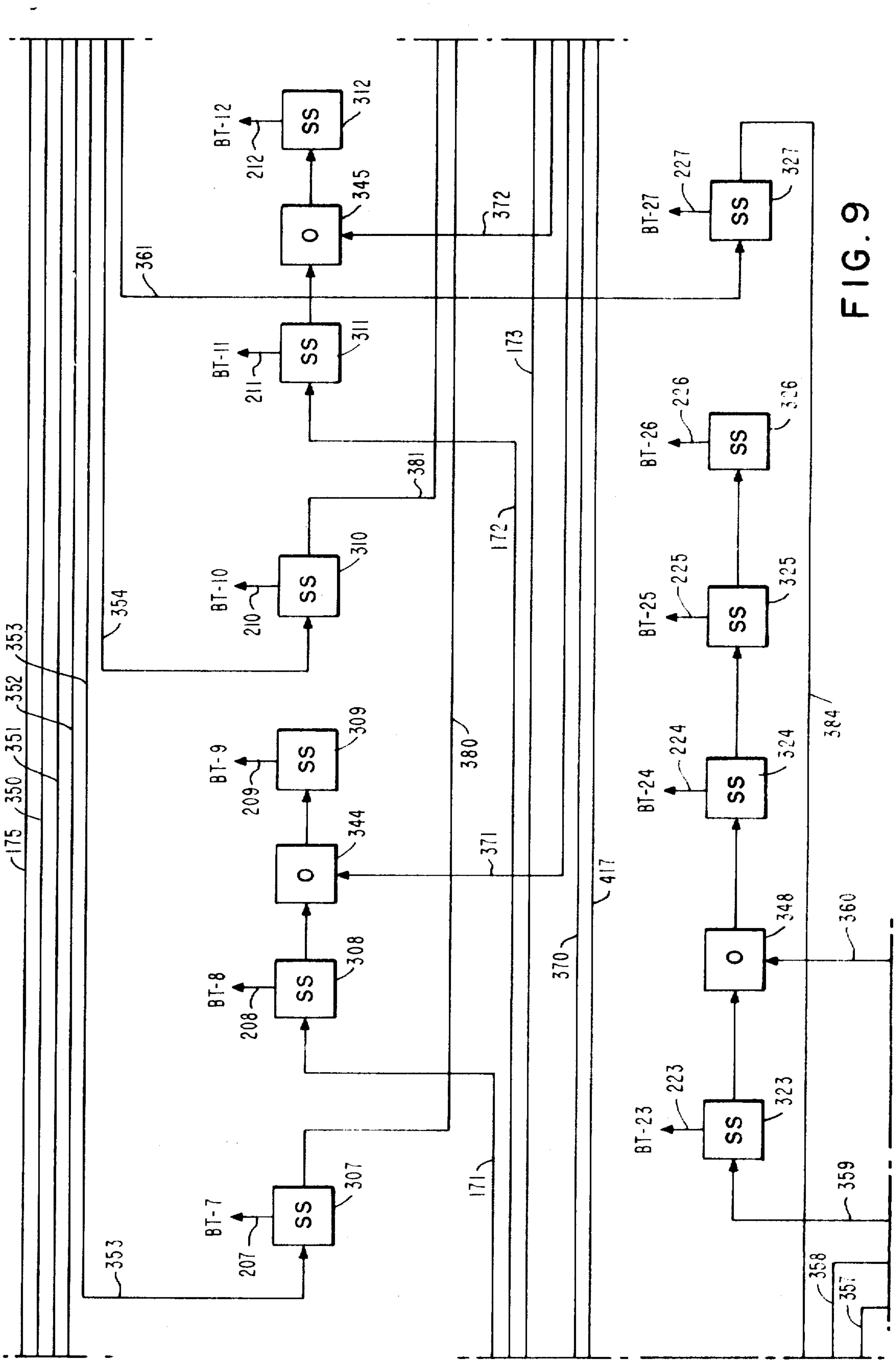
Figure 11:
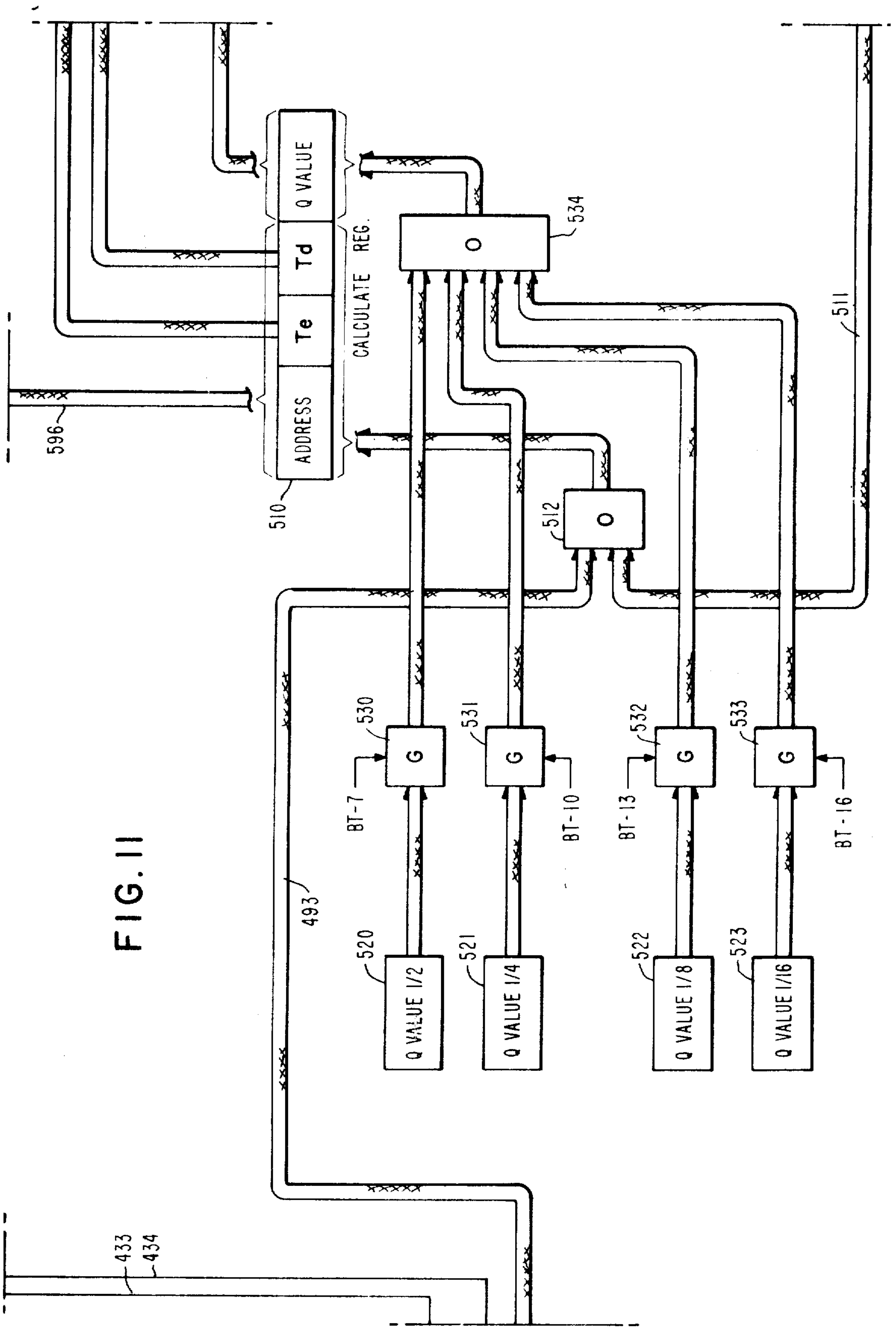
Figure 12:
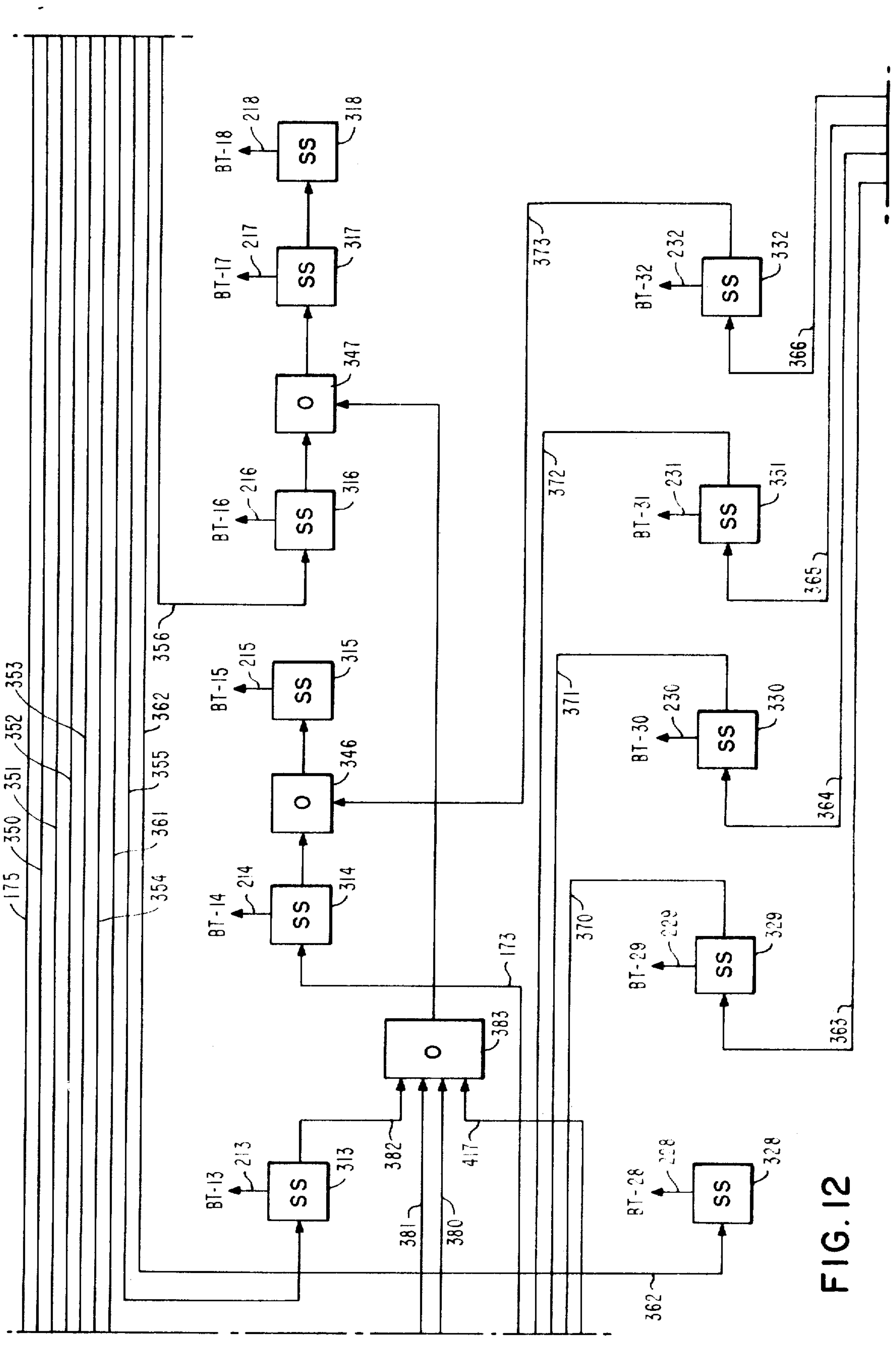

Reference is made next to FIGS. 6, 9, and 12 which illustrate the construction of the BT clock. This clock provides a microprogram which utilizes various timing pulses BT–1 through BT–32 on respective output lines 201 through 232 from respective single shots 301 through 332. A positive BT pulse on the line 175 is applied through a delay circuit 340 and an OR-circuit 341 to initiate the operation of the BT clock by operating the single shot 301 to supply a positive pulse on the output line 201 labeled BT–1. Or circuits 342 through 348 have their outputs connected to respective single shots 306, 309, 312, 315, 317, and 324. Positive signals on input control lines 350 through 356 operate respective single shots 302, 303, 304, 307, 310, 313, and 316. Positive signals on the input control lines 357 through 365 operate the respective single shots 319, 321, 323, 324, 327, 328, 329, 330, and 332. Positive signals on the control lines 170 through 173 operate respective single shots 305, 308, 311, and 314. The single shots 329 through 332 provide positive going pulses on associated output lines 370 through 373 which operate respective single shots 306, 309, 312, and 315. Signals from single shots 307, 310, and 313 are supplied on respective lines 380 through 382 through an OR-circuit 383 and the OR-circuit 347 to operate the single shot 317. A positive going output signal from the single shot 327 on the line 384 is supplied to a new task clock described more fully hereinafter. The various input control lines to the BT clock operate the associated single shots to generate positive output pulses having a duration determined by the circuit parameters of the single shots. The positive output pulses on the lines 201 through 232 are used throughout the system of FIGS. 4 through 51.

Figure 7:
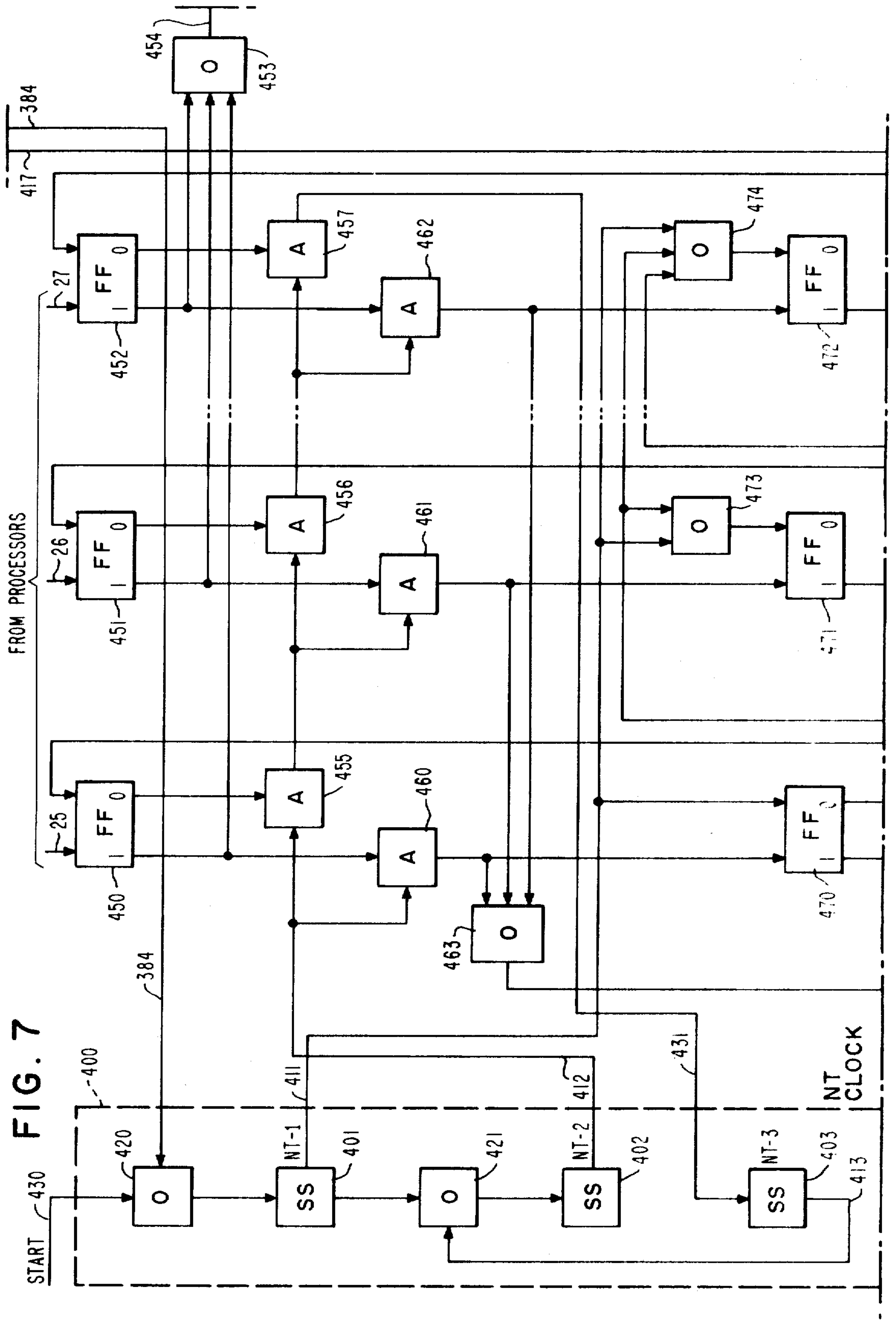

Reference is made next to FIGS. 7 and 8 which illustrate a new task (NT) clock 400 in conjunction with circuitry for accepting new tasks from the various processors 10 through 12 in FIG. 1. The NT clock 400 includes single shots 401 through 407 which supply positive pulses NT–1 through NT–7 on respective output lines 411 through 417. The NT clock 400 includes OR-circuits 420, 421, and 422 which have their outputs connected to respective single shots 401, 402, and 404. The NT clock may be started by a positive start pulse on a line 430 or a positive pulse on the line 384 from the single shot 327 in FIG. 9. The single shot 403 is operated by a positive signal on the input line 431. The single shot 404 is operated by a positive signal on the input line 415 or a positive signal on an input line 432. The single shot 405 is operated by a positive pulse on an input line 433, and the single shot 406 is operated by a positive pulse on a line 434.

Whenever one of the processors 10 through 12 in FIG. 1 forwards a task to the program scheduler 15, it sends a positive signal on an associated one of the control lines 25 through 27 simultaneously as a task word is forwarded on an associated one of the cables 20 through 22. The positive signals on the control lines 25 through 27 are supplied to associated flip-flops 450 through 452 in FIG. 7. The zero output sides of these flip-flops are connected to associated AND-circuits 455 through 457, and the one output sides of these flip-flops are connected to associated AND-circuits 460 through 462. Positive output signals from the AND-circuits 460 through 462 are supplied through an OR-circuit 463 and the OR-circuit 422 to operate the single shot 404. Output signal from the AND-circuits 460 through 462 are supplied also to the one input sides of associated flip-flops 470 through 472. The flip-flops 470 through 472 are reset by a positive signal on the line 411 at NT–1 time. The positive NT–1 pulse is supplied through OR-circuits 473 and 474 to the zero input sides of the respective flip-flops 471 and 472.

The zero output side of the flip-flop 470 is connected to and AND-circuit 475. The one output sides of the flip-flops 470 and 471 are connected to associated AND-circuits 476 and 477. The one output side of the flip-flops 470 through 472 are connected to respective AND-circuits 480 through 482. The output of the AND-circuits 480 through 482 control associated sets of gates 485 through 487 and reset associated flip-flops 450 through 452. Task words received on the cables 20 through 22 in FIG. 8 are stored in respective registers 490 through 492. Task words from the registers 490 through 492 are passed by the associated sets of gates 485 through 487 along a cable 493.

New task words simultaneously received by the registers 490 through 492 are accepted one at a time in a given order of priority. Processor 10 in FIG. 1 has first priority; processor 11 in FIG. 1 has second priority; and processor 12 has third priority. The circuits in FIGS. 7 and 8 insure acceptance of task words one at a time in this order, and this operation is described next.

A positive signal at BT time 27 is supplied on the line 384 through the OR-circuit 420 to operate the single shot 401 which resets the flip-flops 470 through 472 at NT–1 time. When the single shot 401 terminates the positive pulse on the line 411, it supplies a positive going signal through the OR-circuit 421 to operate the single shot 402 and supply a positive NT–2 pulse on the line 412 to the AND-circuits 455 and 460 in FIG. 7. If the flip-flops 450 through 452 are in their zero states, the positive signal on the line 412 passes through the AND-circuits 455, 456, and 457, and a positive signal is returned on the line 431 which operates the single shot 403 to supply a positive signal through the OR-circuit 421 to operate the single shot 402. The positive signal on the line 412 repeats the foregoing operation repetitively so long as all of the flip-flops 450 through 452 remain in the zero state. When anyone of the flip-flops 450 through 452 in FIG. 7 is set to the one state, it supplies a positive signal through an OR-circuit 453 which in turn supplies a positive output signal on a line 454 to FIG. 19. If one or more of the flip-flops 450 through 452 is set to the one state, then the first one of the conditioned AND-circuits 455 through 457 blocks the passage of the positive pulses on the line 412, thereby terminating the repetitive operation, and one of the AND-circuits 460 through 462 passes a positive signal to the OR-circuit 463 and to the one input side of the associated ones of the flip-flops 470 through 472. The positive signal from the AND-circuit 463 passes through the OR-circuit 422 to operate the single shot 404. A positive pulse is supplied on the output line 414 at NT–4 time from the single shot 404, and is performs a sampling operation in FIG. 19 which is described more fully hereinafter. If the conditions in FIG. 19 for accepting a new task word are not met, a positive signal is returned on the line 433 which operates the single shot 405 to supply a positive NT–5 pulse on the line 415 through the OR-circuit 422 to generate another NT–4 pulse thereby to continue the sampling operation repetitively until such time as a new task word can be accepted. At such time a positive signal is returned on the line 434 from FIG. 19 to operate the single shot 406 in FIG. 8 thereby to supply a positive NT–6 pulse to the AND-circuits 475 and 476. If the flip-flop 470 is in the zero state, the AND-circuit 475 passes the positive NT–6 signal to the AND-circuit 477. If the flip-flop 471 is in the zero state, the AND-circuit 477 is not operated, and it follows that the flip-flop 472 is set to the one state. If the flip-flop 471 is set to the one state when the AND-circuit 477 receives a positive pulse, this pulse is passed by the AND-circuit 477 through the OR-circuit 474 to reset the flip-flop 472. If the flip-flop 470 is in the one state when a positive pulse is received on the line 416, the AND-circuit 476 passes a positive signal which resets the flip-flops 471 and 472. Consequently, it is seen that the AND-circuits 476 and 477 serve to reset flip-flops to the right thereof. This prevents the acceptance of more than one task work at a time, giving highest priority to the left most task word. A positive signal from the one output side of the set one of the flip-flops 470 through 472 conditions the associated one of the AND-circuits 480 through 482 to pass the positive NT–7 pulse on the line 417 to an associated one of the sets of gates 485 through 487, thereby to transfer one, and only one task word to the output cable 493. This gives highest priority to the left most task word in FIG. 8. After the left most task word is gated onto the cable 493, the positive output signal from the associated one of the AND-circuits 480 through 482 is returned to reset the associated one of the flip-flops 450 through 452. The foregoing operation is repeated to accept the next left most task word in FIG. 8. Such operations continue until all task words have been accepted.

Reference is made next to FIGS. 10, 11, 13, and 14 for a description of a circuit arrangement which schedules tasks to various buckets or tables according to their service ratio.

Referring more specifically to FIG. 11, a calculate register 510 receives task words from the processors 10 through 12 on the cable 493 and task words from buckets or tables on a cable 511, and the task words are supplied through a set of OR-circuits 512 to the calculate register 510. Q value registers 520 through 523 are connected through respective gates 530 through 533 and through a set of OR-circuits 534 to the calculate register. The Q value registers 520 through 523 supply the Q value indicated to the Q value portion of the calculate register. The output of the Q value portion of the calculate register is supplied to a decoder 540, and this decoder selects one of the AND-circuits 541 through 544. These AND-circuits are sampled by a positive pulse on the line 228 at BT–28 time to provide a positive output pulse on one of the lines 363 through 366.

The TE field and the TD field of the calculate register are supplied to a divider 550. The output of the divider represents the calculate service ratio, and it is supplied to a comparator 551. Signals are supplied from a Q value hold register in FIG. 48 on a cable 552 to the comparator 551 in FIG. 13. The signals on the cable 552 represent a Q value which serves as a reference. The comparator 551 provides signals on the output lines 553 and 554 to associated AND-circuits 560 through 565. If the Q value is less than the quotient, the line 553 is energized with a positive signal, and the line 554 is energized with the negative signal by the comparator 551. If the Q value is equal to or greater than the quotient, the line 554 is energized with a positive signal, and the line 553 is energized with a negative signal by the comparator 551. If the line 553 is energized with a positive signal, the AND-circuits 560 through 562 pass positive pulses on respective lines 218 through 222 in response to pulses BT–18, BT–20, or BT–22 respectively, on corresponding output lines 357 through 359. If the line 554 is energized with a positive signal, the AND-circuits 563 through 565 pass positive pulses on the lines 218 through 222 an OR-circuit 566 to the output line 360 in response to pulses BT–18, BT–20, or BT–22, respectively. The positive signals on the output lines 357 through 360 operate the portion of the BT clock shown in FIGS. 6 and 9.

Figure 10:
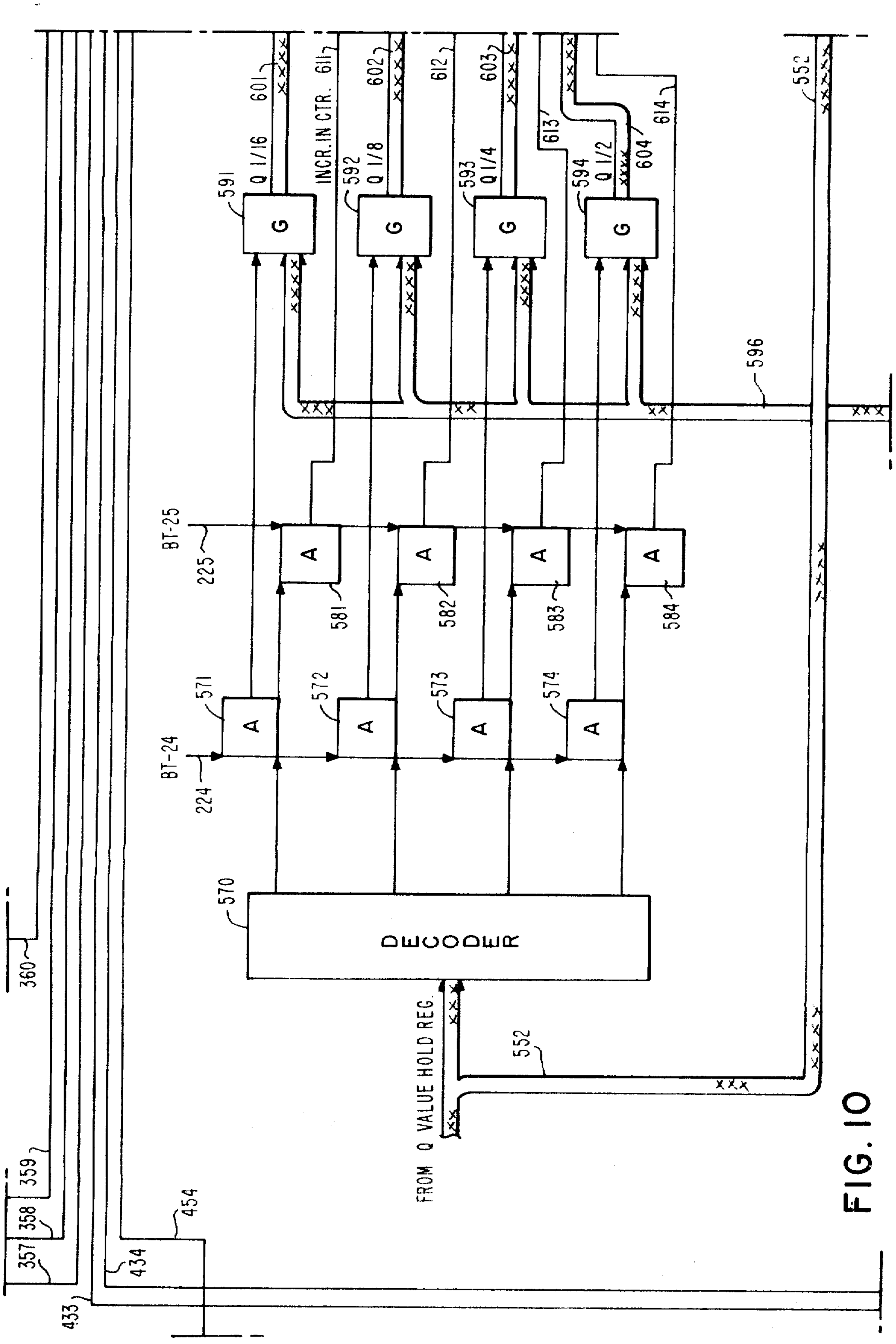

A decoder 570 in FIG. 10 responds to the Q value on the cable 552 and supplies a positive output signal to one of the And circuits 571 through 574. One of the AND-circuits 581 through 584 is conditioned in conjunction with one of the AND-circuits 571 through 574. The AND-circuits 571 are sampled by a positive pulse on the line 224 at BT–24 time, and the AND-circuits 581 through 584 are sampled by a positive pulse on the line 225 at BT–25 time. Positive signals from the AND-circuits 571 through 574 are supplied to associated sets of gates 591 through 594. Whenever the AND-circuit 571 is operated at BT–24 time to supply a positive pulse to set of gates 591, the task word from the calculate register 510 is transferred from the cable 596 through the set of gates 591 to an output cable 601. At BT–25 time the associated AND-circuit 581 supplies a positive signal on an output line 611. The AND-circuits 572 and 582 operate in similar fashion to transfer a task word from the calculate register through the set of gates 592 to an output cable 602 at BT–24 time and to supply a positive signal on an output line 612 at BT–25 time. The gates 573 and 583 operate the set of gates 593 to transfer a task word from the calculate register to a cable 603 and to supply a positive pulse on a line 613. The AND-circuits 574 and 584 operate in conjunction with the set of gates 594 to transfer a task word from the calculate register to an output cable 604 and to supply a positive signal on a line 614. The task words on the cables 601 through 604 are stored in respective buckets or tables 651 through 654 in respective FIGS. 46, 38, 30, and 22. The buckets or tables 651 through 654 are multiregister memory devices which are referred to hereinafter as tables for convenience. The tables 651 through 654 are labeled respectively as Q 1/16, Q 1/8, Q 1/4, and Q 1/2. Four tables are arbitrarily illustrated, but it is understood that the number of tables employed may be increased or diminished, as desired. Each Q table stores task words with service ratios in a given range, and these ranges are discussed next.

If the service ratio of a task word is equal to or less than 1/16, the task is stored in the Q 1/16 table. If the service ratio is greater than 1/16 but equal to or less than 1/8, the task word is kept in the Q 1/8 table. If the service ratio of a task word is greater than 1/8 but equal to or less than 1/4, the task word is placed in the Q 1/4 table. If the service ratio is greater than 1/4, the task word is stored in the Q 1/2 table. As pointed out earlier, the Td field is decremented at all times so that its content constantly indicates the amount of time remaining before the result of a computational task must be made available. The decrementing is done, by means not shown, in the program scheduler 15 at all points where a task word may be stored, including all Q tables. Next the Q tables and their associated controls are described.

Referring first to FIGS. 17, 18, 21, and 22, the Q 1/2 table and its control equipment are described first. An in counter 670 is reset by a positive signal on a line 671, and this counter is incremented by positive pulses on the line 614 as task words are stored in the table 654. Signals from the in counter 670 are supplied to a decoder 672 which in turn supplies a positive signal on a selected one of its output lines 673 through 675. As the counter 670 advances through a cycle of operation, the lines 673 through 675 are sequentially energized with positive signals to designate successive storage locations in the table 654 where incoming task words are stored. The counter 670 always points to the next available storage register.

Figure 22:
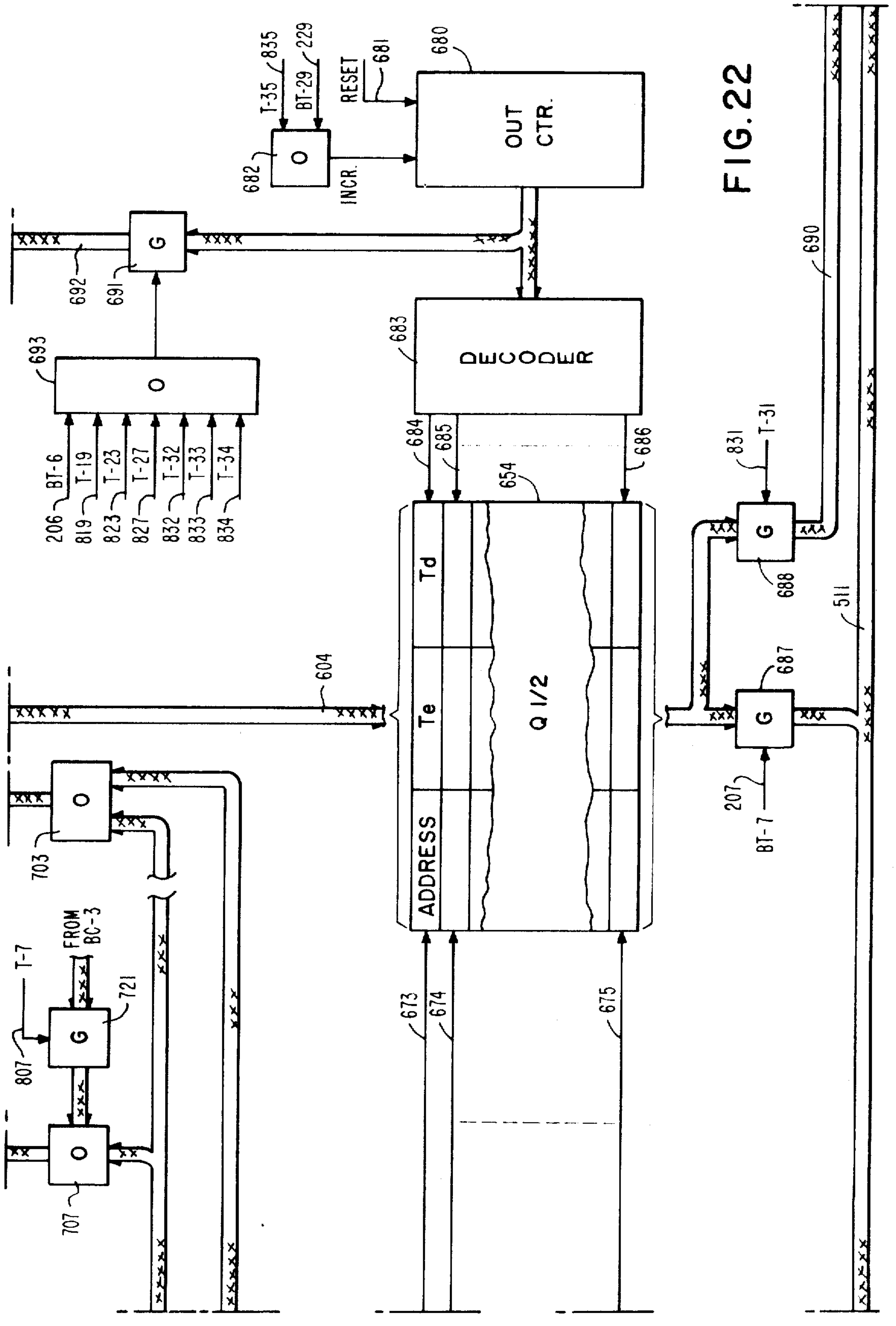

An out counter 680 in FIG. 22 is reset by a positive signal on a line 681. Positive signals from an OR-circuit 682 increment the out counter 680. Output signals from the out counter 680 are supplied to a decoder 683 which in turn energizes a selected one of its output lines 684 through 686 with a positive signal. As the out counter 680 is incremented, the decoder 683 energizes successive output lines with a positive signal to designate successive registers in the table 654 for read operations. Information read from the table 654 is supplied through a set of gates 687 at BT–7 time to the output table 511, and information read from the table 654 is supplied through a set of gates 688 at T–31 time on a cable 690. Task words on the line 511 are supplied to the calculate register 510 in FIG. 11, and task words on the cable 690 are supplied to a task hold-out register in FIG. 51 described subsequently. The out counter always points to the next word to be read from the table. The content of the counter 680 in FIG. 22 is transferred through a set of gates 691 to a cable 692 in response to a positive pulse from an OR-circuit 693. The content of the counter 680 is supplied to a comparator in FIG. 24 described subsequently.

Figure 18:
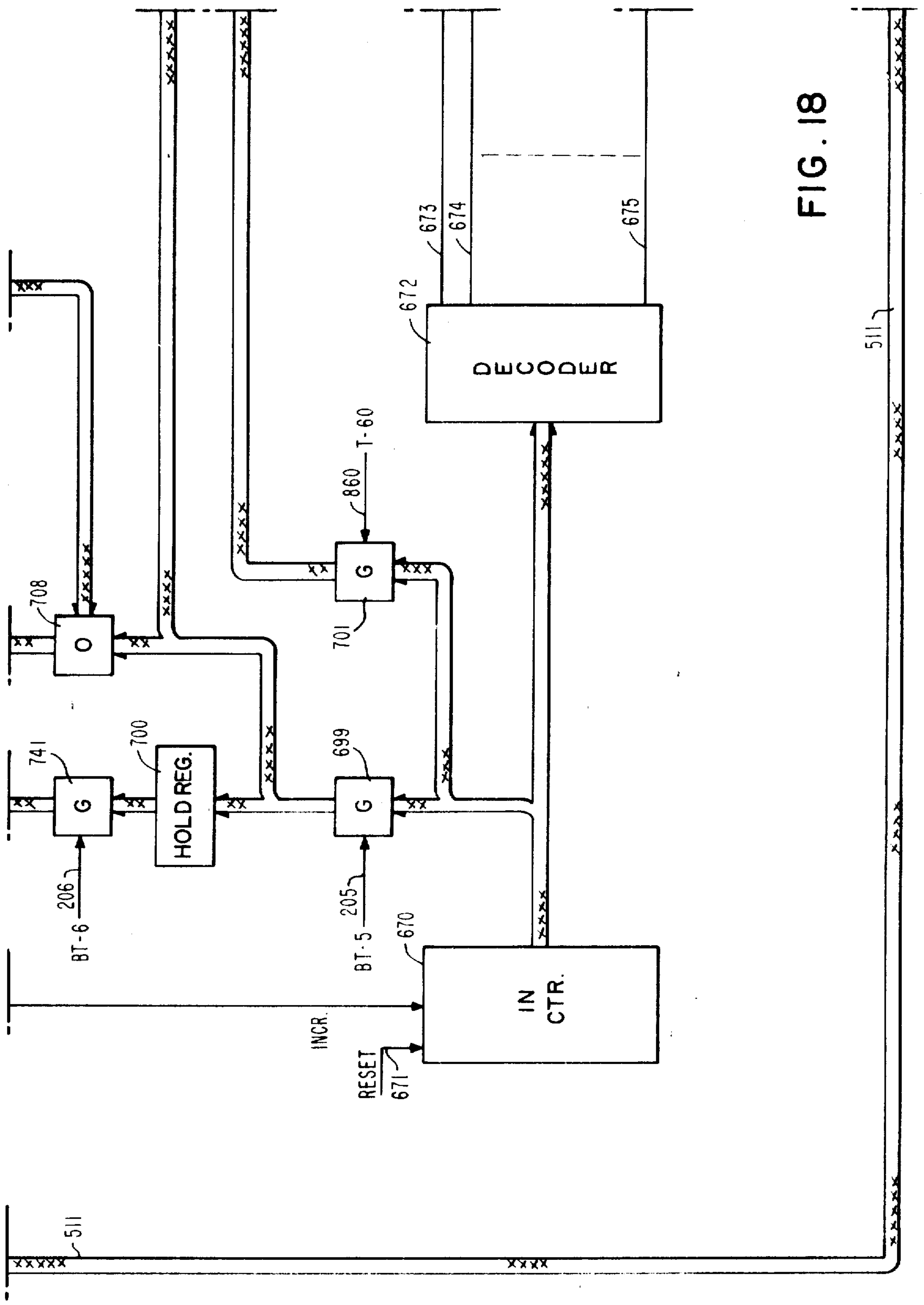

The content of the in counter 670 in FIG. 18 is transferred through a set of gates 699 at BT–5 time (1) to a hold register 700 and (2) through OR-circuits 707 and 708 to corresponding boundary counters 705 and 706. The content of the in counter 670 is transferred through a set of gates 701, in response to a positive signal on the line 860 at time T–60, and through a set of OR-circuits 703 to a boundary counter 704. The boundary counters 704 through 706 are incremented by positive signals from respective AND-circuits 715 through 717. The counters 704 through 706 are designated respectively as boundary counters BC–N...BC–2, and BC–1. The content of each of the boundary counters 704 and 705 is transferred to the respective counters 705 and 706. More specifically, the content of the boundary counter BC–2 is transferred through a set of gates 720 at T–6 time through the set of OR-circuits 708 to the boundary counter 706. The content of the boundary counter BC–3, not shown, is transferred through a set of gates 721 at T–7 time through the set of OR-circuits 707 to the boundary counter 705. The content of the boundary counter BC–N is transferred through a set of gates 722 at T–8 time to a boundary counter BC–(N–1), not shown.

Figure 24:
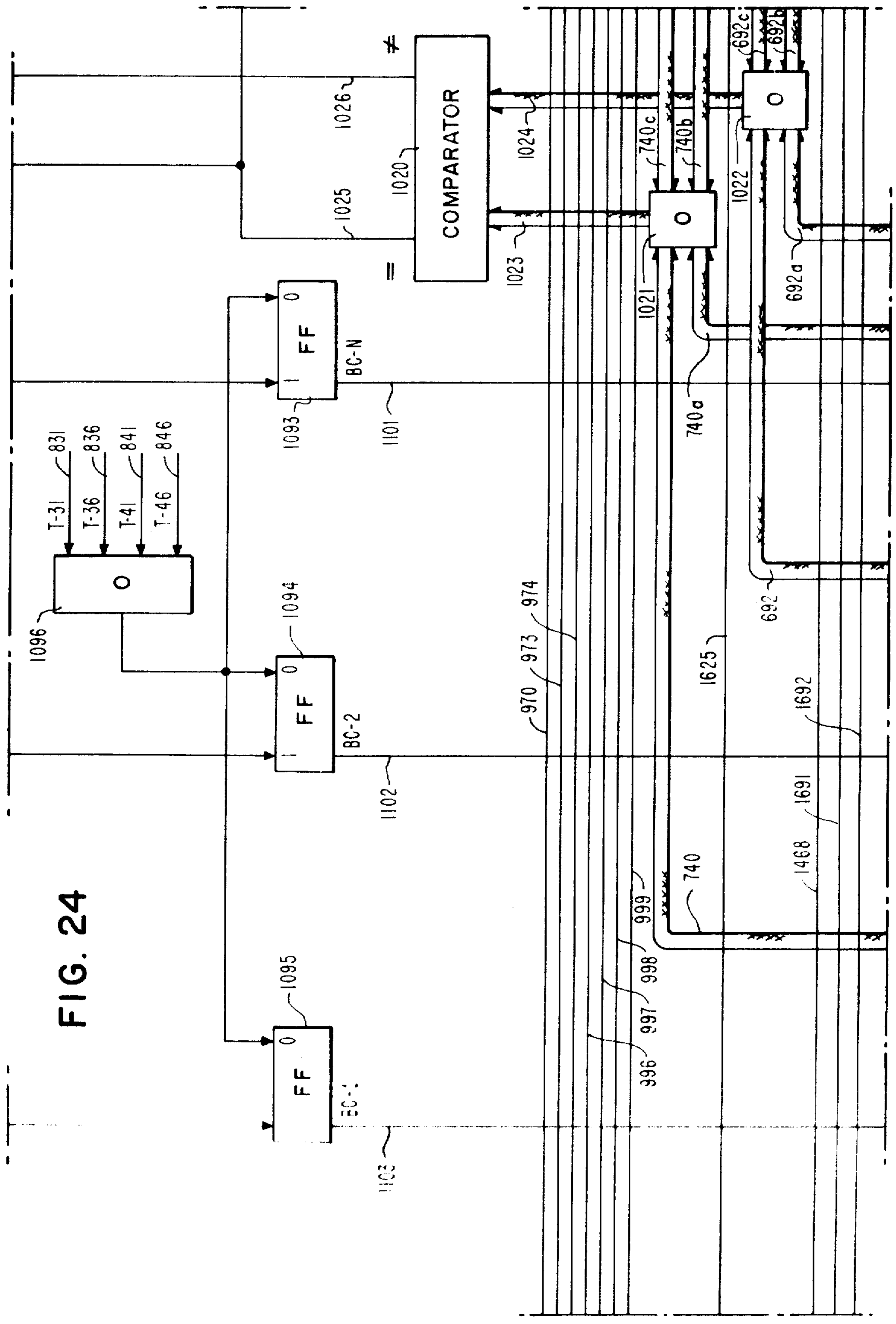

The contents of the boundary counters 704 through 706 are transferred through respective sets of gates 730 through 732, in response to positive signals from respective OR-circuits 733 through 735, through a set of OR-circuits 736 and via a cable 740 ultimately to a comparator in FIG. 24. The set of gates 732 is operated by positive signals from the OR-circuit 735 at T–19 time and T–32 time. The set of gates 731 is operated by positive signals from the OR-circuit 734 at T–23 time and T–33 time. The set of gates 730 is operated by positive signals from the OR-circuit 733 at T–27 time and T–34 time. A set of gates 741 in FIG. 18 is operated by a positive pulse on the line 206 at BT–6 time to transfer the content of the hold register 700 through the OR-circuit 736 in FIG. 21 to the cable 740.

Reference is made next to FIGS. 25, 26, 29, and 30 which illustrate the Q 1/4 table and its control arrangement. It is identical in construction to the Q 1/2 table and its associated control equipment of FIGS. 17, 18, 21, and 22. Accordingly, the component parts of the table Q 1/4 are designated with the same reference numerals with the letter "*a*" affixed. In like fashion the table Q 1/8 and its associated control arrangement in FIGS. 33, 34, 37, and 38 are labeled with the same reference numerals with the letter "*b*" affixed, and the table Q 1/16 and its associated control arrangement in FIGS. 41, 42, 45, and 46 are likewise labeled with the same reference numerals with the letter "*c*" affixed.

Figure 35:
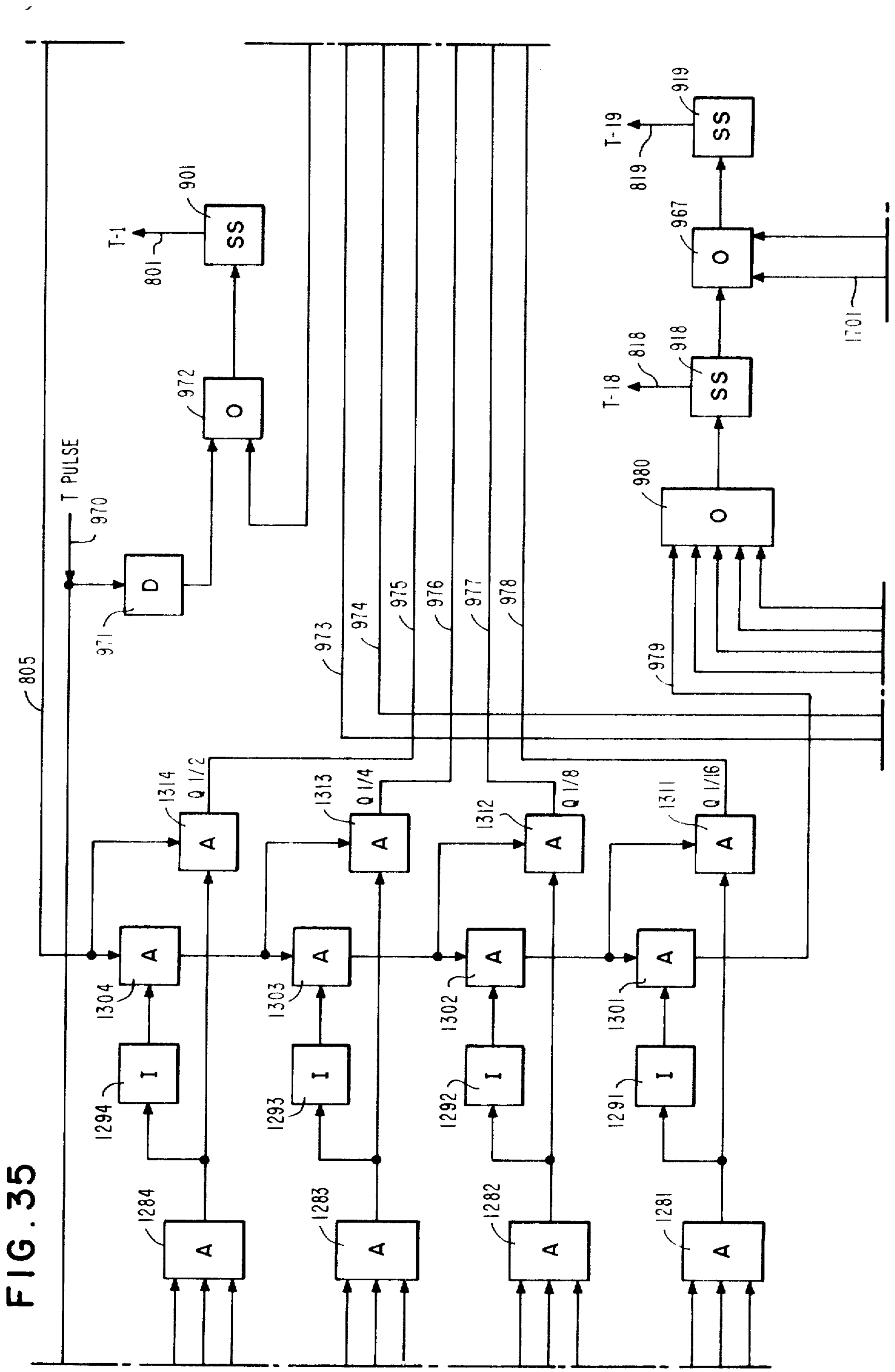
Figure 36:
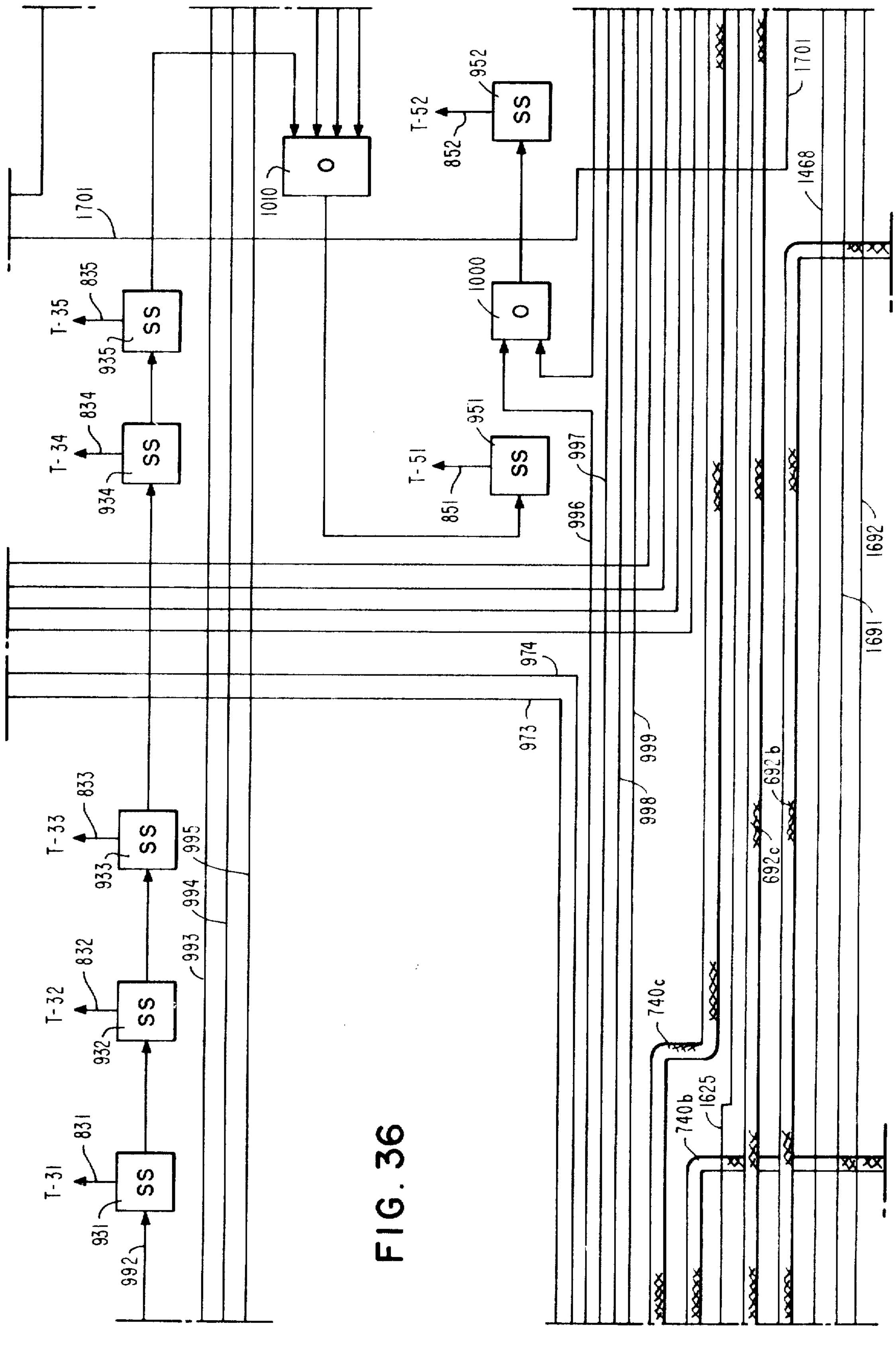
Figure 39:
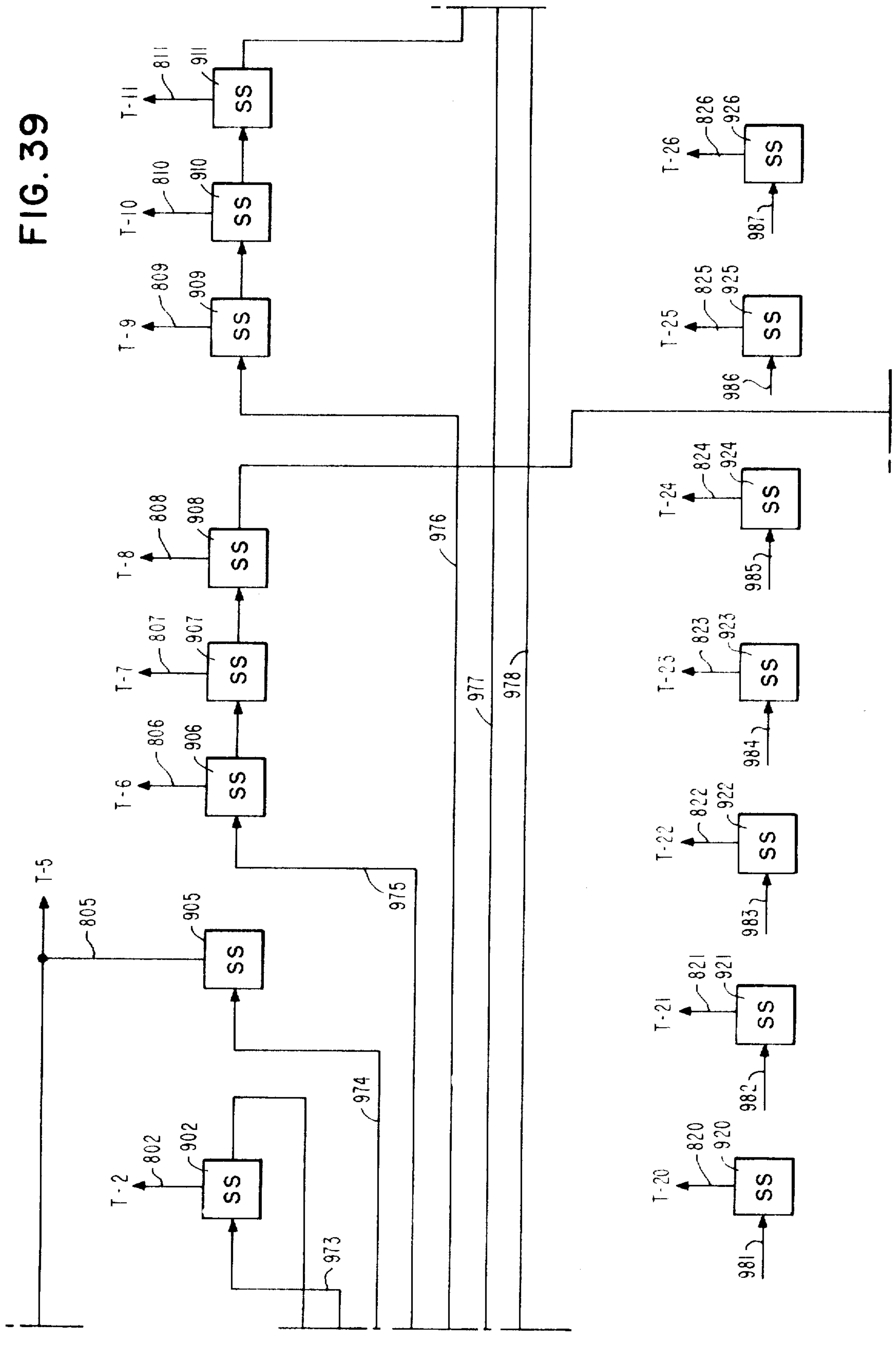
Figure 40:
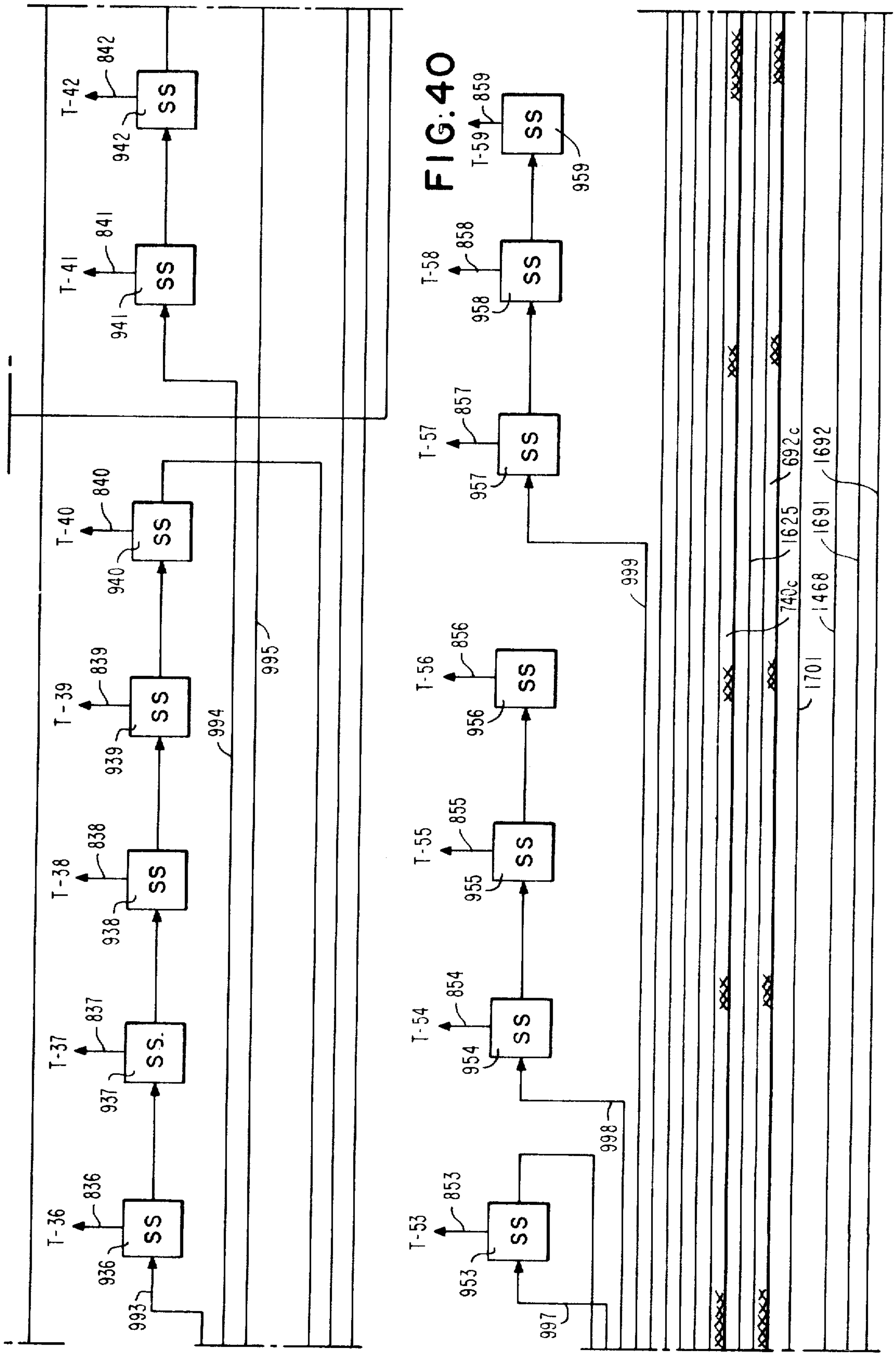
Figure 43:
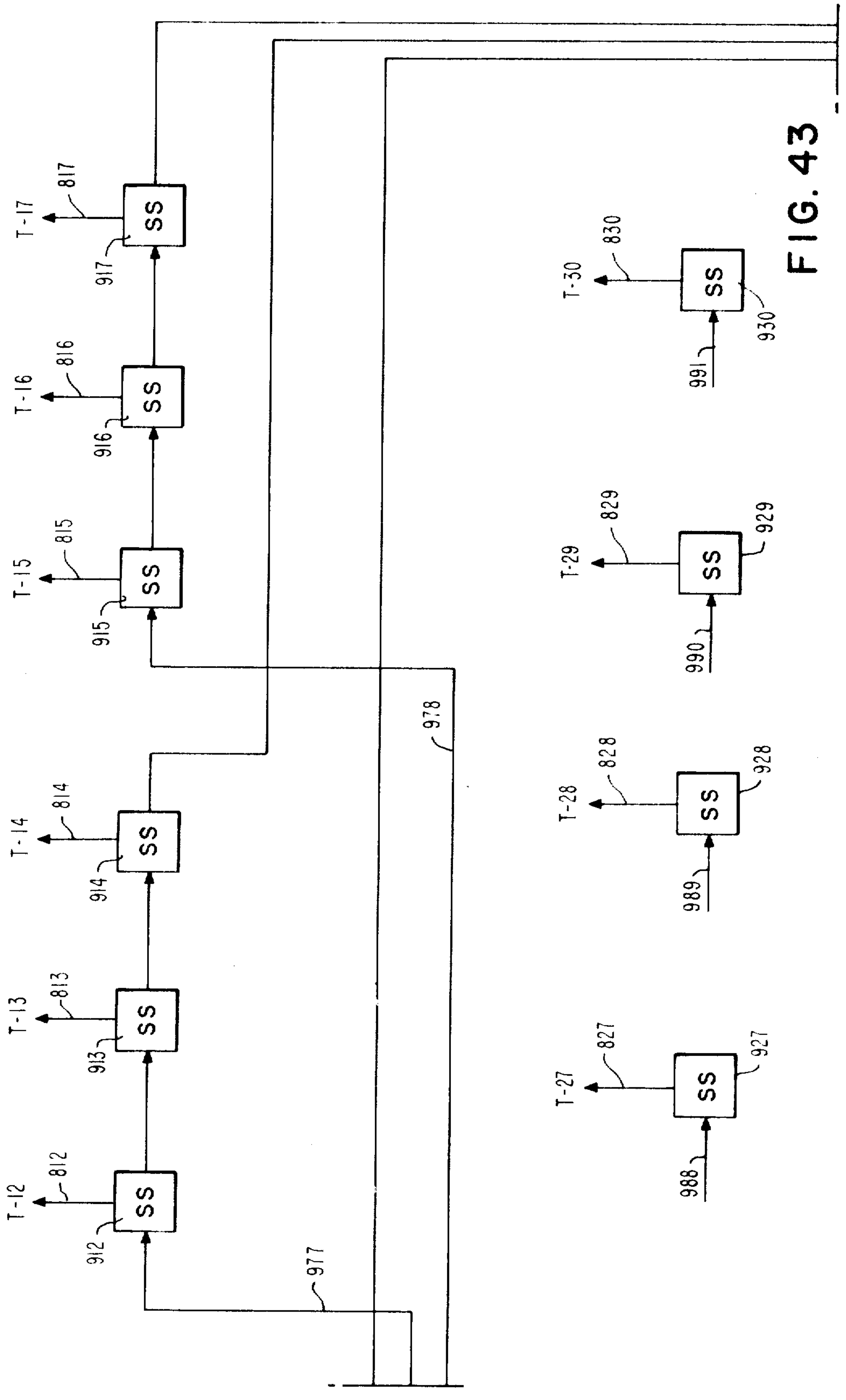
Figure 44:
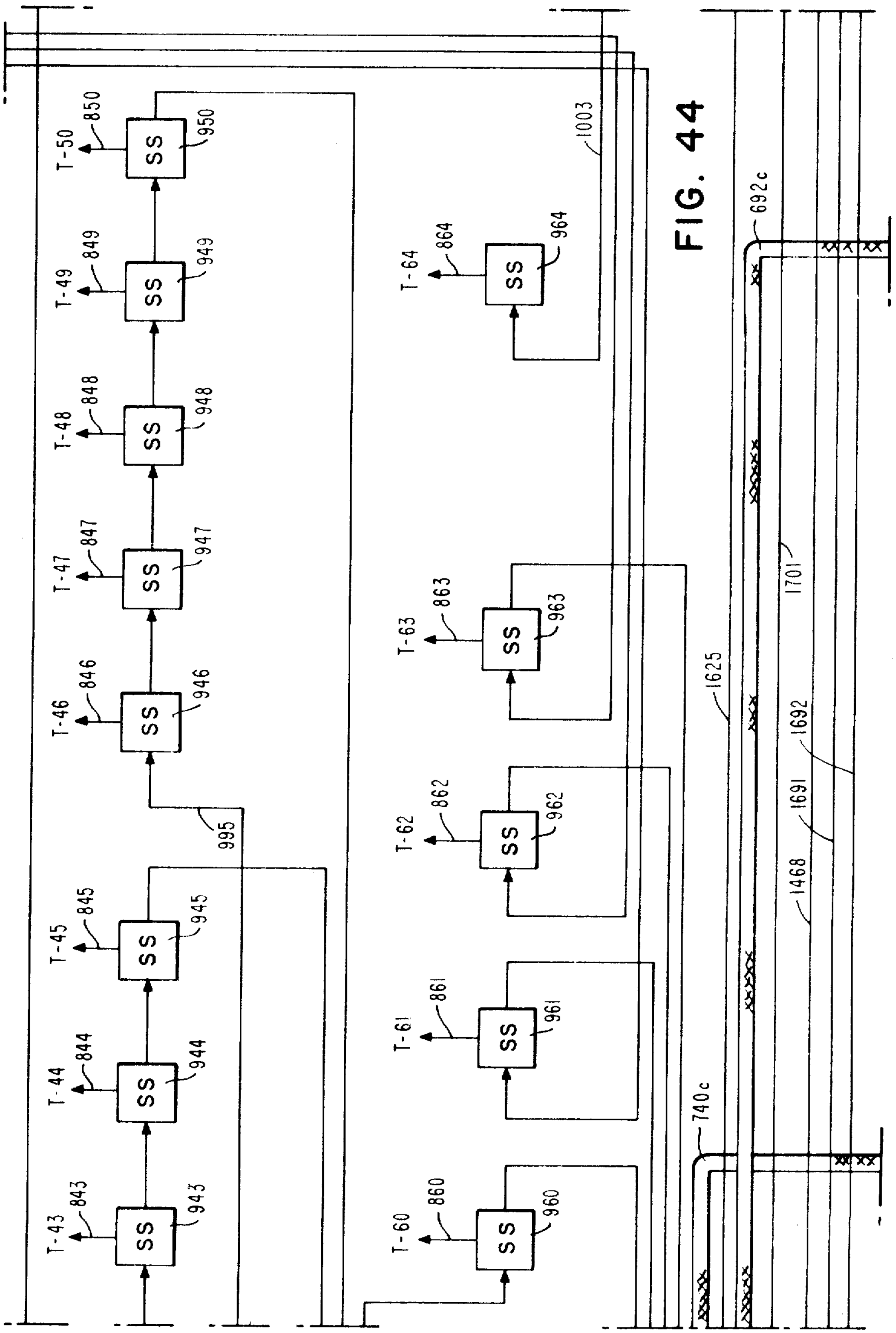

Reference is made next to FIGS. 35, 36, 39, 40, 43, and 44 for a description of the T clock. This clock provides a microprogram which utilizes various timing pulses T–1 through T–64 on respective output lines 801 through 864 from respective single shots 901 through 964. A positive T pulse on a line 970 in FIG. 35 passes through a delay circuit 971 and an OR-circuit 972 to initiate the operation of the T clock by operating the single shot 901 whereby it supplies a positive pulse on the output line 801 at T1 time. A positive signal on the lines 973 through 975 operate respective single shots 902, 905, and 906 to provide output pulses on respective lines 802, 805 and 806. Positive signals on the control lines 976 through 978 operate respective single shots 909, 912, and 915 to provide positive output signals on respective lines 809, 812, and 815. A positive signal on a line 979 is supplied through an OR-circuit 980 to operate the single shot 918. Positive signals on the lines 981 through 991 in FIGS. 39 and 43 operate associates single shots 920 through 930. The control lines 981 through 991 are taken from gates in FIG. 27 which are described subsequently. Positive signals on control lines 992 through 995 in FIG. 36 operate respective single shots 931 in FIGS. 36, 936 and 941 in FIG. 40, and 946 in FIG. 44. Positive signals on control lines 996 through 999 in FIG. 36 operate respective single shots 952 in FIG. 36, 953 in FIG. 40, 954 in FIG. 40, and 957 in FIG. 40. An OR-circuit 1000 in FIG. 36 is connected to the single shot 952. The OR-circuit 1000 in FIG. 36 receives a second input from the output of the single shot 953 in FIG. 40. An input signal on the line 1003 from a gate in FIG. 47 operates the single shot 964. Some of the single-shots in the T clock have one output connected as an input to other single-shots in this clock. An output from the single-shot 908 in FIG. 39 operates the single-shot 960 in FIG. 44. Output signals from the single-shot 911 in FIG. 39, the single-shot 914 in FIG. 43, and the single-shot 917 in FIG. 43 control respective single-shots 961, 962, and 963 in FIG. 44. An OR-circuit 1010 in FIG. 36 responds to positive signals from single-shots 935 in FIG. 36, 940 in FIG. 40, 945 in FIG. 44, and 950 in FIG. 44. The output of the OR-circuit 1010 operates the single-shot 951 in FIG. 36. An output of the single-shot 953 in FIG. 40 is supplied through the OR-circuit 1000 in FIG. 36 to operate the single-shot 952. An output signal from the single-shots 960 through 963 in FIG. 44 are supplied through the OR-circuit 980 in FIG. 35 to operate the single-shot 918.

Reference is made next to FIG. 24. A comparator 1020 receives input signals from a set of OR-circuits 1021 and a set of OR-circuits 1022. The OR-circuit 1021 receives signals on the cables 740, 740*a*, 740*b*, and 740*c* from the various boundary counters associated with the respective tables Q1/2 through Q 1/16. The signals from the boundary counters are supplied from the set of OR-circuits 1021 on a cable 1023 as one input to the comparator 1020. The set of OR-circuits 1022 receives signals on cables 692, 692*a*, 692*b*, and 692*c* from respective tables Q1/2 through Q1/16. The signals from the set of OR-circuits 1022 are supplied on a cable 1024 as a second input to the comparator 1020. A comparison is made in the comparator 1020. If the two quantities are equal, a positive signal is established on an output line 1025, and a negative signal is established on an output line 1026. If the two quantities in the comparator 1020 are not equal, a positive signal is established on the output line 1026, and a negative signal is established on the line 1025.

Figure 17:
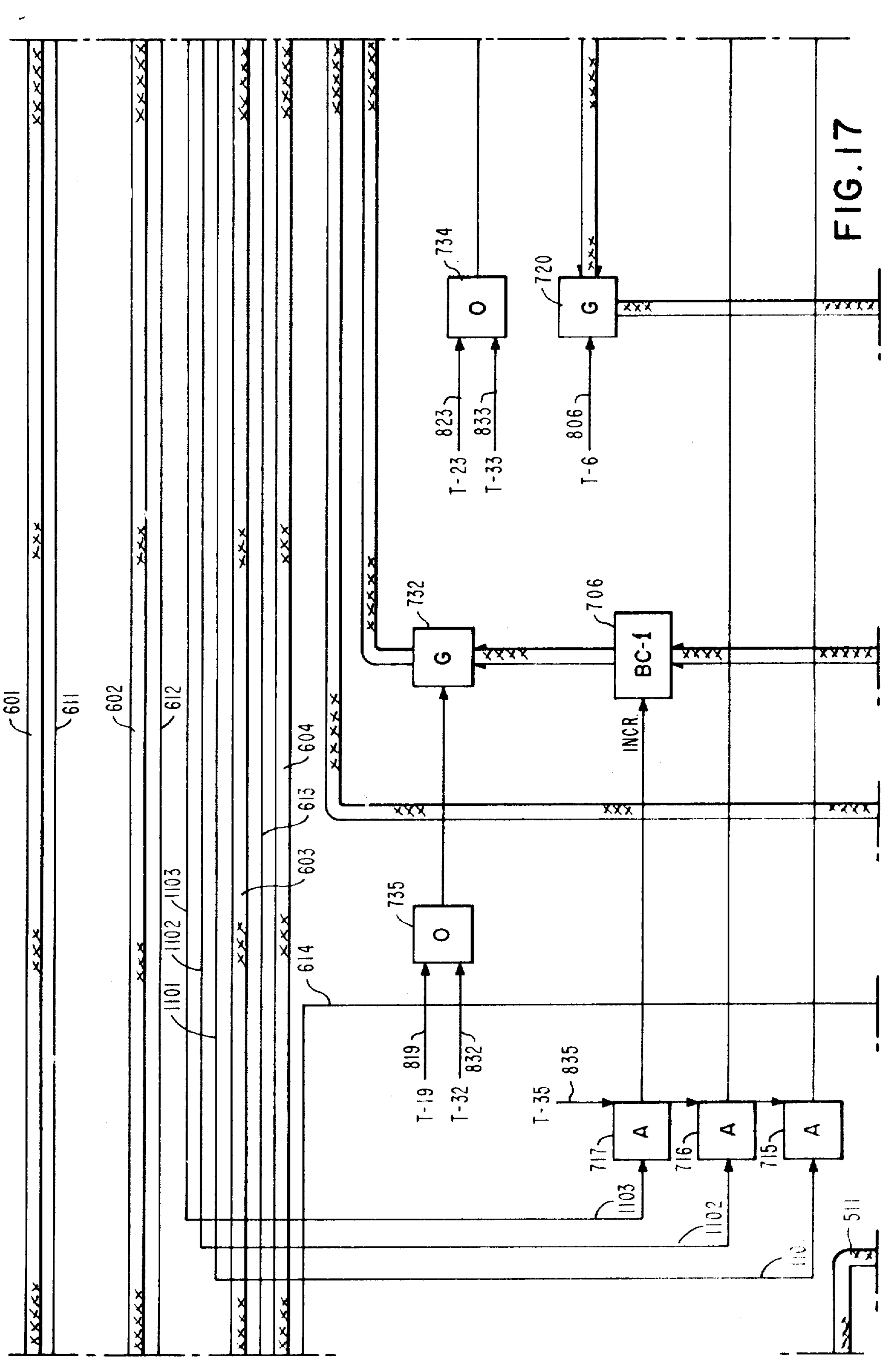
Figure 23:
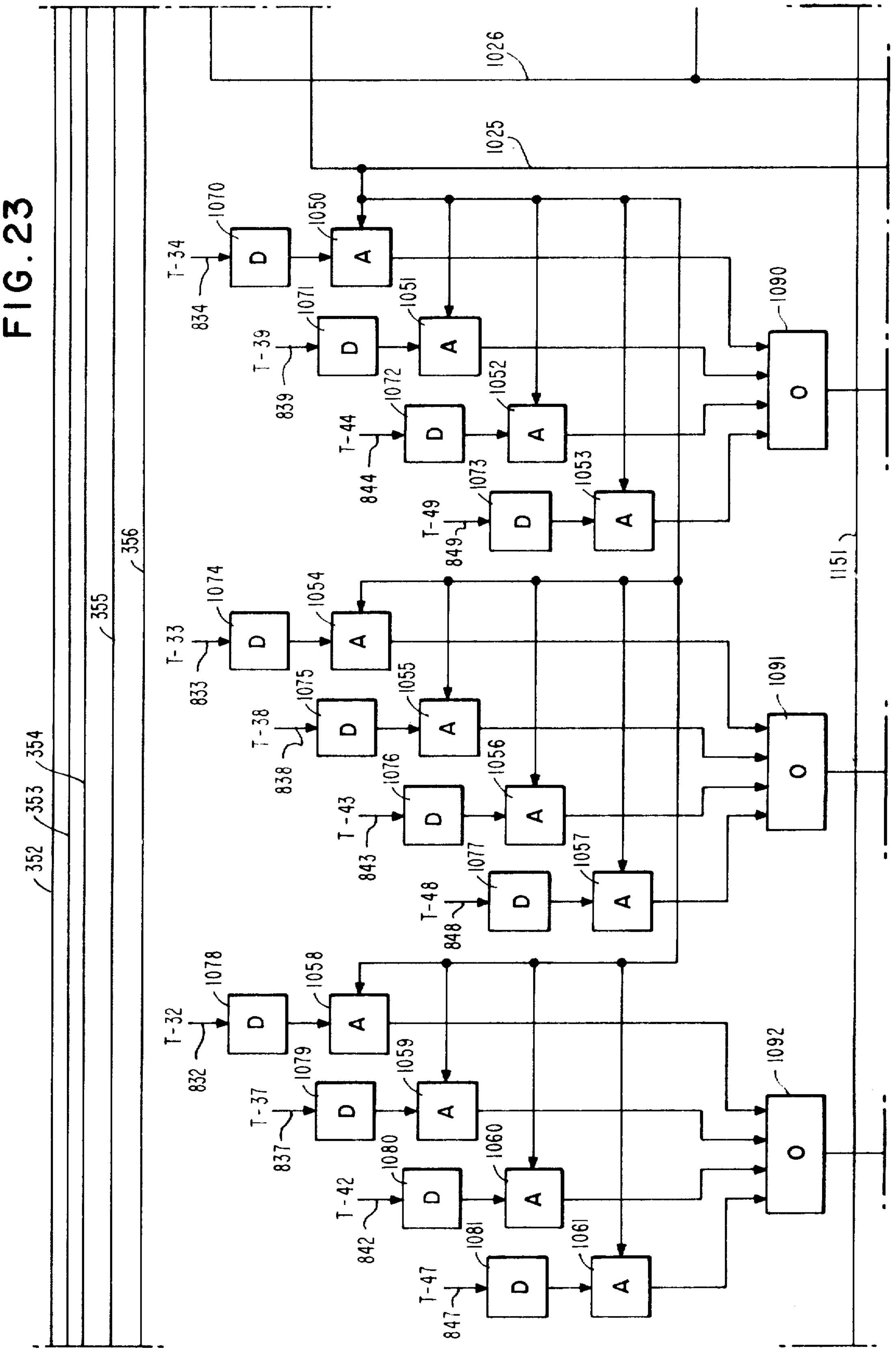
Figure 25:
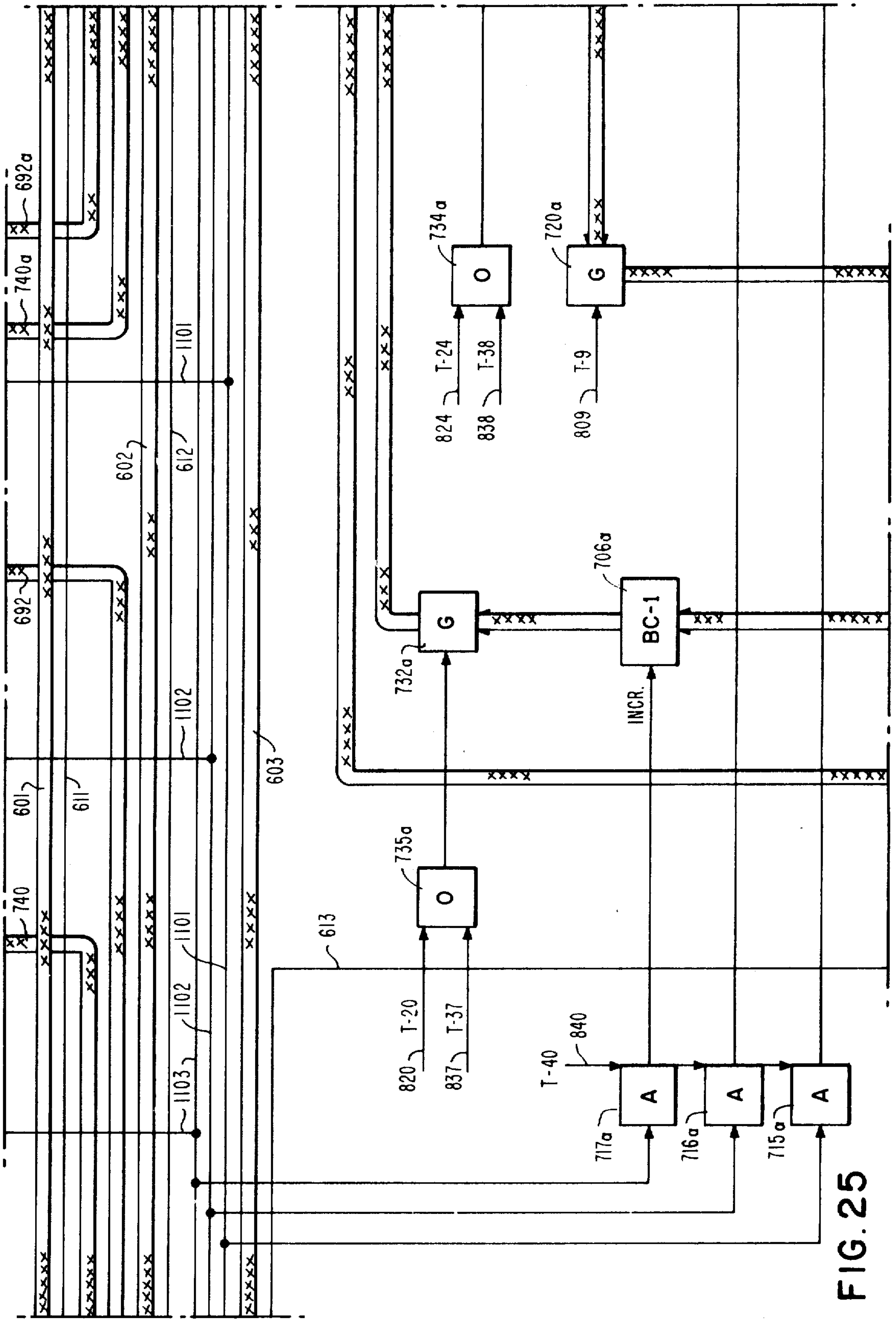
Figure 33:
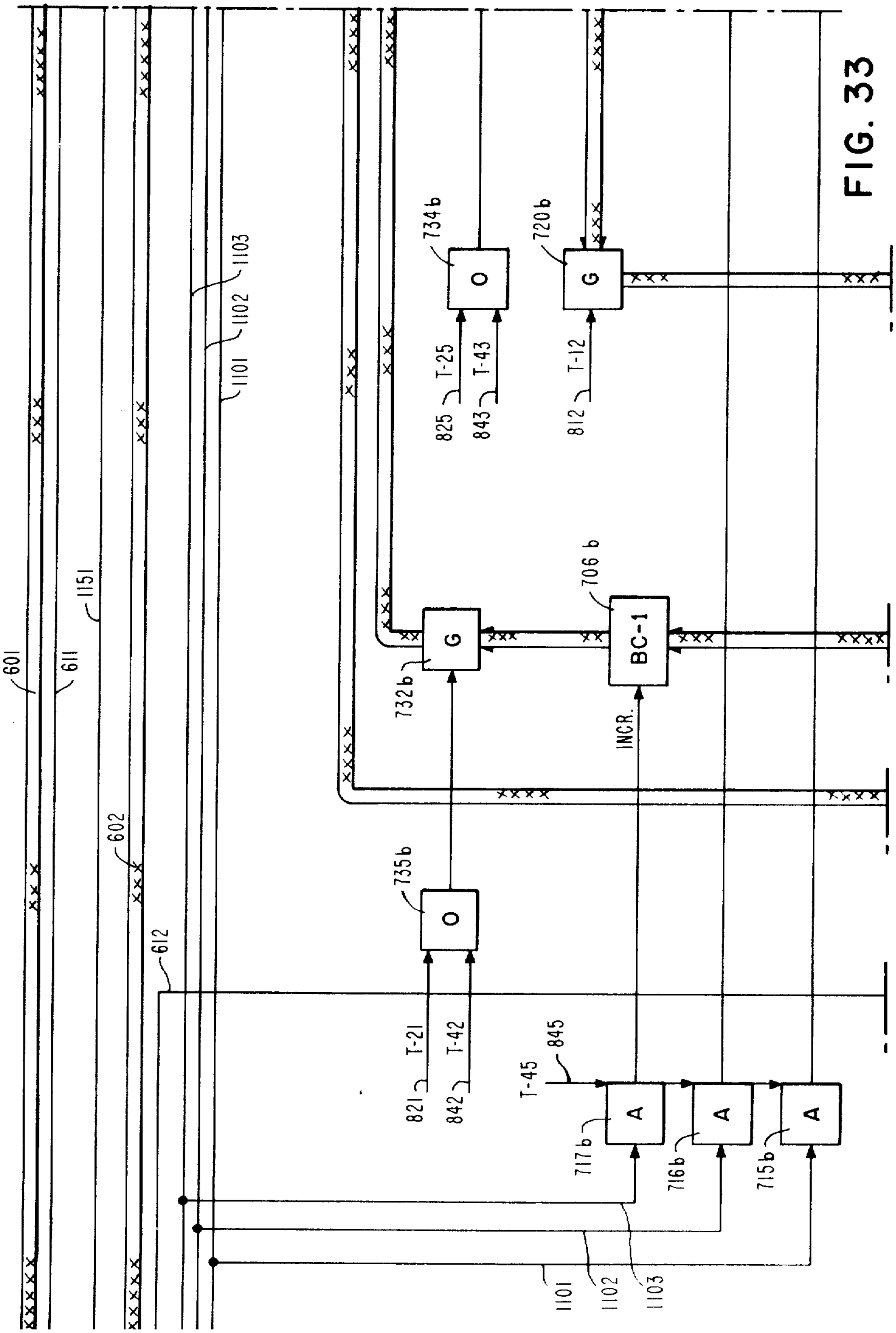
Figure 41:
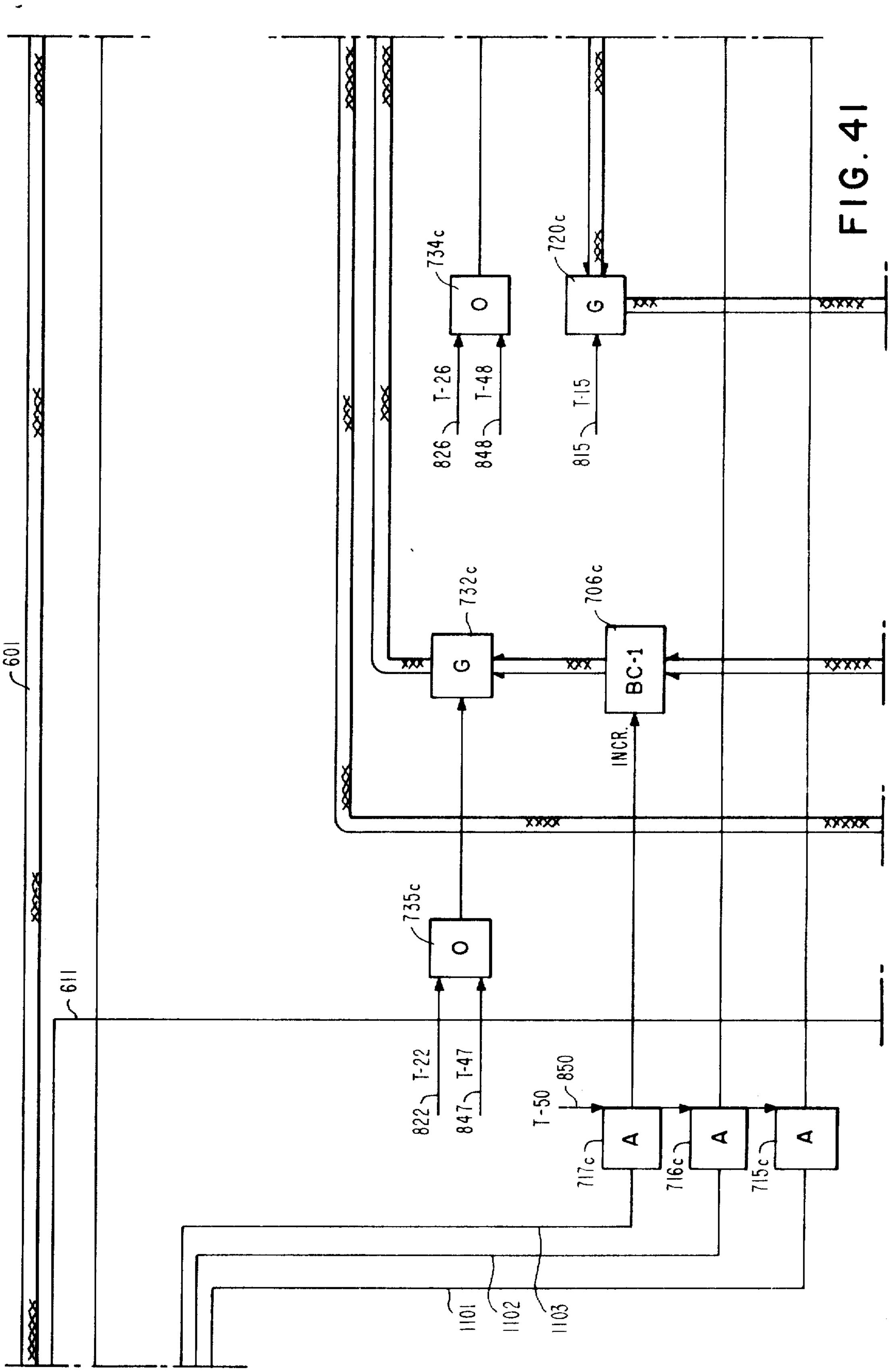

Signals on the output line 1025 are supplied to AND-circuits 1050 through 1061 in FIG. 23. Delay circuits 1070 through 1081 are connected to respective AND-circuits 1050 through 1061. Positive pulses on lines 834, 839, 844, and 849 are supplied through respective delay circuits 1070 through 1073 to corresponding AND-circuits 1050 through 1053. Output signals from these AND-circuits are supplied to an OR-circuit 1090. Input signals on the lines 833, 838, 843, and 848 are supplied through respective delay circuits 1074 through 1077 to corresponding AND-circuits 1054 through 1057. Output signals from these AND circuits are supplied to an OR-circuit 1091. Input signals on the lines 832, 837, 842, and 847 are supplied through respective delay circuits 1078 through 1081 to corresponding AND-circuits 1058 through 1061. Output signals from these AND circuits are supplied to an OR-circuit 1092. Signals from the OR-circuits 1090 through 1092 in FIG. 23 are supplied to the one input side of respective flip-flops 1092 through 1095 in FIG. 24. These flip-flops are reset by a positive signal from an OR-circuit 1096 in FIG. 24. This OR circuit receives positive pulses on the input lines 831, 836, 841, and 846 at respective times T–31, T–36, T–41, and T–46. The positive pulse on the line 831 at T–31 time resets the flip-flops 1093 through 1095. The following pulses T–32, T–33, and T–34 sample respective AND-circuits 1058, 1054, and 1050 in FIG. 23. If any one of these AND circuits passes a positive signal, this signal is supplied through the associated one of the OR-circuits 1090 through 1092 to set the corresponding one of the flip-flops 1093 through 1095 to the one state. The positive signals from the binary one output side of the flip-flop 1093 is supplied on a line 1101 to the AND-circuits 715 in FIG. 17, 715*a* in FIG. 25, 715*b* in FIG. 33, and 715*c* in FIG. 41. Signals from the one output side of the flip-flop 1094 in FIG. 24 are supplied on a line 1102 to the AND-circuits 716 in FIG. 17, 716*a* in FIG. 25, 716*b* in FIG. 33, and 716*c* in FIG. 41. Signals from the one output side of the flip-flop 1095 in FIG. 24 are supplied on a line 1103 to the AND-circuit 717 in FIG. 17, 717*a* in FIG. 25, 717*b* in FIG. 33, and 717*c* in FIG. 41. The AND-circuits 715 through 717 in FIG. 17 are sampled by a positive pulse on the line 835, and if these AND circuits provide a positive output signal, the associated boundary counters 704 through 706 are incremented. The AND circuits 715*a* through 717*a* in FIG. 25 are sampled by a positive signal on the line 840, and if positive output signals are provided, they increment associated boundary counters 704*a* through 706*a*. The AND-circuits 715*b* through 717*b* in FIG. 33 are sampled by a positive signal on the line 845, and if positive output signals are passed, they increment associated boundary counters 704*b* through 706*b*. The AND-circuits 715*c* through 717*c* in FIG. 41 are sampled by a positive pulse on the line 850, and if positive output signals are passed, they increment associated boundary counters 704*c* through 706*c*.

Figure 27:
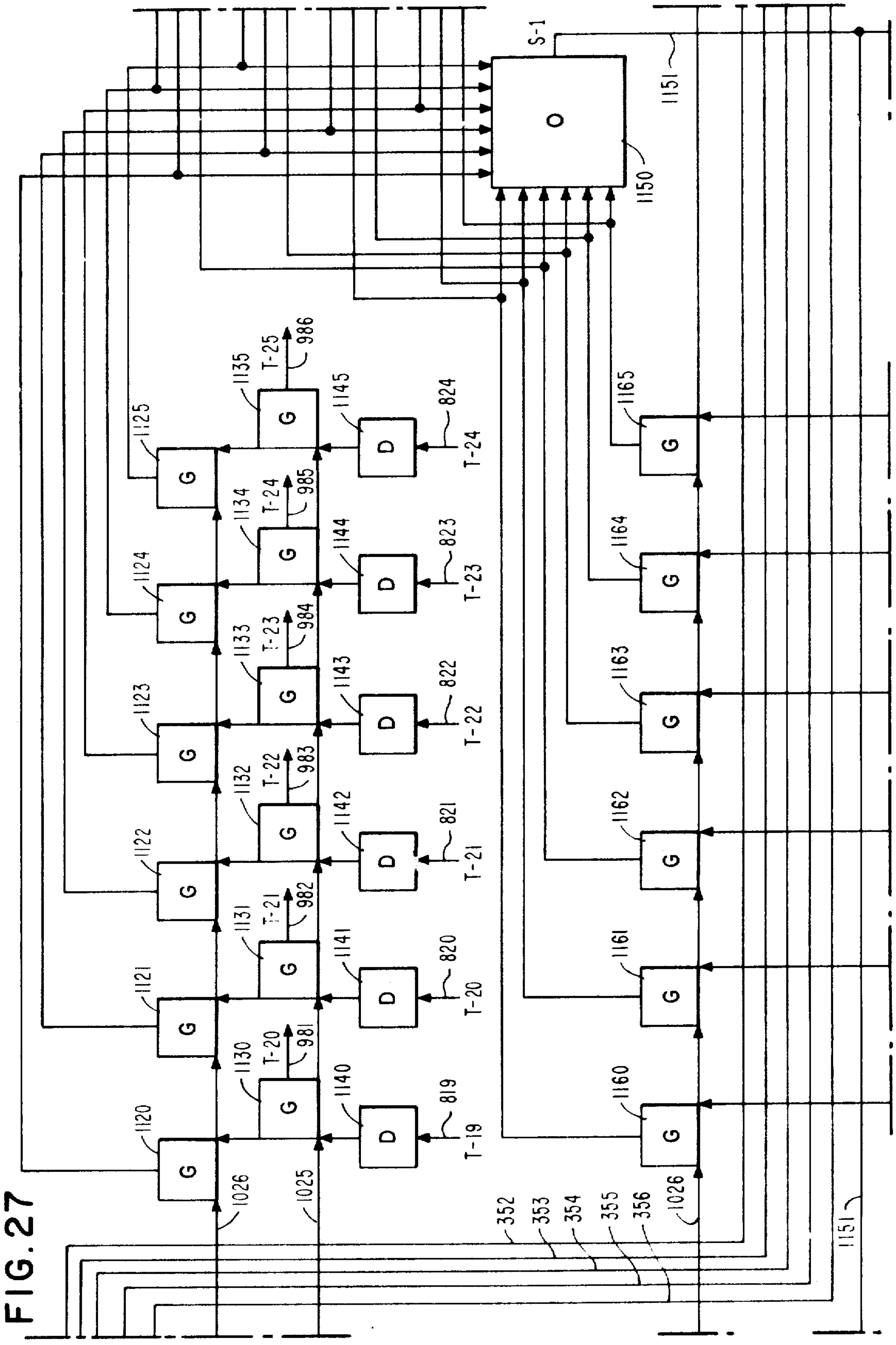

A positive signal on the line 1026 from the comparator 1020 in FIG. 24 is supplied to gates 1120 through 1125 in FIG. 27. A positive signal on the line 1025 from the comparator 1020 in FIG. 24 is supplied to gates 1130 through 1135 in FIG. 27. Signals on the lines 819 through 824 in FIG. 27 pass through delay circuits 1140 through 1145 through 1145 to respective gates 1130 through 1135 and to respective gates 1120 through 1125. Output signals from the gates 1130 through 1135 are supplied on respective lines 981 through 986 to respective single-shots 920 through 925 in FIG. 39. Signals from the gate 1120 through 1125 in FIG. 27 are supplied to various OR-circuits 1146 through 1149 in FIG. 31.

These OR circuits supply output signals on respective lines 992 through 995 to respective single-shots 931 in FIG. 36, 936 in FIG. 40, 941 in FIG. 40, and 946 in FIG. 44. The output signals from the gates 1120 through 1125 in FIG. 27 are supplied also to an OR-circuit 1150 which in turn supplies an output signal on a line 1151 to start a search clock described subsequently.

Figure 28:
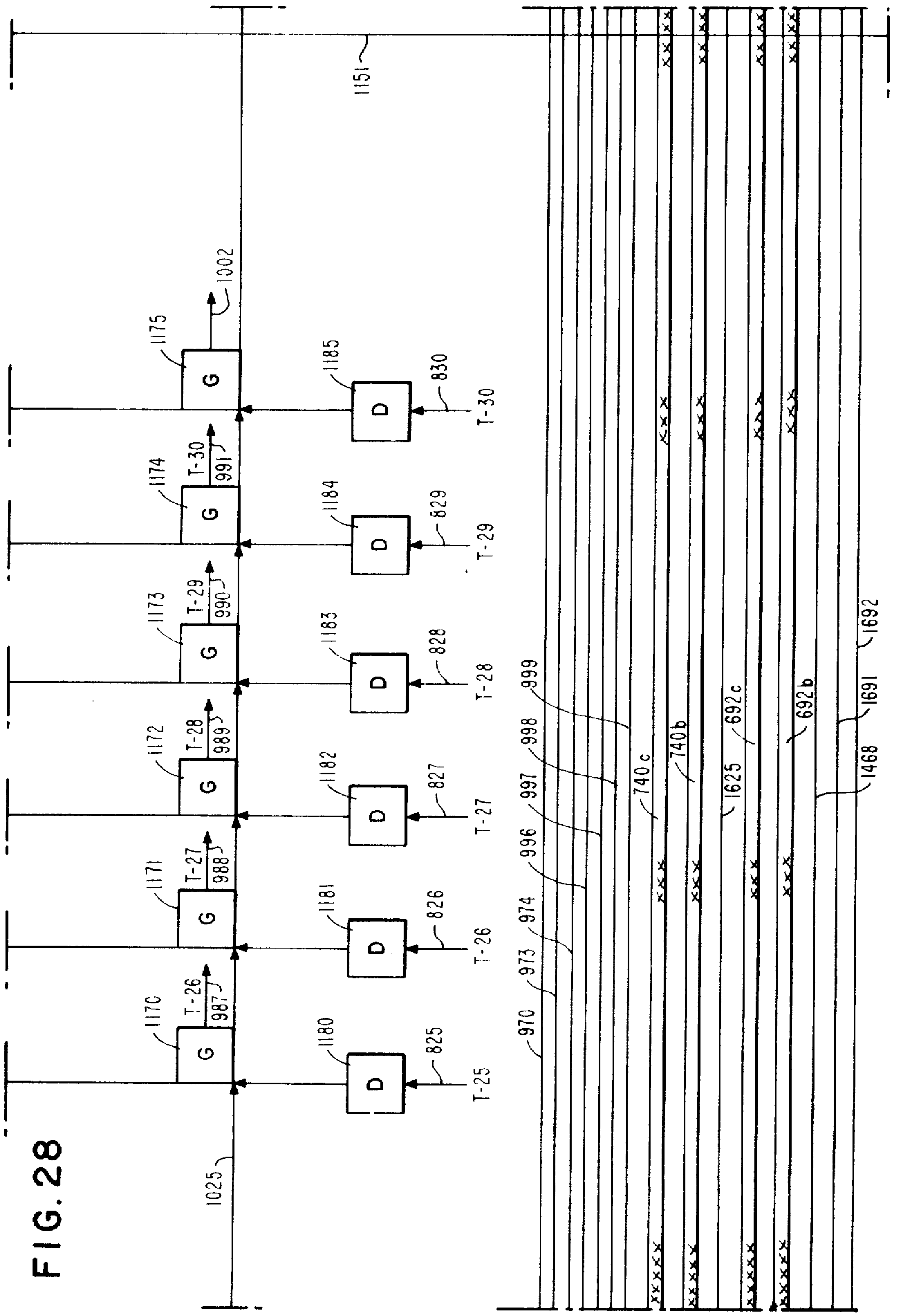

Signals on the line 1026 from the comparator 1020 are supplied to gates 1160 through 1165 in FIG. 27. Signals on the line 1025 from the comparator 1020 in FIG. 24 are supplied to gates 1170 through 1175 in FIG. 28. Signals on the lines 825 through 830 in FIG. 28 are supplied through respective delay circuits 1180 through 1185 to respective gates 1170 through 1175 and respective gates 1160 through 1165. Output signals from the gates 1160 through 1165 are supplied to the OR-circuit 1150. Output signals from the gates 1170 through 1165 are supplied to the OR-circuit 1150. Output signals from the gates 1170 through 1174 are supplied on respective lines 987 through 991 to respective single-shots 926 through 930 in FIGS. 39 and 43. The output signal from the gate 1175 in FIG. 28 on the line 1002 is supplied through the OR-circuits 1815 and 1816, to the flip-flops 1801 and 1802 in FIG. 15.

Figure 32:
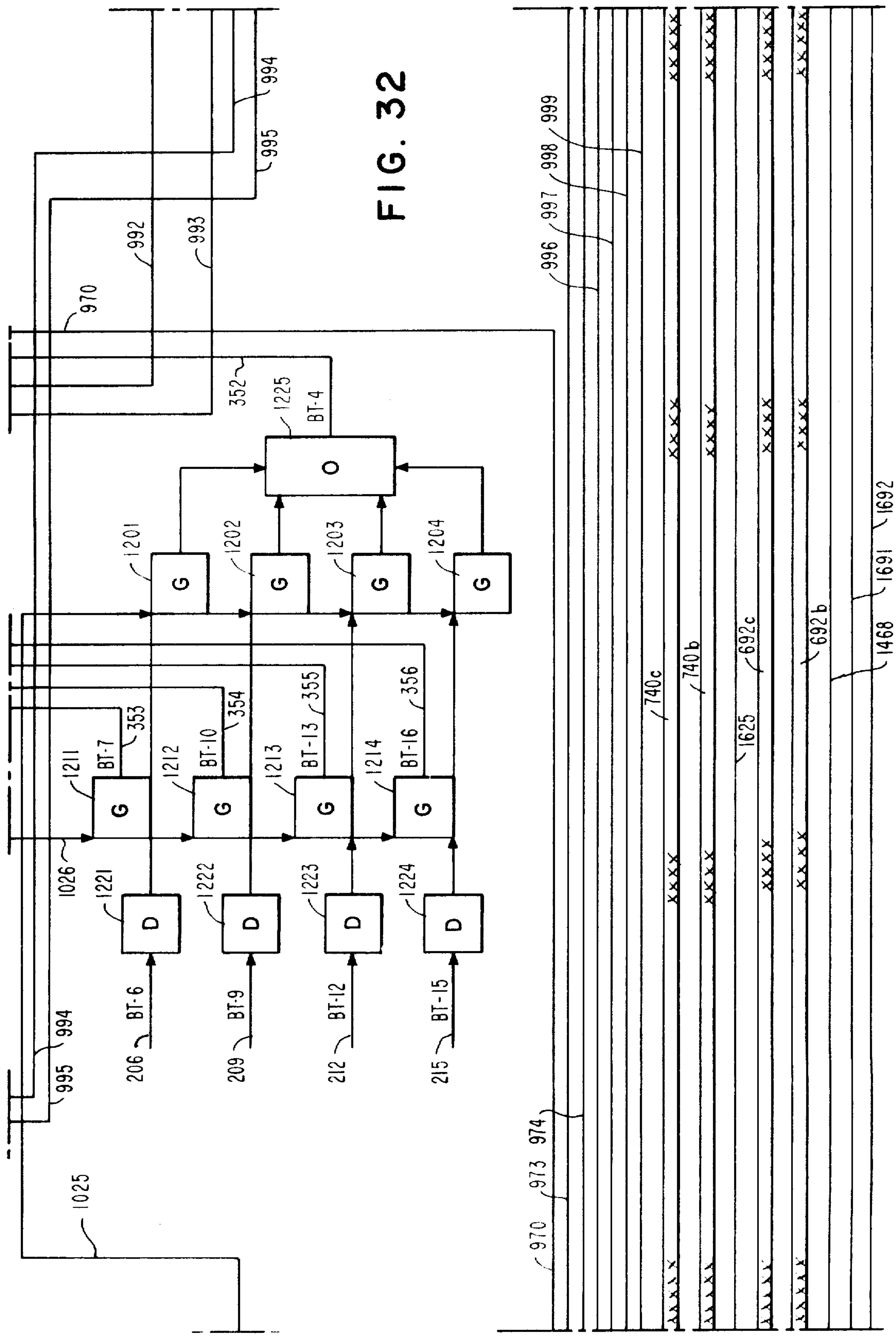

Signals on the line 1025 from the comparator 1020 in FIG. 24 are supplied to gates 1201 through 1204 in FIG. 32. Signals on the line 1026 from the comparator 1020 in FIG. 24 are supplied to gates 1211 through 1214 in FIG. 32. Positive pulses on input lines 206, 209, 212 and 215 are supplied through respective delay circuits 1221 through 1224 to respective gates 1211 through 1214 through respective delay circuits 1221 through 1224 to respective gates 1211 through 1214 and respective gates 1201 through 1204. A positive signal from any one of the gates 1201 through 1204 through 1204 is supplied through an OR-circuit 1225 to the line 352 which conveys a positive signal through the OR-circuit 392 in FIG. 6 to operate the single shot 304 at BT–4 time. Positive signals from the gates 1211 through 1214 are supplied on respective lines 353 through 356 to respective single shots 307 in FIG. 9, 310 in FIG. 9, 313 in FIG. 12, and 316 in FIG. 12 to provide corresponding timing pulses BT–7, BT–10, BT–13, and BT–16.

Figure 31:
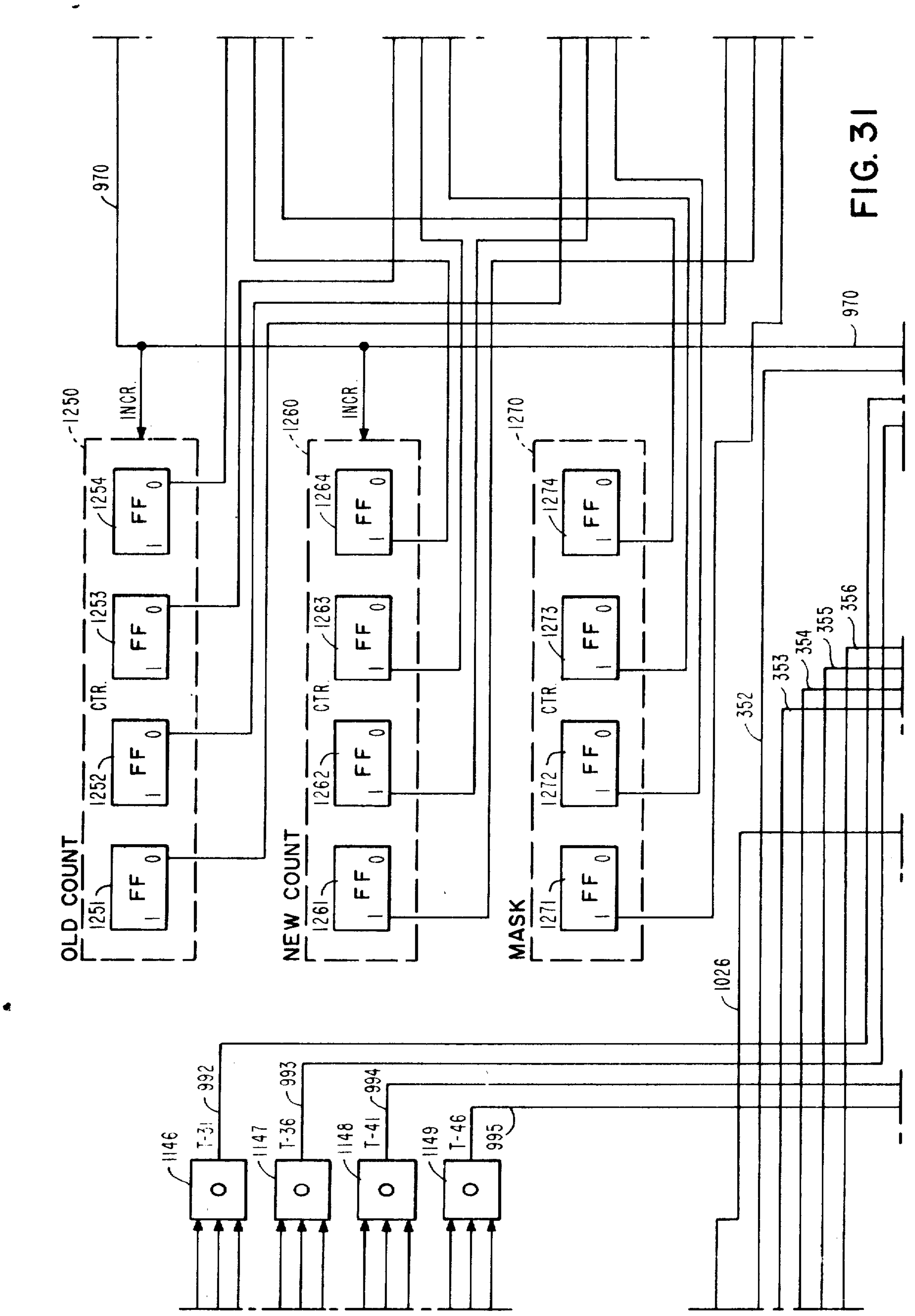

Reference is made next to FIGS. 31 and 35 for a description of a circuit arrangement for controlling the T clock. An old count counter 1250 in FIG. 31 includes flip-flops 1251 through 1254, and a new count counter 1260 includes flip-flops 1261 through 1264. A mask register 1270 includes flip-flops 1271 through 1274. The zero out put sides of the flip-flops 1251 through 1254 in FIG. 31 are connected to respective AND-circuits 1281 through 1284 in FIG. 35. The one output sides of the flip-flop circuits 1261 through 1264 in FIG. 31 are connected to respective AND-circuits 1281 through 1284 in FIG. 35. The one output side of the flip-flops 1271 through 1274 in FIG. 31 are connected to respective AND-circuits 1281 through 1284 in FIG. 35. Output signals from the AND-circuits 1281 through 1284 are connected through respective inverters 1291 through 1294 to respective AND-circuits 1301 through 1304. Output signals from the AND-circuits 1281 through 1284 are connected also to respective AND-circuits 1311 through 1314. Output signals from the AND-circuits 1311 through 1314 are connected to respective lines 978 through 975. Signals on the lines 975 through 978 operate respective lines 978 through 975. Signals on the lines 975 through 978 operate respective single-shots 906 in FIG. 39, 909 in FIG. 39, 912 in FIG. 43, and 915 in FIG. 43. Signals from the AND-circuit 1301 in FIG. 35 are supplied on the line 979 through the OR-circuit 980 to operate the single-shot 918.

Figure 48:
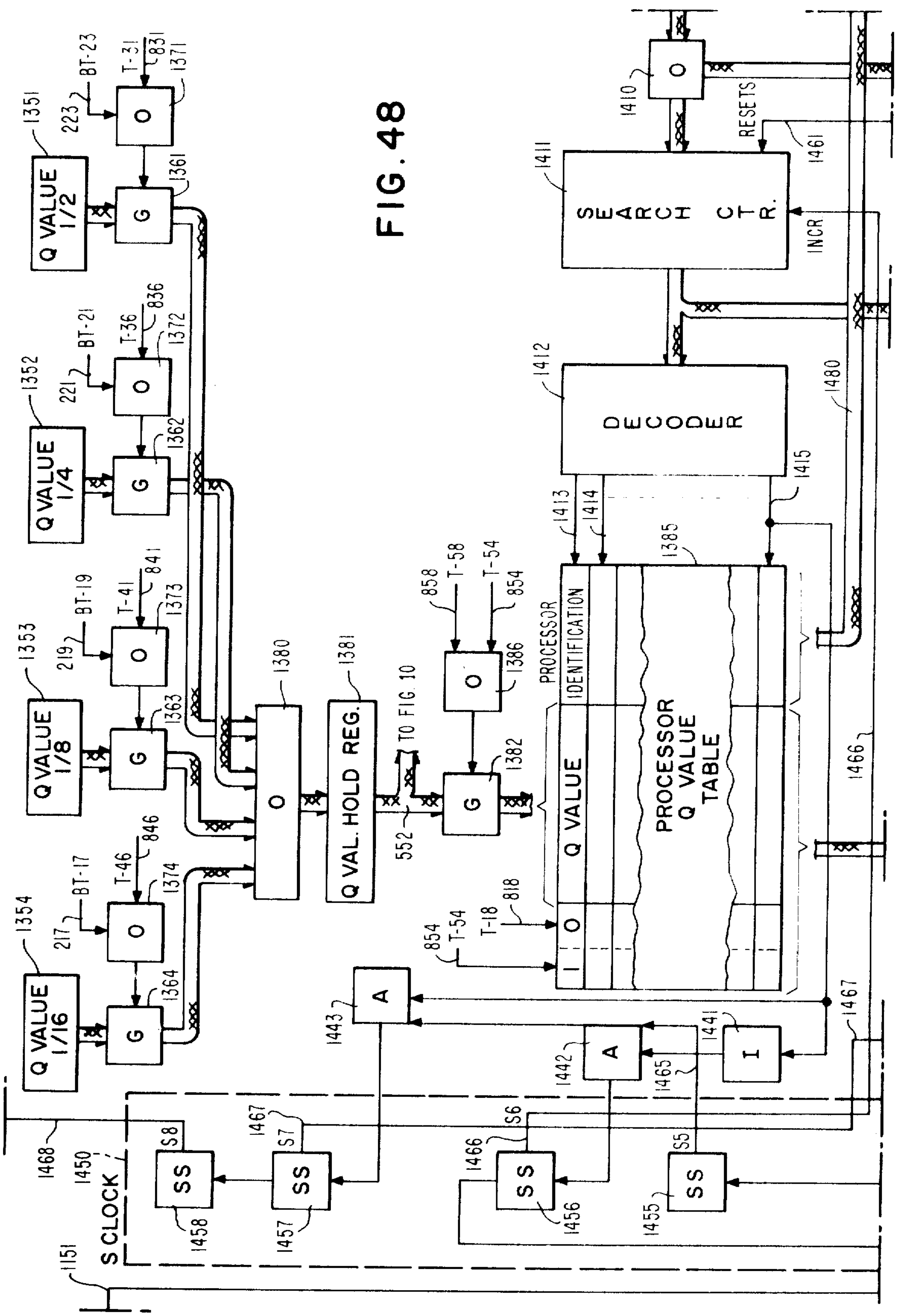
Figure 49:
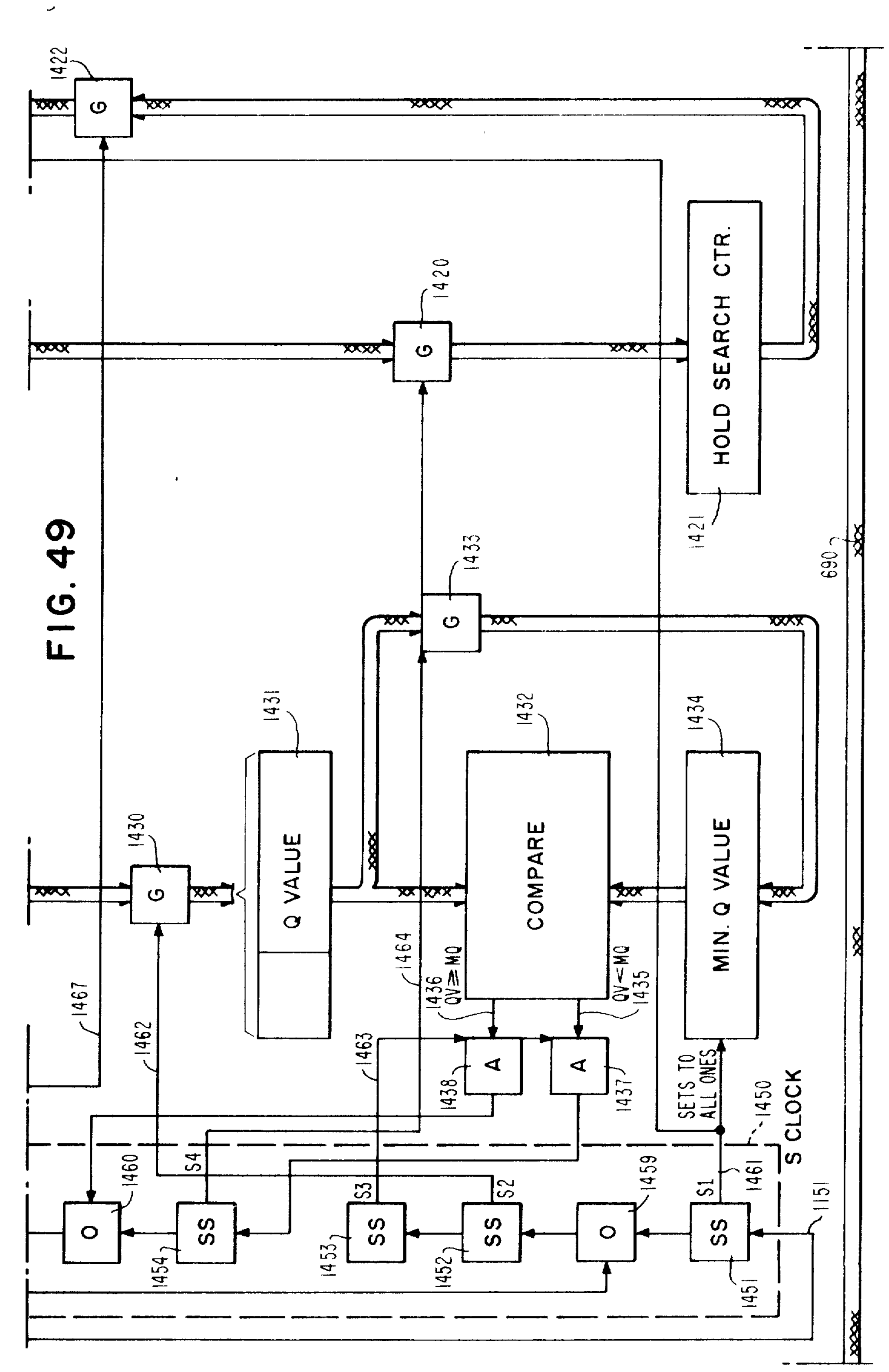

Reference is made next to FIGS. 48 and 49 for a description of a table in which are stored the Q value of tasks assigned to processors and the related equipment for controlling the operation of the table. Referring first to FIG. 48, Q value registers 1351 through 1354 are connected to respective sets of gates 1361 through 1364. Or circuits 1371 through 1374 are connected to respective sets of gates 1361 through 1364. The OR-circuits 1371 through 1374 receive signals on respective input lines 831, 836, 841, and 846. The Or circuits 1371 through 1374 also receive input signals on respective input lines 831, 836, 841, and 846. The Or circuits 1371 through 1374 also receive input signals on respective lines 223, 221, 219, and 217. The sets of gates 1361 through 1364 are connected through a set of OR-circuits 1380 to a Q value hold register 1381. The Q value hold register 1381 supplies signals on a cable 552 to the decoder 570 in FIG. 10. Signals from the Q value hold register 1381 are supplied also on the cable 552 through a set of gates 1382 to a table 1385. An OR-circuit 1386 receives signals on input lines 854 and 858 and supplies them to the set of gates 1382.

Signals for addressing the table 1385 are supplied through a set of OR-circuits 1410 to a search counter 1411. Signals from the search counter 1411 are supplied to a decoder 1412 which in turn supplies a positive signal on a selected one of its output lines 1413 through 1415 to address corresponding registers of the table 1385. The content of the search counter 1411 is supplied to a set of gates 1420 which in turn supplies this information to a hold search counter 1421. The output of the hold search counter 1421 is supplied to a set of gates 1422 which in turn supplies this information through the set of OR-circuits 1410 to the search counter 1411. Information from the table 1385 is supplied through a set of gates 1430 to a Q value register 1431. The content of the Q value register 1431 is supplied to a compare circuit 1432. The content of the Q value register 1431 may be supplied through a set of gates 1433 to a minimum Q value register 1434. The content of the minimum Q value register 1434 is supplied to the compare circuit 1432. The compare circuit 1432 supplies a positive signal on an output line 1435 if the Q value in the register 1431 is less than the minimum Q value in the register 1434. The compare circuit 1432 supplies a positive output signal on the line 1436 if the Q value in the register 1431 is equal to or greater than the minimum Q value in the register 1434. Signals on the lines 1435 and 1436 are supplied to respective AND-circuits 1437 and 1438.

Signals on the line 1415 in FIG. 48 are supplied through an inverter 1441 to an AND-circuit 1442. Signals on the line 1415 are supplied also to an AND-circuit 1443. The AND-circuits 1437 and 1438 in FIG. 49 and the AND-circuits 1442 and 1443 in FIG. 48 are used to control an S (search) clock 1450 in FIGS. 48 and 49. This clock is described next.

The S clock 1450 includes single-shots 1451 through 1458 which are operated to generate timing pulses S1 through S8. OR-circuits 1459 and 1460 are connected to respective single-shots 1452 and 1455. The single-shots 1451 through 1458 supply the timing pulses S1 through S8 on respective lines 1461 through 1468.

The S clock is started by a positive pulse on the line 1151 in FIG. 49. This pulse is received from the OR-circuit 1150 in FIG. 27, and it operates the single-shot 451 in FIG. 49 thereby to establish a positive signal on the line 1461 which sets the minimum Q value register 1434 to all ones and resets the search counter 1411 to all zeros. When the S1 signal terminates, a positive going signal from the single-shot 1451 passes through the OR-circuit 1459 and operates the single-shot 1452 thereby to establish a positive S2 signal on the line 1462 which transfers the Q value of the first register in the table 1385 through the gates 1430 to the Q value register 1431. When the single shot 1452 reverts to its stable state, a positive going pulse operates the single shot 1453 to establish a positive S3 signal on the line 1463. This signal passes through the AND-circuit 1437 or the AND-circuit 1438, depending upon the results of the comparison in the compare circuit 1432 of the quantities held in the registers 1431 and 1434. If the register 1431 holds the lesser value, the AND-circuit 1437 supplies a positive pulse to the single-shot 1454 which in turn supplies a positive S4 signal on the line 1464 to gate the content of the register 1431 to the register 1434. If the register 1431 holds the greater value after a comparison, the AND-circuit 1438 supplies a positive signal through the OR-circuit 1460 which operates the single-shot 1455 to supply a positive S5 signal to the AND-circuits 1442 and 1443. Since it is assumed that the search counter 1411 operates the decoder 1412 to select the first register in the table 1385, a positive signal is established on the line 1413. Conversely, a negative signal is established on the remaining address lines 1414 and 1415. The negative signal on the line 1415 is inverted by the inverter 1441 to condition the AND-circuit 1442 to pass the positive signal on the line 1465 which in turn operates the single-shot 1456 to supply a positive S6 signal on the line 1466 which increments the search counter 1411. When the single-shot 1456 reverts to its stable state, a positive going signal is supplied through the OR-circuit 1459 in FIG. 49 to the single-shot 1452, and the foregoing sequence of pulses S2 through S6 is repeated whereby the content of the register 1434 is compared with the next Q value in the register 1431. The new Q value is taken from the second register in the table 1385 because the search counter 1411 in FIG. 48 is incremented to the next value which thereby operates the decoder 1412 to energize the line 1414 with a positive signal simultaneously as the lines 1413 and 1415 are energized with negative signals.

The S clock repeats the foregoing operation each time it progresses through the loop which includes the single shots 1452 through 1456. When the search counter 1411 operates the decoder 1412 to select the last register in the list or table 1385, it supplies a positive signal on the line 1415 which conditions the AND-circuit 1443 to pas a positive S7 signal on the line 1467 gates the content of the hold search counter 1421 through the gate 1422 to the search counter 1411. The content of the search counter then represents the address of a word in the list or table 1385 which has the lowest Q value, and the decoder 1412 is operated to select that register. When the single shot 1457 reverts to its stable state, a positive going signal operates the single shot 1458 thereby to establish a positive S8 signal on the line 1468. A positive signal on the line 1468 signifies that the processor working on a task word with the lowest Q value is identified by the selected register in the list 1385. The processor identification portion of the selected register in the list 1385 is supplied on a cable 1480 to a decoder 1481 in FIG. 51.

Figure 51:
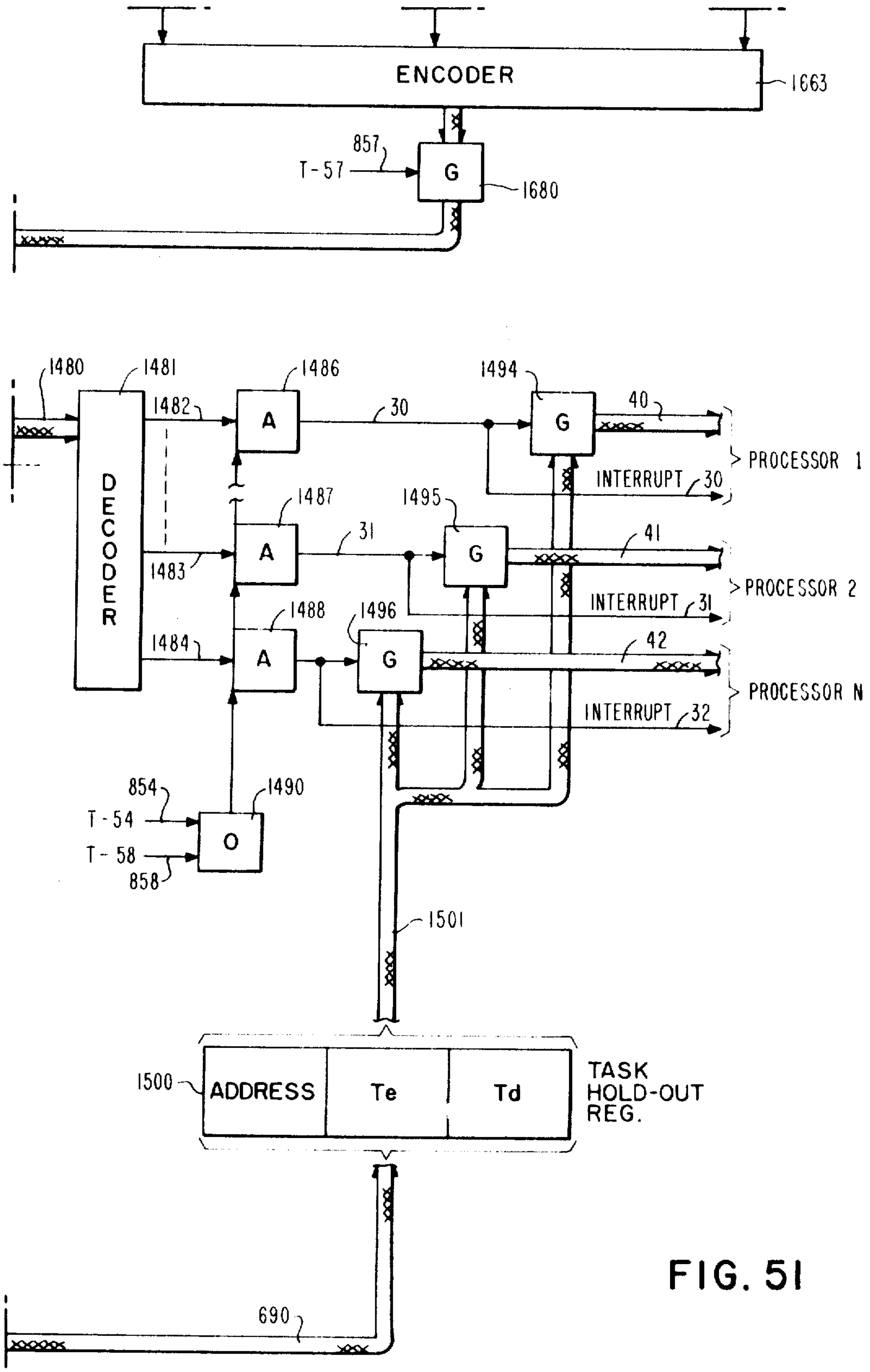
Figure 52:
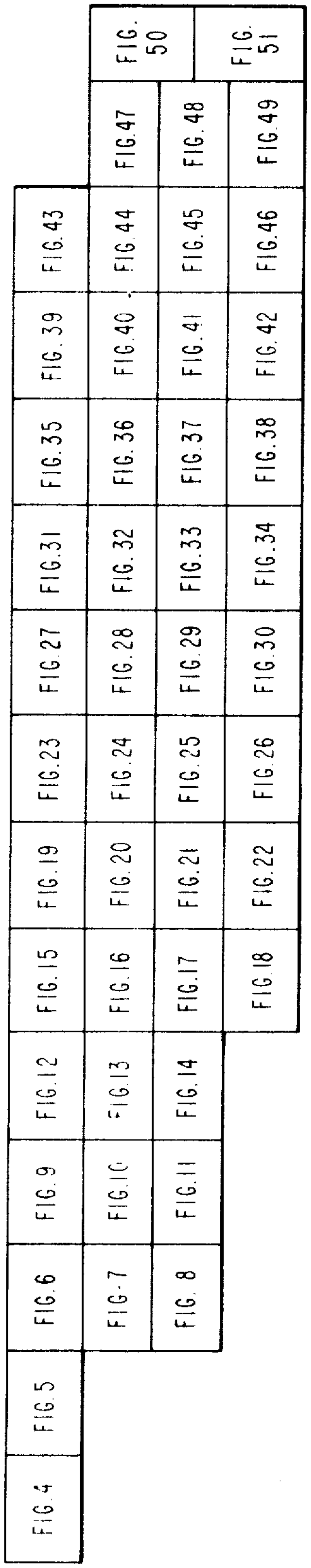
FIG. 52 illustrates the manner in which FIGS. 4 through 51 should be arranged.

Referring next to FIG. 51, the decoder 1481 responds to input signals and energizes a selected one of its output lines 1482 through 1484 with a positive signal. The lines 1482 through 1484 are connected to respective AND-circuits 1486 through 1488. An OR-circuit 1490 responds to positive pulses on the lines 854 at T–54 time and 858 at T–58 time and provides a positive signal to the AND-circuits 1486 through 1488. Output signals from the AND-circuits 1486 through 1488 are conveyed on respective lines 30 through 32 to corresponding sets of gates 1494 through 1496. A task word in a task holdout register 1500 is conveyed on a cable 1501 to the sets of gates 1494 through 1496. The sets of gates 1494 through 1496 are connected to respective output cables 40 through 42 to respective processors 10 through 12 in FIG. 1. The decoder 1481 in FIG. 51 selects a given one of the AND-circuits 1486 through 1488, and this AND circuit passes a positive pulse from the OR-circuit 1490 at T–54 time or T–58 time on the associated one of the lines 30 through 32. The positive signal on the selected one of the lines 30 through 32 serves as an interrupt signal for the selected processor, and the task word in the task holdout register 1500 passes through the associated on of the sets of gates 1494 through 1496 to the selected one of the processors 10 through 12 in FIG. 1. An interrupt signal on the lines 30 through 32 may cause an idle processor to commence operating if it is idle or interrupt an existing task in process. If a task is interrupted, the interrupted task is forwarded to the program scheduler 15 for subsequent allocation reassignment.

Figure 47:
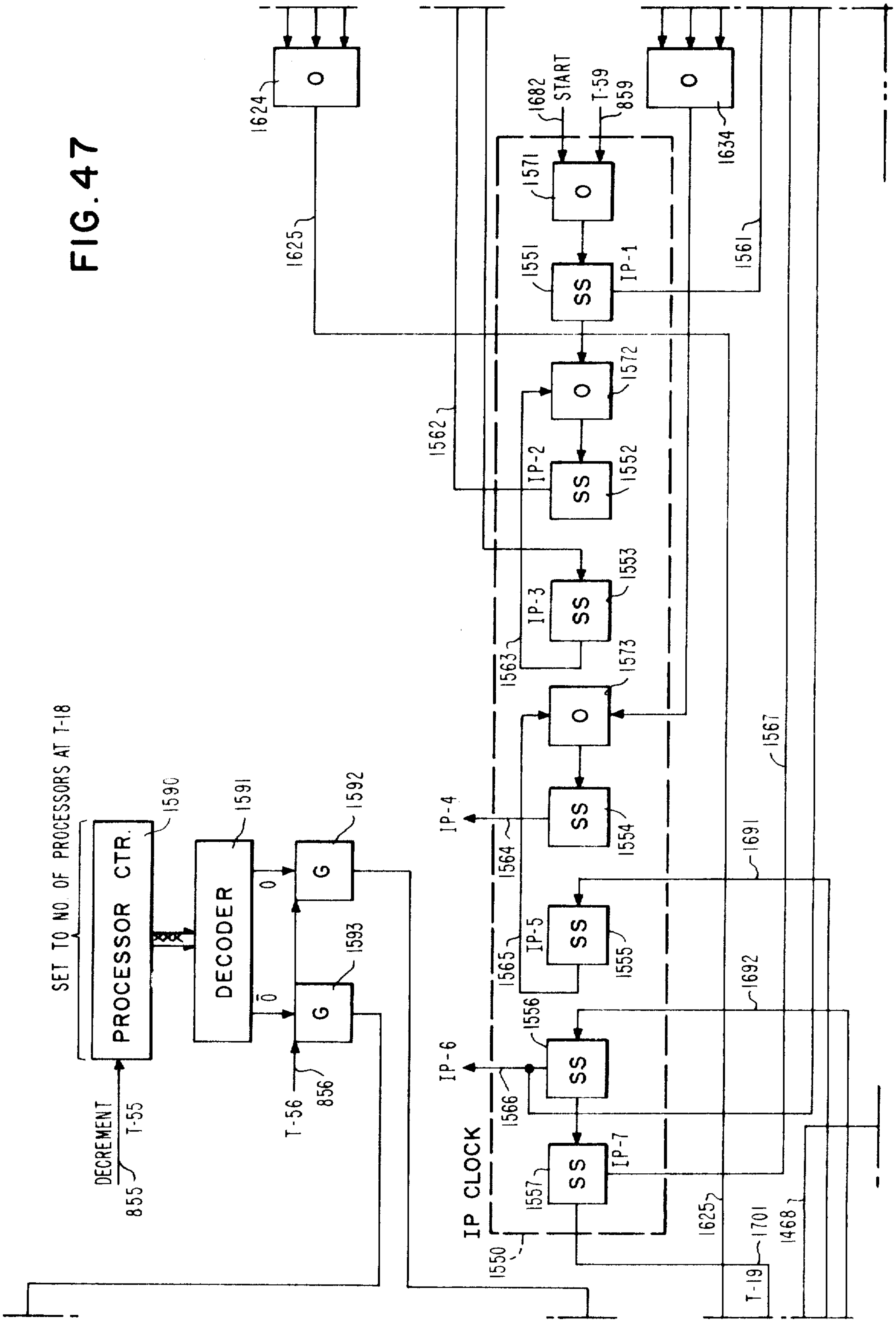
Figure 50:
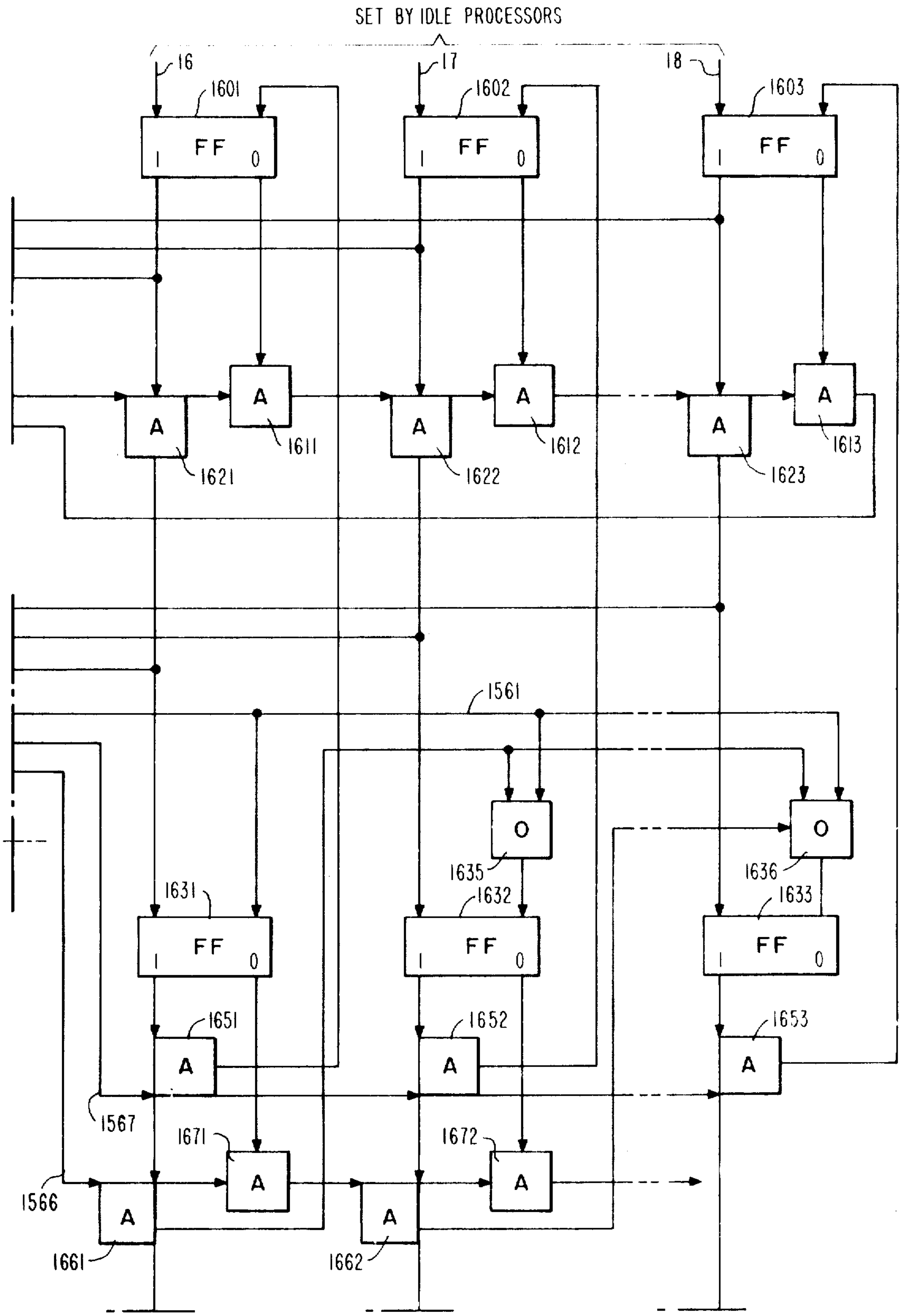

Reference is made next to FIGS. 47 and 50 for a description of an IP (idle processor) clock and its associated circuits for determining which processors, if any, in FIG. 1 are idle. Referring first to FIG. 47, an IP clock 1550 includes single shots 1551 through 1557 which supply control signals on respective output lines 1561 through 1567. Or circuits 1571 through 1573 are connected to respective signal shots 1551, 1552, and 1554.

When the processors 10 through 12 in FIG. 1 are idle, they send positive signals on corresponding lines 16 through 18 which set respective flip-flops 1601 through 1603 in FIG. 50. The zero output side of the flip-flops 1601 through 1603 are connected to respective AND-circuits 611 through 613. The one output side of the flip-flops 1601 through 1603 are connected to respective AND-circuits 1621 through 1623. The one output signal of the flip-flops 1601 through 1603 are connected also through an OR-circuit to a line 1625. The AND-circuits 1621 through 1623 have their outputs connected to the one input side of respective flip-flops 1631 through 1633. The AND-circuits 1621 through 1623 are connected also through an OR-circuit 1634 in FIG. 47 to the OR-circuit 1573. OR-circuits 1635 and 1636 in FIG. 50 are connected to the zero input side of respective flip-flops 1632 and 1633.

The flip-flops 1631 through 1633 have their one outputs connected to respective AND-circuits 1651 through 1653. The one outputs of the flip-flops 1631 and 1632 are connected to respective AND-circuits 1661 and 1662. The one output of the flip-flops 1631 through 1633 are connected also to an encoder 1663 in FIG. 51. The zero outputs of the flip-flops 1631 and 1632 are connected to respective AND-circuits 1671 and 1672.

The encoder 1663 receives a positive signal from the output side of one, and only one, of the flip-flops 1631 through 1633 at any given instant, and the encoder 1663 in FIG. 1 supplies a multisignal code representing the identity of a given idle processor to a st of gates 1680. These gates are operated by a positive signal on the line 857 at T–57 time to transfer the multisignal code through the OR-circuit 1410 in FIG. 49 to the search counter 1411.

Next the function of the IP clock is described. The OR-circuit 1571 in FIG. 47 responds to a positive signal on the line 1682 or a positive signal on the line 859 at T–59 time, and this positive signal operates the single-shot 1551 thereby to initiate operation of the IP clock by supplying a positive pulse on the line 1561 which resets the flip-flops 1631 through 1633 in FIG. 50. When the single-shot 1551 in FIG. 47 reverts to its stable state, a positive signal passes through the OR-circuit 1572 to operate the single-shot 1552 thereby to establish a positive signal on the output line 1562. This signal is supplied to the AND-circuits 1611 and 1621. If the processor 10 in FIG. 1 is idle, a positive signal on the line 16 earlier set the flip-flop 1601 in FIG. 50. Consequently, the AND-circuit 1621 responds to the positive signal on the line 1562 and sets the flip-flop 1631. In this case the AND-circuit 1611 receives a negative signal from the zero output of the flip-flop 1601, and the positive signal on the line 1562 is not passed to interrogate the AND-circuits 1612 and 1622. In essence, the flip-flops to the right of the flip-flop 1611 are not interrogated. If, on the other hand, the processor 10 in FIG. 1 is not idle, flip-flop 1601 is in the zero state, thereby supplying a positive signal to the AND-circuit 1611. This AND-circuit then passes the positive signal on the line 1562 to the AND-circuits 1612 and 1622. If the flip-flop 1602 is in the zero state, indicating that the processor 11 in FIG. 1 is not idle, then the AND-circuits 1612 in FIG. 50 passes a positive signal to the AND-circuits 1613 and 1623. If the flip-flop 1603 is in the zero state, indicating that the processor 12 in FIG. 1 is not idle, then the AND-circuit 1613 in FIG. 50 passes a positive signal to the single-shot 1553. A positive signal from the AND-circuit 1613 signifies that the processors 10 through 12 in FIG. 1 are busy. The single-shot 1553 serves as a delay device, and upon reverting to the stable state, it provides a positive going output signal to the OR-circuit 1572 which in turn operates the single shot 1552 to repeat the foregoing sampling operation. The sampling operation is repeated until at least one of the processors becomes idle at which time the positive signal on the line 1562 is passed by the leftmost one of the AND-circuits 1621 through 1623 to set the associated ones of the flip-flops 1631 through 1633.

The positive output signal from one of the AND-circuits 16121 through 1623 is supplied through the OR-circuit 1634 in FIG. 47 to the OR-circuit 1573. The positive signal from the OR-circuit 1573 operates the single-shot 1554 thereby to establish a positive signal on the output line 1564. The positive signal on the line 1564 performs a sampling operation described hereinafter. If the sampling operation is not successful, a positive signal is returned on a line 1691 to the single-shot 1555. The single-shot 1555 serves as a delay mechanism, and when reverting to the stable state, it provides a positive going signal through the OR-circuit 1573 which operates the single-shot 1554 to repeat the sampling operation. The sampling operation is repeated until it is successful at which time a positive signal is returned on a line 1692 to the single-shot 1556 which thereby provides a positive signal on the line 1566. A positive signal on the line 1566 is supplied to the AND-circuit 1661 and 1671 in FIG. 50. If the flip-flop 1631 is in the one state, the AND-circuit 1661 passes the positive signal on the line 1556 to the OR-circuits 1635 and 1636 which resets the associated flip-flops 1632 and 1633. The positive signal from the one output side of the flip-flop 1631 operates the encoder 1663 in FIG. 51 to supply a multisignal code to the set of gates 1680. This code signifies that the processor 10 in FIG. 1 is idle, and it has been selected to receive a task word.

If the flip-flop 1631 is in the zero state when a positive signal occurs on the line 1566, the AND-circuit 1671 passes this positive signal to the AND-circuits 1662 and 1672. If the flip-flop 1632 is in the one state, the AND-circuit 1662 passes a positive signal to the OR-circuit 1636 which resets the flip-flop 1633. The one output of the flip-flop 1632 is encoded by the encoder 1663 in FIG. 51 to indicate that the processor 11 in FIG. 1 is idle as is selected to receive a task word. If the flip-flop 1632 is in the zero state when the positive signal is supplied to the AND-circuits 1662 and 1672, the AND-circuit 1672 passes this positive pulse to succeeding stages, not shown, where this same type of sampling operation takes place. If the flip-flop 1633 is in the one state and the flip-flops 1631 and 1632 are both in the zero state, then the AND-circuits 1661 and 1662 do not provide positive output signals through the OR-circuit 1636 to reset the flip-flop 1633. Consequently, the one output side of the flip-flop 1633 is encoded by the encoder 1663 to indicate that processor 12 in FIG. 1 is idle and is selected to receive a task word.

After the above sampling operation takes place the single-shot 1557 is operated to provide a positive signal on the line 1567 which is supplied to the AND-circuits 1551 through 1553. One of the AND-circuits is operated by a positive signal from its associated flip-flop, and a positive signal is supplied to the zero input of the associated one of the flip-flops 1601 through 1603, thereby resetting this flip-flop. This signifies that the request of the associated processor for a task word has been honored. When the single-shot 1557 reverts to its stable state, it supplies a positive going signal on an output line 1701 to an OR-circuit 967 in FIG. 35. The positive signal on the line 1701 indicates to the T clock that an idle processor is available, and its request for a task word is satisfied by initiating the operation of the T clock at that portion of its cycle commencing with the single-shot 919 in FIG. 35 to generate timing pulse T–19. The operation of the T clock to assign or allocate a task word to the selected idle processor is described more fully hereinafter.

In FIG. 47 a processor counter 1590 is set at T–18 time with the number of processors in the system. The processor counter 1590 is connected to a decoder 1591. If the content of the processor counter 1590 is zero, the decoder 1591 conditions a gate 1592, and this gate passes a positive pulse on the line 856 at T–56 time to the single-shot 964 in FIG. 44, thereby to provide a positive T–64 pulse on the line 864. The T–64 pulse is sent through OR-circuits 1815 and 1816 to reset control flip-flops 1801 and 1802 in FIG. 15 to indicate that the T clock is stopped or not running. The operation of the control flip-flops 1801 and 1802 is discussed hereinafter.

When the content of the professor counter 1590 in FIG. 47 is not zero, the decoder 1591 conditions a gate 1593 to pass a positive T–56 pulse on the line 856 through the OR-circuit 967 in FIG. 35 to the single-shot 919 thereby to establish a positive T–19 pulse on the line 819 in order to recycle the T clock and allocate or assign another task word to another processor. This operation by the processor counter is repeated to interrupt each processor and allocate new task words under the allocation algorithm as explained more fully hereinafter.

Figure 14:
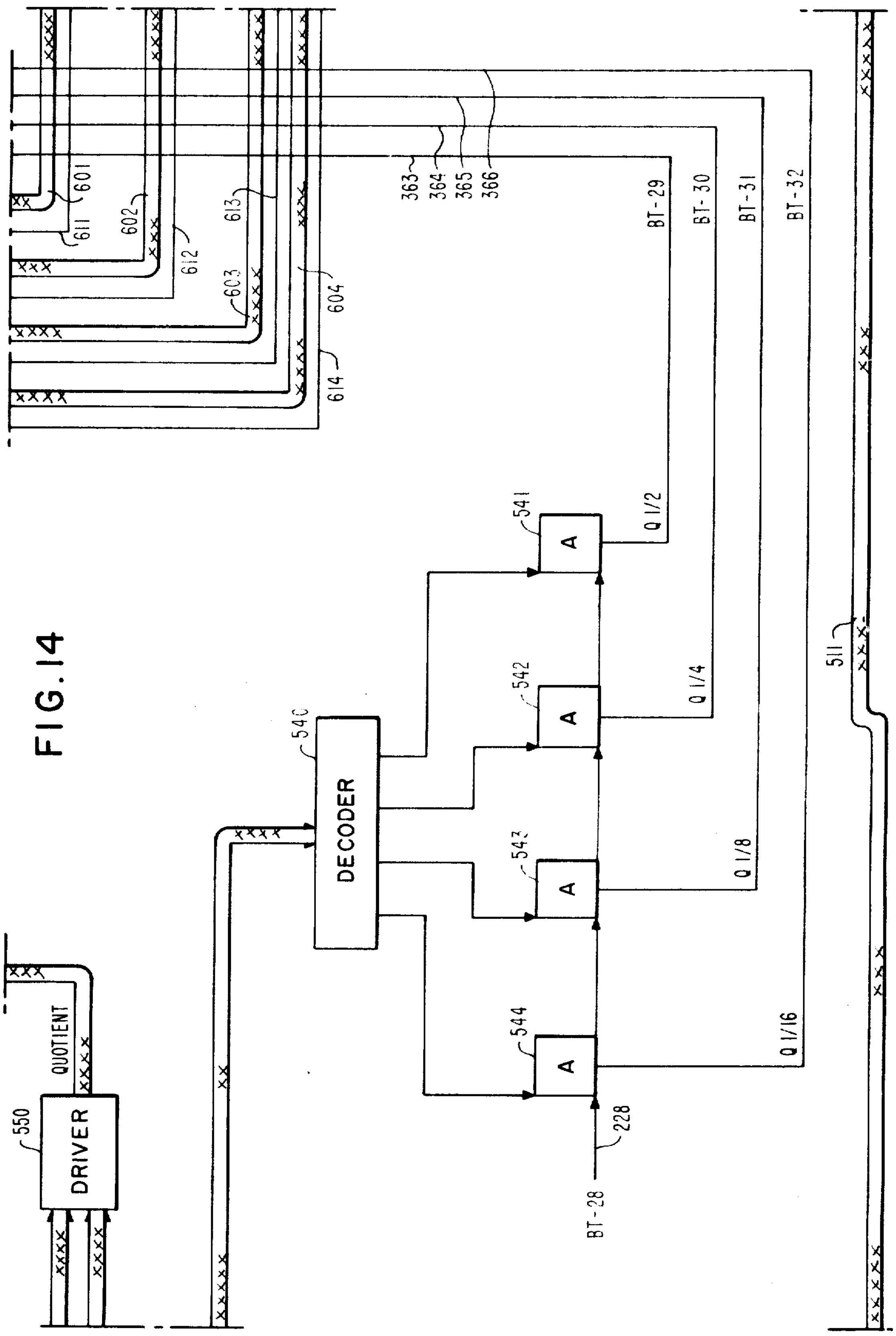
Figure 15:
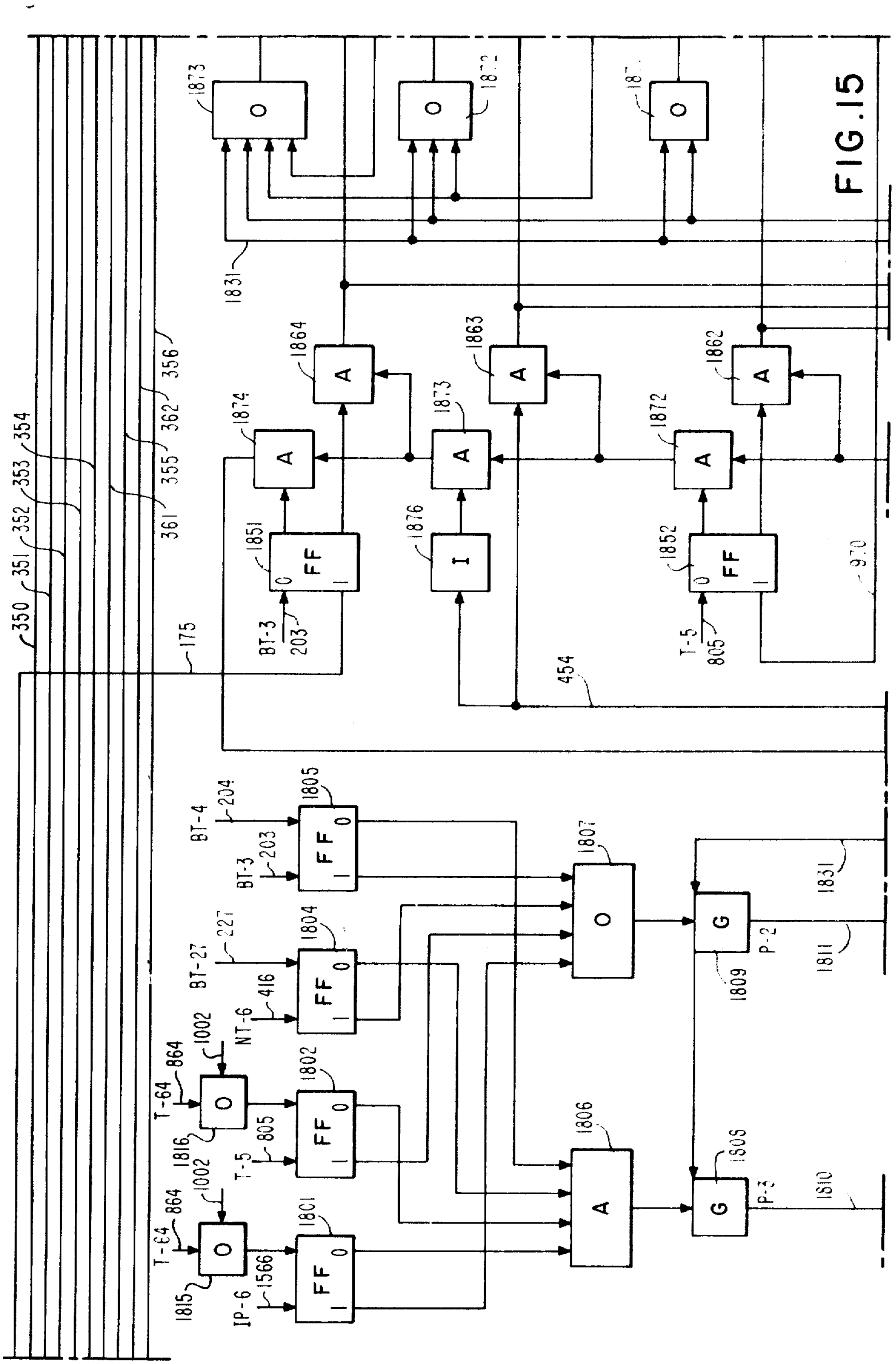

Reference is made next to FIGS. 15, 16, 19 and 20 for a description of a priority (P) clock and priority control circuits associated therewith for coordinating the operation of the various component parts of the system shown in FIGS. 4 through 51. Referring first to FIG. 15, flip-flops 1801 through 1805 have their zero outputs connected to an AND-circuit 1806 and their one outputs connected to an OR-circuit 1807, and the outputs of the AND-circuit 1806 and the OR-circuit 1807 are connected to respective gates 1808 and 1809. Signals from the gates 1808 and 1809 are supplied on respective output lines 1810 and 1811 to the P clock in FIG. 16. A priority (P) clock 1820 in FIGS. 16 and 20 includes single-shots 1821 through 1825. An OR-circuit 1826 is connected to the single-shot 1821. Positive signals are supplied from the single-shots 1821 through 1825 on respective lines 1831 through 1835. The P clock is started by a positive signal on a line 1836 which is supplied through the OR-circuit 1826 to the single-shot 1821. The P clock runs continuously thereafter.

Figure 16:
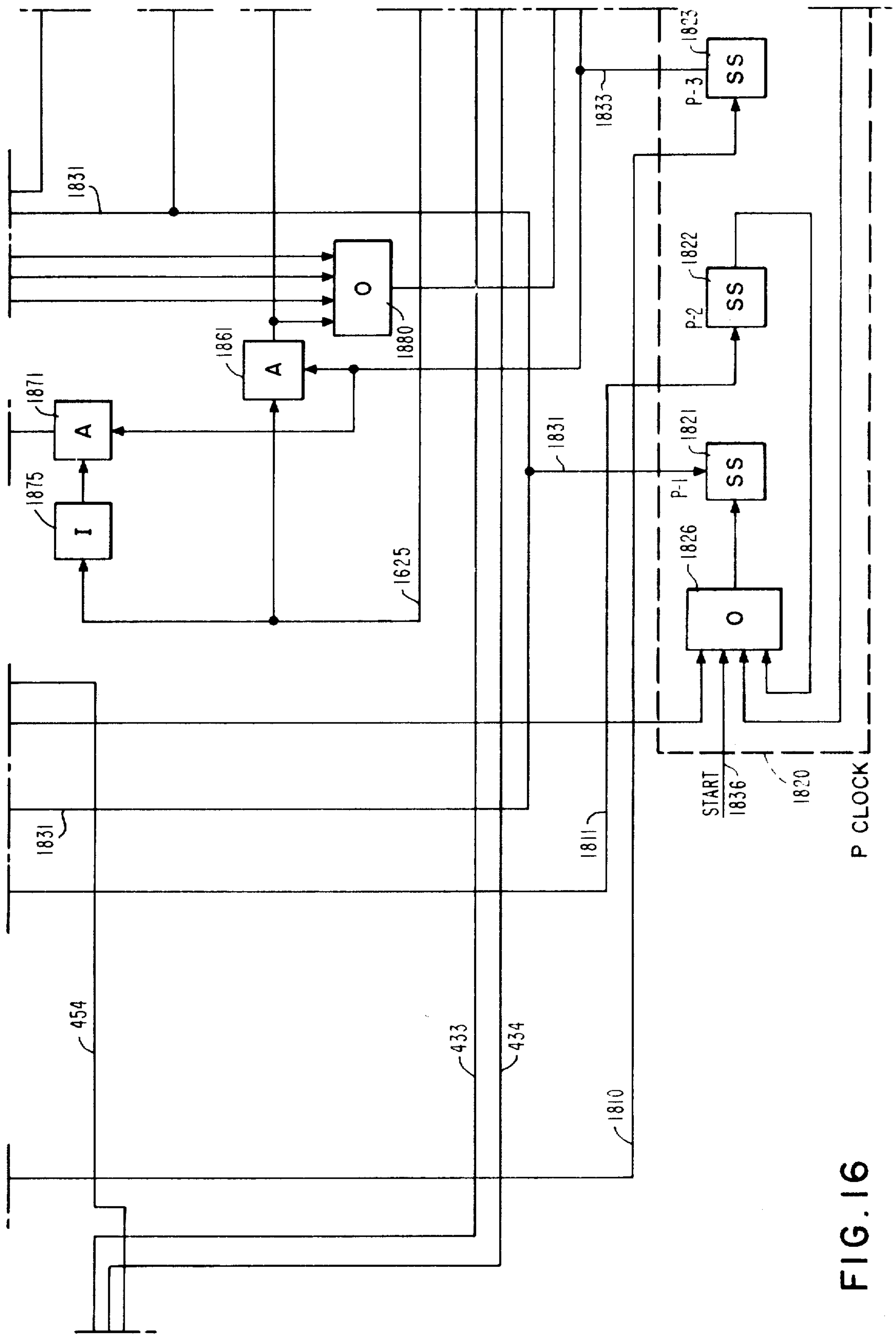

Flip-flops 1851 and 1852 are provided in FIG. 15. The signals on the line 1625 in FIG. 16, the one output of the flip-flop 1852 in FIG. 15, the line 454 in FIG. 15, and the one output of the flip-flop 1851 in FIG. 15 are connected to respective AND-circuits 1861 through 1864 in FIGS. 15 and 16. AND-circuits 1871 through 1874 in FIGS. 15 and 16 are provided. An inverter 1875 in FIG. 16 reverts signals received on the line 1625 and supplies them to the AND-circuit 1871. The AND-circuits 1872 and 1874 in FIG. 15 receives signals from the zero output sides of respective flip-flops 1852 and 1851. An inverter 1876 in FIG. 15 inverts signals on the line 454 and supplies them to the AND-circuit 1873. Output signals from the AND-circuits 1861 through 1864 in FIGS. 15 and 16 have their outputs connected through an OR-circuit 1880 in FIG. 16 to the single-shot 1824.

Figure 19:
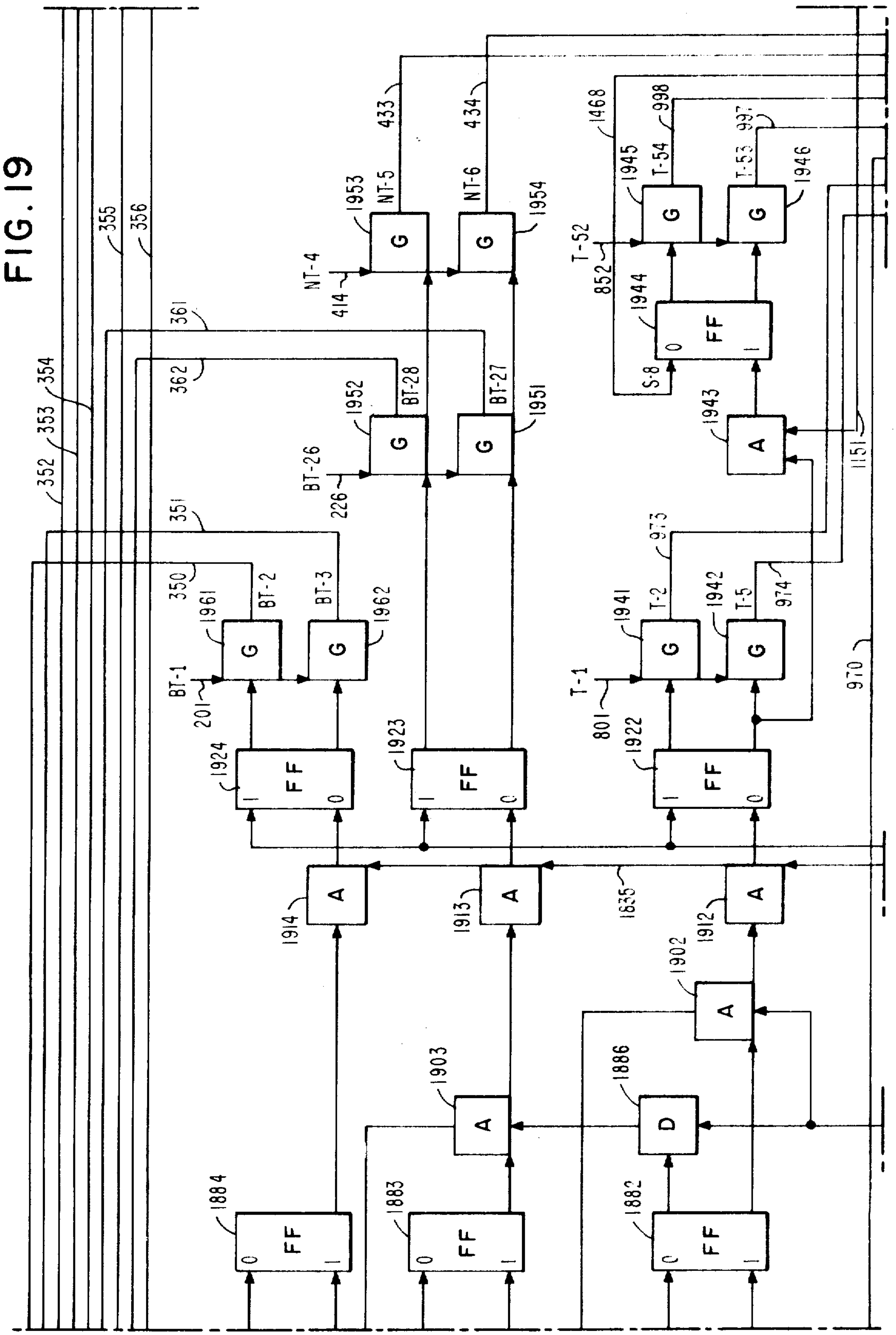
Figure 20:
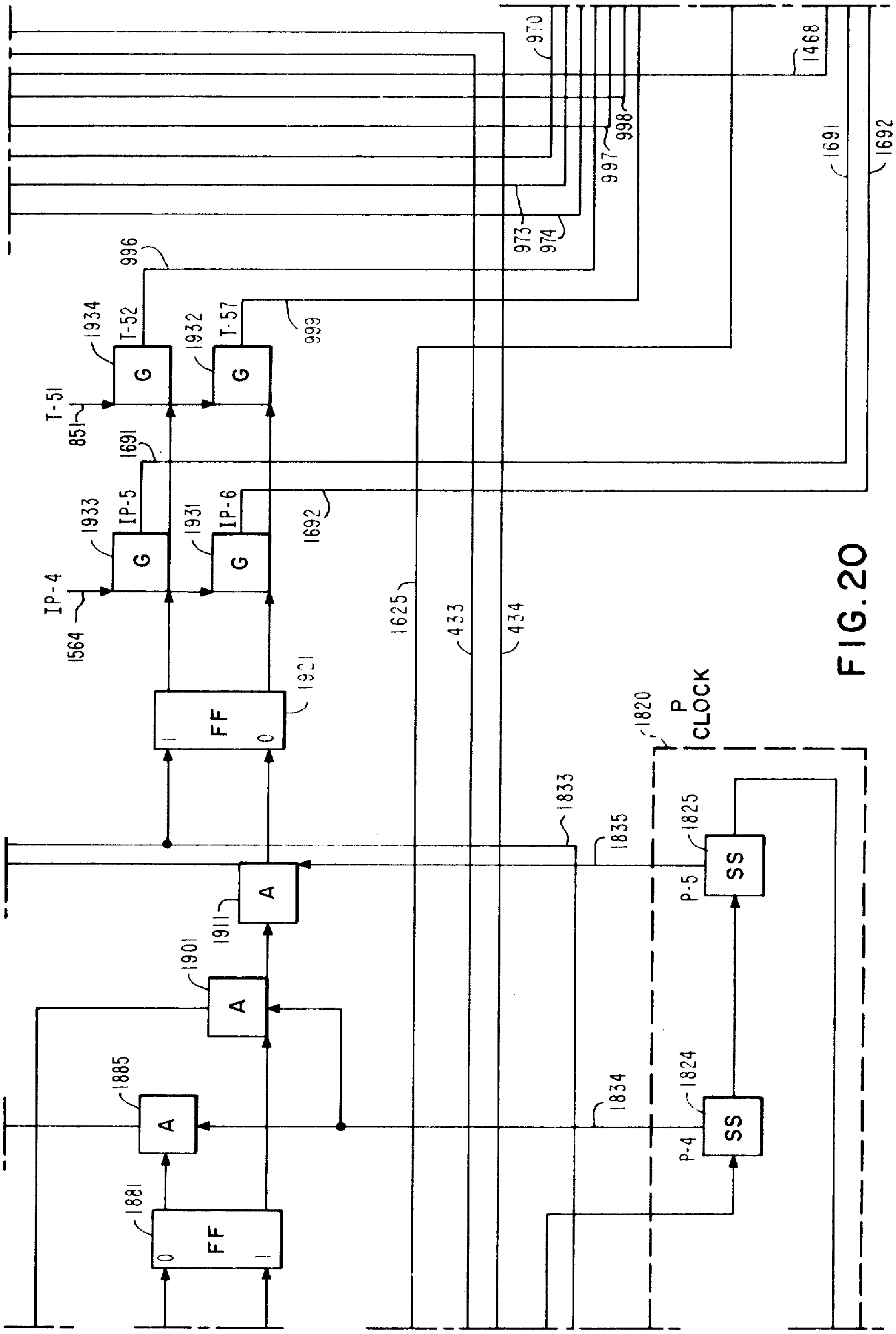

The AND-circuits 1861 through 1864 in FIGS. 15 and 16 are connected to the one input side of respective flip-flops 1881 through 1884 in FIGS. 19 and 20. AND-circuits 1885 and 1886 in FIGS. 19 and 20 are connected to the zero output side of respective flip-flops 1881 and 1882. The one output side of the flip-flops 1881 through 1883 in FIGS. 19 and 20 are connected to respective AND-circuits 1091 through 1903, and the one output side of the flip-flops 1881 through 1884 are connected to respective AND-circuits 911 through 914. The outputs of the AND-circuits 911 through 914 in FIGS. 19 and 20 are connected to the zero input side of respective flip-flops 1921 through 1924.

The zero output side of the flip-flop 1921 in FIG. 20 is supplied to gates 1931 and 1932, and the one output side of the flip-flop 1921 is connected to gates 1933 and 1934. The gates 1931 and 1933 respond to a positive signal on the line 1564 at IP–4 time, and they supply a positive pulse on the associated output lines 1691 and 1692, depending upon the state of the flip-flop 1921. The gates 1932 and 1934 respond to a positive pulse on the line 851 at T–51 time, and they provide a positive output signal on the associated lines 996 and 999, depending upon the state of the flip-flop 1921.

The flip-flop 1922 in FIG. 19 has its one and zero output sides connected to respective gates 1941 and 1942. The outputs of the gates 1941 and 1942 are connected to respective lines 973 and 974. The zero output of the flip-flop 1922 is connected also to an AND-circuit 1943 which in turn has its output connected to the one input side of a flip-flop 1944. The flip-flop 1944 has its zero and one output sides connected to respective gates 1945 and 1946. The output of the gates 1945 to 1946 are connected to respective lines 998 and 999. The gates 1945 and 1946 are sampled by a positive signal on the line 852 at T–52 time, and they pass a positive output signal on the lines 998 or 999, depending upon the state of the flip-flop 1944.

The flip-flop 1923 has its zero and one outputs connected to respective gates 1951 and 1952. These gates are sampled by a positive pulse on the line 226 at BT–26 time, and they provide a positive output signal on respective lines 361 and 362, depending upon the state of the flip 1923. The flip-flop 1923 has its one and zero outputs connected to respective gates 1953 and 1954. These gates are sampled by a positive pulse on the line 414 at NT–4 time, and they provide a positive output signal on respective lines 433 and 434, depending upon the state of the flip-flop 1923.

The flip-flop 1924 has its one and zero outputs connected to respective gates 1961 and 1962. These gates are sampled by a positive signal on the line 201 at BT–1 time, and they provide positive output signals on respective lines 350 and 351, depending upon the state of the flip-flop 1924.

Next, the operation of the priority selection and control circuits of FIGS. 15, 16, 19, and 20 is discussed. The P clock is started by a positive signal on the line 1836 in FIG. 16. This signal is passed by the OR-circuit 1826 to the single-shot 1821 which thereby supplies a positive signal on the line 1831 at P–1 time. This signal resets the flip-flops 1881 through 1884 in FIGS. 19 and 20, and it samples the gates 1808 and 1809 in FIG. 15. If any one of the flip-flops 1801 through 1805 is in the one state, signifying that an associated clock is busy, it supplies a positive signal through the OR-circuit 1807 to the gate 1809, and this gate passes the positive signal on the line 1831 along the line 1811 to operate the single-shot 1822 in FIG. 16. If all of the flip-flops 1801 through 1805 in FIG. 15 are in the zero state, signifying that all associated clocks are not busy, the AND-circuit 1806 supplies a positive signal to the gate 1808, and it passes the positive signal from the line 1831 to the line 1810 which thereby operates the single-shot 1823 in FIG. 16.

If the single-shot 1822 is operated, it serves as a delay device, and when it reverts to the stable state, a positive going signal on the output line 1832 passes through the OR-circuit 1826 to operate the single-shot 1821 to sample again the gates 1808 and 1809 in FIG. 15. This process is repeated until all of the flip-flops 1801 through 1805 are reset at which time the positive signal on the line 1831 passes through the gate 1808 and along the output line 1810 to the single-shot 1823. This single-shot supplies a positive output signal on the line 1833 to set the flip-flops 1921 through 1924, and the positive signal on the line 1833 is supplied to the AND-circuits 1861 and 1871 in FIG. 16. If the AND-circuits 1871 through 1874 are conditioned by positive signals, the positive signal on the line 1833 passes through each of these AND circuits in sequence, and a positive signal from the AND-circuit 1874 is returned through the OR-circuit 1826 to the single-shot 1821 to repeat the foregoing process. This indicates there is no request for service. If, however, one of the AND-circuits 1871 through 1874 is not conditioned with a positive signal, the positive pulse on the line 1833 is inhibited from passing through such AND circuit, and the associated one of the AND-circuits 1861 through 1864 passes a positive signal which sets the associated one of the flip-flops 1881 through 1884 in FIG. 19. A positive signal from any one of the AND-circuits 1861 through 1884 is returned through the OR-circuit 1880 to operate the single-shot 1824, and the single-shot 1824 supplies a positive pulse on the line 1834 to the AND-circuits 1885 and 1901. If the AND-circuit 1901 is conditioned by a positive signal from the one output side of the flip-flop 1881 in FIG. 20, it passes a positive output pulse through OR-circuits 1871 through 1873 which resets corresponding flip-flops 1882 through 1884. If, however, the flip-flop 1881 in FIG. 20 is in the zero state when the positive signal is received on the line 1834, the AND-circuit 1885 is conditioned to pass this positive signal to the AND-circuits 1886 and 1902. If the flip-flop 1882 is in the one state, the AND-circuit 1902 passes a positive signal through the OR-circuits 1872 and 1873 in FIG. 15 which resets the flip-flops 1883 and 1884 in FIG. 19. If, on the other hand, the flip-flop 1882 is in the zero state, the AND-circuit 1886 passes a positive signal to the AND-circuit 1903, and the AND-circuit 1903 passes a positive signal, if the flip-flop 1883 is in the one state, through the OR-circuit 1873 in FIG. 15 to reset the flip-flop 1884 in FIG. 19. It is pointed out that the foregoing sampling operation finds the first one of the flip-flops 1881 through 1884 which is in the one state and resets all succeeding flip-flops to the zero state. Thus, only one of the flip-flops 1881 through 1884 remains in the one state after the foregoing sampling operation.

The one of the flip-flops 1881 through 1884 in FIG. 19 which is in the one state supplies a positive signal to the corresponding one of the AND-circuits 1911 through 1914, and this AND-circuit responds to a positive signal on the line 1835 at P–5 time to pass a positive signal which resets the associated one of the flip-flops 1921 through 1924 in FIGS. 19 and 20. It is pointed out that a positive signal is generated on the line 1835 by the single-shot 1825 in response to a positive going signal developed by the single-shot 1824 when it reverts to the stable state. Upon termination of the positive signal on the line 1835 one, and only one, of the flip-flops 1921 through 1924 is in the zero state. In this connection it is pointed out that the positive signal on the line 1833 at P–3 time sets all of the flip-flops 1921 through 1924 to the one state, and the foregoing sampling operation resets a given one of these flip-flops. When the single-shot 1825 in FIG. 20 reverts to its stable state, a positive going signal is supplied back through the OR-circuit 1826 to operate the single-shot 1821, and its positive output signal resets the flip-flops 1881 through 1884 in FIG. 19 and samples the gates 1808 and 1809 in FIG. 15 to repeat the foregoing process. It is pointed out that the foregoing sampling technique gives first priority to positive signals on the line 1625 in FIG. 15, second priority to positive signals on the line 970, third priority to positive signals on the line 454, and fourth priority to positive signals on the line 175.

A positive signal appears on the line 1625 from the OR-circuit 1624 in FIG. 47 whenever anyone of the processors 10 through 12 in FIG. 1 is idle. The idle processor sets the associated one of the flip-flops 1601 through 1603 in FIG. 50 which in turn supplies a positive signal from its one output side through the OR-circuit 1624 in FIG. 47 to the line 1625. The positive signal on the line 1625 conditions the AND-circuit 1861. The P clock operates in the manner explained above to cause the flip-flop 1921 in FIG. 20 to reset. A positive pulse on the line 1564 at IP–4 time passes through the gate 1931 and along the line 1692 to the single-shot 1556 in FIG. 47, to generate an IP–6 pulse. This pulse sets the flip-flops 1801 in FIG. 15. The single-shot 1566 operates in the manner previously explained to insure that one, and only one, idle processor at a given time is given access to the encoder 1663 in FIG. 51. The identity of the selected idle processor is encoded by the encoder 1663 in FIG. 51. The identity of the selected idle processor is encoded by the encoder 1663 and supplied to the set of gates 1680 in FIG. 51. The gate 1932 in FIG. 19 passes a positive pulse from the line 851 at T–51 time to the output line 999, and this positive signal is supplied to the single-shot 957 in FIG. 40 to develop a positive signal on the output line 857 at T–57 time. The positive signal on the line 857 is supplied to the set of gates 1680 in FIG. 51 to pass signals from the encoder 1663 through the OR-circuit 1410 in FIG. 48 to the search counter 1411. The T–58 pulse is automatically generated when the T–57 pulse terminates, and the T–58 pulse is supplied on the line 858 through the OR-circuit 1490 in FIG. 51 to operate one of the AND-circuits 1886 through 1888 thereby to transfer a task word from the task hold-out register 1500 through the associated one of the sets of gates 1494 through 1496 to the selected idle processor. The T–58 pulse also passes through the OR-circuit 1386 in FIG. 48 to operate the set of gates 1382 thereby to transfer the Q value of the allocated task word to the selected register in the table 1385 pointed to by the counter 1411.

Returning again to FIG. 19, the flip-flop 1921 does not condition the gates 1933 and 1934 since it is in the zero state under the assumed conditions, Consequently, positive pulses are not supplied on the respective output lines 1691 and 996. Since the zero stage is assumed for the flip-flop 1921, the flip-flops 1922 through 1924 must be in their binary one state. Therefore, positive pulses are supplied (1) by the gate 1941 at T–1 time on the line 973 to initiate a T–2 pulse, (2) by the gate 1952 at BT–26 time on the line 362 to initiate a BT–28 pulse, (3) by the gate 1953 at NT–4 time on the line 433 to initiate an NT–5 pulse, and (4) by the gate 1961 at BT–1 time on the line 350 to initiate a BT–2 pulse.

When the line 970 in FIG. 15 is energized with a positive signal, it sets the flip-flop 1852. The flip-flop 1852 has second priority, as explained above, and it is set each time there is a T pulse on the line 970 requesting use of the T clock. The positive signal on the line 970 is supplied through the delay circuit 971 and the OR-circuit 972 to operate the single-shot 901 thereby to generate a positive signal on the line 801 at T–1 time. After the flip-flop 1852 in FIG. 15 is set, the P clock 1820 in FIGS. 16 and 20 progresses through its sequence, resulting in the resetting of the flip-flop 1922 in FIG. 19 and the setting of the flip-flops 1921, 1923 and 1924 as explained above provided there is a negative signal on the line 1625. Consequently, the flip-flop 1921 in FIG. 19 conditions the gates 1933 and 1934 to pass positive signals on the respective output lines 1691 and 996 are IP–4 time and T–51 time, respectively. The positive signal on the line 1691 serves as an enabling pulse to generate an IP–5 pulse, and the positive signal on the output line 996 serves as an enabling pulse for generating a T–52 pulse. The gate 1942 in FIG. 19 passes a positive pulse at T–1 time on the line 974 which serves as an enabling pulse for generating the T–5 pulse. The T–5 pulse sets the flip-flop 1802 in FIG. 15. The positive signal from the flip-flop 922 in FIG. 19 is supplied also the the AND-circuit 1943. When a positive signal is received on the line 1151, the AND-circuit 1943 passes a positive signal which sets the flip-flop 1944. In this event the gate 1946 then passes a positive pulse at T–52 time on the line 997 which serves as an enabling pulse to generate a T–53 pulse. The flip-flop 923 in FIG. 19 conditions the gates 1952 and 1953 to pass respective pulses BT–26 and NT–4 on corresponding output lines 362 and 433 which serve as enabling pulses to generate respective pulses BT 28 and NT-5. The flip-flop 1924 in FIG. 19 conditions the gate 1961 to pass a BT–1 pulse on the output line 350 which serves as an enabling pulse to generate a BT–2 pulse.

A positive signal on the line 454 in FIG. 15, representing the third priority case, is effective, under control of the P clock in FIGS. 16 and 20, to set the flip-flop 1883 and reset to the zero state the flip-flop 1923 provided there are negative signals on the lines 1625 and 970. When the flip-flop 1923 is in the zero state, the flip-flops 1921, 1922 and 1924 are in the one state. In this case the gates 1933 and 1934 pass positive signals which perform the function explained above. Likewise, the gates 1941 and 1961 in FIG. 19 pass positive signals to perform the function explained above. The flip-flop 1923 conditions the gates 1951 and 1954 to pass respective BT–26 and NT–4 pulses on corresponding lines 361 and 434 which serve as enabling pulses to generate the respective BT–27 and NT–6 pulses. The positive signal from the gate 1951 on the line 361 is applied to the single-shot 327 in FIG. 9 to generate a positive signal BR–27 on the line 227. When the single-shot 327 reverts to its stable state, a positive going signal on the line 384 is supplied to the OR-circuit 420 in FIG. 7 to initiate the cycle of the NT clock 400. The positive signal from the gate 1954 in FIG. 19 on the line 434 is supplied to the single-shot 406 in FIG. 8 thereby to generate a positive pulse NT–6 on the line 416. When the single-shot 406 reverts to its stable state, a positive going signal operates the single-shot 407. Operation of the single-shots 406 and 407 causes the transfer of a new task from one of the registers 490 through 492 in FIG. 8 through an associated one of the sets of gates 485 through 487 and the set of OR-circuits 512 in FIG. 11 to the calculate register 510. Thereafter the service ratio of the new task word is calculated, and the task word is assigned to the appropriate one of the tables 651 through 654.

A positive signal on the line 175 sets the flip-flop 1851 in FIG. 15. This represents the lowest, or fourth case, or priority. If positive signals are not present on the lines 1625, 970, or 454 in FIGS. 15 and 16, then the P clock 1820 in FIGS. 16 and 20 performs its cycle with results in the resetting of the flip-flop 1924 in FIG. 19 and the setting of the flip-flops 1921 through 1923 in FIGS. 19 and 20. The flip-flops 1921 through 1923 condition the associated gates 1933 and 1934 in FIG. 20, 1941 in FIG. 19, 1952 and 1953 in FIG. 19 to perform the functions explained above. The gate 1962 is condition by the flip-flop 1924 to pass a positive signal on the line 201 at BR–1 time on the output line 351 which operates the single shot 303 in FIG. 6 thereby to supply a positive signal BR–3 on the line 203. The positive signal on the line 203 is supplied to the one input side of the flip-flop 851 in FIG. 15, thereby setting this flip-flop. The BT–3 pulse samples the AND-circuits 140 through 143 and 160 through 163 thereby to initiate operation of the BT clock to perform recalculation of service ratios and assignment of proper Q storage under the scheduling algorithm.

As explained earlier on the flip-flop 1944 in FIG. 19 is set by a positive signal on the line 1151 and a positive signal from the zero output side of the flip-flop 1922. When set, this flip-flop conditions the gate 1946 to pass a positive pulse T–52 on the line 852 along the output line 997 to the single-shot 953 in FIG. 40. This single-shot supplies a positive signal T–53 on the line 843, and when the single-shot 953 reverts to the stable state, if supplies a positive signal through the OR-circuit 1000 in FIG. 36 to operate the single-shot 952. The single-shot 952 supplies a positive signal T–52 on the line 852 to the gates 1945 and 1946 in FIG. 19. The single-shot 953 serves as a delay device whereby T–52 pulses are repetitively generated. This repetitive generation of T–52 pulses continues until the flip-flop 1944 in FIG. 19 reset at which time the gate 1954 passes a positive T–52 pulse on the line 998 to the single-shot 954 in FIG. 40. This initiates the train of pulses T–54, T–55, and T–56. The positive T-54 pulse passes through the OR-circuit 1490 in FIG. 51 to gate the new task word in the task holdout register 1500 and an interrupt signal to a selected processor. The T–54 pulse is applied also to the OR-circuit 1386 in FIG. 48 to gate the content of the Q value hold register 1381 through the set of gates 1382 to the register in the table 1385 addressed by the decoder 1412. Also, the positive T–54 pulse on the line 854 sets the left most bit of the selected register in the table 1385 to the binary one state. This binary one bit causes the selected register not to be considered during the subsequent searches for the lowest Q value stored in the table 1385. The positive T–55 pulse decrements the processor counter 1590 in FIG. 47, and the positive T–56 pulse interrogates the processor counter to determine if all processors have been interrupted and allocated new task words.

The functions of the P clock and the associated control circuits in FIGS. 15, 16, 19, and 20 as explained above are summarized in Table 1 below with reference to the priority of the first through the fourth cases.

TABLE I

| Priority | Input Line | Function | Result |
|---|---|---|---|
| 1 | 1625 | Signal that a processor is idle | Assign new task word to idle processor |
| 2 | 970 | Requests T clock cycle | Perform allocation algorithm by interrupting each processor assigning new task words |
| 3 | 454 | Signals that new task word available | Accepts new task word, calculates its service ratio, and places it in proper Q table |
| 4 | 175 | Requests BT clock cycle | Perform scheduling al- algorithm of updating |

service ratios and assigning storage of selected Q table.

Next the operation of the program scheduler 15 in FIG. 1 is discussed, and the function of the component parts of the system in FIGS. 4 through 51 is described. The various clock provide microprograms, and each operates in the manner pointed out above to perform a given function. The program scheduler 15 in FIG. 1 performs two basic functions. One is the processor allocation function which controls the assignment of tasks to the various processors, and the other is the scheduling function which is concerned with assigning incoming tasks to the proper table and the periodic updating of each stored task word. It is pointed out that machine time for the total system is quantized, the quantium being time slots. Pulses on the line 970 in FIG. 35 define time slots. Processor time is also quantized, the quantum being time slices per time slot. If there are P processors, then there are P time slices per time slot. The requested service ratio associated with each task entering the program scheduler 15 is the ratio of estimated processor time to complete a task to the desired completion time as pointed out hereinbefore. That is, the ratio in essence is the total number of time slices required to complete processing of a given task to the number of time slots remaining until such task must be completed.

The program scheduler 15 contains tables 651 through 654 in respective FIGS. 46, 38, 30, and 22. Each table stores a list of task words which are pointers to the tasks that are potential candidates for scheduling. Task words are assigned to the tables on the basis of their service ratios. The task words in each table constitute a different service class. From this standpoint the service ratio defines the frequency at which the scheduling algorithm considers tasks in the corresponding service class. More specifically, it is the ratio of the number of times the tasks of a table are considered for scheduling to the number of time slots during which these considerations are made. If the service ratio of a service class is ⅛, for example, then task words in that class are considered by the scheduling algorithm at least once every eight time slots. The microprogram which controls the servicing of the task words in the various tables 651 through 654 is the BT clock. The BT clock is operated by BT pulses on the line 175 in FIG. 4, and these pulses define the basis frequency of the scheduling algorithm. It is pointed out that the frequency of the BT clock may be equal to, less than or greater than that of the T clock.

When a task enters the program scheduler 15, the requested service ratio is used as an input to assign the task to a given one of the tables 651 through 654. If this service ratio is equal to or less than 1/16, the task word is placed in a table referred to as Q 1/16 which is the table 651 in FIG. 46. If the service ratio is greater than 1/16 but equal to or less than ⅛, the task is put in a table referred to as Q ⅛ which is the table 651 in FIG. 38. If the service ratio is greater than ⅛ but equal to or less than ¼, the task word is stored in a table referred to as Q ¼ which is the table 653 in FIG. 30. If service ratio is greater than ¼, the task is disposed in the table Q ½ which is the table 654 in FIG. 22. It is pointed out that additional tables may be used, or different service frequencies assigned, but only four are shown in the interest of simplicity.

Service classes or tables with higher service ratios are provided a higher service frequency under both the scheduling algorithm and the allocation algorithm than service classes or tables with lower service ratios. All tasks in service classes with lower service ratios are provided a lower service frequency under both algorithms. All tasks words in a higher service class may not receive service during a time slot under the allocations algorithm if the list or number of tasks in that class exceeds the number of processors in the system. Those task words not receiving service under the allocation algorithm during one time slot receive service before task words in lower service classes, ideally speaking, and their ideal is approached by weighting the service frequencies in favor of the tables with higher service ratios.

To this end consideration of task words in a service class is guaranteed according to its service ratio. Consideration does not imply that tasks will actually be activated for scheduling or allocation. The guarantee is that the scheduling and allocation algorithms will look at the Q table corresponding to the class to which a time slot is assigned. This look will include allocation to the extent possible or scheduling by recalculation of the service ratios of the task words in that class to reflect elapsed time. Recalculation may cause tasks to be moved to other service classes, either higher or lower as the case may be. The desired objective of the recalculation is that task words receiving more service than requested are moved to lower service classes; whereas, task words receiving less service than requested are moved to service classes which have a higher service frequency.

One of the important aspects of the scheduling algorithm is its relationship to the storage allocation which stores task words by its service ratio in tables having different service frequencies. The scheduling algorithm schedules task words that have been received. In effect, the scheduling algorithm can be made to look endlessly for task words. Allocation of task words is an asynchronous process. When allocated, a task will be worked on for a time slot or larger, returned if not completed, and picked up by the scheduling algorithm.

An important aspect of the scheduling algorithm is its predictive quality. With a knowledge of which classes are to be scheduled in the next 1,2, or *n* time slots, storage required by tasks can be allocated in anticipation of a processor being allocated. That is, the scheduling algorithm can be executed in parallel with the storage allocation algorithm, actually acting as a look ahead for it. The scheduling algorithm is implemented by the micro program of the BT clock with the frequency of the pulses on the line 175 in FIG. 4 defining the basic time slot for this purpose, and the allocation algorithm is implemented by the microprogram of the T clock with the frequency of the pulses on the line 970 in FIG. 35 defining the basic time slot for this purpose. The flow of task words into, through, and out of the program scheduler 15 is discussed next commencing first with the scheduling algorithm and later the allocation algorithm.

Since the scheduling algorithm is implemented by the microprogram of the BT clock, it is appropriate at this point to examine in more detail the operations performed by the BT clock. The BT clock in FIGS. 6, 9, and 12 provides positive pulses BT1 through BT32 on respective lines 201 through 232. These are positive pulses which perform the functions outlines below.

The BT1 pulse is initiated each time a BT pulse appears on the line 175. The BT pulse passes through the delay circuit 340 and the OR-circuit 341 to operate the single-shot 301. The BT pulse on the line 175 sets the flip-flop 1851 in FIG. 15. After a delay determined by the delay circuit 340 in FIG. 6, a positive BT1 pulse samples the state of the flip-flop 1924 in FIG. 19. If this flip-flop is in the one state, a positive pulse is supplied from the gate 1961 on the line 350 which enables the single-shot 302 in FIG. 6 to generate a BT2 pulse. The BT2 pulse is not used, and when the single-shot 302 reverts to its stable state, the positive signal is supplied through the OR-circuit 341 to enable the single-shot 301 again. It is seen, therefore, that the single-shot 302 serves as a delay device which reenables the single-shot 302 in FIG. 6 whereby BT1 pulses are repetitively generated until the flip-flop 1924 in FIG. 19 is set to the zero state. In this event a BT1 pulse is passed by the gate 1962 on the line 351 to enable the single-shot 303 in FIG. 6 thereby to generate a BT–3 pulse.

A BT–3 pulse resets the flip-flop 1851 in FIG. 15, sets the flip-flop 1805 in FIG. 15, and samples the AND-circuits 140 and 160 in FIG. 5. If all of the AND-circuits 160 through 163 are conditioned, the positive BT–3 pulse returns on the line 174 through the OR-circuit 342 to enable the single-shot 304 thereby to generate a BT–4 pulse.

A positive BT-4 pulse resets the flip flop 1805 in FIG. 15 thereby to turn off the BT clock. This conditions arises when the mask register 120 in FIG. 4 is set to all zeros to indicate that no tasks words are stored in the tables 451 through 454, and operations under the scheduling algorithm are not required. The negative signals from the one output sides of the flip-flops 121 through 124 of the mask register 120 in FIG. 4 decondition the associated AND-circuits 130 through 134, and the associated inverters 150 through 153 condition the associated AND-circuits 160 through 163 to pass the positive BT-3 pulse on the line 174 through the OR-circuit 342 to the single-shot 304 on FIG. 6, thereby to generate a BT-4 pulse which terminates any further operation of the BT clock. If, however, the BT-3 pulse passes through one of the AND-circuits 140 through 143 in FIG. 5, then the BT clock continues.

The BT-5 pulse is supplied to the gate 699 in FIG. 18, and this transfers the content of the in counter 670 to the hold register 700 and through respective OR-circuits 703, 707, and 708 to respective boundary counters 704, 705, and 706.

Figure 21:
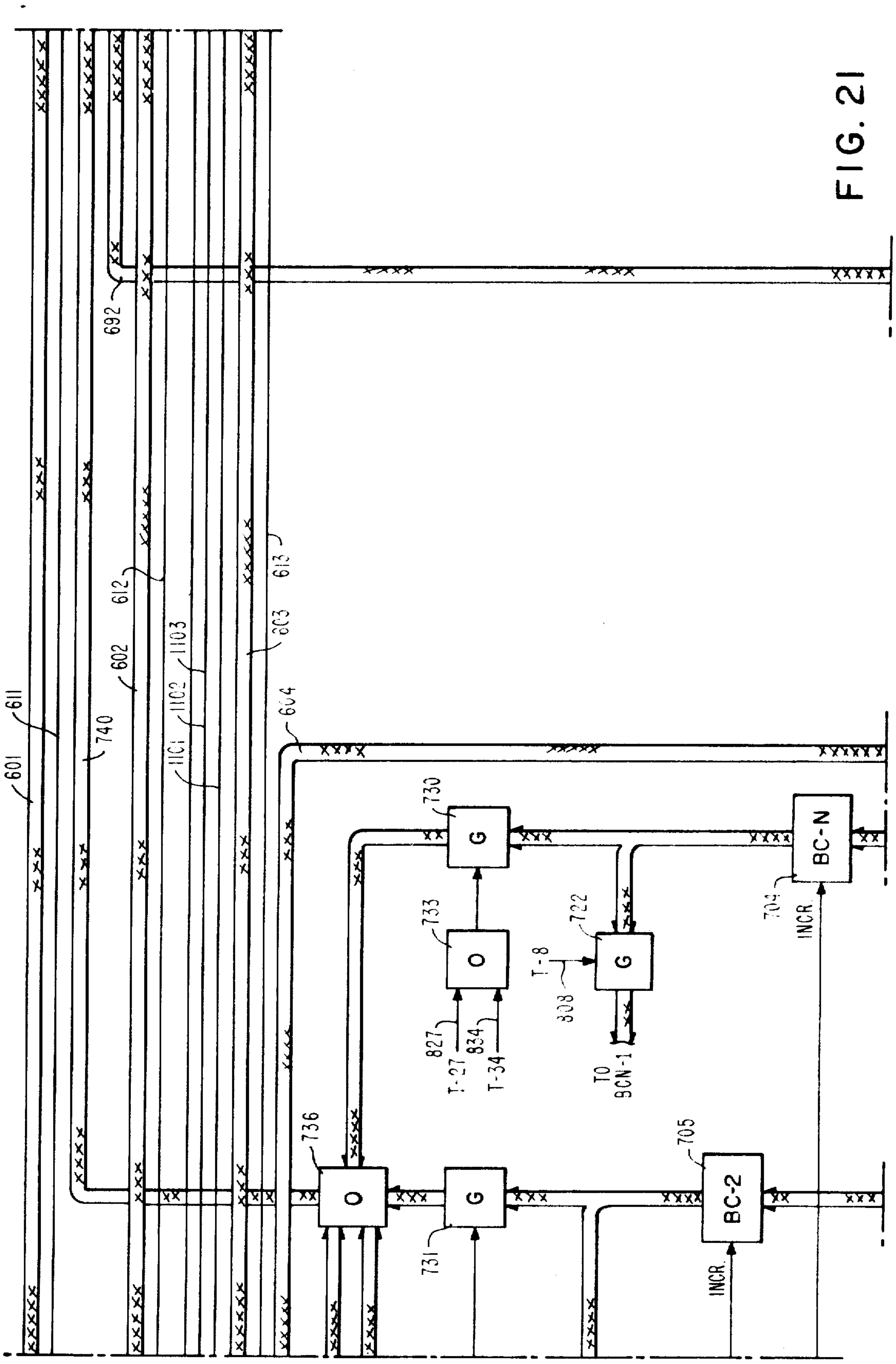

The BT-6 pulse is applied to the set of gates 741 in FIG. 18 to transfer the content of the hold register 700 through the set of OR-circuits 736 in FIG. 21 along the cable 740 through the set of OR-circuits 1021 in FIG. 24 to the comparator 1020. The BT-6 pulse is supplied also through the OR-circuit 693 in FIG. 22 to the gates 691, and this transfers the content of the out counter 680 along the cable 692 through the OR-circuit 1022 in FIG. 24 to the comparator 1020. The BT-6 pulse is supplied also to the delay circuit 1221 in FIG. 32. As soon as the comparator 1020 determines the two input quantities are equal or not equal, it supplies a positive signal on the appropriate one of the output lines 1025 or 1026. Subsequently the delay circuit 1221 in FIG. 32 supplies a positive pulse from its output which is applied to the gates 1201 and 1211. If the two input quantities to the comparator 1020 are equal, a positive signal on the line 1025 conditions the gate 1201 to pass a signal through the OR-circuit 1225 on the line 352 through the OR-circuit 302 in FIG. 6 to the single-shot 304, thereby to generate a BT-4 pulse. The BT-4 pulse stops the BT clock as explained above. In this case the content of the hold register 700 in FIG. 18 equals the content of the out counter 680, and this signifies that there are no available task words in the selected table 654. If task words are available in the table 654, the content of the hold register 700 in FIG. 18 and the content of the out counter 680 in FIG. 22 are not equal, and the comparator 1020 in FIG. 24 supplies a positive signal on the line 1026 to signify this condition. The positive signal on the line 1026 conditions the gate 1211 to pass the positive signal from the delay circuit 1221 on the output line 353 to the single-shot 307 in FIG. 9 thereby to generate a BT-7 pulse.

The BT-7 pulse is applied to the set of gates 687 in FIG. 22 to gate the task word specified by the out counter 680 from the table 654 along the cable 511 through the OR-circuit 512 in FIG. 11 to the calculate register 510. The BT-7 pulse is supplied also to the set of gates 530 in FIG. 11 to gate the content on the register 520, holding the Q value ½ through the OR-circuit 534 to the calculate register 510. The task word transferred to the calculate register 510 is stored in the upper portion, and the Q value of the table from which the task word was obtained is stored in the lower portion of the calculate register, as indicated by the brackets in FIG. 11. When the BT-7 pulse terminates, the single-shot 307 in FIG. 9 reverts to its stable state and supplies a positive signal through the OR-circuit 383 in FIG. 12 which in turn supplies a positive signal through the OR-circuit 347 in FIG. 12 to the single-shot 317 thereby to generate a BT-17 pulse. A BT-17 pulse is used in the process of recalculating the service ratio, but the functions performed by the pulses BT-8 through BT-16 are discussed before this process is described.

The pulses BT-18 through the BT-10 perform in connection with the table 653 the same functions performed by the pulses BT-5 through BT-7 in connection with the table 654. That is, the pulse BT-8 is applied to the set of gates 699a in FIG. 26 to transfer the content of the in counter 670a to the hold register 700a and through the OR-circuits 703a, 707a and 708a to respective boundary counters 704a through 706a. The BT-9 pulse transfers the content of the hold register 700a in FIG. 26 through the set of OR-circuits 736a in FIG. 29 along the cable 740a through the set of OR-circuits 1021 in FIG. 24 to the comparator 1020. The BT-9 pulse is supplied also through the OR-circuit 693a in FIG. 30 to the set of gates 691a, and this transfers the content of the Out counter 680a along the cable 692a through the set of OR-circuits 1022 in FIG. 24 to the comparator 1020. The BT-9 pulse is supplied also to the delay circuit 1222 in FIG 32. The delayed output of the delay circuit 1222 is supplied to the gates 1202 and 121. If the content of the hold register 700a is equal to the content of the out counter 680a, no task word is available in the table 653 in FIG, 30, and the comparator 1020 in FIG. 24 supplies a positive signal on the line 1025 which conditions the gate 1202 in FIG. 32 to pass a positive signal through the OR-circuit 1225 along the line 352 through the OR-circuit 342 in FIG. 6 to enable the single-shot 304 thereby to generate a BT-4 pulse which terminates the operation of the BT clock as earlier explained. If the comparator 1020 in FIG. 24 provides a positive signal on the line 1026, signifying a task word is available in the table 653 in FIG. 30, then the gate 1212 in FIG. 32 is conditioned to pass the delayed BT-9 pulse on the line 354 to the single-shot 310 in FIG. 9 thereby to generate a positive BT-10 pulse.

Figure 30:
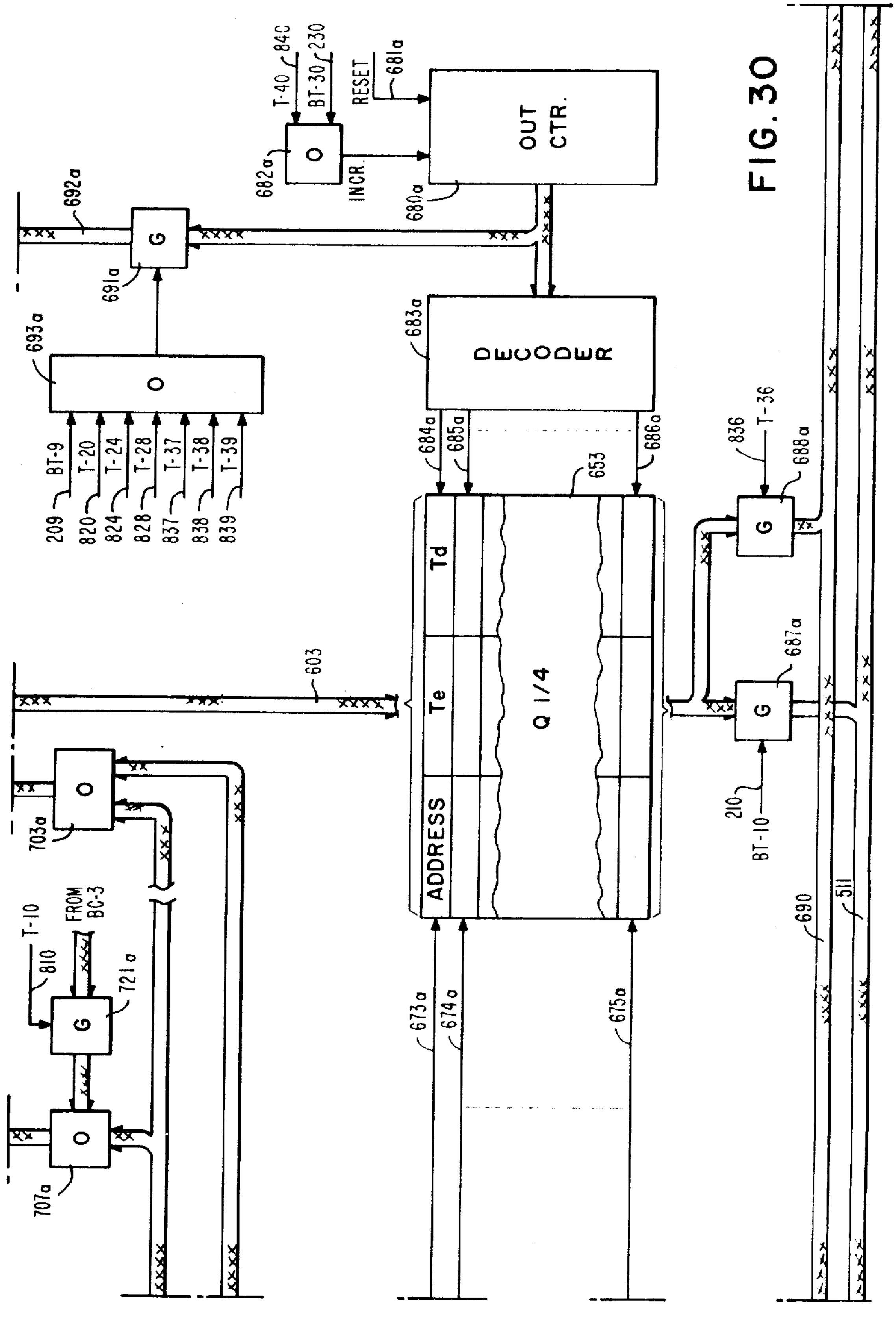

The BT-10 pulse is supplied to the set of gates 687a in FIG. 30 to transfer the task word specified by the out counter 680 along the cable 511 through the OR-circuit 512 in FIG. 11 to the calculate register 510. The BT-10 pulse is supplied to the set of gates 531 in FIG. 11 to transfer the content of the register 521, representing the Q value ½, through the OR-circuit 534 to the calculate register 510. The Q value in the lower portion of the calculate register specifies the table from which the task word in the upper portion of the calculate register was obtained. When the BT-10 pulse terminates, the single-shot 310 in FIG. 9 reverts to its stable state and supplies a positive going signal through the OR-circuit 383 to the OR-circuit 347 which in turn provides a positive output signal which operates the single-shot 317 to generate a BT-17 pulse.

Figure 38:
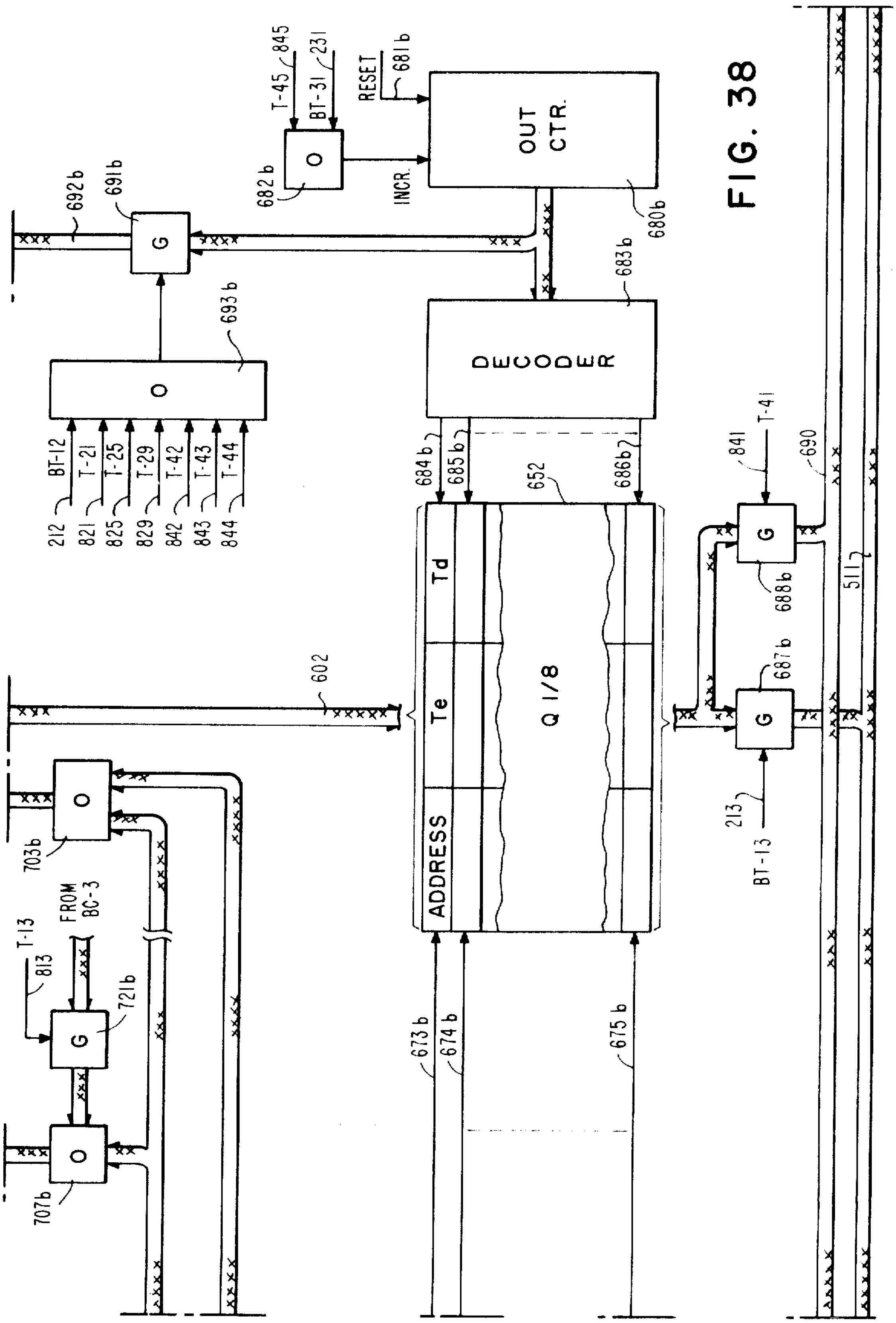

The pulses BT-11 through BT-13 operate in connection with the table 652 in FIG. 38 to obtain a task word, if available, specified by the out counter 680b and place it in the calculate register 510 in FIG. 11. If a task word is not available in the table 652, the operation of the BT clock is terminated by generating a BT-4 pulse.

The BT-11 pulse is applied to the set of gates 698b to transfer the content of the in counter 670b to the hold register 700b and through the OR-circuits 703b, 707b, and 708b to respective boundary counters 704b through 706b.

Figure 34:
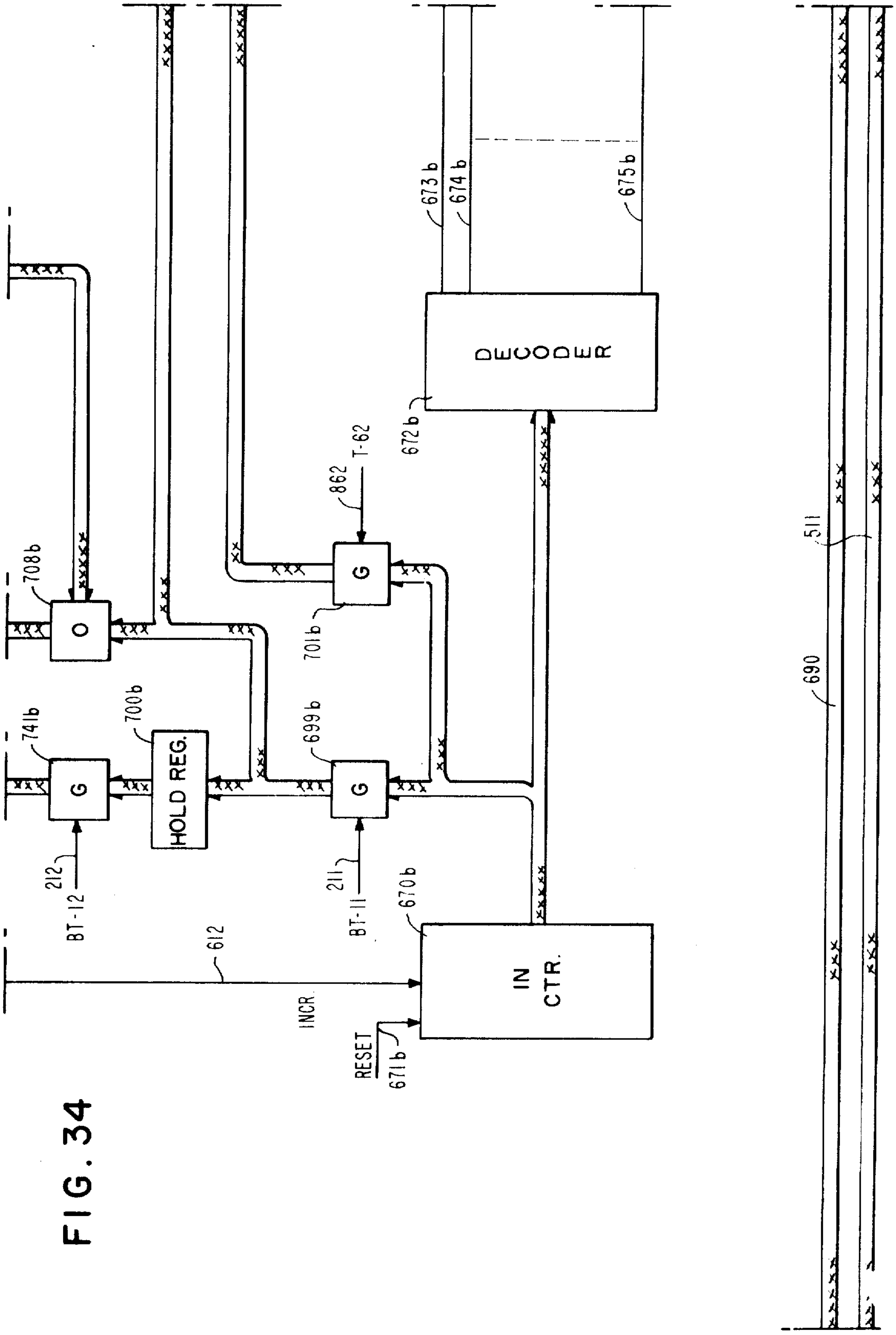
Figure 37:
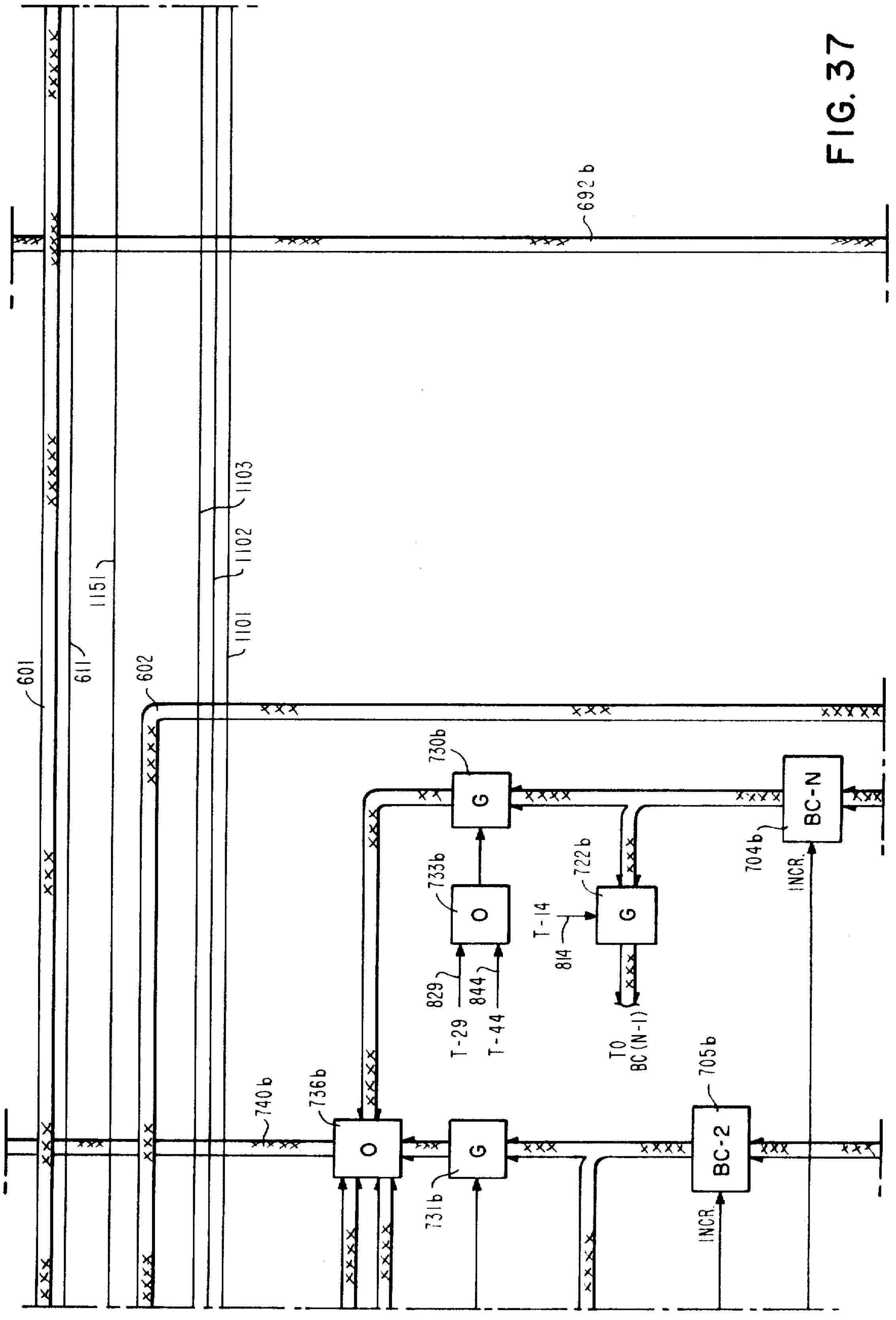

The BT-12 pulse is applied to the set of gates 741b in FIG. 34 to gate the content of the hold register 700b through the set of OR-circuits 736b in FIG. 37 on the cable 740b through the OR-circuit 1020 in FIG. 24 to the comparator 1020. The BT-12 pulse is supplied also through the OR-circuit 693b in FIG. 38 to the set of gates 691b, and this transfers the content of the out counter 680b in FIG. 38 along the cable 692b through the set of OR-circuits 1022 in FIG. 24 to the comparator 1020. The BT-12 pulse is supplied also through a delay circuit 1223 in FIG. 32 to the gates 1203 and 1213. If there is no word available in the table 682, the comparator supplies a positive signal on the output line 1025 to condition the gate 1203 to pass the delayed BT-12 pulse through the OR-circuit 1225 on the line 352 through the OR-circuit 342 in FIG. 6 to enable the single-shot 304 thereby to generate a BT-4 pulse which terminates the operation of the BT clock as earlier explained. If the comparator 1020 in FIG. 24 supplies a positive signal on the line 1026, indicating a task word is available in the table 652, the gate 1213 in FIG. 32 is conditioned to pass the delayed BT-12 pulse on the line 355 to the single-shot 313 in FIG. 12 thereby to generate a BT-13 pulse.

The BT-13 pulse is applied to the set of gates 687b in FIG. 38 to transfer the task word pointed to by the out counter 680 from the table 652 on the cable 511 through the OR-circuit 512 in FIG. 11 to the calculate register 510. The BT-13 pulse is supplied also to the set of gates 532 to transfer the content of the register 522, holding the Q value ⅛, through the OR-circuit 534 to the lower portion of the calculate register 510. The Q value is the lower portion of the calculate register indicates the table from which the task word in the upper portion was obtained.

Figure 46:
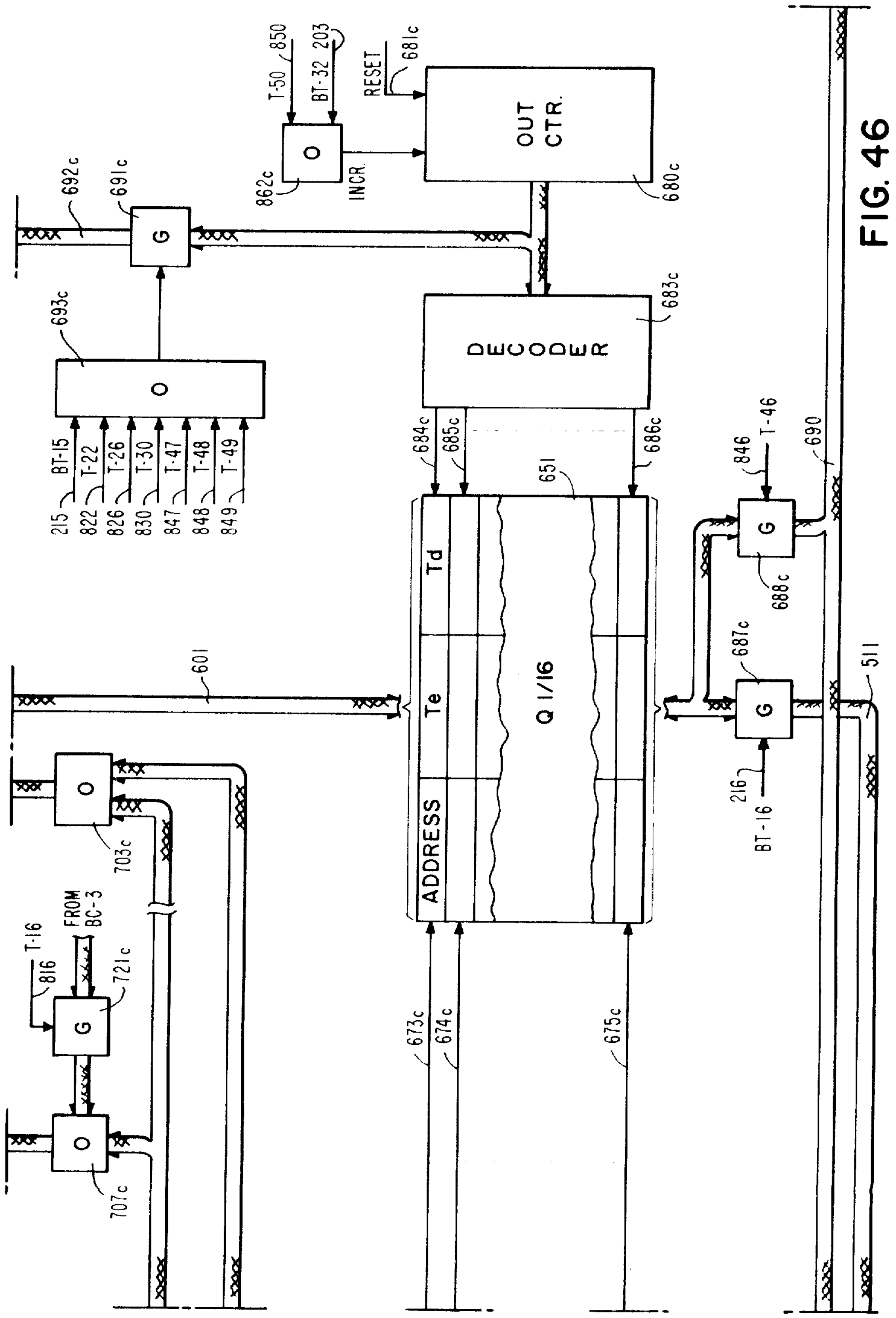

The pulses BT-14 through BT-16 operate in connection with the table 651 in FIG. 46 to transfer an available task word to the calculate register or terminate the operation of the BT clock if a task word is not available.

Figure 42:
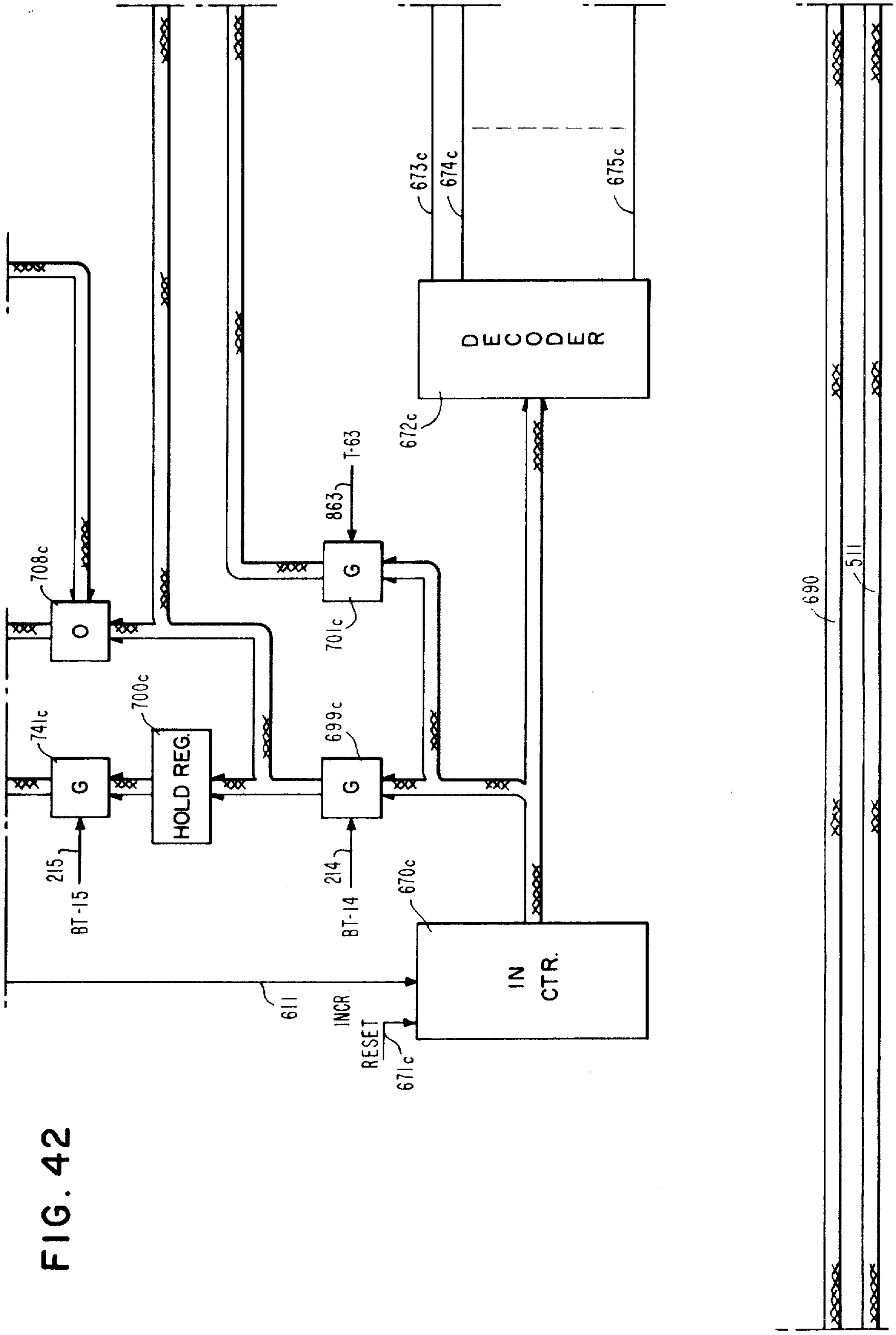

The BT-14 pulse is applied to a set of gates 699c in FIG. 42 to transfer the content of the in counter 670c to the hold register 700c and through OR-circuit 703c, 707c and 708c to the respective boundary counters 704c through 706c.

Figure 45:
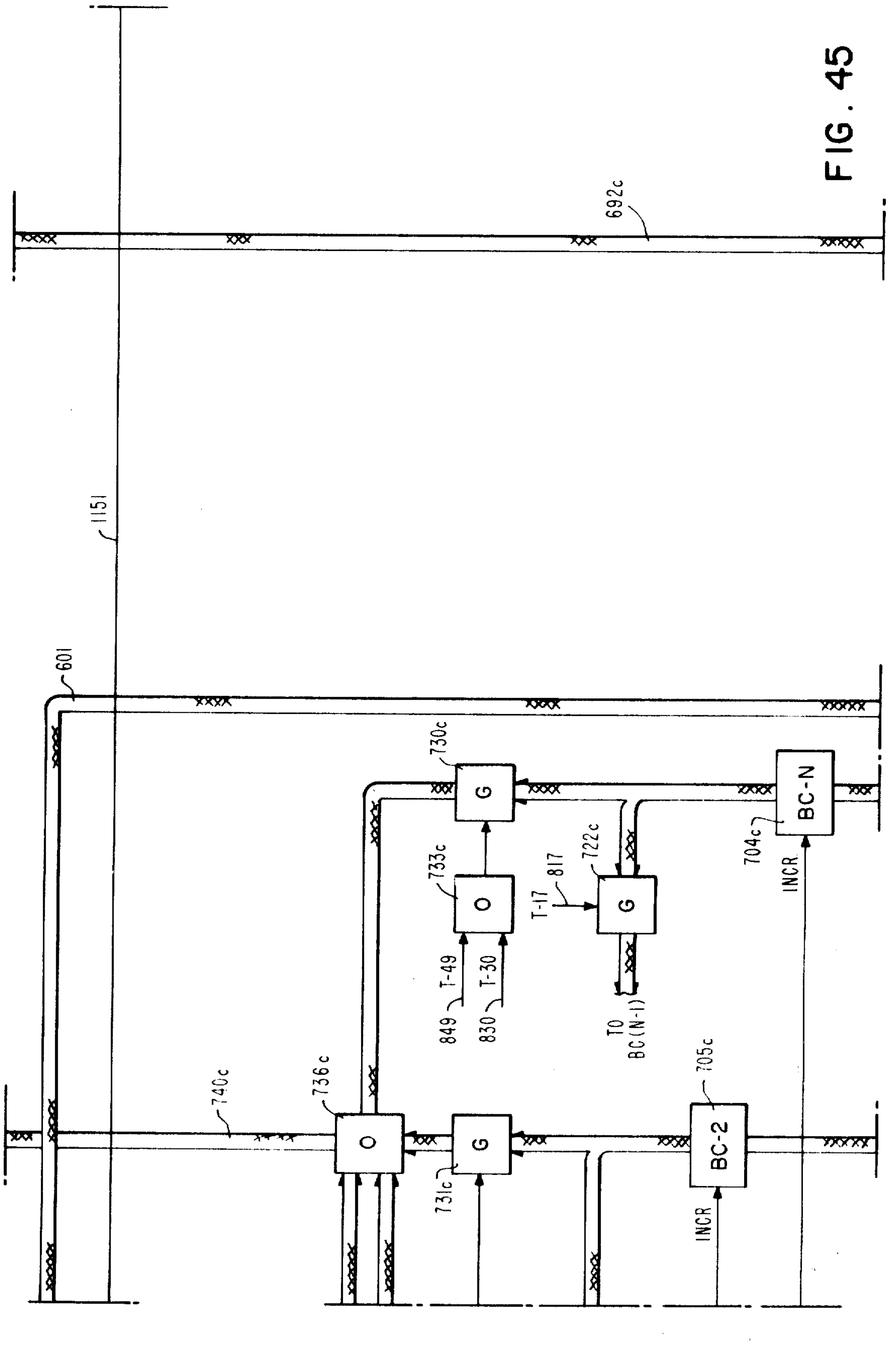

The BT-15 pulse is supplied to the set of gates 741c to transfer the content of the hold register 700c in FIG. 42 through the set of OR-circuits 736c in FIG. 45 on the cable 740c through the set of OR-circuits 1021 in FIG. 24 to the comparator 1020. The BT-15 pulse is supplied also through the OR-circuit 693c in FIG. 46 to the set of gates 691c to transfer the content of the out counter 680c along the cable 692c through the set of OR-circuits 1022 in FIG. 24 to the comparator 1020. The BT-15 pulse is supplied also through a delay circuit 1224 in FIG. 32 to the gates 1204 and 1214. If there is no task word available in the table 651 in FIG. 46, the comparator 1020 in FIG. 24 signifies this by supplying a positive signal on the line 1025 which conditions the gate 1204 to pass the delayed BT-15 pulse through the OR-circuit 1225 on the output line 352 through the OR-circuit 342 in FIG. 6 to the single-shot 304 thereby to generate a BT-4 pulse which terminates the operation of the BT clock. If a task word is available in the table 651 in FIG. 46, the comparator 1020 in FIG. 24 signifies this by supplying a positive signal on the output line 1026 which conditions the gate 1214 in FIG. 32 to pass the delayed BT-15 pulse on the line 356 to the single-shot 316 in FIG. 12 thereby to generate a BT-16 pulse.

The BT-16 pulse is supplied to a set of gates 687c in FIG. 46 to transfer a task word specified by the out counter 680c on the cable 511 through the OR-circuit 512 to the calculate register 510 in FIG. 11. The BT-16 pulse is supplied also to a set of gates 533 to transfer the content of the register 523, representing the Q value 1/16, through the OR-circuit 534 to the lower portion of the calculate register 510. The Q value in the lower portion of the calculate register indicates the table from which the task word in the upper portion was taken. When the BT-16 pulse terminates, the single-shot 316 in FIG. 12 reverts to its stable state and supplies a positive going signal through the OR-circuit 347 to the single-shot 317 thereby to generate a BT-17 pulse. It should be pointed out that a BT-17 pulse is generated upon the termination of a BT-7 pulse, a BT-10 pulse, a BT-13 pulse, or a BT-16 pulse. In this connection note that the single-shots 307 and 310 in FIG. 9 and the single-shot 313 in FIG. 12 are connected through the OR-circuit 383 to the OR-circuit 347 which in turn is connected to the single shot 317. Also, the single-shot 316 in FIG. 12 is connected through the OR-circuit 347 to the single-shot 317. When any one of the single-shots 307 or 310 in FIG. 9 or the single-shots 313 or 316 in FIG. 12 are operated, this indicates that a task word is available in a respective one of the tables Q 1/2, Q 1/4, Q 1/8, or Q 1/16, and a BT-17 pulse must be generated to perform a recalculation of the service ratio. This recalculation is explained next.

The BT-17 pulse is supplied through the OR-circuit 1374 in FIG. 48 to the set of gates 1369 thereby to transfer the content of the register 1354, representing the Q value 1/16, through the OR-circuit 1380 to the queque value hold register 1381. The content of the Q value hold register 1381 is supplied on the cable 552 to the decoder 570 in FIG. 10, and the decoder provides a positive signal on that one of its output lines connected to the AND-circuits 571 and 781. The content of the Q value hold register 1381 in FIG. 48 is supplied on the cable 552 to the comparator 551 in FIG. 13. The task word in the calculate register 510 in FIG. 11 supplies signals from the $T_e$ field to the divider 550 in FIG. 14, and the calculate register 510 in FIG. 11 supplies signals from the $T_d$ field to the divider 550 in FIG. 14. The division of the $T_e$ field by the $T_d$ field in the divider 550 provides a quotient which represents the recalculate service ratio. This quotient is supplied to the comparator 551 in FIG. 13. If the quotient is equal to or less than the Q value in the Q value hold register 1381 in FIG. 48, then the comparator 551 supplies a positive signal on the line 554 to the AND-circuit 563 through 565. A positive signal on the line 554 signifies that the task word in the calculate register 510 should be stored in the table whose Q value is specified by the Q value hold register 381 in FIG. 48. Upon termination of the BT-17 pulse, the single-shot 317 in FIG. 12 reverts to its stable state and supplies a positive signal which operates the single-shot 318 thereby to generate a BT-18 pulse.

Figure 13:
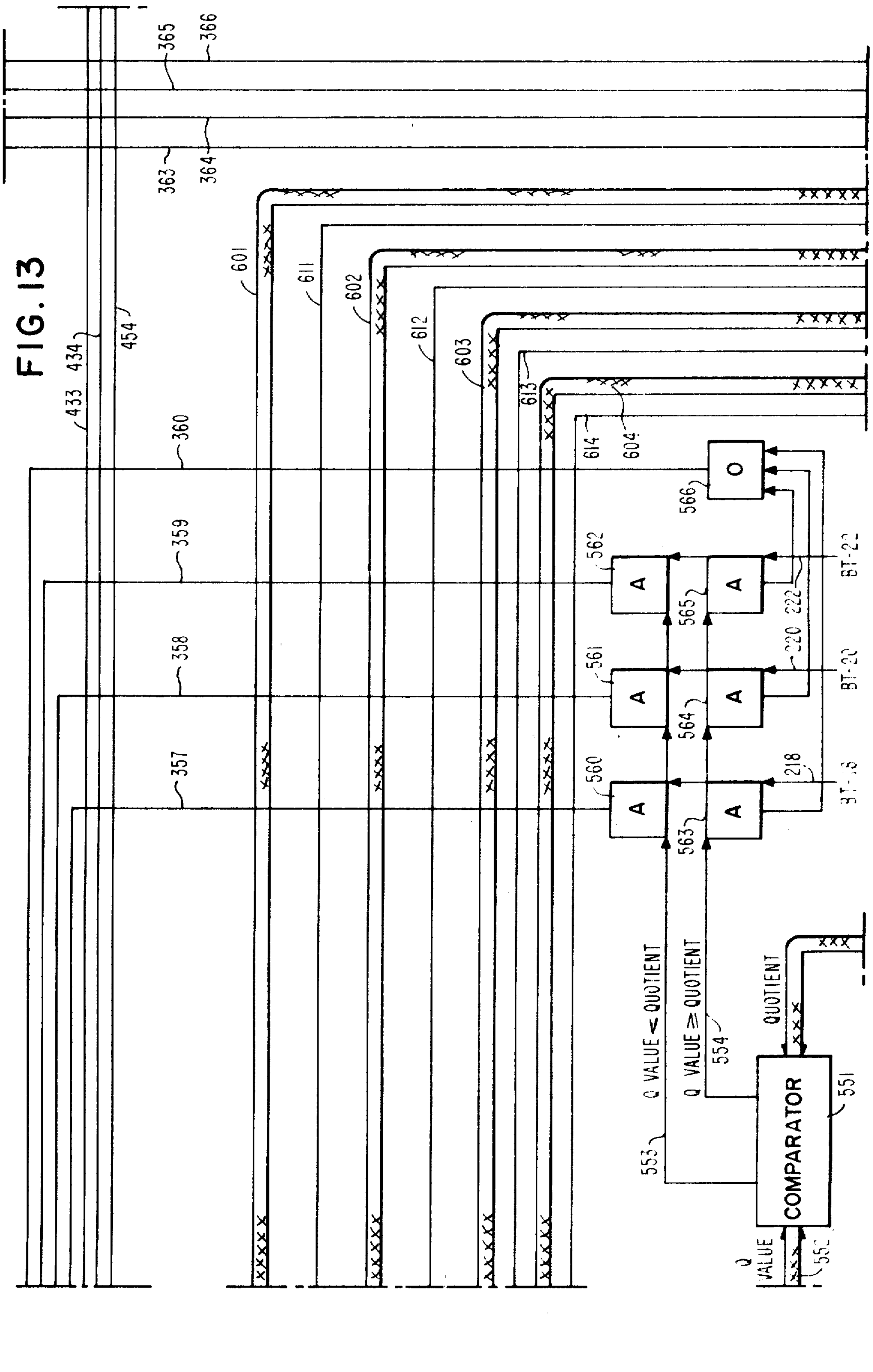

The BT-18 pulse is supplied to the AND-circuits 560 and 563 in FIG. 13, and the AND-circuit 563 supplies a positive pulse through the OR-circuit 566 along the output line 360 through the OR-circuit 348 in FIG. 19 to the single-shot 324. The single-shot 324 is enabled to generate a BT-24 pulse.

The BT-24 pulse is supplied to the AND-circuits 571 through 574 in FIG. 10. The AND-circuit 571 is enabled by a positive signal from the decoder 570 as explained above, and the AND-circuit 571 passes a positive signal to the set of gates 591 which transfer the task word from the upper portion of the calculate register 510 in FIG. 11 along the cable 601 to the table 651 in FIG. 46. This task word is stored in the table 651 at the address indicated by the in counter 670c. The in counter 670c operates the decoder 672c to select the specific register where the task word is stored. When the BT-24 terminates, the single-shot 324 in FIG. 9 reverts to its stable state and supplies a positive signal which operates the single-shot 325 thereby to generate a BT-25 pulse. The BT-25 pulse is supplied to the AND-circuit 581 through 584 in FIG. 10, and the AND-circuit 581 is enabled by the decoder 570 to pass the BT-25 on the line 611 to the in counter 670c in FIG. 42. The positive signal on the line 611 increments the in counter, thereby causing it to step to its next highest value. The in counter 670c operates the decoder 672c which in turn selects the register with the next higher order address.

Returning again to the comparator 551 in FIG. 13, if the Q value in the Q value hold register 1381 in FIG. 48 is less than the recalculated service ratio as represented by the quotient from the divider 550 in FIG. 14, then the comparator 551 in FIG. 13b supplies a positive signal on the line 553 to the AND-circuits 560 through 562. The comparator 551 supplies a negative signal on the output line 554 which deconditions the AND-circuits 563 through 565. Consequently, the BT-18 pulse is not passed by the AND-circuit 563 as was the case in the conditions assumed above. Instead, the BT-18 pulse in this event is passed by the AND-circuit 560 on the output line 357 to the single-shot 319 in FIG. 6 which thereby generates a BT-19 pulse.

The BT-19 pulse is supplied through the OR-circuit 1373 in FIG. 48 to the set of gates 1363, and they are operated to transfer the content of the register 1353, which holds the Q value ⅛, through the set or OR-circuits 1380 to the Q value hold register 1381. This Q value is transferred along the cable 552 to the decoder 570 in FIG. 10 and the comparator 551 in FIG. 13. The decoder 570 in FIG. 10 supplies a positive output signal on that one of its output lines connected to the AND-circuits 572 and 582. When the BT-19 pulse terminates, the single-shot 319 in FIG. 6 reverts to its stable state and supplies a positive signal which operates the single-shot 320 thereby to provide a BT-20 pulse.

The BT-20 pulse is supplied to the AND-circuit 561 and 564 in FIG. 13. If the Q value in the Q value hold register 1381 is equal to or greater than the recalculated service ratio as represented by the quotient from the divider 550 in FIG. 14, then the comparator 551 supplies a positive signal on the line 554, and the BT-20 pulse passes through the AND-circuit 564, through the OR-circuit 556, along the output line 360, and through the OR-circuit 348 to the single-shot 324 thereby to generate a BT-24 pulse. The BT-24 pulse is applied to the AND-circuits 571 through 574 in FIG. 10, and the AND-circuit 572 passes the BT-24 pulse to the set of gates 592. The gates 592 transfer the task word in the upper portion of the calculate register along the cable 602 to the table 652 in FIG. 38 where the task word is stored in the locations specified by the in counter 670*b*. The in counter 670*b* operates the decoder 672*b* to address the specified register.

Upon termination of the BT-24 pulse, the single-shot 324 in FIG. 9 reverts to its stable state and supplies a positive going signal to the single shot 325. The single-shot 325 thereby generates a BT-25 pulse, and this pulse is supplied to the AND-circuits 581 through 584 in FIG. 10. The AND-circuit 582 is conditioned by the decoder 570 to pass the BT-25 pulse on the line 612 to the in counter 670*b* in FIG. 34. The counter 670*b* is incremented by stepping it to the next higher value. Signals from the in counter 670*b* operate the decoder 672*b* to select the register with the next consecutive higher order address.

Returning again to the comparator 551 in FIG. 13, if the Q value in the Q value hold register 1381 in FIG. 48 is greater than the service ratio as represented by the quotient from the divider 550, then the comparator 550 supplies a positive signal on the line 553 to the AND-circuits 560 through 562. In this case the BT-20 pulse passes through the AND-circuit 561 on the output line 358 to the single-shot 321 thereby to provide a BT-21 pulse.

The BT-21 pulse is supplied through the OR-circuit 1372 in FIG. 48 to the set of gates 1362, and they are operated to transfer the content of the register 352, which holds the Q value ¼, through the OR-circuit 1380 to the Q value hold register 1381. This Q value is supplied on the cable 552 to the decoder 570 in FIG. 10 and the comparator 551 in FIG. 13. The decoder 570 provides a positive signal on that one of its output lines connected to the AND-circuits 573 and 783. Upon termination of the BT-21 pulse, the single-shot 321 reverts to its stable state and supplies a positive going signal which operates the single-shot 322 thereby to provide a BT-22 pulse.

The BT-22 pulse is supplied to the AND-circuits 562 and 565 in FIG. 13. If the Q value in the Q value hold register 1381 in FIG. 48 is equal to or greater than the service ratio as represented by the quotient from the divider 550, the comparator 551 supplies a positive signal on the line 554 to the AND-circuits 563 through 565. In this event the BT-22 pulse passes through the AND-circuit 565, through the OR-circuit 566, along the output line 360, and through the OR-circuit 348 in FIG. 9 to operate the single shot 324 thereby to provide a BT-24 pulse. The BT-24 pulse passes through the AND-circuit 573 in FIG. 10 to operate the set of gates 593 and transfer the task word from the calculate register 510 along the cable 603 to the table 653 in FIG. 30. This task word is stored in a register specified by the in counter 670*a*. Signals from the in counter 670*a* operate the decoder 672*a* to select the specified register where the task word is stored.

Returning to the comparator 551 in FIG. 13, if the Q value in the Q value hold register 1381 in FIG. 48 is less than the service ratio as represented by the quotient from the divider 550 in FIG. 14, then the comparator 551 supplies a positive signal on the line 553 to the AND-circuit 560 through 562. The BT-22 pulse in this case passes through the AND-circuit 562 on the output line 359. The BT-22 pulse in this case passes through the AND-circuit 562 on the output line 359 to the single-shot 323. The single-shot 323 is operated to provide a BT-23 pulse.

The BT-23 pulse is supplied through the OR-circuit 1371 in FIG. 48 to the set of gates 1361. These gates are operated to transfer the content of the register 1351, which holds the value Q 1/2, through the OR-circuit 1380 to the Q value hold register 1381. This Q value is supplied on the cable 552 to the decoder 570 in FIG. 10. This Q value is supplied also to the comparator 551, but it is uneventful since the output of the comparator is not sampled when the Q value ½ is supplied thereto. The reason for this is straightforward. The preceding comparisons by the comparator 551 commenced with the lowest Q value of 1/16 and proceeded in sequence through to the highest Q value which is ½. If the Q value is greater than the service ratio as represented by the quotient from the divider 550, the comparator never provides the positive pulse from anyone of the AND-circuits 563 through 565 in response to pulses BT-18, BT-20, or BT-22. Consequently, the task word in the calculate register 510 is not stored in any of the tables 651 through 653. Therefore, it follows that the task word in the calculate register 510 must have a Q value equal to or greater than ½, and the task word may be stored in the table 654 since it is the only remaining table. For this reason the single-shot 323, upon reverting to its stable state, supplies a positive signal through the OR-circuit 348 in FIG. 9 to enable the single-shot 324 thereby to generate a BT-24 pulse.

The BT-24 pulse is supplied to the AND-circuit 571 through 574 in FIG. 10. The decoder 570 responds to the Q value ½ from the Q hold register 1381 in FIG. 48 and supplies a positive signal on that one of its output lines connected to the AND-circuit 574 and 784. The BT-24 pulse passes through the AND-circuit 574 to operate the set of gates 594 thereby to transfer the task word in the calculate register 510 on the cable 604 to the table 654. The task word is stored in a register specified by the in counter 670. The in counter 670 operates the decoder 672 to provide a positive signal on a given one of its output lines 673 through 675 which selects the specified register where the task word is stored. When the BT-24 pulse terminates, the single-shot 324 reverts to its stable state and supplies a positive signal which operates the single shot 325 thereby to generate a BT-25 pulse.

The BT-25 pulse is supplied to the AND-circuits 581 through 584 in FIG. 10, and the AND-circuit 584 passes the positive BT-25 pulse on the line 614 to the in counter 670. The positive pulse on the line 614 increments the in counter 670, thereby stepping it to the next higher consecutive value. The output signals from the in counter 670 operate the decoder 672 to select the next consecutive higher order register.

It is seen, therefore, how a task word taken from anyone of the tables 651 through 654 in respective FIGS. 46, 38, 30, and 22 may be supplied to the recalculate register 510, have its service ratio recalculated by the divider 550 in FIG. 14, and by comparison with each of the possible Q values in the comparator 551 in FIG. 13 be reassigned to the appropriate one of the tables 651 through 654. The reassignment may return the task word to the same table from which it was taken, or the reassignment may be made to a table having a greater service ratio. If a task word is not assigned to a processor, its service ratio will increase with the passage of time. When the service ratio increases, upon recalculation, sufficient to cause it to be reassigned to a table having a higher Q value, this increases its possibilities for allocation to a processor under the allocation algorithm.

Task words are returned after one time slot of the T pulses in the processors to the calculate register 510 in FIG. 11. In this case task words from the processors are supplied to the registers 490 through 492 where they are stored until the NT clock operates the associated gates 485 through 487 at NT-7 time to transfer the task words along the cable 493 through the OR-circuit 512 to the calculate register 510. As task words are received in this manner from the processors, their service ratios are recalculated in the recalculate register 510, and they are assigned to the appropriate table as explained above. It should be pointed out that a task word from a processor is stored in an appropriate one of the tables 651 through 654; subsequently it is allocated for one time slot of the T pulses to a processor for execution; the processor is then interrupted for another allocated task whereby the interrupted task word is returned as a new task through one of the registers 490 through 492 to the recalculate register 510; and upon recalculation, the task word may have the same service ratio, a smaller service ratio, or a larger service ratio. One important aspect of periodically recalculating service ratios of task words is to increase or diminish their possibilities for allocation to a processor on the basis of current need. Hence, task words with a lower urgency are downgraded by being stored in tables with a lower Q value; whereas, task words with a greater urgency are upgraded by being stored in tables with a higher Q value, thereby permitting greater flexibility in timely completing all tasks. This process is repeated until each task word is completely executed at which time the associated processor, upon becoming idle, initiates an IP cycle.

Upon termination of the BT–25 pulse the single shot 325 in FIG. 9 supplies a positive going signal which operates the single shot 326 to generate a BT–26 pulse. The BT–26 pulse is used to coordinate the operation of the NT clock 400 in FIGS. 7 and 8 with the operation of the BT clock when new task words are brought in from the processors to the calculate register 510 in FIG. 11. The BT–26 pulse is supplied to the gates 1951 and 1952 in FIG. 19. If the flip-flop 1923 is in the one state, the gate 1952 passes the positive BT–26 pulse on the line 362 to operate the single shot 328 in FIG. 12 thereby to generate a BT–28 pulse.

The B–28 pulse is supplied to the AND-circuits 541 through 544 in FIG. 14. The Q value portion of the calculate register 510 is supplied to the decoder 540 in FIG. 514, and it supplies a positive signal on a selected one of its output lines to condition one of its AND-circuits 541 through 544. If the Q value ½ is in the calculate register 510, then the AND-circuit 541 is conditioned to pass the BT–28 pulse, and if the Q value ¼ is in the calculate register, the decoder 540 conditions the AND-circuit 542 to pass the B–28 pulse. If the Q value ⅛ is in the calculate register 510, the decoder 540 conditions the AND-circuit 543, and if the Q value 1/16 is in the calculate register 510, the decoder 540 conditions the AND-circuit 544 to pass the B–28 pulse. The Q value in the calculate register 510 indicates the table from which a task word was taken. It is necessary to increment the out counter of such table in order to prevent recalculation of the same task word again as well as to prevent subsequent allocation of this task word to a processor by the allocation algorithm. A positive signal from a respective one of the AND-circuits 541 through 544 in FIG. 14 operate a respective one of the single-shots 329 through 332 in FIG. 12.

The pulses BT–29 through BT–32 from respective single-shots 329 through 332 on respective lines 229 through 232 are supplied through respective OR-circuits 682, **682*a*, 682*b*, and 682*c* thereby to increment the respective out counters 680, 680*a*, 680*b*, and 680*c*. Only one of the pulses BT–29 through BT–32 are generated during a given cycle of the BT clock. Upon termination of the given pulse, the operated one of the single-shots 328 through 332 supplies a positive going signal to the associated one of the single-shots 306, 309, 312, and 315** thereby to initiate another cycle of the BT clock.

Referring again to the B–26 pulse, it was assumed above that the flip-flop 1923 in FIG. 19 was in the one state whereby the B–26 pulse was passed by the gate 1952 to generate a B–28 pulse which in turn generated a selected one of the pulses BT–29 through BT–32 to increment a selected one of the out counters 680, **680*a*, 680*b*, or 680*c* and initiate another BT clock cycle. If the flip-flop 1923 in FIG. 19 is in the zero state, it indicates (1) that the NT clock requires service for the purpose of admitting a task word from one of the processors and (2) that the NT clock has obtained priority by being selected. More specifically, at least one of the line 25 through 27 in FIG. 7 is energized with a positive signal to set at least one of the flip-flops 450 through 452 in FIG. 7. Whenever one of these flip-flops is set to the one state, it supplies a positive signal through the OR-circuit 453 in FIG. 7 along the output line 454 to the AND-circuit 1863 and the inverter 1876 in FIG. 15. This represents the third priority case discussed above, and if the first two priority cases are not requesting service and the BT clock is not running, the P clock 1820 in FIGS. 16 and 20 progresses through a cycle and causes the positive signal on the line 454 to pass through the AND-circuit 1863 in FIG. 19 and set the flip-flop 1883. Subsequently a positive signal from the one side of the flip-flop 1883 passes through the AND-circuit 1913 to reset the flip-flop 1923. This indicates that the new task clock 400 is selected for service. Before the flip-flop 1923 is reset an NT–4 pulse from the single-shot 404 in FIG. 8 passes through the gate 1953 in FIG. 19 and along the line 433 to the single-shot 405 in FIG. 8 which is operated to provide an NT–5 pulse. The NT–5 pulse is supplied through the OR-circuit 422 to operate the single-shot 404 and provide another NT–4 pulse which samples the gates 1953 and 1954 in FIG. 19. This process continues until the NT clock is selected. In this connection it is pointed out that the positive signal on the line 454 continues to be applied to the AND-circuit 1863 and the inverter 1876 in FIG. 15 until the NT clock completes its function of transferring a task word to the calculate register 510 in FIG. 11. When the flip-flop 1923 in FIG. 19 is reset, the next NT–4 pulse passes through the gate 1954 in FIG. 19 along the line 434 to operate the single-shot 406 in FIG. 8 thereby to generate an NT–6 pulse. The NT–6 pulse is applied to the AND-circuits 475 and 476 in FIG. 8 in order to sample the state of the flip-flop 470 in FIG. 7. If the flip-flop 470 is in the one state, the AND-circuit 476 passes a positive signal which resets the flip-flops 471 and 472 in FIG. 7. If the flip-flop 470 is in the zero state when the NT–6 pulse is applied, the AND-circuit 475 in FIG. 8 is conditioned to pass the NT–6 pulse to the AND-circuit 477. If the flip-flop 471 in FIG. 7 is in the one state, then the AND-circuit 477 passes a positive signal through the OR-circuit 474 to reset the flip-flop 472. If the flip-flop 471 is in the zero state when a positive pulse is passed from the AND-circuit 475 in FIG. 8 to the AND-circuit 477, this positive pulse is uneventful, and no further action takes place because the flip-flops 470 and 471 in FIG. 7 are in the zero state. It follows, therefore, that the flip-flop 472 is in the one state. The NT–6 pulse on the line 416 is supplied also to the one input side of the flip-flop 1804 in FIG. 15 thereby to inhibit operation of the P clock 1820**.

Upon termination of the NT–6 pulse, the single-shot 406 in FIG. 8 reverts to its stable state and supplies a positive going signal which operates the single-shot 407 thereby to generate an NT–7 pulse. The NT–7 pulse on the line 417 is applied to the AND-circuits 480 through 482 in FIG. 8, and one, and only one, of these AND-circuits supplies a positive pulse to an associated one of the sets of gates 485 through 487 thereby to transfer a task word from the associated one of the registers 490 through 492 along the cable 493 and through the OR-circuit 512 in FIG. 11 to the calculate register 510. The NT–7 pulse is supplied on the line 417 also through the OR-circuit 383 in FIG. 12 and then through the OR-circuit 347 to the single-shot 317 thereby to generate a BT–17 pulse. The microprogram of the BT clock proceeds from the pulse BT–17 through its cycle of operation as explained above to calculate the service ratio of the task word in the calculate register 510 and store the task word in the appropriate one of the tables 651 through 654. The BT–26 pulse passes through the gate 1951 in FIG. 19 and along the line 361 to the single-shot 327 in FIG. 9. This single-shot is operated to generate a BT–27 pulse which resets the flip-flop 1804 in FIG. 15 thereby to release the P clock. Upon termination of the BT–27 pulse, the single-shot 327 supplies a positive going signal on the line 384 which passes through the OR-circuit 420 in FIG. 7 to operate the single-shot 401 and thereby initiate another cycle of the NT clock 400 in FIGS. 7 and 8. The NT–1 pulse resets the flip-flops 470 through 472. The NT–2 pulse interrogates the state of the flip-flops 450 through 452, and the first or left most flip-flop in the one state conditions its associated one of the AND-circuit 460 through 462 to pass a pulse which sets the associated one of the flip-flops 470 through 472. A positive signal from the given one of the AND-circuits 460 through 462 in FIG. 7 passes through the OR-circuit 463 and the OR-circuit 422 in FIG. 8 to operate the single-shot 404 thereby to provide an NT–4 pulse on the line 414. This positive NT–4 pulse is applied to the gates 1953 and 1954 in FIG. 19 to sample the state of the flip-flop 1923 and repeat the foregoing process. If another task word is available, the NT clock awaits selection. When selected, it transfer the new task word to the appropriate one of the tables 651 through 654 as previously explained.

From the foregoing description of the BT clock and the NT clock it is seen how task words are stored in the tables 651 through 654 according to their service ratios. Task words which have a low priority are disposed in the table 651, and task words with a high priority are disposed in the table 654. Task words with intermediate priorities are disposed in the tables 652 and 653 with the latter table having the higher intermediate priority. It is a feature of the scheduling algorithm to recalculate the service ratios and advance task words from a table of lower priority to a table of higher priority or vice versa thereby equitably distributing processor time according to current conditions. The scheduling algorithm insures that task words with a higher priority, and hence a higher Q value, are recalculated more often than task words with a lower priority or lower Q value. More specifically, task words in the table 654 have their service ratios recalculated more often than task words in the table 653, and task words in the table 653 have their service ratios recalculated more often than task words in the table 652. Likewise, task words in the table 652 have their service ratios recalculated more often than task words in the table 651. The service ratio or Q value indicates the frequency with which the scheduling algorithm considers task words in the corresponding service classes or tables. It is defined as the ratio of the number of times the task words of a table are considered for scheduling to the number of time slots during which these considerations are made, the time slots being determined by the frequency of the BT pulses on the line 175 on FIG. 4. For example, if the service ratio of a service class or table has a Q value ⅛, then task words in that table are considered by the scheduling algorithm at least once every eight time slots defined by the BT pulses on the line 175 in FIG. 4. The mechanism for controlling the frequency of recalculating the service ratios of task words in the various tables 651 through 654 is shown in FIGS. 4 and 5, and it is discussed next.

The two counters 100 and 110 in FIG. 4 determine the frequency with which BT pulses on the line 175 are used to perform recalculation of the service ratios of task words stored in the tables 651 through 654. The old count counter 100 is initially set to a value one less than the value of the new count counter 110. Each BT pulse on the line 175 in FIG. 4 increments both of these counters. The mask register 120 is included so that one or more of the tables 651 through 654 may be disregarded, if desired, for recalculation purposes. There are four bits or stages in each of the counters in FIG. 4, and there are four bits or stages in the mask register. All bits are connected to the AND-circuits 130 through 133 in FIG. 5 as shown. It is pointed out that the true value in the new count counter 110 is supplied to the AND-circuit 130 through 133, and the complement of the value in the old count counter 100 in FIG. 4 is supplied to the AND-circuits 130 through 133 in FIG. 5. The true value in the mask register 120 in FIG. 4 is supplied to the AND-circuits 130 through 133 in FIG. 5. As the BT pulses on the line 175 operate the counters 100 and 110, the AND-circuits 130 through 133 are conditioned in a given sequence to supply positive output signals to respective AND-circuits 140 through 143. The AND-circuits 140 through 143 are sampled by a BT-3 pulse, and one, and only one, of them may pass a positive pulse at a given time on a respective one of the lines 170 through 173 to the BT clock. A positive signal on the line 170 is supplied to the single shot 305 in FIG. 6 whereby pulses BT-5 and BT-6 are generated to perform recalculations of service ratios of task words in the table 654 in FIG. 22. A BT-7 pulse is generated if the table 654 has available task words as explained earlier. A positive signal on the line 171 in FIG. 5 operates the single-shot 308 in FIG. 9, thereby to generate pulses BT-8 and BT-9 which are used to perform recalculations of service ratios of task words in the table 653. A BT-10 pulse is generated if the table 653 has available task words. A positive signal on the line 172 in FIG. 5 operates the single-shot 311 in FIG. 9 thereby to generate pulses BT-11 and BT-12 which perform recalculations of service ratios of task words in the table 652. A BT-13 pulse is generated if the table 652 has available task words. A positive signal on the line 173 in FIG. 5 operates the single-shot 314 in FIG. 12 thereby to generate pulses BT-14 and BT-15 which perform recalculation of the service ratio of task words in the table 651. A BT-16 pulse is generated if the table 651 has available task words. If at least one task word is available in the selected one of the tables 651 through 654, then the OR-circuit 383 in FIG. 12 receives a positive signal from the single-shot 307 in FIG. 9, the single-shot 310 in FIG. 9, or the single-shot 382 in FIG. 12. The OR-circuit 383 passes the positive signal through the OR-circuit 347 to the single-shot 317. Also, the single-shot 316 may supply a positive signal through the OR-circuit 347 to the single-shot 317. The single-shot 317 provides a BT-17 pulse which continues the cycle of the BT clock which performs the recalculation of the service ratio of the task word from the selected table.

The mask register 120 in FIG. 4 is set with a binary one in each of the flip-flops 121 through 124 whenever it is desired not to mask out recalculation operations in the corresponding tables 651 through 654. If the flip-flop 121 is reset, the calculation operations on task words in the table 651 are inhibited. If the flip-flop 122 is reset, recalculation operations on task words in the table 652 are inhibited. If the flip-flop 123 is reset, recalculation operations on task words in the table 653 are inhibited, and in like fashion recalculation operations on the table 654 are inhibited if the flip-flop 124 in FIG. 4 is reset. It is readily seen that resetting of any one or more of the flip-flops 120 through 124 inhibits the operation of the associated AND-circuit 130 through 133 in FIG. 5, thereby to inhibit recalculation operations in respective tables 654 through 651.

As the counters 100 and 110 in FIG. 4 are incremented by BT pulses on the line 175, they condition the AND-circuits 130 through 133 in FIG. 5 in the order indicated in Table 2 below.

TABLE 2

| BT Pulses On The Line 175 | Old Count Counter 110 | New Count Counter 110 | Logic | Q Value Table | Selected And Circuit in FIG. 5 |
|---|---|---|---|---|---|
| Initial Set Up | 1111 | 0000 | 0000<br>0000<br>0000 | nothing | none |
| 1 | 0000 | 0001 | 1111<br>0001<br>0001 | ½ | 130 |
| 2 | 0001 | 0010 | 1110<br>0010<br>0010 | ¼ | 131 |
| 3 | 0010 | 0011 | 1101<br>0011<br>0001 | ½ | 130 |
| 4 | 0011 | 0100 | 1100<br>0100<br>0100 | ⅛ | 132 |
| 5 | 0100 | 0101 | 1011<br>0101<br>0001 | ½ | 130 |
| 6 | 0101 | 0110 | 1010<br>0110<br>0010 | ¼ | 131 |
| 7 | 0110 | 0111 | 1001<br>0111<br>0001 | ½ | 130 |
| 8 | 0111 | 1000 | 1000<br>1000<br>1000 | 1/16 | 133 |
| 9 | 1000 | 1001 | 0111<br>1001<br>0001 | ½ | 130 |
| 10 | 1001 | 1010 | 0110<br>1010<br>0010 | ¼ | 131 |
| 11 | 1010 | 1011 | 0101<br>1011<br>0001 | ½ | 130 |

| | | | | | |
|---|---|---|---|---|---|
| 12 | 1011 | 1100 | 0100<br>1100<br>0100 | 1/8 | 132 |
| 13 | 1100 | 1101 | 0011<br>1101<br>0001 | 1/2 | 130 |
| 14 | 1101 | 1110 | 0010<br>1110<br>0010 | 1/4 | 131 |
| 15 | 1110 | 1111 | 0001<br>1111<br>0001 | 1/2 | 130 |
| 16 | 1111 | 0000 | 0000<br>0000<br>0000 | nothing | none |

For the initial setup the old count counter 100 is initially set to all ones, and the new count counter is initially set to all zeros. This is the first condition shown at the top of Table 2. It is assumed that the mask register 120 in FIG. 4 is set to all ones for this illustration. The mask register serves as a third input to the AND-circuit 130 through 133, and the remaining discussion is devoted to the inputs to these AND circuits from the counters 100 and 110. The first BT pulse on the line 175 in FIG. 4 increments the counters 100 and 110. The number in the old count counter is inverted and logically ANDed with the number in the new count counter in the AND circuits 130 through 133. This operation always produces a single binary 1 in the result. If the single binary 1 in the result appears in the right-hand position in Table 2, it means that the Q 1/2 table 654 is selected for recalculation service. If the single one appears in the second column from the right in Table 2, it means that the Q 1/4 table 653 is selected for recalculation service. If the single 1 appears in the column third from the right in Table 2, it means that the Q 1/8 table 652 is selected for recalculation service. If the single 1 appears in the left-hand column in Table 2, it means that the Q 1/16 table 651 is selected for recalculation service. Table 2 illustrates the sequence for the first 16 BT pulses on the line 175 in FIG. 4. It is noted that for these 16 BT pulses that the Q 1/2 table is serviced in response to each alternate BT pulse for a total of eight times; the Q 1/4 table is serviced in response to every fourth BT pulse for a total of four times; the Q 1/8 table is serviced in response to every eighth pulse for a total of two times; and the Q 1/16 table is serviced in response to every 16th BT pulse for a total of one time. The sequence of servicing the Q tables is as follows: Q 1/2, Q 1/4, Q 1/2, Q 1/8, Q 1/2, Q 1/4, Q 1/2, Q 1/16, Q 1/2, Q 1/4, Q 1/2, Q 1/8, Q 1/2, Q 1/4, and Q 1/2 as illustrated in Table 2. This sequence then repeats itself. It is readily seen, therefore, that the service frequency of the Q 1/2 table 654 is twice the service frequency of the Q 1/4 table 653 which in turn has a service frequency which is twice as great as that of the Q 1/8 table 652 which in turn likewise has a service frequency which is twice as great as that of the Q 1/16 table 651. Task words in the Q 1/16 table 651 must, with the passage of time, eventually acquire a higher service ratio if they are not allocated to a processor, and they are reassigned to a table having a higher Q value. This insures that as the Q value of a task word increases, its service ratio is recalculated more often thereby to cause its reassignment to a table having a still greater Q value, and the process is repeated thereby to increase its possibilities of allocation to a processor under the allocation algorithm which is discussed next.

The purpose of the particular selection mechanism in FIGS. 4 and 5 is to distribute recalculation service on a weighted or biased basis to the Q tables 651 through 654 which bias is related to the service ratios of such Q tables. Sequences of recalculation service may be used other than that described above. For example, instead of the sequence (a) Q 1/2, Q 1/4, Q 1/2, Q 1/8, Q 1/2. Q 1/4, Q 1/2, Q 1/16, Q 1/2, Q 1/4, Q 1/2, Q 1/8, Q 1/2, Q 1/4, Q 1/2, the sequence (b) Q 1/2, Q 1/2, Q 1/2, Q 1/2, Q 1/2, Q 1/2, Q 1/2, Q 1/2, Q 1/4, Q 1/4, Q 1/4, Q 1/4, Q 1/8, Q 1/8, Q 1/16 or (c) Q 1/2, Q 1/2, Q 1/2, Q 1/2, Q 1/4, Q 1/4, Q 1/8, Q 1/2, Q 1/2, Q 1/2, Q 1/2, Q 1/4, Q 1/4, Q 1/8, Q 1/16 would suffice. When a BT pulse is received on the line 175 in FIG. 4, the service ratios of all tasks in the selected Q table, according to the selection sequence Q 1/2, Q 1/4, Q 1/2, Q 1/8 --- of sequence (a) above, are recalculated. This provides a weighted scheme which favors tasks, usually older ones but not necessarily so in all cases, with a higher priority or need for processor service. A further scheme is to recalculate the service ratio of all tasks in all Q tables using BT pulses on the line 175 in FIG. 4 to perform the sequence (d) Q 1/2, Q 1/4, Q 1/8, Q 1/16. Here the weighting is less pronounced. The Q tables with higher service ratios are favored, but the weighting or bias is minimal. Another suitable scheme is to recalculate the service ratio of all tasks in all Q tables upon the completion of each task. In this case the BT pulses on the line 175 in FIG. 4 are used according to any of the selections sequences (a) through (d) only when any task is terminated. This in essence relates updating of service ratios to the task execution rate.

The number of Q tables arbitrarily included in this illustrated embodiment is four, corresponding to the service ratios of 1/2, 1/4, 1/8, and 1/16. The number of such Q tables employed may be varied or desired, and their number is related to the range of ratios which it is desired to cover and the expected population of tasks that fall within a given service ratio. It is desirable that the number of Q tables and their tasks are such that the Q tables are uniformly populated. The mask register provides a facility for controlling the distribution of tasks to the Q tables such that uniformity of distribution is achieved.

The allocation algorithm forwards task words to the processors for execution of the task in whole or in part, and the allocation algorithm is implemented by the microprogram of the T clock. It is appropriate, therefore, first to discuss the microprogram of the T clock. The T clock in FIGS. 35, 36, 39, 40, 43, and 44 includes single-shots 901 through 964 which provide respective output pulses T1, T2, and T5 through T64. The function performed by each pulse is set out below. It is pointed out that all pulses of the T clock are not generated during each cycle of the T clock, but when generated, they perform the function described.

The T1 pulse is applied to the gates 1941 and 1942 in FIG. 19 to test the state of the flip-flop 1922. Whenever a T pulse appears on the line 970 in FIG. 39 it is supplied through the delay circuit 971 and the OR-circuit 972 to operate the single-shot 901 thereby to provide a BT1 pulse. The positive T pulse on the line 970 is applied also to the one input side of the flip-flop 1852 in FIG. 15 thereby to set this flip-flop. This represents the second priority case described above, and if the first priority case (a request by an idle processor for service) does not request service and the NT clock and the BT clock are not running, then the P clock 1820 in FIGS. 16 and 20 causes the output signal from the one side of the flip-flop 1852 to pass through the AND-circuit 1862 and set the flip-flop 1882 which thereby causes the one output side to supply a positive signal through the AND-circuit 1912 to reset the flip-flop 1922. Until the flip-flop 1922 is reset, the T1 pulse on the line 801 in FIG. 19 passes through the gate 1941 along the line 973 to the single-shot 902 in FIG. 39, and this single-shot is operated to provide a T2 pulse. The T2 pulse is not used, but the single-shot 902 provides a time delay. Upon termination of the T2 pulse, the single-shot 902 reverts to its stable state and supplies a positive going signal through the OR-circuit 972 in FIG. 35 which operates the single-shot 901 to provide another T1 pulse to the gates 1941 and 1942 in FIG. 19. This process is repeated until the flip-flop 922 is reset at which time the next T1 pulse passes through the gate 1942 along the line 974 to the single shot 905 in FIG. 39 thereby to generate a T5 pulse. The T5 pulse set the flip-flop 1802 in FIG. 15. The positive T5 pulse is supplied on the line 805 to the AND-circuits 1304 and 1314 in FIG. 35. The T5 pulse passes through one of the AND-circuits 1304 or 1314 in FIG. 35. The T5 pulse passes through all of the AND-circuits 1301 through 1304 if all of the AND-circuits 1281 through 1284 are not conditioned, and the positive pulse from the AND-circuit 1301 is supplied on the line 979 through the OR-circuit 980 to the single-shot 918 thereby to generate a T18 pulse. One, and only one, of the AND-circuits 1281 through 1284 in FIG. 35 is conditioned at any one time to pass a positive signal. Whenever one of the AND-circuits 1281 through 1284 is conditioned to pass a positive signal, it causes the associated one of the AND-circuits 1301 through 1304 to pass a positive signal on the associated one of the output lines 975 through 978. A positive signal on the line 975 causes the generation of pulses T6 through T8 which execute a left shift of the boundary counters associated with the Q 1/2 table 654. A positive signal on the line 976 causes the generation of pulses T9 through T11 which execute a left shift of the boundary counters associated with the Q 1/4 table 653. A positive signal on the line 977 causes the generation of the pulses T12 through T14 which execute a left shift of the boundary counters associated with the Q 1/8 table 652. A positive signal on the line 978 causes the generation of the pulses T15 through T17 which execute a left shift of the boundary counters associated with the Q 1/16 table 651. As explained more fully hereinafter, the boundary counters control the priority within a Q table by which task words therein are allocated to processors.

It is a feature of the allocation algorithm to provide a higher service frequency to the Q tables having task words with a higher Q value. This is accomplished by the order in which the lines 975 through 978 are energized with the positive signals. The order by which these lines are periodically energized with positive signals is controlled by the old count counter 1250 in FIG. 31 and the new count counter 1260 in combination with the mask register 1270. The T pulses on the line 970 in FIG. 31 increment the old count counter and the new count counter, and their outputs, in combination with the mask register 1270, control the order in which the AND-circuits 1281 through 1284 are periodically conditioned to pass positive signals. The counters 1250 and 1260 in combination with the mask register 1270 control the AND-circuits 1281 through 1284 in the same manner in which the counters 100 and 110 in FIG. 4, in combination with the mask register 120, control the order in which the AND-circuits 130 through 133 in FIG. 5 are periodically operated to provide positive output signals on the lines 170 through 173 as previously explained. More specifically, the order of conditioning the AND-circuits 130 through 133 in FIG. 5 is depicted in Table 2 above, and respective AND-circuits 1284 through 1281 are periodically conditioned in a like fashion in response to T pulses on the line 970. The frequency of the T pulses on the line 970 thus defines the basic time slot of the allocation algorithm. Positive pulses on the lines 975 through 978 in FIG. 35 are supplied to respective single-shots 906 in FIG. 39, 909 in FIG. 39, 912 in FIG. 43, and 915 in FIG. 43. It is pointed out that one, and only one, of these lines is energized with a positive signal in response to a given T pulse on the line 970, which thereby determines which Q table is selected for allocation of task words to a processor.

The pulses T6 through T8 adjust the binary counters 704 through 706 in FIGS. 17 and 21 by executing a left shift operation. The T6 pulse is applied to a set of gates 720 in FIG. 17 thereby to transfer the content of the boundary counter 705 through the set of OR-circuits 708 to the boundary counter 706; the T7 pulse is applied to a set of gates 721 in FIG. 22 to shift the content of a boundary counter 3, not shown, through a set of OR-circuits 707 to the boundary counter 705 in FIG. 21; and the T8 pulse is applied to a set of gates 722 in FIG. 21 to transfer the content of the boundary counter 704 to a boundary counter (N–1), not shown. The function of the boundary counters is explained more fully hereinafter. Upon termination of the T8 pulse, the single-shot 908 in FIG. 39 supplies a positive going signal to the single-shot 960 in FIG. 44 thereby to generate a T60 pulse the function of which is described subsequently.

A positive signal on the line 976 causes pulses T–9 through T11 to be generated, and they adjust the boundary counters **704*a* through 706*a* associated with the Q 1/4 table 653. More specifically, the pulse T9 is applied to the set of gates 720*a* in FIG. 25 thereby to transfer the content of the boundary counter 705*a* in FIG. 29 through the set of OR-circuits 708*a* in FIG. 26 to the boundary counter 706*a*. The T10 pulse is applied to the set of gates 721*a* in FIG. 30 to transfer the content of a boundary counter 3, not shown, through the OR-circuits 707*a* to the boundary counter 705. The T11 pulse is applied to a set of gates 722*a* to transfer the content of the boundary counter 704*a* in FIG. 29** to a boundary counter (N–1), not shown.

A positive signal on the line 977 in FIG. 35 is effective to generate pulses T12 through T14 in FIG. 43. The pulses T12 through T14 are applied to respective sets of gates **720*b* in FIG. 33, 721*b* in FIG. 38, and 722*b* in FIG. 37 thereby to execute a left shift of information in respective boundary counters 705*b* and 704*b*. The content of the boundary counter 705*b* is transferred to the boundary counter 706*b*, and the content of a boundary counter 3, not shown, is transferred to the boundary counter 705*b*. The content of the boundary counter 704*b*** is transferred to a boundary counter (N–1), not shown.

A positive signal on the line 978 in FIG. 35 is effective to generate pulses T15 through T17 in FIG. 43, and they are used to adjust the boundary counters associated with the Q 1/16 table 651 in FIG. 46. The pulses T15 through T17 are applied to respective sets of gates **720*c* in FIG. 41, 721*c* in FIG. 46, and 722*c* in FIG. 45. The content of the boundary counter 705*c* is transferred to the boundary counter 706*c*, and the content of a boundary counter No. 3, not shown, is transferred to the boundary counter 705*c*. The content of the boundary counter 704*c*** is transferred to a boundary counter (N–1), not shown.

The single-shots 908 and 911 in FIG. 39 and the single-shots 914 and 917 in FIG. 43 supply positive signals to respective single-shots 960 through 963 which thereby generate respective pulses T60 through T63 the functions of which are described subsequently.

The T18 pulse is connected to the input of the processor counter 1590 in FIG. 47, and it is connected to various stages of this counter thereby to set the counter content to a value equal to the number of processors employed in the system of FIG. 1. It is necessary for the program scheduler to know the number of processors in the system since it must interrupt each processor and assign a new task in response to each T pulse on the line 970 in FIG. 35.

The T19 pulse is applied through the OR-circuit 693 in FIG. 22 to the set of gates 691 thereby to transfer the content of the out counter 680 along the cable 692 and through the OR-circuit 1022 in FIG. 24 to the comparator 1020. The T19 pulse is supplied also through the OR-circuit 735 in FIG. 17 to the set of gates 732 thereby to transfer the content of boundary counter 1 through the set of OR-circuits 736 in FIG. 21 along the cable 740 through the set of OR-circuits 1021 in FIG. 24 to comparator 1020. If the value in the boundary counter 1 and the value in the out counter 680 are equal, the comparator 1020 in FIG. 24 supplies a positive signal on the line 1025 to the gate 1130 in FIG. 27. The T19 pulse is supplied through the delay circuit 1140 to the gate 1130, and this gate supplies a positive signal on the line 981 to the single-shot 920 in FIG. 39 thereby to generate a T20 pulse. It is pointed out that when the value in the boundary counter 1 in FIG. 17 is equal to the value in the out counter 680 in FIG. 22, a task word is not available in a designated portion of the table 654. If the value in the boundary counter 706 is not equal to the value in the out counter 680, this indicates that a task word is available in the designated portion of the table 654 in FIG. 22, and this fact is signified by a positive signal from the comparator 1020 in FIG. 24 on the line 1026. In this case the positive signal on the line 1026 is applied to the gate 1120 in FIG. 27, and the delayed T19 pulse from the delay circuit 1140 passes through the gate 1120 to the OR-circuit 1150. The positive signal from the OR-circuit 1150 is supplied on the line 1151 to the single-shot 1451 of the S clock 1450 in FIG. 49, and a cycle of the S clock is initiated to determine which processor is working on the task with the lowest Q value. The S clock 1450 in FIGS. 48 and 49 performs in the manner previously explained to place the minimum Q value in the minimum Q value register 1434 in FIG. 49, and the address of such Q value in the table 1385 in FIG. 48 is placed in the hold search counter 1421 in FIG. 49. The word stored in such address of the table 1385 contains the lowest Q value and the identify of the processor which is working on that task.

The positive signal on the line 1151 in FIG. 27 from the OR-circuit 1150 is supplied also to the AND-circuit 1943 in FIG. 19. Since the third priority case, initiated by the T pulse on the line 970 prevails at this time, the flip-flop 1922 in FIG. 19 continues in the reset state, and it conditions the AND-circuit 1943 to pass the positive pulse on the line 1151 thereby to set the flip-flop 1944. The state of the flip-flop 1944 is sampled by a T52 pulse for reasons described subsequently.

The T20 pulse is applied through the OR-circuit 693*a* in FIG. 30 to the set of gates 691*a* to gate the content of the out counter 680*a* along the cable 692*a* and through the set of OR-circuits 1022 to the comparator 1020. The T20 pulse is supplied also through the OR-circuit 735*a* in FIG. 25 to the set of gates 732*a* to gate the content of the boundary counter (BC-1) 706*a* through the set of OR-circuits 736*a* along the cable 740*a* and through the set of gates 1021 in FIG. 24 to the comparator 1020. If the comparator 1020 finds the two values equal, a positive signal on the line 1025 conditions the gate 1131 to pass the delayed T20 pulse from the delay circuit 1141 on the line 982 to the single-shot 921 in FIG. 39 thereby to generate the T21 pulse. If an equality is not indicated by the comparator 1020 in FIG. 24, a positive signal on the line 1026 conditions the gate 1121 in FIG. 27 to pass the delayed T20 pulse from the delay circuit 1141 to the OR-circuit 1150. This positive signal passes through the OR-circuit 1150 on the output line 1151 to start the S clock 1450 in FIGS. 48 and 49, and the positive signal on the line 1151 passes through the AND-circuit 1943 in FIG. 19 to set the flip-flop 1944.

The T21 pulse is supplied through the OR-circuit 693*b* in FIG. 38 to the set of gates 691*b* to gate the content of the out counter 680*b* on the cable 692*b* through the set of OR-circuits 1022 to the comparator 1020. The T 21 pulse is supplied also through the OR-circuit 735 to the set of gates 732*b* to gate the content of the boundary counter 706*b* through the set of OR-circuits 736*b* on the cable 740*b* through the set of OR-circuits 1020 in FIG. 24 to the comparator 1020. If an equality is reached by the comparator 1020, a positive signal on the line 1025 conditions the gate 1132 in FIG. 27 to pass the delayed T21 pulse from the delay circuit 1142 on the line 983 to the single shot 922 in FIG. 39 thereby to generate a T22 pulse. If an equality is not indicated by the comparator 1020, a positive signal on the line 1026 conditions the gate 1122 in FIG. 27 to pass the delayed T21 pulse from the delay circuit 1142 to the OR-circuit 1150. The positive pulse passes through the OR-circuit 1150 on the output line 1151 to start the S clock 1454 in FIGS. 48 and 49, and the positive pulse on the line 1151 passes through the AND-circuit 1943 in FIG. 19 to set the flip-flop 1944.

The T22 pulse is supplied through the OR-circuit 1093*c* in FIG. 46 to the set of gates 691*c* to transfer the content of the out counter 680*c* on the cable 692*c* through the set of OR-circuits 1022 in FIG. 24 to the comparator 1020. The T22 pulse is supplied through the OR-circuit 735*c* in FIG. 41 to the set of gates 732*c* to transfer the content of the binary counter (BC-1) 706*c* through the set of OR-circuits 736*c* along the cable 740*c* through the set of OR-circuits 1021 in FIG. 24 to the comparator 1020. If an equality is reached by the comparator 1020, a positive signal on the line 1025 conditions the gate 1133 in FIG. 27 to pass the delayed T22 pulse from the delay circuit 1143 on the line 984 to the single-shot 923 in FIG. 39 thereby to generate a T23 pulse. If an equality is not reached by the comparator 1020 in FIG. 24, a positive signal on the line 1026 conditions the gate 1123 to pass the delayed T22 pulse from the delay circuit 1143 to the OR-circuit 1150. This positive signal passes through the OR-circuit 1150 and on the output line 1151 to start the S clock 1450 in FIGS. 48 and 49, and the positive signal on the line 1151 passes through the AND-circuit 1943 in FIG. 19 to set the flip-flop 1944.

It is pointed out by way of summary that the pulses T19 through T22 cause the out counters 680 and 680*a* through 680*c* associated with respective tables 654 through 651 to be compared with their associated boundary counters (BC-1) 706 and 706*a* through 706*c*. The comparisons are performed sequentially until an available task word is found commencing first with table 654 and proceeding through to the table 651. If an available task word is not found, a search is made in like fashion through tables 654 through 651 using boundary counters 2 and pulses T23 through T26.

The pulses T23 through T26 perform in the same fashion to cause the out counters 680 and 680*a* through 680*c* associated with respective tables 654 through 651 to be compared with the associated boundary counters (BC-2) 705 and 705*a* through 705*c*. If a comparison is reached indicating a task word is not available, the next consecutive T pulse is generated by positive signals from the gates 1134 or 1135 in FIG. 27 or the gates 1170 or 1171 in FIG. 28. If an equality is not reached, indicating the availability of a task word, one of the gates 1124, 1125, 1160, or 1161 in FIG. 27 supplies a positive signal through the OR-circuit 1150 on the line 1151 to start the S clock 1450 in FIGS. 48 and 49. The positive signal on the line 1150 also passes through the AND-circuit 1943 in FIG. 19 to set the flip-flop 1944.

The pulses T27 through T30 perform in like fashion to compare the content of the out counters 680 and 680*a* through 680*c* with their associated boundary counters (BC-N) 704 and 704*a* through 704*c*. If an equality is found, indicating the unavailability of a task word, the gates 1172 through 1175 in FIG. 28 pass positive signals to generate the consecutive pulses T28, T29, T30 and T64 respectively. Upon termination of the T30 pulse the microprogram of the T clock completes its search for task words in the tables 651 through 654. If no available task word is found, the T30 pulse passes through the gate 1175 in FIG. 28 along the line 1002 and through the OR-circuit 1001 in FIG. 44 to operate the single-shot 964 thereby to generate a T64 pulse which terminates the operation of the T clock. This search routing illustrates how a search is made through all of the tables 651 through 654 utilizing all of the boundary counters associated with each table. It is pointed out, however, that the search operation terminates when the first available task word is found. The termination is effected by a signal from any one of the gates 1120 through 1125 and 1160 through 1165 in FIG. 27. The output lines from these gates are connected to the OR-circuit 1151 as explained above, and they are connected also to the OR-circuits 1146 through 1149 in FIG. 31. If the table 654 in FIG. 22 has an available task word, the OR-circuit 1146 receives a positive signal from one of the gates 1120 in FIG. 27, 1124, or 1162. If the table 653 in FIG. 30 has an available task word, the OR-circuit 1147 in FIG. 31 receives a positive signal from one of the gates 1121 in FIG. 27, 1125 or 1163. If the table 652 in FIG. 38 has an available task word, the OR-circuit 1148 in FIG. 31 receives a positive signal from one of the gates 1122 in FIG. 27, 1160, or 1164. If the table 651 in FIG. 46 has an available task word, the OR-circuit 1149 in FIG. 27 receives a positive signal from one of the gates 1123, 1161, or 1165. Therefore, if this search operation is terminated upon finding a task word available in one of the tables 654 through 651, one of the respective OR-circuits 1146 through 1149 supplies a positive signal on one of the respective output lines 992 through 995. A positive signal on the line 992 in FIG. 31 is applied to the single-shot 931 in FIG. 36 to generate a T31 pulse, and a positive signal on the line 993 in FIG. 31 operates the single-shot 936 in FIG. 40 to generate a T36 pulse. Similarly, a positive signal on the line 994 in FIG. 31 operates the single-shot 941 in FIG. 40 to generate a T41 pulse, and a positive signal on the line 995 in FIG. 31 operates the single-shot 946 in FIG. 44 to generate a T46 pulse.

If the foregoing search operation finds an available task word in the table 654, a T31 pulse is generated, and it is applied to the set of gates 688 in FIG. 22 to transfer the task word from the table 654 specified by the out counter 680 along the cable 690 to the task hold out register 1500 in FIG. 51. The pulse T31 is applied also through the OR-circuit 1371 in FIG. 48 to the set of gates 1361 to transfer the Q value of 1/2 from the register 1351 through the set of OR-circuits 1380 to the Q value hold register 1381. The T31 pulse is supplied also through the OR-circuit 1096 in FIG. 24 to reset the flip-flops 1093 through 1095.

The T32 pulse is supplied through the OR-circuit 735 in FIG. 18 to the set of gates 732 to transfer the content of the boundary counter (BC–1) 706 through the set of OR-circuits 736 along the cable 740 through the set of OR-circuits 1021 in FIG. 24 to the comparator 1020. The T32 pulse is supplied also through the OR-circuit 693 in FIG. 22 to the set of gates 691 to transfer the content of the out counter 680 along the cable 692 through the set of OR-circuits 1022 in FIG. 24 to the comparator 1020. If an equality is not indicated, no further action is required. If equality is indicated by the comparator 1020, a positive signal on the line 1025 is applied to the AND-circuit 1058 in FIG. 23, and a delayed T32 pulse from the delay circuit 1078 passes through the AND-circuit 1058 and the OR-circuit 1092 to set the flip-flop 1095 in FIG. 24. A positive signal from the one output side of the flip-flop 1095 is supplied on the line 1103 to condition the AND-circuits 717 and 717*a* through 717*c* in respective FIGS. 17, 25, 33, and 41.

The T33 pulse is applied to the OR-circuit 693 in FIG. 22 and the OR-circuit 734 in FIG. 17 thereby to transfer the content of the out counter 680 and the boundary counter (BC–2) 705 to the comparator 1020 in FIG. 24. If an equality is found by the comparator 1020, a positive signal on the line 1025 conditions the AND-circuit 1054 in FIG. 23 to pass the delayed T33 pulse from the delay circuit 1074 through the OR-circuit 1091 to reset the flip-flop 1094 in FIG. 24. A positive signal from the one output side of this flip-flop on the line 1102 is supplied to the AND-circuits 716 and 716*a* through 715*c* in respective FIGS. 17, 25, 33, and 41.

The T34 pulse is supplied to the OR-circuit 693 in FIG. 22 and the OR-circuit 733 in FIG. 21 to transfer the content of the out counter 680 and the content of the boundary counter 704 to the comparator 1020 in FIG. 24. If an equality is found by the comparator 1020, a positive signal on the line 1025 conditions the AND-circuit 1050 to pass the delayed T34 pulse from the delay circuit 1070 through the OR-circuit 1090 to set the flip-flop 1093. A positive signal from the one output side of the flip-flop 1093 on the line 1101 is supplied to the AND-circuits 715 and 715A through 715C in respect to FIGS. 17, 25, 33, and 41.

The T35 pulse is supplied through the OR-circuit 682 in FIG. 22 to increment the out counter 680 on its next consecutive higher value, and the T35 pulse is applied also to the the AND-circuits 715 through 717 in FIG. 17. If anyone of the AND-circuits 715 through 717 is conditioned by a positive signal from the one output side of the respective flip-flops 1093 through 1095, such AND circuit passes the positive T35 pulse to the associated one of the boundary counters 704 through 706. Pulses from the AND-circuits 715 through 717 increment the associated boundary counters 704 through 706. It is pointed out that each one of the boundary counters 704 through 706 is incremented if, and only if, it holds a value equal to the content of the associated out counter 680 at the time a search is made for a task word in the table 654. These boundary counters may hold a value which is greater than the value held in the associated out counter 680, but they are not permitted to hold a value less than the value held in the associated out counter 680. Upon termination of the pulse T35, the single-shot 935 reverts to its stable state and supplies a positive going signal through the OR-circuit 1010 in FIG. 36 to operate the single-shot 951 to generate the T51 pulse described hereinafter.

The pulses T36 through T40 perform the same function with respect to the table 653 in FIG. 30 that the pulses T31 through T35 performed with respect to the table 654 in FIG. 22. If an available task word is found in the table 653 as the result of the search operation described above, then the pulse T36 operates the set of gates 688*a* in FIG. 30 to transfer the available task word from an address in the table 653 specified by the out counter 680*a* along the cable 690 to the task hold out register 1500 in FIG. 51. The pulse T36 is supplied through the OR-circuit 1372 in FIG. 48 to operate the set of gates 1362 to transfer the Q value of ¼ from the register 1352 through the set of OR-circuits 1380 to the Q value hold register 1381. The T36 pulse is supplied through the OR-circuit 1096 in FIG. 24 to reset the flip-flops 1093 through 1095.

The pulse T37 is supplied through the OR-circuit 693*a* in FIG. 30 to operate the set of gates 691*a* to transfer the content of the out counter 680*a* on the cable 692*a* through the set of OR-circuits 1022 in FIG. 24 to the comparator 1020. The T37 pulse is supplied also through the OR-circuit 753*a* in FIG. 25 to operate the set of gates 732*a* to transfer the content of the boundary counter 706*a* through the set of OR-circuits 736*a* in FIG. 29 along the cable 740*a* through the set of OR-circuits 1021 in FIG. 24 to the comparator 1020. If an equality is not found, no further action takes place. If equality is found by the comparator 1020, a positive signal on the line 1025 conditions the AND-circuit 1059 in FIG. 23 to pass the delayed T37 pulse from the delay circuit 1079 through the OR-circuit 1092 to set the flip-flop 1095. A positive signal from the one output side of the flip-flop 1095 is supplied on the line 1103 to the AND-circuits 717, and 717*a* through 717*c* in respective FIGS. 17, 25, 33, and 41.

Figure 29:
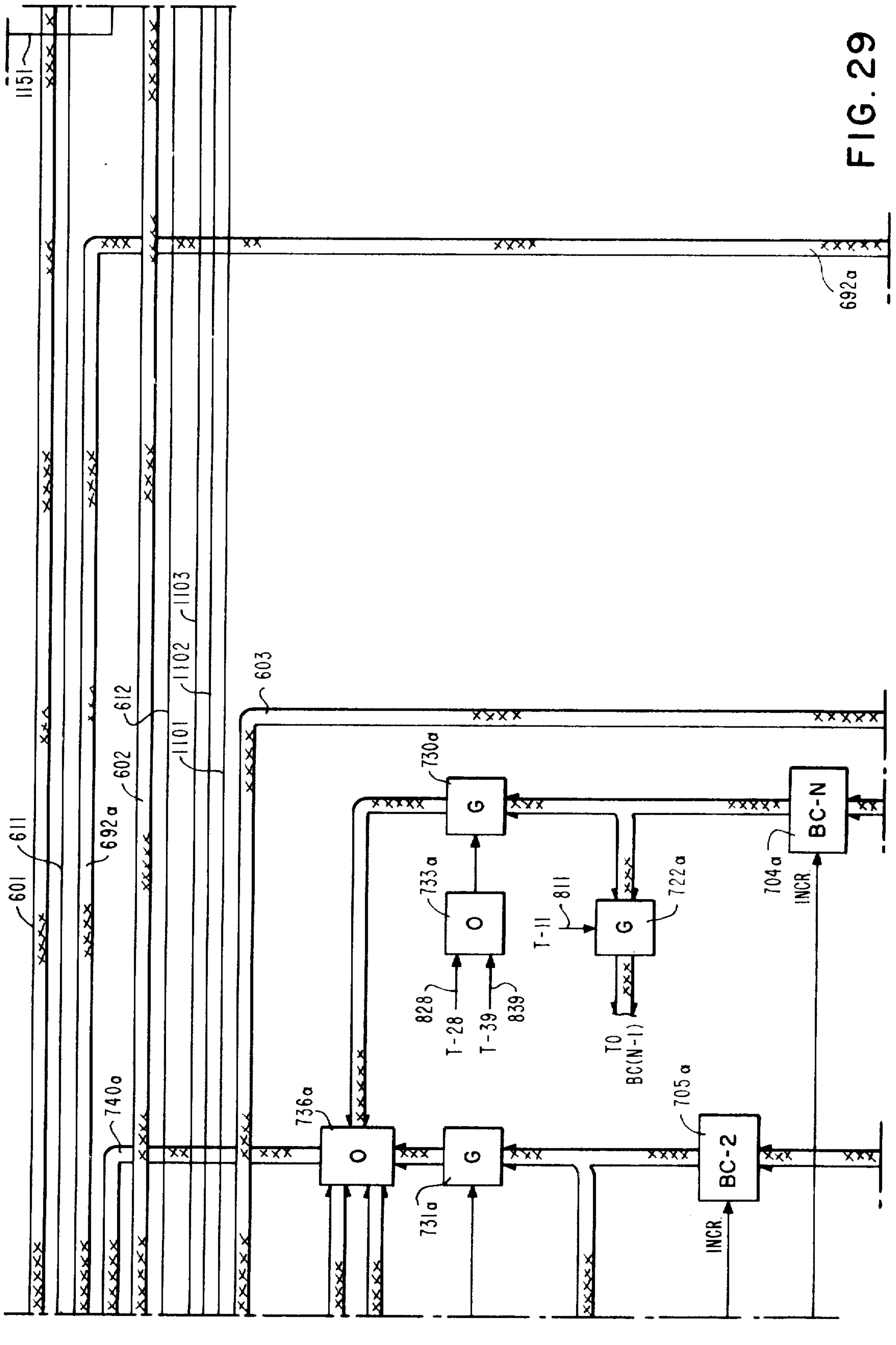

The pulse T38 is supplied to the OR-circuit 693*a* in FIG. 30 and the OR-circuit 793*a* in FIG. 25 to transfer the content of the out counter 680*a* in FIG. 30 and the boundary counter 705*a* in FIG. 29 to the comparator 1020 in FIG. 24. If a comparison is reached, the AND-circuit 1055 in FIG. 23 is conditioned to pass the delayed T38 pulse from the delay circuit 1075 through the OR-circuit 1091 to set the flip-flop 1094 which thereby supplies a positive signal on the line 1102 which conditions the AND-circuits 716 and 716*a* through 716*c* as explained earlier.

The T39 pulse is applied to the OR-circuit 693*a* in FIG. 30 and the OR-circuit 733*a* in FIG. 29 to transfer the content of the out counter 680*a* and the content of the boundary counter 704*a* to the comparator 1020 in FIG. 24. If a comparison is reached, the AND-circuit 1051 in FIG. 23 passes the delayed T39 pulse through the OR-circuit 1090 to set the flip-flop 1093 in FIG. 24 which thereby conditions the AND-circuits 715 and 715*a* through 715*c*.

The T40 pulse is supplied through the OR-circuit 682*a* in FIG. 30 to increment the out counter 680*a*, and the T40 pulse is applied also to the AND-circuits 715*a*, 716*a* and 717*a* in FIG. 25. Positive signals passed by these AND circuits increment the associated boundary counters 704*a*, 705*a*, and 706*a*. Upon termination of the T40 pulse, the single-shot 940 in FIG. 40 reverts to its stable state and supplies a positive going signal through the OR-circuit 1010 in FIG. 36 to operate the single-shot 951 thereby to generate the T51 pulse the function of which is described subsequently.

If an available task word is found in the table 652 in FIG. 38 during a search operation, as described above, then pulses T41 through T45 are generated. The pulse T41 operates the set of gates 688*b* in FIG. 38 to transfer the available task word from an address in the table 652 specified by the out counter 680*b* along the cable 690 to the task hold out register 1500 in FIG. 51. The pulse T41 is supplied through the OR-circuit 1373 in FIG. 48 to operate the set of gates 1363 to transfer the Q value of ⅛ from the register 1353 through the OR-circuit 1380 to the Q value hold register 1381. The pulse T41 is supplied through the OR-circuit 1096 in FIG. 24 to reset the flip-flops 1093 through 1095.

The pulse T42 is supplied through the OR-circuit 693*b* in FIG. 38 and the OR-circuit 735*b* in FIG. 33 to transfer the content of the out counter 680*b* and the content of the boundary counter 706*b* to the comparator 1020 in FIG. 24. If an equality is found by the comparator 1020, the AND-circuit 1061 in FIG. 23 is conditioned to pass the delayed T42 pulse from the delay circuit 1080 through the OR-circuit 1092 to set the flip-flop 1095 and thereby condition the AND-circuit **717*b*** in FIG. 33.

The pulse T43 is supplied through the OR-circuit **693*b* in FIG. 38 and the OR-circuit 734*b* in FIG. 33 to transfer the content of the out counter 680*b* in FIG. 38 and the boundary counter 705*b* in FIG. 37 to the comparator 1020 in FIG. 24. If an equality is found by the counter 1020, the gate 1056 in FIG. 23 is conditioned to have passed the delayed T43 pulse through the OR-circuit 1091 to set the flip-flop 1094 thereby to condition the AND-circuit 716*b*** in FIG. 33.

The T44 pulse is applied to the OR-circuit **693*b* in FIG. 38 and the OR-circuit 733*b* in FIG. 37 to transfer the content of the out counter 680*b* and the content of the boundary counter 704*b* to the comparator 1020 in FIG. 24. If an equality is found, the comparator 1020 conditions the AND-circuit 1052 in FIG. 23 to pass the delayed T44 pulse from the delay circuit 1072 through the OR-circuit 1090 to set the flip-flop 1093 and thereby condition the AND-circuit 715*b* in FIG. 33**.

The T45 pulse is supplied through the OR-circuit **682*b* in FIG. 38 to increment the out counter 680*b*, and it is supplied through the conditioned ones of the AND-circuits 715*b*, 716*b*, and 717*b* in FIG. 33 to increment the associated boundary counters 704*b* and 705*b* in FIG. 37 and the boundary counter 706*b* in FIG. 33. When the T45 pulse terminates, the single-shot 945 in FIG. 43 reverts to its stable state and supplies a positive going signal through the OR-circuit 1010 in FIG. 36 to the single-shot 951 thereby to generate the T51** pulse.

When an available task word is found in the table 651 in FIG. 46 by a search operation, as described above, the pulses T46 through T50 are generated. The T46 pulse operates the set of gates **688*c* in FIG. 46 to transfer the available task word from an address in the table 651 specified by the out counter 680*c*, and this task word is supplied along the cable 690 to the task hold out register 1500 in FIG. 51. The T46 pulse is supplied also through the OR-circuit 1374 in FIG. 48 to operate the set of gates 1364 thereby to transfer the Q value of 1/16 from the register 1354 through the set of OR-circuits 1380 to the Q value hold register 1381. The T46 pulse is supplied also through the OR-circuit 1096 in FIG. 24 to reset the flip-flops 1093 through 1095**.

The T47 pulse is applied to the OR-circuit **693*c* in FIG. 46 and to the OR-circuit 735*c* in FIG. 41 to transfer the content of the out counter 680*c* in FIG. 46 and the content of the boundary counter 706*c* in FIG. 41 to the comparator 1020 in FIG. 24. If an equality is found by the comparator 1020, the AND-circuit 1061 in FIG. 23 passes the delayed T47 pulse from the delay circuit 1081 through the OR-circuit 1092 to set the flip-flop 1095 which thereby conditions the AND-circuit 717*c*** in FIG. 33.

The T48 pulse is applied to the OR-circuit **693*c* in FIG. 46 and the OR-circuit 734*c* in FIG. 41 to transfer the content of the out counter 680*c* in FIG. 46 and the content of the boundary counter 705*c* in FIG. 45 to the comparator 1020 in FIG. 24. If an equality is found by the comparator 1020, the AND-circuit 1057 in FIG. 23 passes the delayed T48 pulse from the delay circuit 1077 through the OR-circuit 1091 to set the flip-flop 1094 which thereby conditions the AND-circuit 716*c*** in FIG. 41.

The T49 pulse is applied to the OR-circuit **693*c* in FIG. 46 and the OR-circuit 733*c* in FIG. 45 to transfer the content of the out counter 680*c* in FIG. 46 and the content of the boundary counters 704*c* in FIG. 45 to the comparator 1020 to FIG. 24. If an equality is found by the comparator 1020, the AND-circuit circuit 1053 in FIG. 23 is conditioned to pass the delayed T49 pulse from the delay circuit 1073 through the OR-circuit 1090 to set the flip-flop 1093 which thereby conditions the AND-circuit 715*c* in FIG. 41**.

The T50 pulse is supplied through the OR-circuit **682*c* in FIG. 46 to increment the out counter 680*c*, and the T50 pulse passes through the conditioned ones of the AND-circuits 715*c*, 716*c* and 717*c* in FIG. 41 to increment the associated boundary counters 704*c* and 705*c* in FIG. 45 and the boundary counter 706*c* in FIG. 41. When the T50 pulse terminates, the single-shot 950 in FIG. 44 supplies a positive going signal through the OR 1010 in FIG. 36 to the single-shot 951 thereby to generate the T51** pulse.

It is pointed out by way of summary at this point that the available task word from a given one of the tables 651 through 654 is stored in the task hold out register 1500 in FIG. 51, and the out counter is incremented. Also, the boundary counters of the associated table are incremented, if necessary, to maintain their content equal to the content of the associated out counter. If any associated boundary counter has a content greater in value than the control of the associated out counter, it is not incremented.

The delta T51 pulse is applied to the gates 1932 and 1934 in FIG. 19 to test the state of the flip-flop 1921. If the flip-flop 1921 is in the zero state, representing the first priority case, the gate 1932 passes a pulse on the line 999 to the single-shot 957 thereby to generate a T57 pulse. If the T clock, the third priority case, has priority, then the flip-flop 1921 is in the one state, and the gate 1934 passes the T51 pulse on the line 996 through the OR-circuit 1000 in FIG. 36 to the single-shot 992 thereby to generate the T52 pulse.

The T52 pulse is applied to the gates 1945 and 1946 in FIG. 19 to sample the state of the flip-flop 1944. It is recalled that this flip-flop is set to the one state by a positive signal from the AND-circuit 1943 as explained hereinabove. If the flip-flop 1944 continues in the one state, the T52 pulse passes through the gate 1946 on the line 997 to the single-shot 953 in FIG. 40 thereby to generate the T53 pulse. The T53 pulse is not used, but when the T53 pulse terminates, the single-shot 953 in FIG. 40 reverts to its stable state and supplies a positive going signal through the OR-circuit 1000 to the single-shot 952 thereby to generate another T52 pulse. The T52 pulse is applied again to the gates 1945 and 1946 in FIG. 19 to sample the state of the flip-flop 1944, and the process of regenerating T52 and T53 pulses continues as long as the flip-flop 1944 remains in the one state. This is a holding action which delays the microprogram of the T clock until the S clock 1450 in FIGS. 48 and 49 completes its operating cycle and finds the processor wording on the task word with the lowest Q value from the data in the processor Q value table 1385 in FIG. 48. When the S clock completes its operating cycle, the lowest Q value in the table 1385 in FIG. 48 is disposed in the minimum Q value register 1434 in FIG. 49, and the address of the minimum Q value in the table 1385 is held in the hold search counter 1421 which is transferred at S7 time through the gates 1422 in FIG. 49 through the set of OR-circuits 1410 to the search counter 1411. The S8 pulse from the single-shot 1458 in FIG. 48 is supplied on the line 1468 to reset the flip-flop 1944 in FIG. 19. The next T52 pulse then passes through the gate 1945 on the line 998 to the single-shot 954 in FIG. 40 thereby to generate a T54 pulse.

The T54 pulse is supplied through the OR-circuit 1490 in FIG. 51 to the AND-circuits 1486 through 1488. The register in the table 1385 specified by the search counter 1411 identifies which processor is working on the task word with the minimum Q value, and signals representing the identify of this processor are supplied on the cable 1480 to the decoder 1481 in FIG. 51. The decoder in turn supplies a positive signal on one of the lines 1482 to 1484 to condition the associated one of the AND-circuits 1486 through 1488, and such AND-circuit passes the positive T54 pulse on the associated one of the lines 30 through 32 which interrupts the selected processor and transfers or allocates to it a task word which passes from the task hold out register 1500 through the associated one of the sets of gates 1494 through 1496 which is operated by a positive signal on one of the lines 30 through 32. Thus, the first task word is transferred from the selected one of the tables 651 through 654 to the processor working on a task word having the lowest service ratio or Q value.

The pulse T54 is supplied through the OR circuit 1386 in FIG. 48 to the set of gates 1382, and the Q value of the task word allocated or assigned to the selected processor is transferred from the Q value hold register 1381 to the address in the processor Q value table 1385 in FIG. 49 specified by the search counter 1411. The identity of the selected processor was obtained from this address. The T54 pulse sets the left most bit, the highest order bit, of the Q value in the selected register to a binary one. This makes the Q value of the selected register so large that this Q value is effectively removed from subsequent search operations to find the minimum Q value in the table 1385 for the remaining period of time until the next T pulse occurs on the line 970 in FIG. 35. In essence this prevents a processor from being interrupted more than once during a time slot defined by the T pulses on the line 970 in FIG. 35, and a task word, once allocated, is guaranteed processor time equal to such time slot regardless of its service ratio or Q value.

The T55 pulse is generated automatically when the T54 pulse terminates, and the T55 pulse on the line 855 decrements the processor counter 1590 in FIG. 47.

The T56 pulse is generated automatically when the T55 pulse terminates, and the T56 pulse is applied to the gates 1592 and 1593 in FIG. 47 to sample the state of the decoder 1591. If the decoder indicates that the processor counter holds a value which is not zero, then the gate 1593 passes the T56 pulse through the OR-circuit 967 in FIG. 35 to the single-shot 919 thereby to generate a T19 pulse. The microprogram of the T clock proceeds from this point through to a T56 pulse again, and this process is repeated until all processors have been interrupted and a new task word allocated to each at which time the processor counter 1590 is decremented to the point where it holds a value of zero. When this condition is reached, the decoder 1591 in FIG. 47 conditions the gate 1592 to pass the T56 pulse through the OR-circuit 1001 in FIG. 44 to the single-shot 964 thereby to generate a T64 pulse which resets the flip-flop 1802 in FIG. 15 thereby signifying that the T clock is not running.

Returning again to the flip-flop 1921 in FIG. 19, the case is discussed next where this flip-flop is reset when its state is sampled by the T51 pulse. First, the events which cause the flip-flop 1921 to be reset are discussed. When a processor is idle, it sends a positive signal on the associated one of the lines 16 through 18 in FIG. 50 to set the associated one of the flip-flops 1601 through 1603. When any one or more of these flip-flops is set, a positive signal is supplied through the OR-circuit 1624 in FIG. 47 along the line 1625 to the AND-circuit 1861 in FIG. 16. A positive signal on the line 1625 represents the first priority case discussed above, and if the flip-flops 1801 through 1805 in FIG. 15 are reset, then the AND-circuit 1806 is conditioned to pass a positive signal to the gate 1808. A positive signal from the AND-circuit 1806 signifies that the IP clock, the T clock, the NT clock and the BT clock are not running, and a priority selection may be made. In this case a positive P1 pulse on the line 1831 passes through the gate 1808 in FIG. 15 and along the line 1810 to operate the single-shot 1823 thereby to generate a P3 pulse which passes through the AND-circuit 1861 and sets the flip-flop 1881. The positive P3 pulse also sets the flip-flops 1921 through 1924. The positive signal from the AND-circuit 1861 passes through the OR-circuit 1880 to operate the single-shot 1824 in FIG. 20 which thereby provides a positive P4 pulse. The P4 pulse passes through the AND-circuit 1901 and resets flip-flops 1882 through 1884 in FIG. 19. When the P4 pulse terminates, a P5 pulse is automatically generated, and it passes through the AND-circuit 1911 to reset the flip-flop 1921.

The last T59 pulse, generated by the microprogram of the T clock, started the IP clock by supplying a positive signal through the OR-circuit 1571 in FIG. 47, and the IP clock commenced its cycle. When the IP clock commences its cycle, the IP–1 pulse resets the flip-flops 1631 through 1633 in FIG. 50. When the IP–1 pulse terminates, the IP–2 pulse is automatically generated, and it passes through the AND-circuits 1611 through 1613 in FIG. 50 to operate the single-shot 1553 which in turn reactivates the single-shot 1552. This process is repeated until an idle processor supplies a positive signal on one of the lines 16 through 18 at which time the IP–2 pulse passes through one of the AND-circuits 1621 through 1623 because an associated one of the flip-flops 1601 through 1603 is set by the idle processor. Consequently, a positive signal from one of the AND-circuits 1621 through 1623 in FIG. 50 is supplied through the OR-circuit 1634 in FIG. 47 and the OR-circuit 1573 to operate the single-shot 1554 thereby to generate an IP–4 pulse.

A positive IP–4 pulse on the line 1564 is supplied to the gates 1931 and 1933 in FIG. 19 to sample the state of the flip-flop 1921. It is assumed that the flip-flop 1921 is in the zero state, as explained above, and the positive IP–4 pulse passes through the gate 1931 on the line 1692 to operate the single-shot 1556 in FIG. 47 thereby to generate an IP–6 pulse. The IP–6 pulse is applied to the AND-circuits 1661 and 1671 in FIG. 50. If the flip-flop 1631 is in the one state, the AND-circuit 1661 passes the positive IP–6 pulse through the OR-circuits 1635 and 1636 to reset the respective flip-flops 1632 and 1633. If the flip-flop 1631 is in the zero state, the AND-circuit 1671 passes the positive IP–6 pulse to the AND-circuits 1662 and 1672. If the flip-flop 1632 is in the one state, the AND-circuit 1662 passes the positive pulse through the OR-circuit 1636 to reset the flip-flop 1633. If the flip-flop 1632 is in the zero state, then the AND-circuit 1672 passes the positive signal to intervening stages, not shown, to perform similar sampling and resetting operations. This insures that one, and only one, of the flip-flops 1631 through 1633 remains in the zero state after the IP–6 pulse terminates thereby guaranteeing that one, and only one, idle processor is given access to the encoder 1663 in FIG. 51 at any given instant of time. The IP–7 pulse is automatically generated when the IP–6 pulse terminates, and the IP–7 pulse passes through the given one of the AND-circuits 1651 through 1653 which is conditioned, thereby to reset the associated one of the flip-flops 1601 through 1603 to terminate this particular search operation by the IP clock. The encoder 1663 in FIG. 51 supplies output signals to the set of gates 1680 which represent the identity of the idle processor. When the IP–7 pulse terminates, the single-shot 1557 in FIG. 47 reverts to its stable state and supplies a positive going signal on the output line 1701 through the OR-circuit 967 in FIG. 35 to the single-shot 1919 thereby to generate a T19 pulse. It is pointed out that the T clock is idle at the time the positive signal on the line 1701 initiates the T19 pulse. It is pointed out further that the request by an idle processor for a task word cannot be honored, as pointed out earlier, unless the flip-flop 1802 in FIG. 15 is reset thereby to signify the T clock is idle. Consequently, it is permissable for the IP clock to initiate a T19 pulse and cause the microprogram of the T clock to proceed in the manner explained hereinabove. When the microprogram reaches the point where a T51 pulse is generated, the stage of the flip-flop 1921 is sampled. For this purpose the T51 pulse is applied to the gates 1932 and 1934 in FIG. 19. Since the flip flop 1921 is in the zero state, the T51 pulse passes through the gate 1932 on the line 999 to operate the single-shot 957 in FIG. 40 thereby to generate a T57 pulse. It is pointed out that the microprogram of the T clock branches from T51 to T57 when servicing a request from an idle processor.

The T57 pulse is applied to the set of gates 1680 in FIG. 51 to transfer the identity of the selected idle processor from the encoder 1663 through the set of OR-circuits 1410 in FIG. 48 to the search counter 1411. The search counter 1411 operates the decoder 1412 to select a particular register which contains the identity of the requesting idle processor. When the T57 pulse terminates, the T58 pulse is automatically generated.

The T58 pulse is supplied through the OR-circuit 1490 in FIG. 51 to the AND-circuits 1486 through 1488. The identity of the requesting idle processor is supplied from the table 1385 in FIG. 48 along the cable 1480 to the decoder 1481 in FIG. 51, and it conditions the appropriate one of the AND-circuits 1486 through 1488 to pass the positive T58 pulse. The positive signal from one of the AND-circuits 1486 through 1488 on the respective one of the lines 30 through 32 interrupts the selected idle processor and allocates or transfers the task word in the task holdout register 1500 through the selected one of the sets of gates 1494 through 1496 to the selected idle processor. The T58 pulse is supplied also through the OR-circuit 1386 in FIG. 48 to the set of gates 1382 to transfer the Q value in the Q value hold register 1381 to the processor Q value table 1385 where the Q value is stored in the register associated with the selected idle processor as specified by the search counter 1411. It is pointed out that the higher order bit of the selected register in the table 1385 is not set to the one state. This is because the S clock 145 is not used to find the processor working on the lowest Q value when allocating task words to idle processors. Instead, the idle processor selects the address used in the table 1385. When the T58 pulse terminates, the T59 pulse is generated automatically.

The T59 pulse is supplied through the OR-circuit 1571 in FIG. 47 to restart the IP clock. Requests from idle processors are handled individually, one at a time in turn, until each such processor is allotted a control word. In this connection it is pointed out that the first available task word is allocated to an idle processor. The objective is to avoid losing valuable computer time, and it is desirable to make the allocation as soon as possible even if the service ratio of the first task word found is very low. For example, a word from the table 651 in FIG. 46 may be allocated to an idle processor, if it is the most readily available task word, even though the service ratio of such task word may be very low. It is pointed out, however, that the search routine for task words carried out by the allocation algorithm in response to pulses T19 through T30 commences first with the oldest class in the Q 1/2 table 654, then the oldest class of the Q 1/4 table 653, followed by the oldest class of the Q 1/8 table 652 and finally the oldest class in the Q 1/16 table 651. The oldest class is pointed to in each table by its associated binary counter No. 1. This search is carried out by the microprogram in response to pulses T19 through T22. If an available task word is not found by this search, than a search is conducted through these tables in the same order as before using the boundary counter No. 2 associated with each table in response to the pulses T23 through T26. If a task word is not found by this search, then the search is repeated again through these tables in the same order as before in response to pulses T27 through T30 using the associated boundary counter N associated with each table. If no task word is found as a result of this search, the T30 pulse passes through the gate 1175 in FIG. 28 along the line 1002 through the OR-circuits 1815 and 1816 in FIG. 15 to reset the flip-flops 1801 and 1802. This terminates the operation of the T clock because no task word is available, and the priority clock 1820 is released.

The pulses T60 through T63 are automatically generated when the respective pulses T8, T11, T14, and T17 terminate. When the pulses T8, T11, T14, and T17 terminate, the single shots 908 in FIG. 39, 911 in FIG. 39, 914 in FIG. 43, and 917 in FIG. 43 revert to their stable states and supply positive going signals to respective single-shots 960 through 963 in FIG. 44 thereby to generate respective pulses T60 through T63.

The pulse T60 is applied on the line 860 to the set of gates 701 in FIG. 18 to transfer the content of the in counter 670 through the set of OR-circuits 703 in FIG. 22 to the boundary counter 704 in FIG. 21. This transfer takes place in time immediately after the T8 pulse as part of the left shift operation of boundary counters discussed above.

Figure 26:
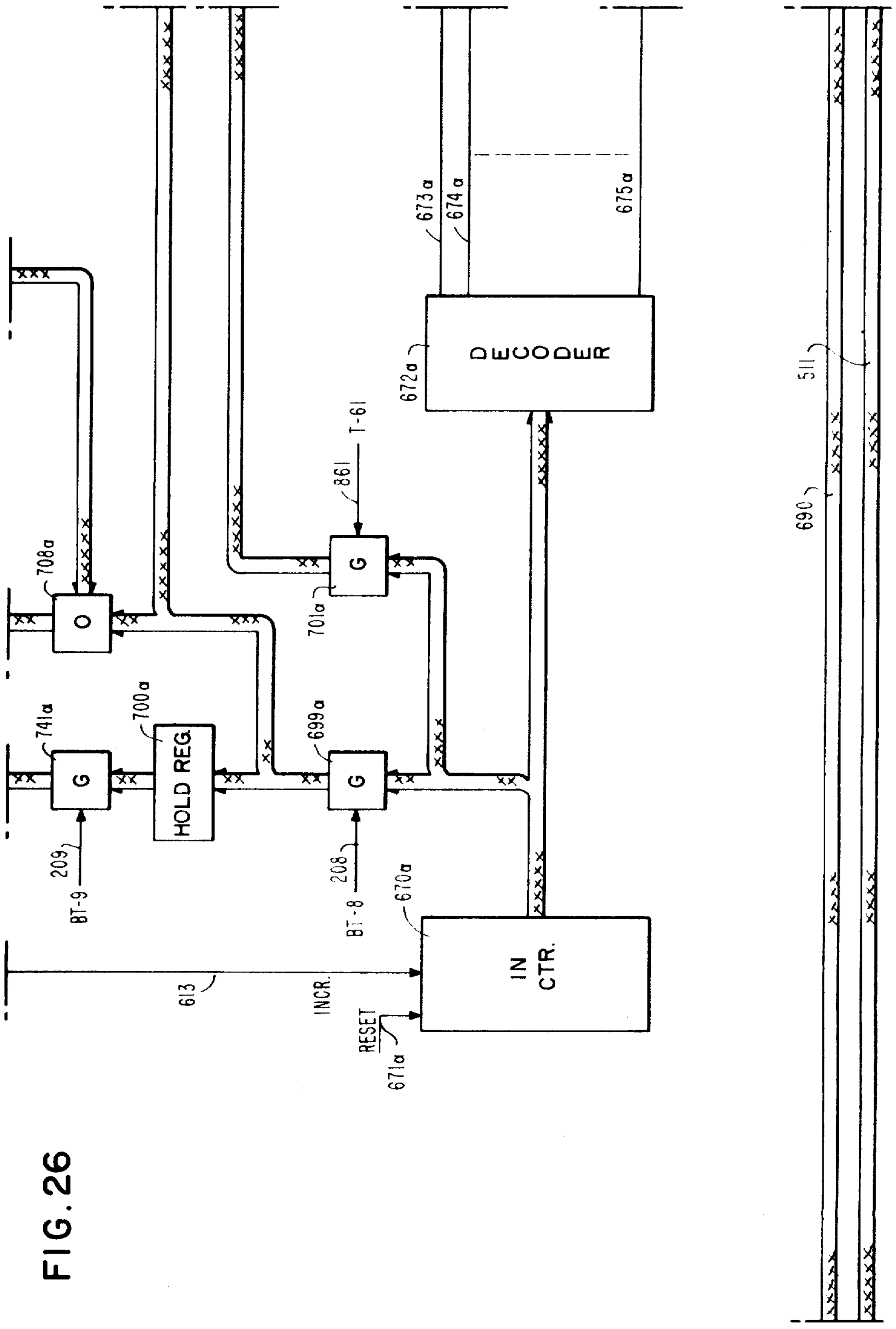

The positive pulse T61 is applied to the set of gates **701*a* in FIG. 26 to transfer the content of the in counter 670*a* through the OR-circuit 703*a* in FIG. 30 to the boundary counter 704*a* in FIG. 29**. This transfer takes place in time immediately after the T11 pulse as part of the left shift operation of the boundary counters.

The pulse T62 is applied to the set of gates **701*b* in FIG. 34 to transfer the content of the in counter 670*b* through the set of OR-circuits 703*b* in FIG. 38 to the boundary counter 704*b* in FIG. 37. This transfer takes place in time immediately after the T14** pulse as part of the left shift operation of the boundary counters.

The positive T63 pulse is applied to the set of gates **701*c* in FIG. 42 to transfer the content of the in counter 670*c* through the set of OR-circuits 703*c* in FIG. 46 to the boundary counter 704*c* in FIG. 45**. This transfer takes place in time immediately after the T17 pulse as part of the left shift operation of the boundary counters.

When the positive pulses T60 through T63 terminate, the associated single-shots 960 through 963 in FIG. 44 revert to their stable states, and each supplies a positive going signal through the OR-circuit 980 in FIG. 35 to the single-shot 918 thereby to generate a T18 pulse. The T18 pulse sets the processor counter 1590 in FIG. 47 to a value equal to the number of processors in the system, and the microprogram proceeds from this point to interrupt each processor in the system and allocate a new task word to each processor as explained hereinbefore. When the last processor is allocated a task word, the processor counter 1590 in FIG. 47 goes to zero, and the decoder 1591 conditions the gate 1592 to pass a positive T56 pulse through the OR-circuit 1001 in FIG. 44 to the single-shot 964 thereby to generate a T64 pulse.

The T64 pulse resets flip-flops 1801 and 1802 in FIG. 15, and the AND-circuit 1806 is conditioned to pass a positive signal to the gate 1808 which in turn passes the next positive P2 pulse on the line 1810 thereby to permit the P clock to carry out its cycle of operation to award priority, in the manner previously explained, upon request. The T64 pulse, therefore, serves to terminate the microprogram of the T clock. It is pointed out that the operation of the T clock to set the processor counter 1590 in FIG. 47, interrupt all processors in turn, and allocate new task words represents the third priority case discussed hereinbefore. For this third priority case the steps of the microprogram T19 through T56 of the T clock are repeated once for each processor in the system, and when the processor counter 1590 goes to zero a T64 pulse is generated to terminate the operation of the T clock. For the first priority case, on the otherhand, involving the allocation of task words to idle processors, the microprogram steps T19 through T51 and T57 through T59 are repeated once for each idle processor. In order to minimize the loss of processor time, task words in the registers 490 and 492 in FIG. 8 might be transferred directly to the task hold out register 1500 in FIG. 51, by means not shown, in response to a request by an idle processor for a task word. This prevents the loss of time occasioned by a search through the tables 651.

Figure 53:
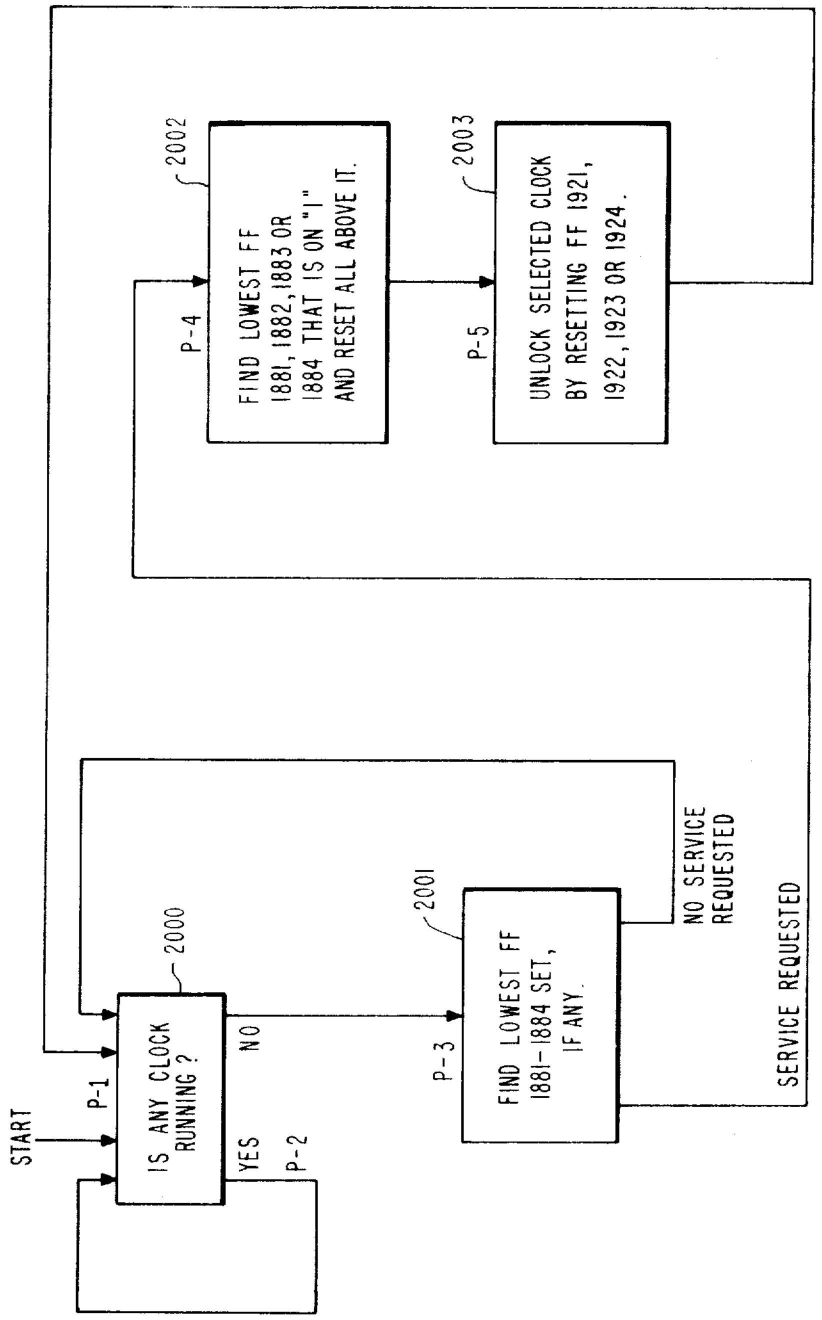
FIG. 53 shows a flow chart which is useful in explaining the operation of the priority clock.

Reference is made next to FIG. 53 which shows a flow chart useful in explaining the functions performed by the priority clock 1820 in FIGS. 16 and 20. The first step is to determine if any clock is running as indicated by the block 2000 in FIG. 53. If any clock is running, the P1 and P2 pulses are repetitively generated until all clocks are turned off. Then a P3 pulse is generated to sample the AND-circuits 1861 through 1864 and 1871 through 1874 in FIGS. 15 and 16 thereby to set the first one of the flip-flops 1881 through 1884 if a request for service is found. This step is indicated by the blocks 20001 in FIG. 53. If no one of the flip-flops 1881 through 1884 is set by this operation, no service is requested and a return is made to the block 2000 whereby the foregoing sequence of events is repeated. When one of the flip-flops 1881 through 1884 is set by a P3 pulse, this indicates that service is requested, and the next step is to find the first one of the flip-flops 1881 through 1884 which is set and reset all remaining flip-flops. This step is indicated by the block 2002 in FIG. 53. The next step is to unlock the selected clock, and this is done by a P5 pulse which is applied to the AND-circuits 911 through 914 in FIGS. 19 and 20 to reset the associated one of the flip-flops 1921 through 1924. The flip-flop which is reset conditions the gates on its zero output side which permits the next sampling pulse to unlock the selected clock. This step is indicated by the block 2003 in FIG. 53. When the P5 pulse terminates, the single shot 1825 in FIG. 20 reverts to its stable state and supplies a positive going signal through the OR-circuit 1826 in FIG. 16 to the single shot 1821 thereby to generate a P1 pulse and repeat the foregoing sequence of events.

Figure 58:
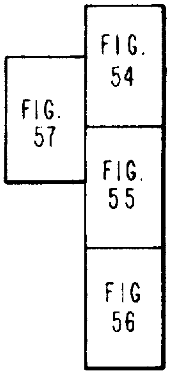
FIG. 58 illustrates the manner in which FIGS. 54 through 57 should be arranged.

Reference is made next to flow charts in FIGS. 54 through 57 which illustrate the steps of the task word scheduling algorithm performed by the BT clock. FIGS. 54 through 57 should be arranged as illustrated in FIG. 58. The microprogram starts with the block 2100 in FIG. 54 where it is determined whether or not the BT clock is locked out. If it is not locked out, the next determination is to find out if one of the AND-circuits 130 through 133 in FIG. 5 is conditioned. If not, a BT4 pulse is generated to terminate the operation of the BT clock. If one of the AND-circuits 130 through 133 in FIG. 5 is conditioned, then the in counter of the selected Q table is gated to the hold register and to all of the boundary counters as indicated by the block 2102. The next step shown by the block 2103 is to compare the hold register and the out counter of the selected Q table. If they are equal, this signifies that no new task words are available and a branch is made to BT4 to terminate the operation of the BT clock. If the hold counter is not equal to the out counter, the task word of the selected Q table pointed to by the out counter is transferred to the calculate register 570 in FIG. 10, and the appropriate Q value is gated from one of the registers 520 through 523 in FIG. 11 to the Q value portion of the calculate register 510. This operation is indicated by the block 2104 in FIG. 55.

Figure 54:
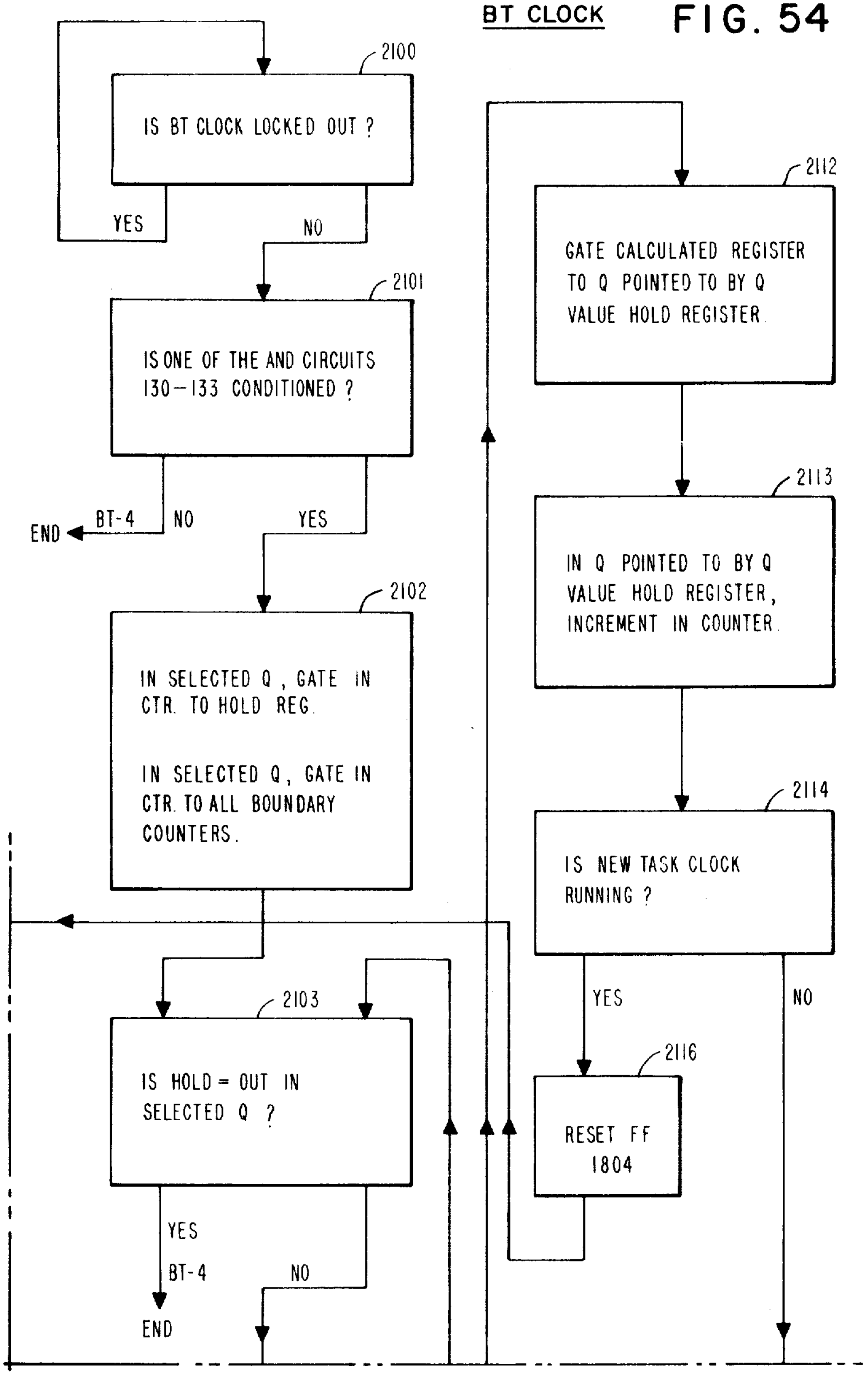
FIGS. 54 through 57 illustrate a flow chart which is useful in explaining the operation of the BT clock and the new task clock.
Figure 55:
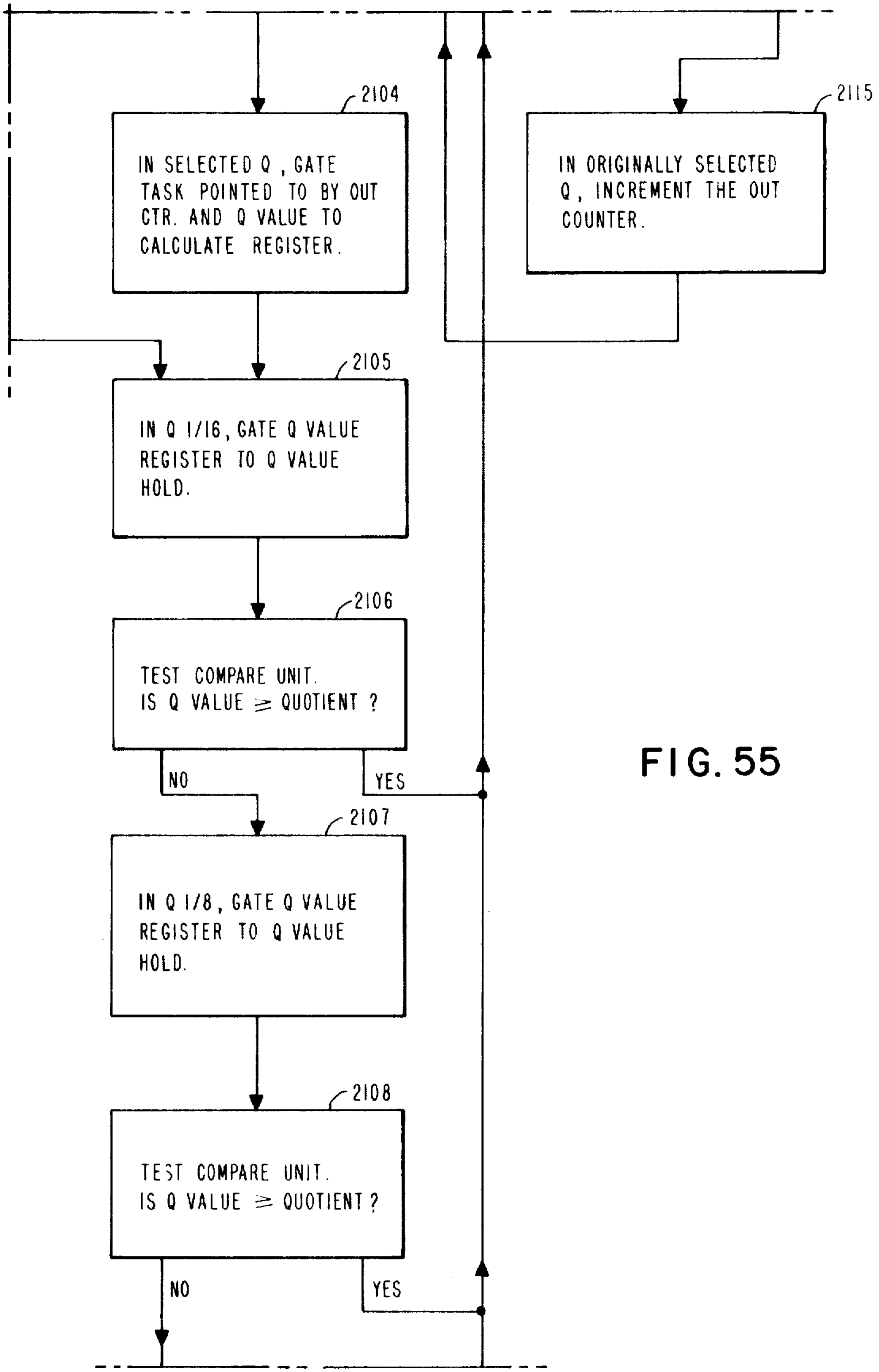
Figure 56:
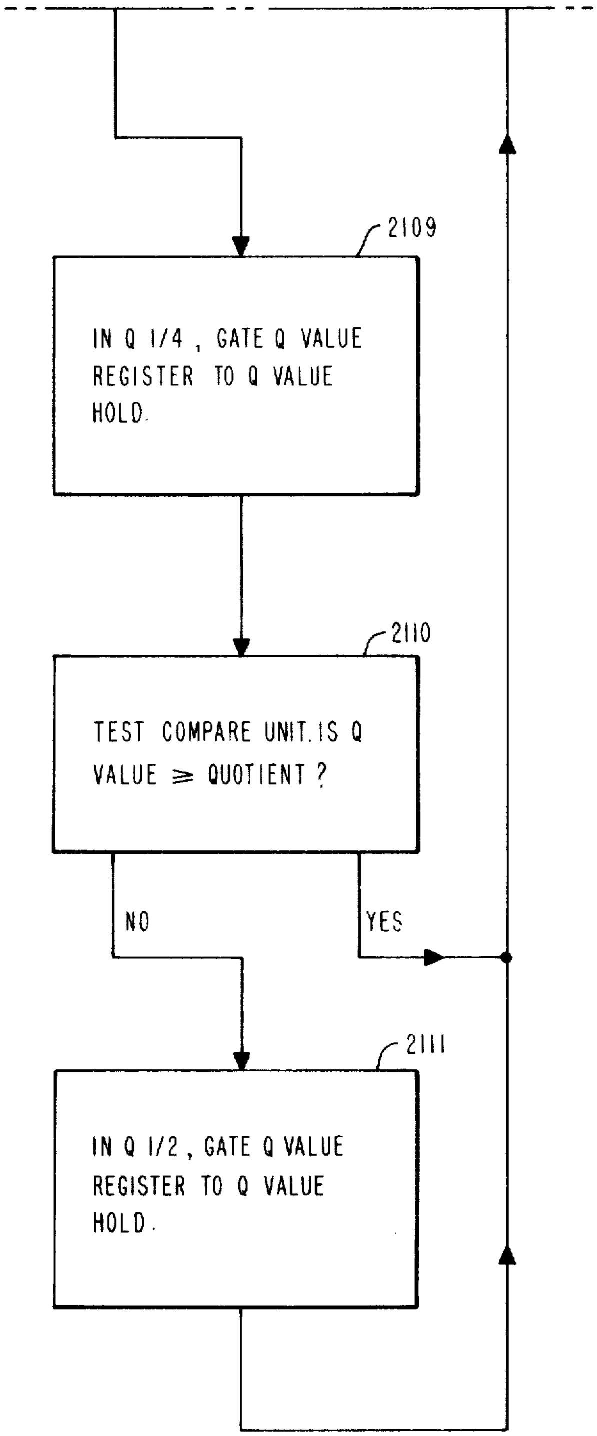

The next step in the scheduling algorithm is to transfer the Q value of 1/16 to the Q value hold register 1381 in FIG. 48 as indicated by the block 2105 in FIG. 55, and then the Q value is compared with the quotient from the divider 550 in FIG. 14. The comparison is made by the comparator 350 in FIG. 13. These steps are indicated by the blocks 2106 and 2107 in FIG. 55. If the value in the Q value hold register is not equal to or greater than the newly calculated service ratio as represented by the quotient, then the process is repeated using a Q value of ⅛ as indicated by the blocks 2107 and 2108 in FIG. 55. If the value in the Q value hold register is not equal to or greater than the quotient, the process is repeated by using the Q value of ¼ as indicated by the blocks 2109 and 2110 in FIG. 56. If the value in the Q value hold register is not equal to or greater than the quotient, then the Q value of ½ is transferred to the Q value hold register as shown by the block 2111 in FIG. 56, and the task word in the calculate register is stored in the Q table specified by the Q value hold register as indicated by the block 2112 in FIG. 54. If any of the compare operations in the blocks 2106, 2108, or 2110 determines that the value in the Q value hold register is equal to or greater than the quotient, then the task word in the calculate register is stored in the Q table indicated by the Q value hold register.

Next the in counter of the selected Q table is incremented as shown by the block 2113 in FIG. 54. Then the NT clock is checked to see if it is running as indicated by the block 2114 in FIG. 54. If the NT clock is not running, the microprogram proceeds to the block 2115 in FIG. 55, and the out counter associated with the Q table from which the task word was taken is incremented. The program then branches back to the block 2103 in FIG. 54 to repeat the process steps outlined in blocks 2103 through 2114. If the test on the NT clock in the block 2114 indicates that the NT clock is running, then the flip-flop 1804 in FIG. 15 is reset and the NT clock performs its functions shown in FIG. 57.

Figure 57:
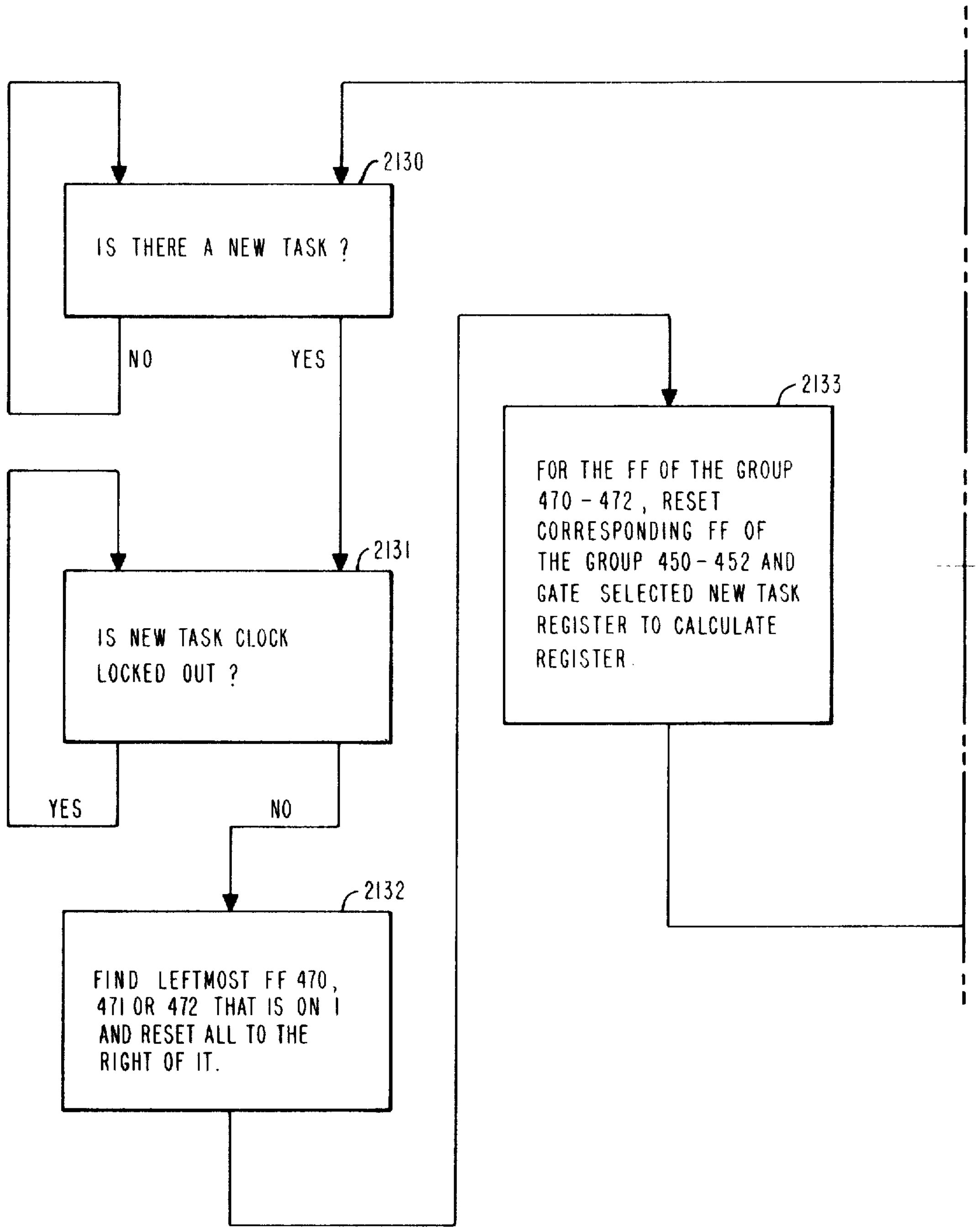
Figures 59, 65:
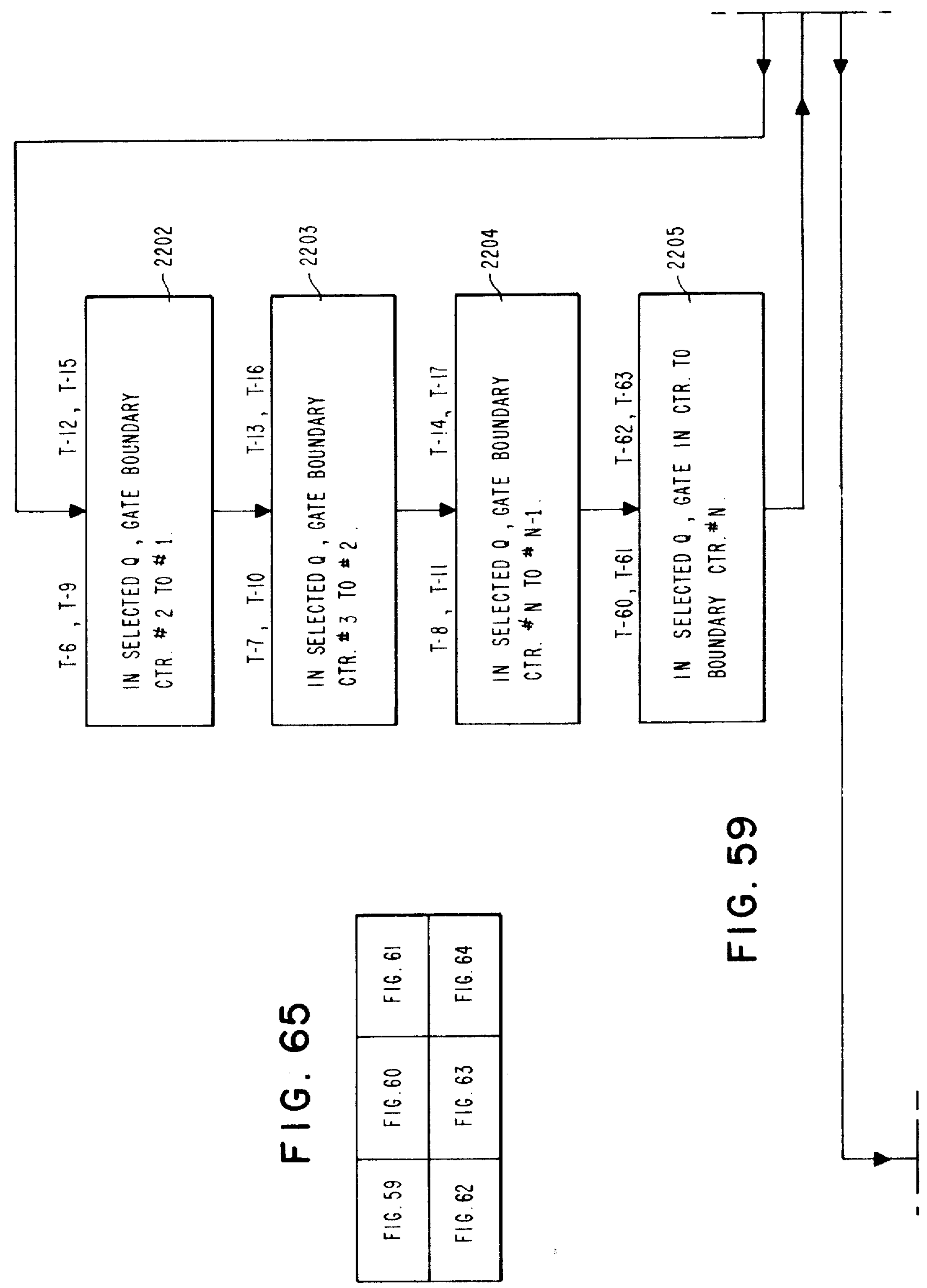
FIGS. 59 through 64 illustrate a flow chart which is useful in explaining the operation of T clock and the idle processor (IP) clock.
FIG. 65 illustrates the manner in which FIGS. 59 through 64 should be arranged.
Figure 60:
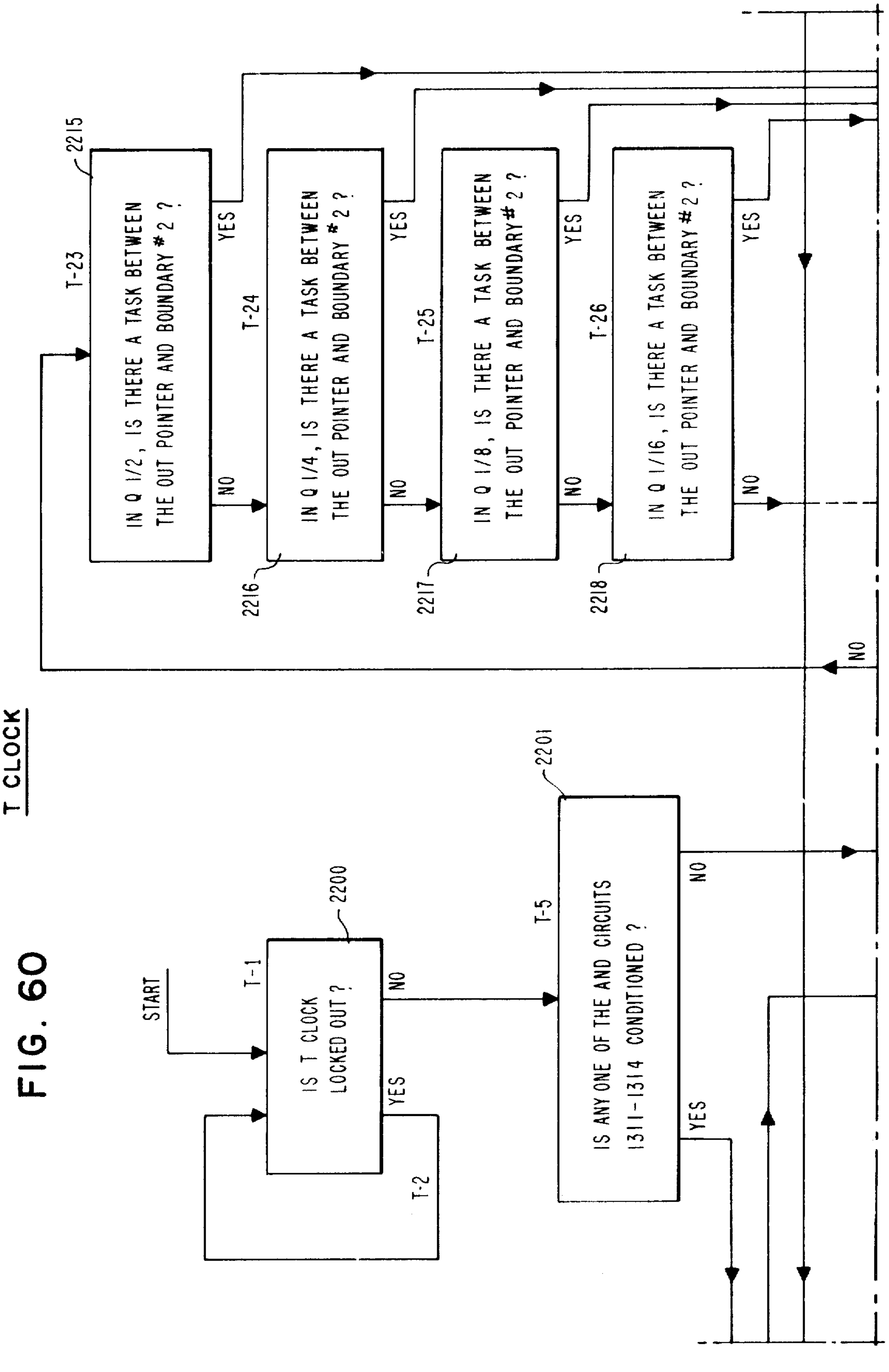

If there is a new task word available, this is indicated by the block 2130 in FIG. 57. The next step is to determine whether or not the new task clock is locked out as indicated by the block 2131. If not, the next step indicated in the block 2132 is to find the leftmost flip-flop of the group 470 through 472 in FIG. 7 which is set, and those flip-flops to the right of it are reset. Next the flip-flop in the group 450 through 452 in FIG. 7 which corresponds to the set one of the flip-flops 470 through 472 is reset simultaneously as the new task word is transferred to the calculate register 510 in FIG. 11. This operation is illustrated by the block 2133 in FIG. 57. The microprogram then branches through the block 2105 in FIG. 55 thereby to process the new task word through the steps outlined in the blocks 2104 through 2114 from which point the program continues.

Reference is made next to flow charts in FIGS. 59 through 64 which illustrate the steps of the task word allocation algorithm performed by the T clock. FIGS. 59 through 64 should be arranged as illustrated in FIG. 65. The starting point is the block 2200 in FIG. 60. If the T clock is not locked out, then a T5 pulse is generated, and as indicated in block 2201 it tests the AND-circuits 1301 through 1305 and 1311 through 1314 in FIG. 35 to determine if one of the AND-circuits 1311 through 1314 is conditioned. If so, a Q table is selected, and a microprogram is initiated to shift the boundary counters of the selected Q table to the left and gate the associated in counter to the associated binary counter N. These steps are indicated by the blocks 2202 through 2205 in FIG. 59. If one of the AND-circuits 1311 through 1314 is not conditioned, the program goes directly from the block 2201 in FIG. 60 to the block 2210 in FIG. 63 where the T18 pulse is generated and sets the processor counter 1590 in FIG. 47 to a value equal to the number of processors in the system. The T18 pulse also resets the leftmost bits in the processor Q value table 1385 to zero. Then the algorithm proceeds through a search routine for task words by comparing the boundary counter No. 1 with the out counter for each of the tables 654 through 651, and these steps are indicated by the blocks 2211 through 2214 in FIG. 63 using pulses T19 through T22. If no task words are found, the algorithm continues the search routine by comparing the boundary counter No. 2 and the out counter in each of the tables 654 through 651 utilizing pulses T23 through T26 as indicated by the blocks 2215 through 2218 in FIG. 60. If no task words are found, the search continues by comparing the boundary counter No. 3 and the out counter of respective tables 654 through 651 using pulses T27 through T30 as illustrated by the blocks 2219 through 2222 in FIG. 63. If no task words are bound, operation of the T clock is terminated by generating a T64 pulse as illustrated by the block 2222.

Figure 64:
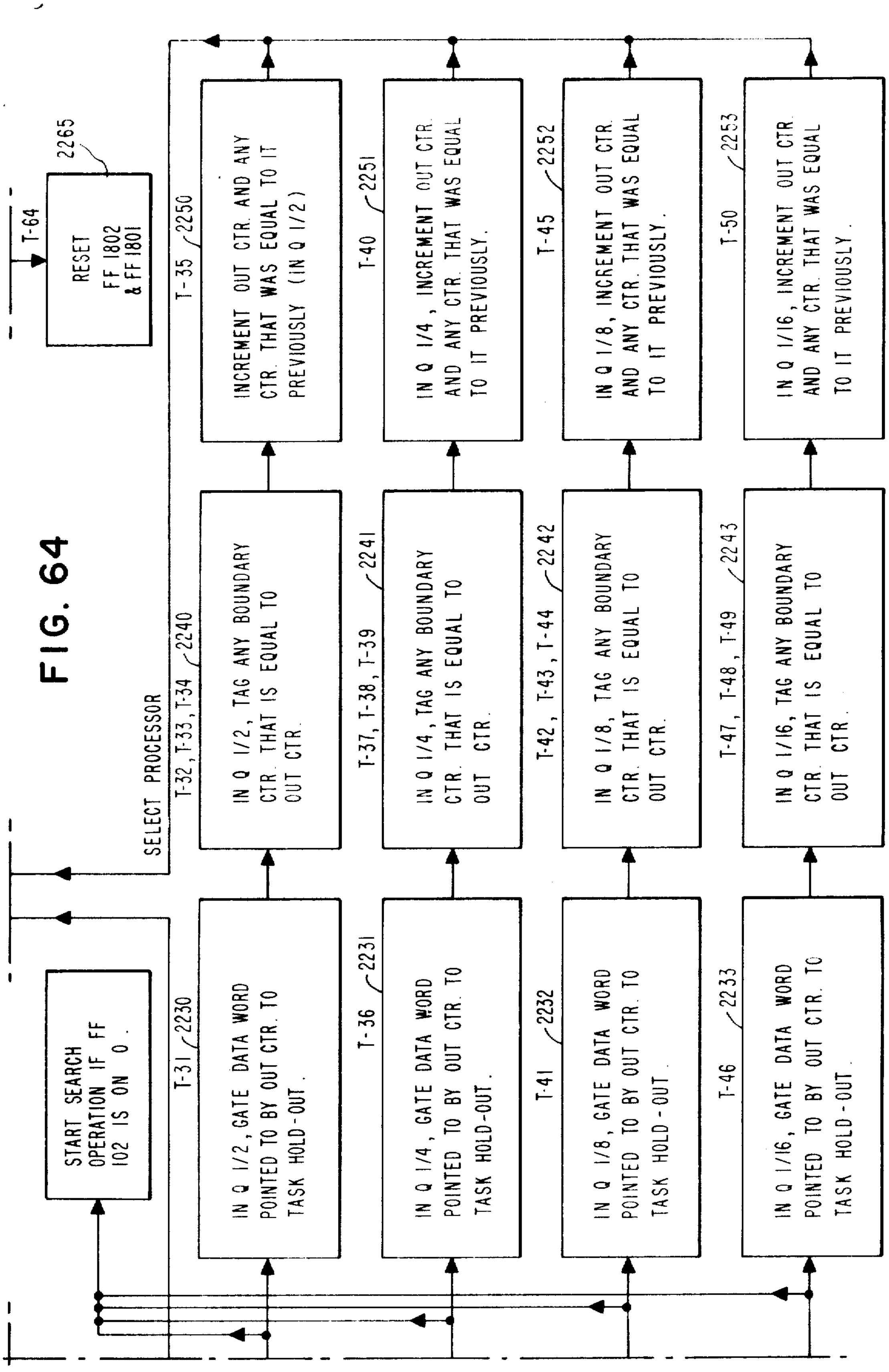

The first task word found by the search operation in the blocks 2211 through 2222 causes an associated one of the blocks 2230 through 2233 in FIG. 64 to gate the available task word from the given one of the tables 651 through 654 to the task holdout register 1500 in FIG. 51. This step of the algorithm is performed by a pulse T31, T36, T41, or T46 which is applied to an associated one of the sets of gates 688, 688*a*, 688*b*, or 688*c* in respective FIGS. 22, 30, 38, or 46. The next step in the algorithm is to identify the boundary counter used in the previous step as indicated by the block 2240 through 2243 in FIG. 64. Selected ones of the pulses T32 through T49 are employed, as indicated. The succeeding step in the algorithm is to increment the out counter and the identified boundary counter, and this step is performed by a pulse T35, T40, T45, or T50 as illustrated by the blocks 2250 through 2253 in FIG. 64.

Figure 61:
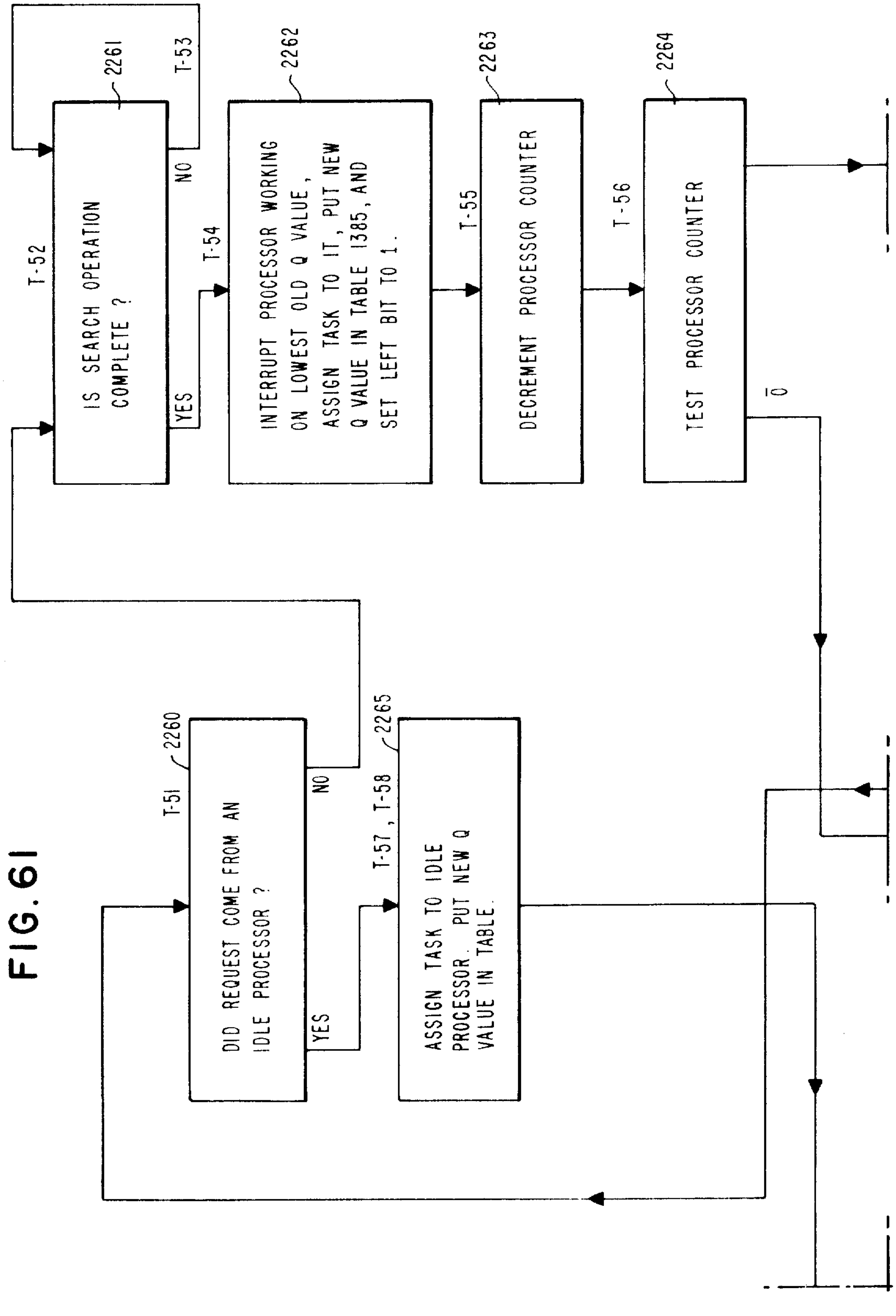

The next step in the allocation algorithm is to determine whether or not a request was made by an idle processor, and this step is performed by a T51 pulse as indicated by the block 2260 in FIG. 61. If a request was not made by an idle processor, a T52 pulse is generated to determine whether the S clock has completed its search for the processor working on the task word with the lowest service ratio or Q value, as indicated by the block 2261 in FIG. 61. If the search has not been completed, the T52 and T53 pulses are repetitively regenerated until the S clock completes its search at which time a T54 pulse is generated. The T54 pulse interrupts the processor working on the task with the lowest Q value, transfers the task word in the task holdout register 1500 to such processor, stores the Q value of such task word in the processor Q value table 1385 with the identity of such processor, and sets the highest order bit of the Q value portion in the table to the binary one state, thereby to inhibit use of this Q value in subsequent searches by the S clock. The operations performed by the T54 pulse are illustrated by the block 2262 in FIG. 61.

The succeeding step is to decrement the processor counter 1590 in FIG. 47 with a T55 pulse as illustrated by the block 2263 in FIG. 61. The next step in the algorithm is to test the processor counter 1590 to see if it has been reduced to zero, as illustrated by the block 2264 in FIG. 61. This step is performed by the T56 pulse, and if the counter holds the value of zero, an exit routine is performed by generating a T64 pulse which resets flip-flops 1801 and 1802 in FIG. 15 as indicated by the block 2265 in FIG. 64. If the test indicates that the processor counter does not hold the value of zero, the algorithm proceeds from the block 2264 in FIG. 61 back to the block 2211 in FIG. 63 to repeat the necessary steps to allocate additional task words to the remaining processors at which time the processor counter holds a value of zero and the operation of the T clock is terminated as indicated by the block 2265 in FIG. 64.

If the block 2260 in FIG. 61 indicates that an idle processor is requesting service, the T51 pulse causes the microprogram to branch to a different routine by generating a T57 pulse as indicated by the block 2265. The T57 pulse operates the set of gates 1680 in FIG. 51 to transfer the identity of the selected idle processor to the search counter 1411 in FIG. 49 whereby the decoder 1412 may select the storage register in the table 1385 reserved for this processor. The T58 pulse transfers the task word in the task holdout register 1551 to the selected processor and stores the Q value of the allocated task word from the Q value hold register 1381 in FIG. 48 to the selected register in the table 1385. The T59 pulse starts the IP clock in FIG. 50.

Figure 62:
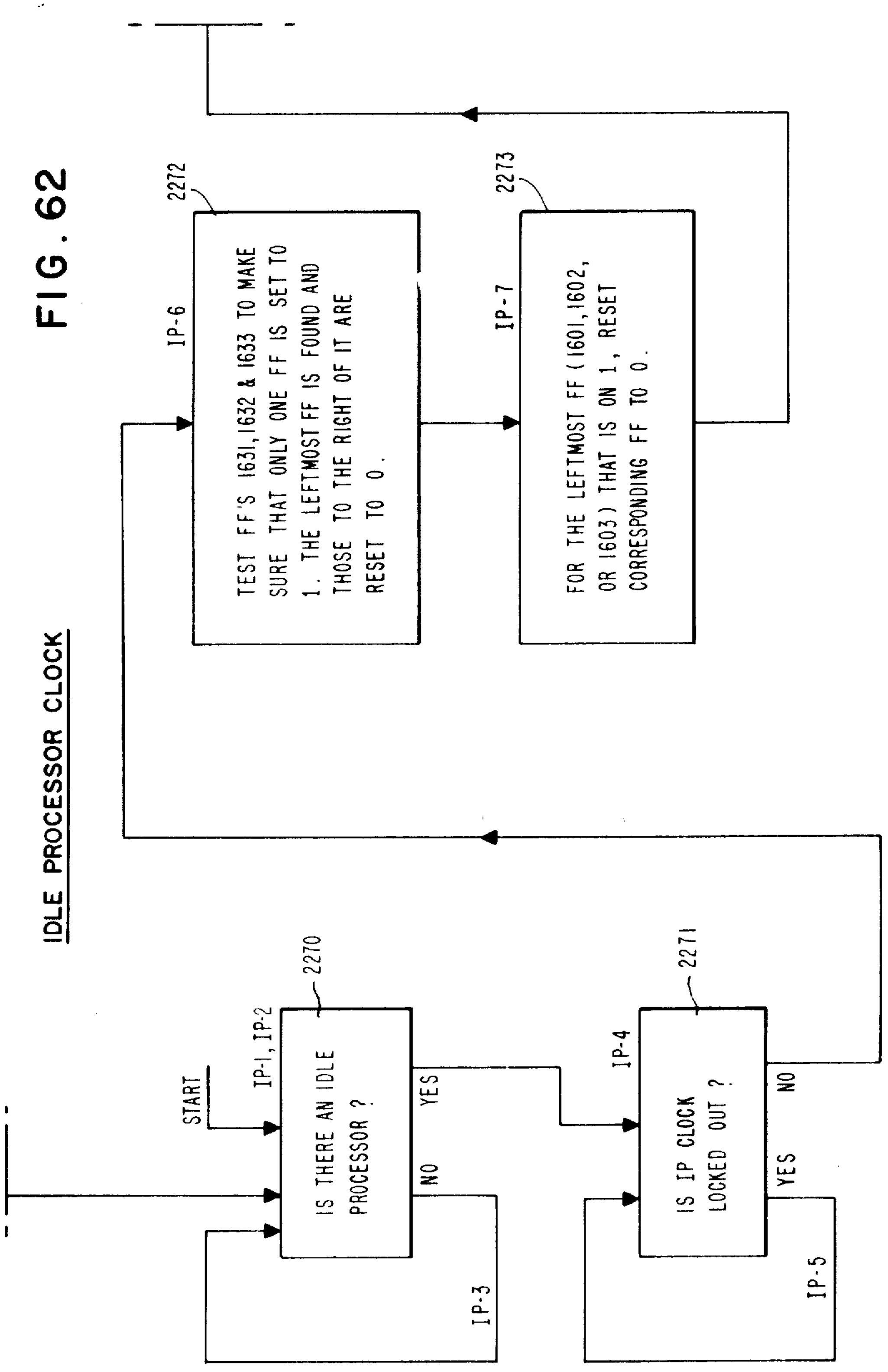
Figure 63:
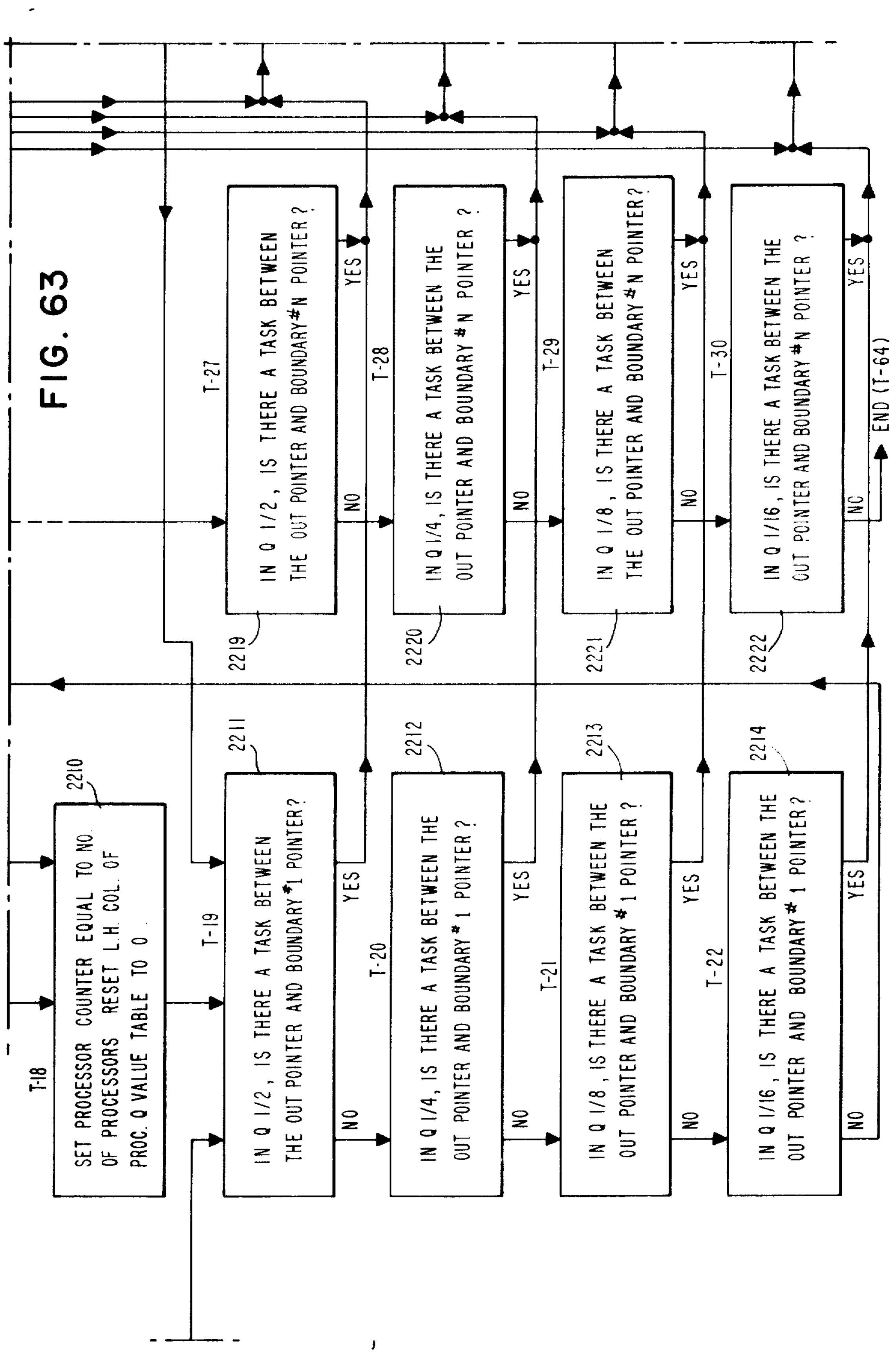

The algorithm proceeds then to the flow chart for the IP clock which commences with the block 2270 in FIG. 62. If there are no more idle processors the IP clock continues to sample for the presence of an idle processor by repetitively generating P2 and P3 pulses. If there is another idle processor, an IP4 pulse is generated which samples the state of the flip-flop 1921 in FIG. 20 to ascertain whether or not the IP clock is locked out. If so, the IP4 and IP5 pulses are repetitively generated until the IP clock becomes available as indicated by the block 2271 in FIG. 62. If the IP clock is not locked out, the next step in the allocation algorithm is to test the flip-flops 1631 through 1633 in FIG. 50 with an IP6 pulse as indicated by the block 2272 in FIG. 62. The left most flip-flop set to the one state is found, and those to the right of it are reset. The IP7 pulse resets the associated one of the flip-flops 1601 through 1603 in FIG. 50 as indicated by the block 2273 in FIG. 62. When the IP7 pulse terminates, a positive going signal is supplied by the single-shot 1557 in FIG. 47 on the line 1701 through the OR-circuit 967 in FIG. 35 to the single-shot 919 thereby to generate a T19 pulse, and the microprogram branches back to the block 2211 in FIG. 63. The microprogram proceeds from the T19 pulse through the necessary steps of the algorithm just explained to the T51 pulse. When the T51 pulse is generated, the block 2260 in FIG. 61 causes the microprogram to branch to the T57 pulse and allocate a task word to the idle processor. The foregoing process is repeated until all idle processors have been allocated task words.

The search under the scheduling algorithm is made for available task words by looking first for the oldest group of task words in the tables 654 through 651 in that order, repeating the search in the same order through these tables looking for the next to the last oldest group of task words, and repeating the search in this fashion until an available task word is found. This constitutes a precedence or priority ordering within each of these tables. Associated with each of these tables are sets of counters which include the in counter, the out counter, and the boundary counters 1, 2, . . . N. The associated boundary counters provide for the precedence or priority ordering scheme within each table, and the number of boundary counters is related directly to the number of priority levels. By adjusting the number of boundary counters the processor allocation algorithm can be biased to consider task words that have received low service even though those task words have a smaller service ratio than other task words. By adjusting the number of Q tables and the number of the boundary counters associated with each table, the system provides a high degree of flexibility with respect to allocating task words to processors according to the service ratio of the tasks and the degree of service required by the tasks. The boundary counters serve to divide the task words in the associated table into priority groups by defining time boundaries which separate the task words into groups. The time boundaries are created by transferring the content of the associated in counter to the boundary counter N at respective times T60 through T63 for the respective tables 654 through 651. The operation of the boundary counters is described next.

Let it be assumed for purposes of illustration that the in counter of a given table holds the value W when it is selected by the scheduling algorithm for updating operations on its available task words. More specifically, let it be assumed arbitrarily that table 653 in FIG. 30 is selected and that the in counter **670*a* in FIG. 26 holds the value W. In this case the BT8 pulse on the line 208 in FIG. 26 operates the gates 699*a* to transfer the content W from the in counter 670*a* through the sets of OR-circuits 703*a*, 707*a*, and 708*a* to respective boundary counters 704*a* through 706*a*. The available task words stored in the tables 653 are updated by recalculating their service ratios in the manner previously explained. Some of the task words may be returned to the table 653, and others may be returned to the table 654 if their service ratios are greater than ¼. If a task word is returned to the table 653, it is stored in the address pointed to by the in counter 670*a*. The in counter 670*a* is incremented to the next higher address, and the out counter 680*a* is incremented to the next higher address. The next task word is taken from the address specified by the out counter 680*a* and updated by recalculating its service ratio. The out counter 680*a* is incremented. If the word is returned to the table 653 after recalculating its service ratio, it is stored in the address pointed to by the in counter 670*a* and this counter is incremented. The updating operation proceeds in this fashion until all available task words have been updated by recalculating their service ratios at which time the out counter 680*a* holds the value W, and the in counter 670*a* holds the value W plus the number of task words returned to the table 653** by the updating operation.

It is assumed next that new task words are supplied to the system through the registers 490 through 492 in FIG. 8 as time passes and that some of these new task words are stored in the table 653 in FIG. 30. Each one of the new task words is stored in the address pointed to by the in counter **670*a* in FIG. 26, and this counter is incremented for each task word. Eventually the table 653 is selected by the allocation algorithm. Let it be assumed that the in counter 670*a* holds the value X at the time that the table 663 is selected by the scheduling algorithm. The pulses T9, T10, and T11 cause the content of the boundary counters 704*a* through 706*a* to be shifted to the left whereby the boundary counter 706*a* holds the value W, and the boundary counter 705*a* holds the value W. The T61 pulse operates the set of gates 701*a* in FIG. 26 to transfer the value X from the in counter 670*a* through the set of OR-circuits 703*a* in FIG. 30 to the boundary counter 704*a* in FIG. 29. The search made through the table 653 by the allocation algorithm is performed by the pulses T20, T24, and T28. These pulses cause the out counter 680*a* in FIG. 30 to be compared with the respective boundary counters 706*a* in FIG. 25, 705*a* in FIG. 29, and 704*a* in FIG. 29. Since the boundary counters 705*a* and 706*a* hold the value W and the out counter 680*a* holds the value W, no task word is transferred from the table 653 in response to the search made by the pulses T37 and T38. The boundary counter 704*a* holds the value X which is greater than the value W in the out counter 680*a*, and the pulse T39 is effective to initiate the transfer of task words from the table 653 because the content of the boundary counter 704*a* is unlike the content of the out counter 680*a*. As each task word is transferred from the table 653, the out counter 680*a* and the appropriate boundary counters 705*a* and 706*a* are incremented by a T40 pulse. When each processor has been interrupted and supplied with a task word, the processor counter 1590 in FIG. 47 terminates the allocation of task words from the table 653 in FIG. 30. It is assumed for purposes of this discussion that the value in the out counter at this time is less than the value X in the boundary counter 704***a*.

Let it be assumed that additional new task words are stored in the table 653 with the passage of time and that the in counter 670*a* advances to the value Y at which time the table 653 again is selected by the allocation algorithm. The left shift operation takes place in response to the pulses T9 through T11, and the value Y is transferred from the in counter 670*a* at T61 time to the boundary counter 704*a*. The the boundary counter 706*a* holds the value W plus the number of task words allocated from the table 653; the boundary counter 705*a* holds the value X; and the boundary counter 704*a* holds the value Y. It is seen that the boundary counter 705*a* in FIG. 29 points to the oldest group of task words stored in the table 653, and the boundary counter 704*a* in FIG. 29 points to the most recent group of task words stored in the table 653. As the scheduling algorithm performs a search through the tables 654 through 651, the pulses T20, T24, and T28 are effective to perform the search in the table 653 by comparing the content of the respective boundary counters 706*a*, 705*a*, and 704*a* with the out counter 680*a* in the manner previously explained. As long as the boundary counter 705*a* has a value which is greater than the value in the out counter 680*a*, the task words pointed to by the out counter 680*a* are transferred from the table 653 through the gates 688*a* by the T36 pulse and allocated to a processor in the manner previously explained. It is assumed that upon termination of the allocation algorithm the out counter 680*a* holds a value which is less than the value X in the boundary counter 705*a*.

If the in counter 670*a* is incremented to the value Z when the allocation algorithm next selects the table 653, the left shift operation of the boundary counters 704*a* through 706*a* and the in counter 670*a* takes place. At this time the boundary counter 706*a* holds the value X; the boundary counter 705*a* holds the value Y; and the boundary counter 704*a* holds the value Z.

During subsequent searches by the allocation algorithm for available task words, the remaining oldest group of task words in the table 653 are pointed to by the boundary counter, 706*a*, and task words are taken from the table 653 at locations pointed to by the out counter 680*a* which is successfully incremented as each task word is transferred from the table 653. When the value of the out counter is incremented to a value equal to the content of the boundary counter 706*a*, then the boundary counter 706*a* is incremented each time the out counter is incremented.

When subsequent search operations for available task words are made through the tables 654 through 651, the boundary counter 705*a* points to a group of task words which is then the oldest group stored in the table 653. As these task words are allocated to processors, the out counter 680*a* is incremented. Allocation of words from the table 653 takes place under control of the boundary counter 705*a* until the out counter 680*a* is incremented to the value Y. Thereafter task words may be allocated under control of the boundary counter 704*a* until the out counter is incremented to the value Z. If the content of the in counter 670*a* stand at the value Z, no further task words are available from the table 653. If new task words are stored in the table 653 before it is selected by the scheduling algorithm for updating operations, the content of the in counter 670*a* is transferred to the boundary counters 704*a* through 706*a*, and the above-described types of operations may be repeated.

It is seen from the foregoing description of the operation of the boundary counters that the oldest group of task words stored in the table 654 in FIG. 22, defined by the boundary counter 706*a*, takes precedence over the oldest group of task words stored in the table 653 which group is defined by the boundary counter 706*a*. However, group of task words, defined by the boundary counter 706*a*, stored in the table 653 take precedence over the group of task words in the table 654 which are defined by the boundary counter 705. Furthermore, the group of task words in the table 653 which are defined by the boundary counter 705*a* take precedence over the group of task words in the table 654 which are defined by the boundary counter 704. Thus it is seen how the boundary counters provide a priority ordering system within each of the tables 651 through 654, and the boundary counters in combination with the search sequence through the tables 654 through 651 provide a priority ordering arrangement of groups of task words dispersed among the various tables 651 through 654.

While the invention has been particularly shown and described with reference to a preferred embodiment thereof, it will be understood by those skilled in the art that various changes in form and details may be made therein without departing from the spirit and scope of the invention.

What is claimed is:

1. A program scheduling device for allocating task words which identify tasks to be performed by data processing means, said program scheduling device including:
   - a plurality of storage tables, first means for determining a service ratio for each task word where the service ratio represents the processing time required to complete a task divided by the time remaining before such task must be completed.
   - second means coupled to the storage tables for storing the task words in the storage tables according to their service ratios whereby task words with service ratios having a magnitude within a given range are stored in a common storage table, and
   - third means coupled to the storage tables for allocating task words to the data processing means, said third means being weighted or biased to allocate task words from the storage tables with higher service ratios more often than it allocates task words from storage tables with lower service ratios.

2. The apparatus of claim 1 wherein the third means includes fourth means which first allocates from each storage table those task words which have been waiting the longest time for processor service.

3. The apparatus of claim 1 wherein control means operates the first means and the second means to recalculate the service ratios of task words in the storage tables and place them in the appropriate storage table according to the updated service ratios.

4. A program scheduling device for allocating task words to data processing means, the task words specifying tasks, said program scheduling device including:
   - first means for determining a service ratio for each task word where the service ratio represents the processing time required to complete a task divided by the time remaining before such task must be completed,
   - a plurality of storage areas, second means coupled to the storage areas for storing the task words in the storage areas according to their service ratios whereby task words with service ratios having a magnitude within a given range are stored in a common storage area, and
   - third means coupled to the storage areas for allocating task words to the data processing means, said third means being weighted or biased to allocate task words from the storage areas with higher service ratios more often than it allocates task words from storage areas with lower service ratios.

5. The apparatus of claim 4 wherein the third means includes fourth means which first allocates from each storage table those task words which have been waiting the longest time for processing service.

6. The apparatus of claim 4 wherein control means operates the first means and the second means to recalculate the service ratios of task words in the storage tables and place them in the appropriate storage table according to the updated service ratios.

7. A system including data processing means and a program scheduling device coupled to the data processing means for receiving task words from the data processing means and for allocating task words to data processing means, each task word identifying a given task, said program scheduling device including:

first means for storing task words received from the data processing means, second means coupled to the first means for determining the sequence of allocating task words to the data processing means, and third means coupled to the first means for changing the sequence of allocating task words to the data processing means based on the data processing time required to complete each task divided by the time remaining before each task must be completed.

8. A system including data processing means and a program-scheduling device coupled to the data processing means for receiving task words from the data processing means and for allocating task words to data processing means, each task word identifying a given task, said program scheduling device including:

first means for storing task words received from the data processing means, second means coupled to the first means for determining the sequence of allocating task words to the data processing means, third means coupled to the first means for changing the sequence of allocating task words to the data processing means based on the ratio of the data processing time required to complete each task divided by the time remaining before each task must be completed, and fourth means coupled to the first and second means which allocates a plurality of task words determined by said second means to the data processing means for a period of time during which processing of the specified tasks takes place and after which unfinished tasks are interrupted and their task words are returned to the first means of the program scheduling device, said fourth means executing this procedure as necessary to allow all tasks to meet their deadlines, whereby tasks with a greater urgency are advanced over tasks with less urgency.

9. The apparatus of claim 8 wherein the second means includes fifth means which first allocates from task words having a common ratio those task words which have been waiting the longest time for service.

10. A system including data processing means and a program scheduling device coupled to the data processing means for receiving task words from the data processing means and for allocating task words to data processing means, each task word identifying a task, said program scheduling device including:

first means for storing task words received from the data processing means, second means coupled to the first means for determining the sequence of allocating task words to the data processing means, and third means coupled to the first means which allocates a first group of task words determined by the second means to said data processing means for a given period of time during which processing of the specified tasks takes place and after which each unfinished task identified by the first group of task words is interrupted and a second group of task words determined by said second means is allocated to said processing means for a given period of processing time, said third means executing this allocation procedure as necessary to allow all tasks sufficient execution time to meet their deadlines.

11. The apparatus of claim 10 further including fourth means coupled to said first means for controlling the sequence of allocating task words as a function of the processing time required to complete each task divided by the time remaining before each task must be executed.

12. A system including data processing means and a program-scheduling device coupled to the data processing means for receiving task words from the data processing means and for allocating task words to the data processing means, each task word identifying a task, said program-scheduling device including:

first means for storing task words received from the data processing means, second means coupled to the first means for determining the sequence of allocating task words to the data processing means, third means coupled to the first means for changing the sequence of allocating task words to the data processing means, said third means changing the sequence of allocating task words as a function of the processing time required to complete a task divided by the time remaining before a task must be completed, fourth means coupled to the first means which allocates a first group of task words determined by the second means to said data processing means for a period of processing time after which unfinished tasks are interrupted and a second group of task words determined by said second means is allocated to said processing means for a period of processing time, said fourth means executing this allocation routine as necessary to allow all tasks sufficient execution time to meet their deadlines.

13. A task selection system for assigning task words from a task storage means to a data processing means which executes tasks, each task word specifying a particular task, said system comprising:

first means for supplying first signals with each task word indicative of the time remaining before each task must be completed, second means for supplying second signals with each task word indicative of the processor time required to complete each task, third means for producing third signals for each task word by dividing the value indicated by the second signals by the value indicated by the first signals, and fourth means for selecting task words from the task storage means based on the value of the third signals.

14. The apparatus of claim 13 wherein the fourth means includes additional means which changes the operation of the fourth means to select task words from the task storage means based on the value indicated by the third signals and the length of time the task word has been waiting for processing service.

15. A task selection arrangement as set forth in claim 13 including means for selectively updating all task words by recalculating the third signals for each task word based on the current time then remaining before each task must be completed and the processor time required to complete each task.

16. A system including data processing means for carrying out tasks simultaneously, a program scheduler coupled to the data processing means, said program scheduler receiving task words from the data processing means and supplying task words to the data processing means, each task word identifying a task, said program scheduler including:

storage means for storing task words, first means for supplying first signals with each task word indicative of the time remaining until each task must be completed, second means for supplying second signals with each task word indicative of the processing time required to complete each task, third means for producing third signals for each task word by dividing the value of the second signals by the value of the first signals, fourth means responsive to said third signals for storing the task words in designated areas of said storage means according to the value of said third signals whereby task words having third signals with a value in a given range are grouped together in a common area, fifth means coupled to said storage means for interrupting periodically the task or tasks being executed by the data processing means and substituting therefor task words from said storage means, and said fifth means including sixth means for selecting the task words transferred from said storage means to said data processing means.

17. The apparatus of claim 16 wherein the data processing means includes means which updates the value of the first signals and the value of the second signals for each task word transferred from the data processing means to the program scheduler, and said program scheduler includes means for updating said first signals of each task word.

18. The apparatus of claim 17 wherein control means is connected to said third and fourth means which periodically operates the third means to update the third signals for each task word and operates the fourth means to place each task word in the appropriate storage area according to the updated third signals.

19. The apparatus of claim 18 wherein the sixth means selects task words from the various common storage areas in turn, and the common areas with task words having higher values of said third signals are selected more often than common storage areas with task words having lower values of said third signals.

20. A system for timely executing a plurality of tasks each of which is identified by a task word, said system including:

data processing means which executes a plurality of task words, a program scheduler coupled to the data processing means which supplies task words to the data processing means and receives task words from the data processing means, and said program scheduler including a control arrangement which allocates task words from said program scheduler to said data processing means as a function of the processing time required to complete each task and the time remaining before each task must be completed.

21. The apparatus of claim 20 wherein the control arrangement includes:

first means to calculate a service ratio for each task word by dividing the processing time required to complete each task word by the time remaining before each task word must be completed, and second means which allocates task words to the data processing means or a function of the service ratio.

22. The apparatus of claim 21 wherein the second means includes selection means which selects task words, and said selection means includes weighting means which cause selection of task words with higher service ratios to occur more often than selection of task words with lower service ratios.

23. The apparatus of claim 21 wherein the second means includes third means which signifies the time task words have been waiting for allocation to the data processing means, and said second means and said third means cooperate to allocate task words to the processing means as a function of the service ratio and the time each task word has been waiting for allocation to the data processing means.

24. The apparatus of claim 23 wherein the third means defines time boundaries, and task words are divided into time groups by said third means according to the length of time they have been waiting for service.

25. The apparatus of claim 23 wherein the control arrangement includes fourth means which operates the first means to update or recalculate the service ratio of the task words based on the current processing time required to complete each task and the current time remaining before each task must be completed.

26. A system including data processor means, a program scheduler coupled to the data processor means for receiving tasks from the data processor means to be executed and for assigning tasks to the data processor means for execution, each task being represented by a plurality of signals constituting a word designated a task word, each task word having an address portion which defines the memory address of the first instruction in the task, a $T_e$ portion which signifies the amount of processor time required to complete the task, and a $T_d$ portion which indicates a later point in time when the task must be completed, first means in the program scheduler which periodically decrements the $T_d$ portion of each task word thereby to update and maintain current said $T_d$ portion of each task word, second means in the program scheduler which determines a service ratio $q$ for each task word, where $q$ is defined as $T_e/T_d$, the program scheduler including a plurality of Q storage tables, designated by service ratios Q 1/2, Q 1/4, and Q 1/8, ... Q 1/n third means coupled to said Q storage tables which responds to the service ratio $q$ of each task word for storing (1) in the storage table Q 1/2 all task words having service ratios equal to or greater than ½, (2) in the storage table Q 1/4 all task words having service ratios equal to or greater than ¼ but less than ½, and (3) in the storage table Q 1/8 all task words having service ratios less than ¼, etc.

fourth means in the program scheduler which recalculates the service ratios of task words in the storage tables Q 1/2, Q 1/4, Q 1/8...Q1/n with storage table Q 1/2 receiving such recalculation service more often than storage table Q 1/4 and with storage table Q 1/4 receiving such recalculation service more often than storage table Q 1/8, etc., and fifth means in the program scheduler for allocating task words from the storage tables Q 1/2, Q 1/4, or Q 1/8...Q1/n to the data processor means, said fifth means allocating more tasks in a given time period from the storage table Q 1/2 than from the storage table Q 1/4, and said fifth means allocating more task words in said given time period from the storage table Q 1/4 than from the storage table Q 1/8, etc.

whereby the sequence of tasks supplied to said data processor means provides for the timely completion of all tasks by the data processor means.

27. The apparatus of claim 26 wherein said data processing means includes a plurality of processors.

28. The apparatus of claim 26 wherein said data processing means includes a data processor which executes multiple instructions simultaneously.

29. The arrangement of claim 26 wherein the program scheduler includes sixth means which can periodically interrupt processors in turn, commencing with the processor working on a task having the lowest $q$ value and proceeding sequentially through to the processor working on a task having the highest $q$ value, and allocates task words supplied by said fifth means as necessary to successively interrupted processors.

30. The apparatus of claim 29 wherein said sixth means includes seventh means which detects an idle processor and allocates to such processor the next task from the said fifth means.

31. The apparatus of claim 26 wherein the fifth means includes eighth means which defines time boundaries and divides the task words into time groups according to the length of time they have been waiting for processing service.

32. The apparatus of claim 31 wherein the eighth means includes a set of boundary counter for each of said Q storage tables, the number of boundary counters in each set being equal to the number of time boundaries.

33. The apparatus of claim 32 wherein task words in the oldest time group of each of the storage tables Q 1/2, Q 1/4 and Q 1/8...Q1/n are allocated by said fifth means before allocating tasks from more recent time groups of these storage tables.

34. A method of transferring task words which identify tasks from a program-scheduling device to a data processing device for execution of the specified tasks, said method comprising the steps of:

1. assigning a service ratio to each task word where the service ratio is directly proportional to the processor time needed to complete such task and inversely proportional to the time remaining before such task must be completed,
2. storing the task words in the program-scheduling device, and
3. transferring the task words to the data processing device from the program-scheduling device in an order determined by their service ratios.

35. A method of transferring task words from a program-scheduling device to a data processing device which performs tasks specified by the task words, said method comprising the steps of:

1. assigning a service ratio to each task word where the service ratio is directly proportional to the processor time needed to complete such task and inversely proportional to the time remaining before such task must be completed,
2. storing the task words in the program-scheduling device in specified storage areas according to their service ratios, and
3. allocating the task words to the data processing device in an order derived as a function of their service ratios and the length of time they have waited for allocation.

36. The method of claim 35 further including the steps of:

4. recalculating the service ratio of each task word thereby to update the service ratio according to the current time remaining before such task must be completed, and
5. storing the task word with an updated service ratio in specified storage areas according to the updated service ratio.

37. A method of transferring task words from a program-scheduling device to a data processing device which performs tasks specified by the task words, said method comprising the steps of:

1. assigning a service ratio to each task word where the service ratio is directly proportional to the processing time needed to complete a task and inversely proportional to the time remaining before a task must be completed.
2. storing the task words in the program-scheduling device in storage areas reserved for service ratios of a given range in magnitude,
3. allocating the task words to the data processing device from a selected order of the storage areas, and
4. allocating task words from each storage area, when it is selected, according to the length of time they have waited in such storage area for allocation.

38. The method of claim 37 further including the steps of:

4. recalculating the service ratio of each task word based on the time then remaining before such task must be completed thereby to update the service ratio, and
5. storing the task words with recalculated service ratios in storage areas according to the recalculated service ratios.

39. A system including data processor means, a program scheduler coupled to the data processor means for receiving tasks from the data processor means to be executed and for assigning tasks to the data processor means for execution, each task being represented by a plurality of signals constituting a word designated a task word, each task word having an address portion which defines the memory address of the first instruction in the task, a $T_e$ portion which signifies the amount of processor time required to complete the task, and a $T_d$ portion which indicates a later point in time when the task must be completed, first means in the program scheduler which periodically decrements the $T_d$ portion of each task word thereby to update and maintain current said $T_d$ portion of each task word, second means in the program scheduler which determines a service ratio $q$ for each task word, where $q$ is defined as $T_e/T_d$, the program scheduler including a plurality of Q storage tables, designated by service ratios Q 1/2, Q 1/4, Q 1/18,...Q 1/n third means coupled to said Q storage tables which responds to the service ratio $q$ of each task word for storing (1) in the storage table Q 1/2 all task words having service ratios equal to or greater than ½, (1) in the storage table Q 1/4 all task words having service ratios equal to or greater than ¼ but less than ½, and (3) in the storage table Q 1/8 all task words having service ratios less than ¼, etc.

fourth means in the program scheduler which recalculates the service ratios of task words in the storage tables Q 1/2, Q 1/4, Q 1/8...Q 1/n with storage table Q 1/2 receiving such recalculation service more often than storage table Q Q 1/4 with storage table Q 1/4 receiving such recalculation service more often than storage table Q 1/8, etc., fifth means in the program scheduler for allocating task words from the storage tables Q 1/2, Q 1/4, Q 1/8...Q 1/n to the data processor means, said fifth means allocating more tasks in a given time period from the storage table Q 1/2 than from the storage table Q 1/4, and said fifth means allocating more task words in said given time period from the storage table Q 1/4 than from the storage table Q 1/8, etc.

said fifth means including sixth means which, upon allocation of each task word, interrupts the task being processed which has the lowest service ratio thereby to give tasks with higher service ratios additional processor time during the allocation process.

whereby the sequence of tasks supplied to said data processor means provides for the timely completion of all tasks by the data processor means.

40. The apparatus of claim 39 wherein said data processor means includes a plurality of data processors; and said fifth means includes:

a storage device, first control means coupled to the storage device which operates the storage device to store the identity of the data processor and the service ratio of the task word whenever each task word is allocated, and second control means coupled to the storage device which searches through the storage device and identifies the data processor which is working on the task with the lowest service ratio prior to allocating each task word.

* * * * *